United States Patent [19]

Kaplan et al.

[11] Patent Number: 4,783,752
[45] Date of Patent: Nov. 8, 1988

[54] KNOWLEDGE BASED PROCESSOR FOR APPLICATION PROGRAMS USING CONVENTIONAL DATA PROCESSING CAPABILITIES

[75] Inventors: Samuel J. Kaplan, Portola Valley; Jonathan J. King; Daniel Sagalowicz, both of Palo Alto, all of Calif.

[73] Assignee: Teknowledge, Inc., Palo Alto, Calif.

[21] Appl. No.: 837,098

[22] Filed: Mar. 6, 1986

[51] Int. Cl.$^4$ .............................................. G06F 15/18
[52] U.S. Cl. ..................................... 364/513; 364/900
[58] Field of Search ........ 364/468, 513, 200 MS File, 364/300, 900 MS File, 400

[56] References Cited

U.S. PATENT DOCUMENTS

| | | | |
|---|---|---|---|
| 4,286,330 | 8/1981 | Isaacson | 364/900 |
| 4,558,413 | 12/1985 | Schmidt et al. | 364/200 |
| 4,591,983 | 5/1986 | Bennett et al. | 364/513 |
| 4,595,982 | 6/1986 | Burt | 364/300 |
| 4,644,479 | 2/1987 | Kemper et al. | 364/513 |
| 4,648,044 | 3/1987 | Hardy et al. | 364/513 |
| 4,649,515 | 3/1987 | Thompson et al. | 364/900 |
| 4,658,370 | 4/1987 | Erman et al. | 364/513 |

OTHER PUBLICATIONS

Rosen ed., *Programming Systems and Languages*, pp. 490–492 (Apr., 1964).
Abelson et al., *Structure and Interpretation of Computer Programs*, MIT Press (1985) pp. xi–xiv.
R. Anderson, J. Gillogly, "RAND Intelligent Terminal Agent (RITA): Design Philosophy". RAND R-18-09-ARPA, 1976.
W. Van Melle et al., *The Emycin Manual*, Stanford University Report No. STAN-CS-81-885, Stanford, California (Oct. 1981).
Erman et al., U.S. Pat. App. Ser. No. 618,038 filed Jun. 7, 1984.
Hardy U.S. Pat. Appl. Ser. 617,791 filed Jun. 6, 1984.
Avron Barr & Edward A. Fiegenbaum, *The Handbook of Artificial Intelligence*, vol. II, Ch. VI, (1982) pp. 1–76.
Sloman et al., "POPLOG: a Multilanguage Program Development Environment," Info. Tech.: Res. & Dev. 2 (1983) pp. 109–122.

*Primary Examiner*—John R. Lastova
*Attorney, Agent, or Firm*—Arnold, White & Durkee

[57] ABSTRACT

A knowledge base processor is callable by an application program to access a knowledge base and to govern the execution or interpretation of the knowledge base to find the values of selected objects or expressions defined in the knowledge base. The application program is written in a conventional computer language which specifies control by the ordering of program steps. The application program provides a user interface for input/output and provides top level control for calling the knowledge base processor to find values for goal expressions. During its search for the values of goal expressions, the knowledge base processor calls the application program to determine values of expressions which are not concluded by the knowledge base, and to signal important events during the execution of the knowledge base. Preferably the knowledge base processor and the application program each include a library of subroutines which are linked-loaded to provide a complete knowledge system for a specific application or task. Therefore, the knowledge base processor provides the esential functions for symbolic reasoning, and establishes a framework for building the knowledge system which permits application program developers to exploit the best available conventional data processing capabilities. The application programmer is free to exercise his or her knowledge and skill regarding the use of conventional programming languages and their support facilities such as utility libraries, optimizing compliers and user interfaces.

41 Claims, 8 Drawing Sheets

Fig.2

| PATTERN | (ANY ONE OF THESE) | | | |
|---------|---|---|---|---|
| VALUE TYPE | LENGTH OF PATTERN | INDEX TO NAME IN SYMBOL TABLE | LONG INTEGER NUMBER | SINGLE PRECISION FLOATING VALUE |

— 60

| VALUE TYPE | DESCRIPTION |
|---|---|
| 1 | INTEGER NUMBER |
| 2 | FLOATING POINT NUMBER |
| 3 | ATOM SYMBOL |
| 4 | VARIABLE SYMBOL |
| 8 | POINTER TO ANOTHER PATTERN |
| 9 | LENGTH OF PATTERN ARRAY |

EXPRESSION
$\begin{cases} \text{ATOM} \\ \text{ATOM (ARG 1, ARG 2,} \cdots \text{)} \end{cases}$ (ANY NUMBER OF ARGUMENTS)

Fig.5 accnt (tbill, rate)           — 75

| 3 | accnt | tbill | rate |

77                                                    76 accnt (tbill, rate(10.5))      — 80

| 3 | accnt | tbill | * |

| 2 | rate | 10.5 |

Fig.6

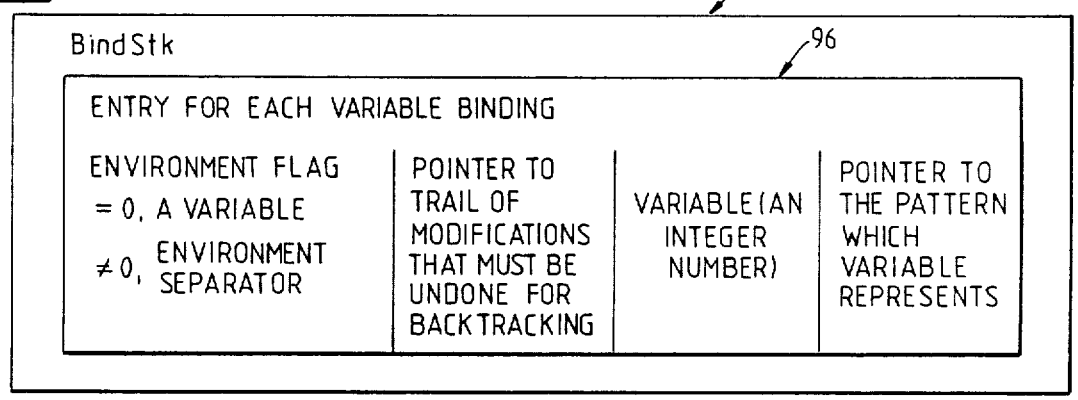
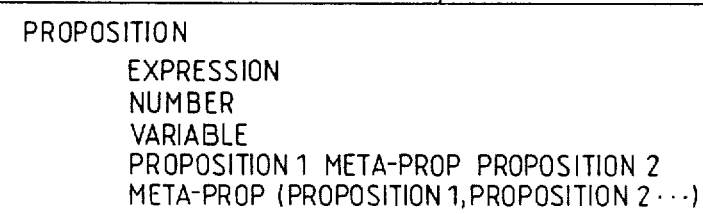
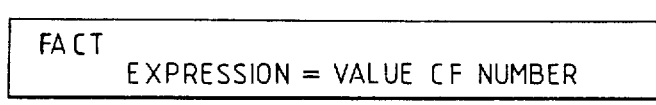
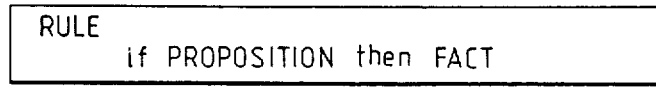

Fig. 15
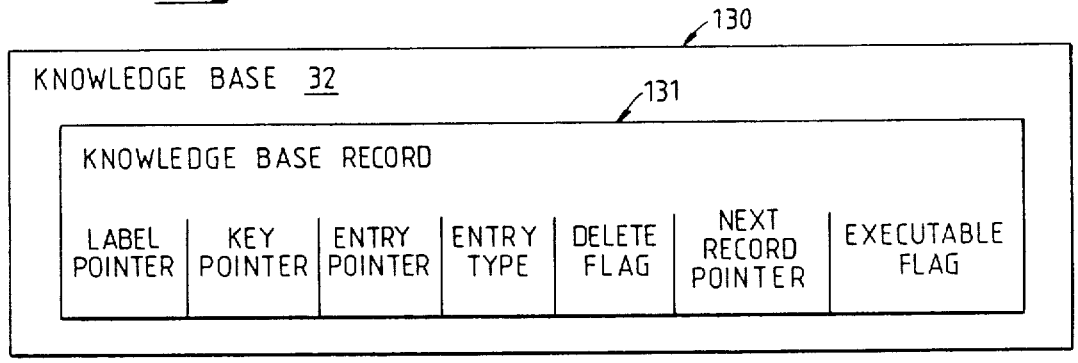
| KNOWLEDGE BASE ENTRY TYPE | DESCRIPTION |
|---|---|
| POSITIVE | APPLICATION-DEFINED METAFACT |
| -5 | NOCACHE |
| -6 | MULTIVALUED |
| -7 | PRESUPPOSITION |
| -8 | WHENFOUND |
| -9 | RULE |
| -11 | FACT |
| -15 | WHENCACHED |
Fig. 16
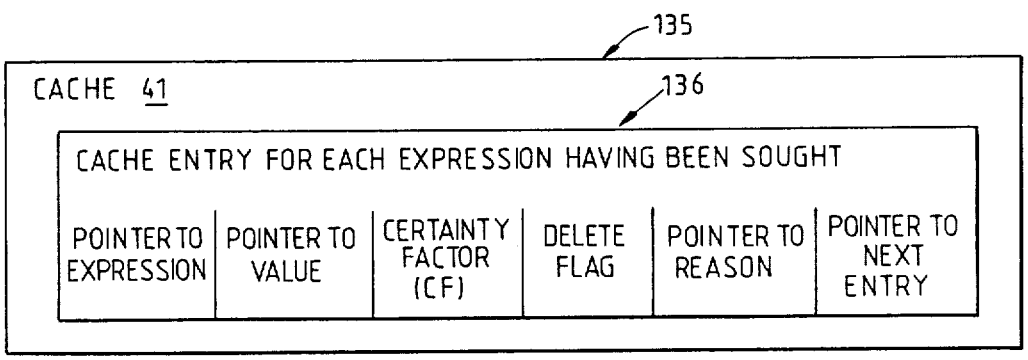
Fig. 17

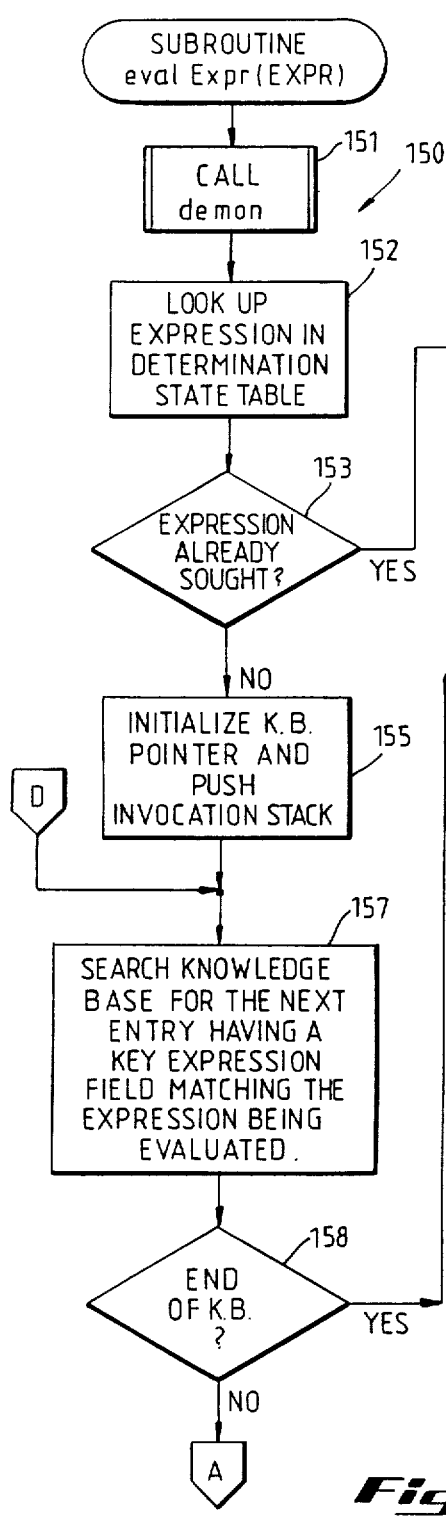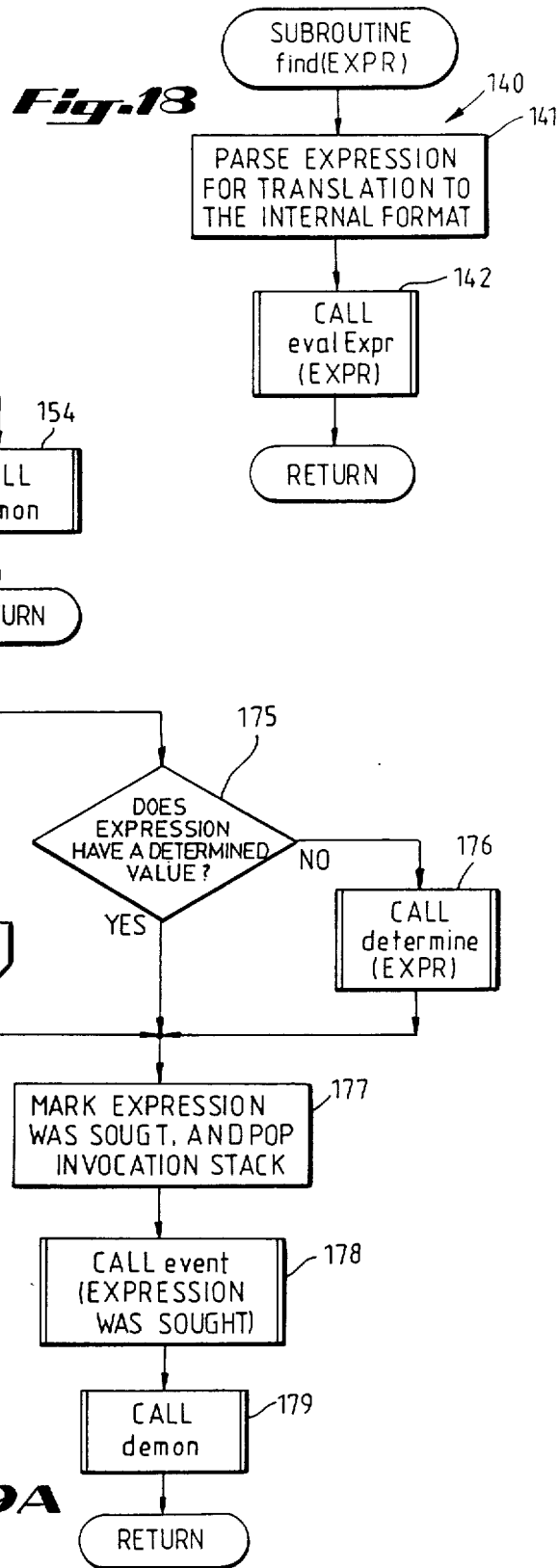

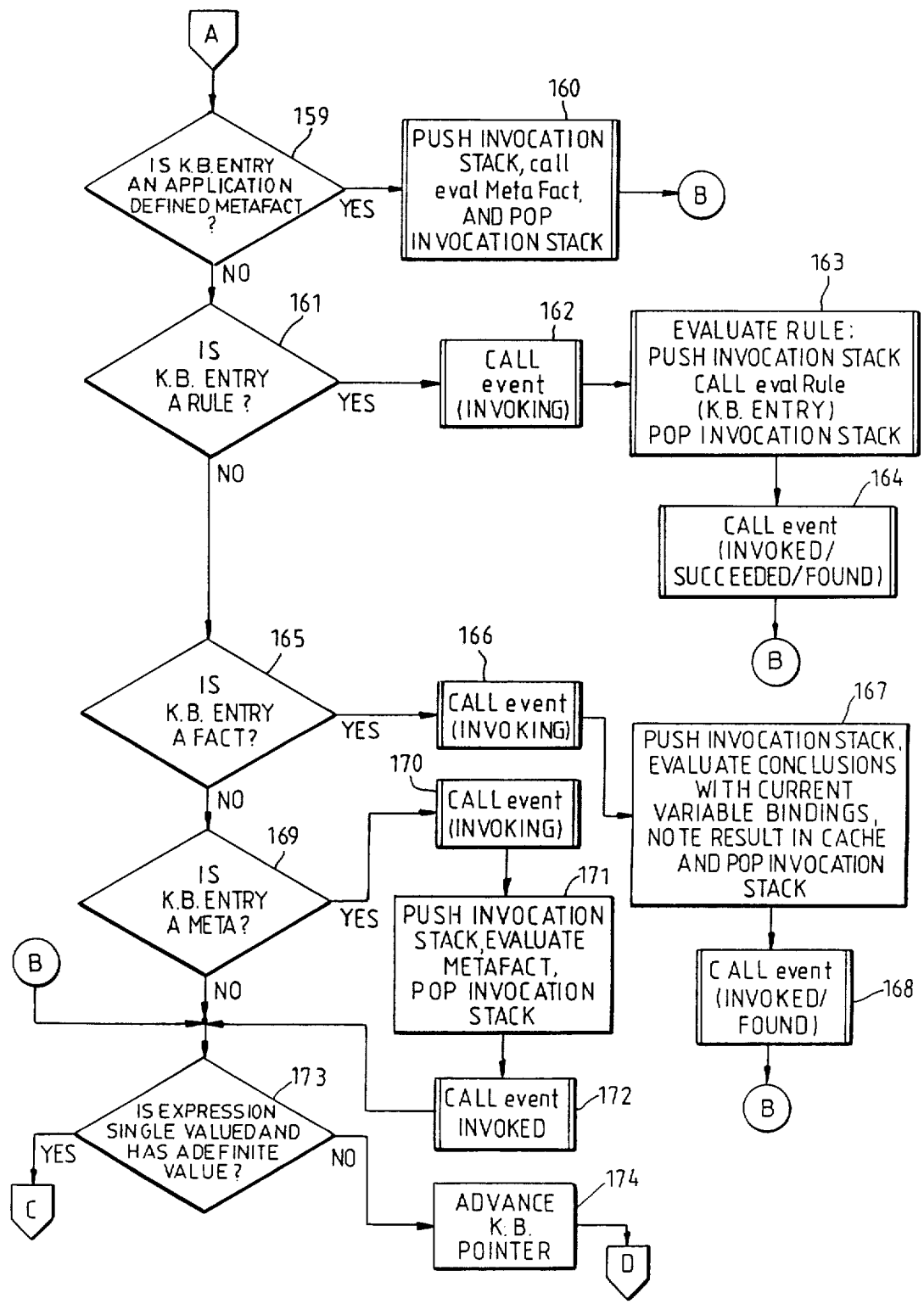

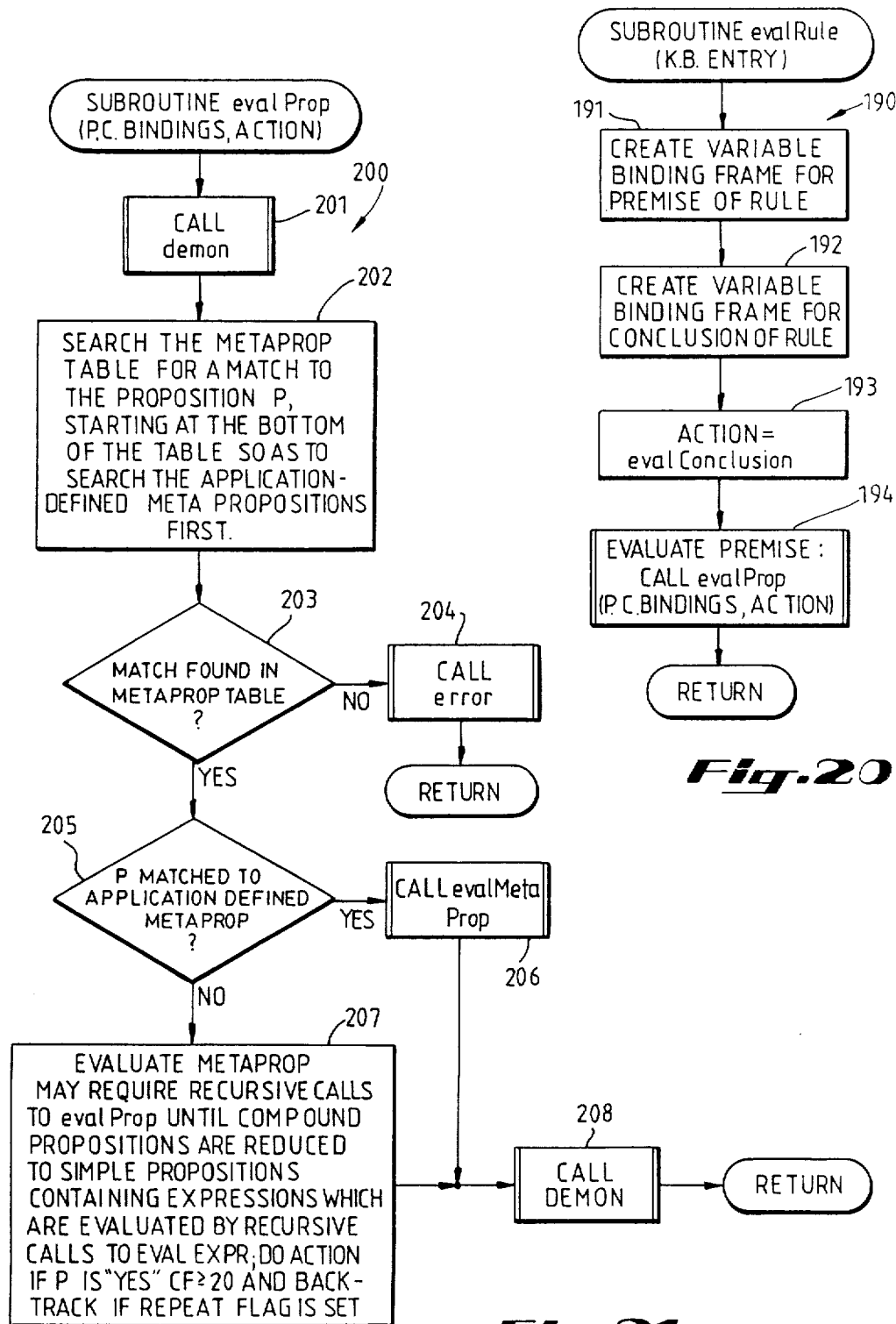

KNOWLEDGE BASED PROCESSOR FOR APPLICATION PROGRAMS USING CONVENTIONAL DATA PROCESSING CAPABILITIES

BACKGROUND OF THE INVENTION

1. Field of the Invention

The present invention relates generally to artificial intelligence and knowledge engineering, and more particularly to a digital computer for executing or interpreting a knowledge base to perform symbolic reasoning.

2. Description of the Related Art

Knowledge systems are computer systems that emulate reasoning tasks by using an "inference engine" to interpret encoded knowledge of human experts stored in a "knowledge base". Knowledge systems are becoming useful for problems that require diagnosis, recommendation, selection or classification. Such tasks in the past have been performed by human experts. It is becoming known that if the domain of the knowledge base, or scope of the problem, is sufficiently narrow and a sufficiently large body of knowledge is properly encoded in the knowledge base, then the knowledge system can achieve performance matching or exceeding the ability of a human expert. In such a case the knowledge system becomes an "expert system".

The first step in building a knowledge system involves encoding unstructured, often even unarticulated, knowledge into machine readable form. For expert systems in a given application domain, several different kinds of knowledge are involved. The different kinds of knowledge include the vocabulary the structure of the domain, the judgmental knowledge of the domain, and the procedures or techniques by which the domain knowledge is applied to solve a specific problem. The vocabulary of the domain refers to the names of the individual objects and ideas that must be encoded in the knowledge base. The structure of the domain refers to relationships between the objects and the ideas in the domain. The judgmental knowledge of the domain refers to the rules of thumb or rules of inference which are used by human experts to solve a problem involving uncertain knowledge or to restrict the scope of relevant knowledge or to direct the search for solutions among various possibilities covered by the knowledge base. Therefore, to some extent the procedures or techniques by which the domain knowledge is applied are a part of the judgmental knowledge of the domain. The procedures or techniques, however, also include a good deal of knowledge that could be considered routine rather than judgmental, such as how to carry out a consultation with a user.

A user typically accesses knowledge in the knowledge system interactively during a consultation. It is important that the consultation occurs in a manner that assures the user that the knowledge in the knowledge base is being properly considered and applied. It is particularly important, for example, that the user is not asked for redundant information and is given specific reasons why the knowledge system arrives at particular conclusions.

Presently there are highly developed commercial tools which may be used by skilled knowledge engineers to build knowledge systems. The well-known commercial tools (such as KS300 manufactured by Teknowledge, Inc. 525 University Avenue, Palo Alto, Calif. 94301) are patterned after a tool called EMYCIN described in *The Emycin Manual* by Van Melle at al., Stanford University Report No. STAN-CS-81-885, Stanford Calif. 94305 (October, 1981).

EMYCIN is specifically designed as a domain-independent system for constructing rule-based consultant expert system programs. Domain knowledge is represented in EMYCIN systems primary as condition-action production rules which are applied according to a goal-directed backward chaining control procedure. Rules and consultation data are permitted to have associated measures of certainty, and incomplete data entry is allowed. The EMYCIN system includes an explanation facility that displays the line of reasoning followed by the consultation program, and answers questions from the client about the content of the knowledge base. To aid the system designer in producing a knowledge base for a specific domain, EMYCIN provides a terse and stylized language for writing rules; extensive checks to catch common user errors, such as misspellings; and methods for handling all necessary indexing chores.

In addition to production rules, the knowledge base for an EMYCIN system includes a hierarchical structure called a "context tree". The elemental representation of an object or idea is defined as a context-parameter-value triple. The context refers generally to an instance of a particular context type, the parameter refers to an attribute of the context instance, and the value refers to the particular value of the parameter for the particular context instance. The context tree is defined by parent and offspring declarations for the context types.

A consultation is started by instantiating a root context and the branches from this root context define major steps in the consultation during which the offspring contexts of the root node are instantiated. Thus, the context definitions are used to structure the data or evidence required to advise a user about the root context. Besides consultation control, the context tree may be used to organize the distinguished components of some object, and to represent distinguished events or situations that happen to an object.

A recognized shortcoming of the EMYCIN-based tools is that the high-level control knowledge about how to conduct a consultation is buried in the rules or is intermingled with the context definitions which define the structure of the domain. As described in Erman et al., U.S. patent application Ser. No. 618,038 filed June 7, 1984, this control knowledge should be made explicit by encoding it in an applicative and imperative procedural language defining control actions to be executed during interruption of a built-in control procedure at specified control steps. To provide transparent representation of control knowledge as well as factual knowledge, the knowledge base is preferably organized into distinct frames including the rules; control blocks separately encoding the control knowledge; and classes which become instantiated, attributes which take on values describing the class instances, class types, legal value hierachies, and user defined functions, which all encode factual knowledge. The knowledge engineer may provide control blocks to be executed at the start of the consultation, after the instantiation of specified classes, when a value for a specified attribute is to be determined, after a specified attribute is determined, and upon explicit invocation by another control block. The knowledge engineering tool described in Erman et al. U.S. Ser. No. 618,038 has been manufactured and sold by Teknowledge, Inc., 525 University Avenue, Palo Alto, Calif. 94301, under the trademane "S.1". This knowledge engineering tool is intended for use by experienced knowledge engineers in building complex knowledge systems.

A knowledge engineering tool suitable for use by people with limited computer experience is described in Hardy U.S. patent application Ser. No. 617,791 filed June 6, 1984. Hardy discloses that because of the lack of knowledge engineering tools based on a transparent expert system language, a person needs a good deal of formal education in computer science as well as specialized training in knowledge engineering: to become a skilled knowledge engineer. The term "expert system language" denotes the manner or way in which factual, judgmental and control knowledge is encoded in the knowledge base. Hardy discloses a useful knowledge engineering tool for building an expert system and running a consultation on a personal-type microcomputer. The knowledge base language is easily understood because English-like language statements express facts, rules, and meta-facts for specifying control knowledge, and control during a consultation is goal directed in depth-first fashion as specified by rule order. The tool includes interactive knowledge base debugging, question generation, legal response checking, explanation, and certainty factors. For the more experienced knowledge engineer, the tool permits the use of recursive rules and universally quantified variables. The knowledge engineering tool described in Hardy Ser. No. 617,791 has been manufactured and sold by Teknowledge, Inc., 525 University Avenue, Palo Alto, Calif. 94301, under the trademark "M.1".

SUMMARY OF THE INVENTION

Although knowledge system tools are available for inexperienced programmers as well as experienced knowledge engineers, the inventors of the present invention have recognized that a large class of potential users of knowledge systems have been inhibited by a shortage of tools adapted to their particular abilities and resources. Specifically, there are many highly skilled computer programmers fluent in high-level conventional computer languages such as BASIC, FORTRAN, and "C", but who are not familiar with languages such as LISP or PROLOG which are commonly used by experts working in the field of knowledge systems. Most knowledge engineering tools are based on LISP or PROLOG, and an understanding of the underlying language is required for realizing the full capabilities of a knowledge engineering tool.

LISP and PROLOG are to a great extent incompatible with the above-mentioned conventional high-level computer languages. The above-mentioned conventional computer languages are general purpose languages having readily available support facilities such as utility libraries, optimizing compliers, and user interfaces which may be operated on a wide variety of computer models. By contrast, LISP and PROLOG are not widely used as general purpose languages and have limited support facilities, although they are especially suited for symbol manipulation and symbolic reasoning. Even though the same computer may have facilities for compiling and loading LISP and PROLOG programs as well as a conventional language program, it is difficult to use both languages simultaneously to perform a common task due to the incompatability of the basic data structures for each language and their procedures for program interruption and execution transfer, for example, by subroutine calls. Therefore a LISP or PROLOG program generally cannot use the support facilities available for the conventional computer programming languages, and conversely conventional computer language programs cannot use the limited support facilities available for LISP and PROLOG. As a consequence, presently available knowledge engineering tools cannot exploit the readily available support facilities for the general purpose languages.

Accordingly, the primary object of the present invention is to provide a knowledge engineering tool that is compatible with the conventional computer programming languages and their support facilities such as utility libraries, optimizing compliers and user interfaces.

Another object of the invention is to increase the performance of knowledge systems by permitting them to use the support facilities of conventional computer programming languages.

Yet another object of the invention is to permit a computer programmer to use a conventional computer programming language to specify most of the control knowlege for a knowledge system.

Still another object of the invention is to permit a computer programmer to use a conventional computer programming language to modify the basic operation of the knowledge system and to extend or enhance the capabilities of the knowledge system.

Moreover, another object of the invention is to permit a conventional computer program to easily perform symbolic reasoning tasks.

Briefly, in accordance with primary aspects of the present invention, a knowledge base processor is callable by an application program to build and maintain a knowledge base, and to govern the execution or interpretation of the knowledge base to find the values of selected objects or expressions defined in the knowledge base. The application program is written in a conventional computer language which specifies control by the ordering of program steps. The application program provides a user interface for input/output and provides top level control for calling the knowledge base processor to find values for goal expressions. Typically the application program provides initial values for objects, initiates and directs the search for goal expressions, defines questions and prompts a user for relevant information, and checks for legal values and assigns default values. During its search for the values of goal expressions, the knowledge base processor calls the application program to determine values of expressions which are not concluded by the knowledge base, and to signal important events during the execution of the knowledge base. In response to these events, the application program may interrupt or modify the execution of the knowledge base. Preferably the knowledge base processor and application program each include a library of subroutines which are linked-loaded to provide a complete knowledge system for a specific application or task. Therefore, the knowledge base processor provides the essential functions for symbolic reasoning, and establishes a framework for building the knowledge system which permits application program developers to exploit the best available conventional data processing capabilities. The application programmer is free to exercise his or her knowledge and skill regarding the use of conventional programming languages and their support facilities such as utility libraries, optimizing compilers and user interfaces.

BRIEF DESCRIPTION OF THE DRAWINGS

Other objects and advantages of the invention will become apparent upon reading the following detailed description and upon reference to the drawings in which:

FIG. 2 is a diagram showing the format for the basic data structure used in the preferred embodiment of the invention;

FIG. 3 is a table showing the meanings of the permissible value types for the basic data structure of FIG. 2;

FIG. 4 is a diagram showing the format for an expression;

FIG. 5 is a diagram showing how an expression is represented as an array of the basic data structures shown in FIG. 2;

FIG. 6 is a diagram showing how more complex expressions are represented as linked arrays of the basic data structures;

FIG. 7 shows a determination state table used for indicating whether the inference engine is seeking or has sought a value or values for an expression;

FIG. 8 shows an expression characteristic table for indicating whether an expression is multi-valued and whether its value or values should be noted in cache when they are determined;

FIG. 9 is a diagram showing the format of a variable binding stack for recording and indicating the current bindings of variables, the trail of variable binding modifications that must be undone for backtracking, and the groups of variables which are local to the same environment;

FIG. 10 is a diagram showing the permissible formats for a proposition;

FIG. 11 is a diagram showing the format for a fact;

FIG. 12 is a diagram showing the format for a rule;

FIG. 15 is a diagram showing the format for the knowledge base;

FIG. 16 is a table showing various meanings of permissible values for the knowledge base entry type;

FIG. 17 is a diagram showing the format for data stored in the cache;

FIG. 18 is a flowchart of a subroutine named "find" for finding the value or values of an expression and storing them in the cache;

FIGS. 19A and 19B comprise a flowchart of a subroutine named "evalExpr" for evaluating an expression after the expression has been converted to a parsed format by the "find" subroutine of FIG. 18;

FIG. 20 is a flowchart of a subroutine named "evalRule" for invoking a rule; and FIG. 21 is a flowchart of a subroutine named "evalProp" for evaluating a proposition such as the premise of a rule and for asserting a conclusion or performing another action in the event that the proposition is found to be true.

Figure 1:
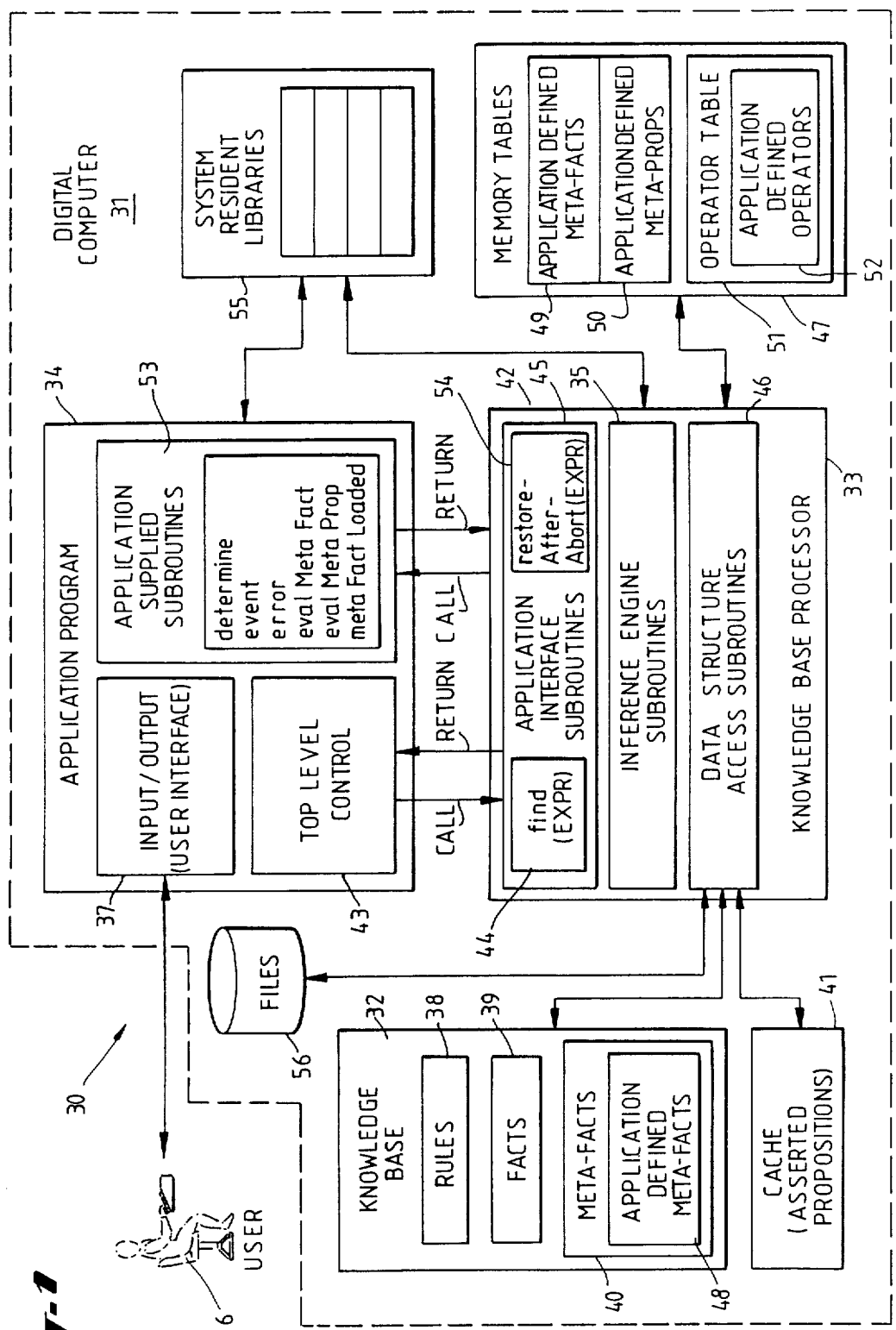
FIG. 1 is a block diagram of the preferred embodiment of the invention.

The present specification includes a number of appendices, including a glossary of terms, a sample knowledge base, an application program listing for a "Stock Market Advisor" knowlege system, a consulatation listing showing the typical operation of the Stock Market Adviser knowledge system, and flow sheets and a program listing of the preferred embodiment of the knowledge base processor according to the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the scope of the invention as defined as by the appended claims.

DESCRIPTION OF THE PREFERRED EMBODIMENT

Turning now to the drawings, there is shown in FIG. 1 a functional block diagram of the preferred embodiment of a knowledge system according to the present invention. The knowledge system, generally designated 30, comprises a digital computer 31 having a knowledge base 32 stored in its memory. For controlling the internal operations of the digital computer 31 to govern the manner in which the knowledge base 32 is executed or interpreted, the memory of the digital computer also includes a control procedure for a knowledge base processor 33 and an application program 34. The knowledge base processor 33 includes inference engine subroutines 35 which reason over the knowledge base 32 to arrive at conclusions. To communicate with a user 36, the application program 34 includes a user interface 37 providing input and output. The system 30, therefore, is recognized as a knowledge system since it comprises a knowledge base 32, an inference engine 35, and a user interface 37, which are the primary components of any knowledge system.

So that the knowledge base 32 is transparent to the knowledge engineer and is easily modified or expanded, the knowledge base includes rules 38 and facts or propositions 39 to encode domain knowledge. Each rule is a pair, composed of an antecedent (known as the premise) and a consequent (known as the conclusion), that can support the deductive process of backward chaining performed by the inference engine 35. The rules 38 are in the form of "if [premise] then [conclusion]." The premise and conclusion are made up of "propositions", or statements that can be proved true or false. Similarly, each fact 39 is a proposition.

To aid the inference engine 35 in the interpretation and execution of the rules 38 and facts 39, the knowledge base 32 also includes meta-facts 40, which are statements about the knowledge base or a consultation to be conducted with the user 36, as opposed to facts about the subject domain. One kind of meta-fact is known as a "presupposition." A presupposition is a condition that must be true in order for some other statement even to make sense. For example, it must have been raining for the question "has it stopped raining?" to make sense. A meta-fact in the form of "presupposition(expression)=condition" can be used to prevent the inference engine 35 from seeking the value of the specified expression unless the specified condition is true.

So that the interpretation of the knowledge base 32 is easily understood by a computer programmer familiar with traditional programming languages, the inference engine 35 finds the value of a specified expression by sequentially searching the knowledge base 32 for rules 38, facts 39, or meta-facts 40 which conclude values for the specified expression. The user, however, must keep in mind that when a rule or fact is encountered having other expressions for which values have not yet been sought, searching will be restarted at the top of the knowledge base in order to determine the values of these other expressions. When a rule or fact concludes a value for an expression, the value is noted in a portion of memory called "cache" 41. The searching of the knowledge base 32 for values of a given expression does not necessarily stop at this point. If the expression has the property of being "multivalued", the entire knowledge base is searched to determine all possible values for the expression. By default, each expression is assumed to be single valued, unless the expression is explicity declared as multivalued by a meta-fact 40 in the form of "multivalued(expression)".

Even though an expression is assumed to be single valued, searching though the knowledge base 32 will not stop unless a value for the expression has been determined with complete certainty. This process is known as the occurrence of a "single valued cut-off".

In order to accumulate evidence about the value or values for an expression, the inference engine 35 can draw conclusions from inexact or imprecise data. For this purpose, each value noted in the cache 41, each rule 38, and each fact 39 has an associated "certainty factor" or number representing the confidence placed by the inference engine 35 upon the validity of the corresponding value, rule, or fact. The certainty factor is not interpreted as a probability, but rather as a subjective index of the amount of evidence that has been accumulated confirming or disconfirming the proposition. The certainty factors range from $-100$ to $+100$, indicating that a rule, proposition, or value is definitely ruled out or is definitely certain respectively. The certainty factors, however, are combined accordingly to the laws of probability for independent events. Therefore, if a value for an expression in cache initially has a certainty factor of CF, and a rule having a certainty factor of CF1 confirms the same value for the expression, then the certainty factor in the cache is changed or updated to a certainty factor of CF2 calculated according to:

$$CF2 = CF1 + CF - CF1*CF/100$$

provided that CF1 and CF2 are both positive.

Negative certainty factors are combined in a similar fashion, as shown in the subroutine "cfCombine" included in the STORAGE.C section of the program listing for the knowledge base processor in Appendix VI.

In accordance with the primary aspect of the present invention, the knowledge base processor 33 is callable by the application program 34 to build and maintain the knowledge base 32 and to govern the execution or interpretation of the knowledge base to find the values of selected objects or expressions in the knowledge base. The application program is written in a conventional high-level computer language which specifies control by the ordering of program steps. In addition to the user interface 37, the application program provides top level control 43 for calling the knowledge base processor to find the values for goal expressions. A subroutine named "find" 44 is specifically provided for this purpose. The knowledge base processor 33 includes a number of other "application interface" subroutines 45 that are easily called by the application program to perform selected ones of predefined functions. Although the entire knowledge base processor 33 preferably is made of user callable functions, the application interface subroutines 45 have few if any "side effects" and do not require the application programmer to have extensive knowledge of the data structures used by the knowledge base processor 33.

The application interface subroutines 45 and inference engine subroutines 35 themselves are made more transparent by using subroutine calls to separate "data structure access" subroutines 46 included in the knowledge base processor 33 for handling the details of accessing the knowledge base 32, cache 41, files 56, and other data structures used by the application interface subroutines or inference engine subroutines.

A number of application interface subroutines 45 provide easy access to the knowledge base 32. Before accessing the knowledge base, the application programmer first calls an application subroutine named "openKB" to open the knowledge base for use. Then an application interface subroutine named "loadKB" is called to load a knowledge base file into the knowledge base data structure. After loading the knowledge base file, a selected knowledge base entry can be obtained for inspection by calling an application interface subroutine named "getKB". In order to edit this knowledge base entry, the knowledge base entry is first removed from the knowledge base data structure 32 by calling a subroutine "resetKB". Then the edited version of the knowledge base entry is added or inserted in the knowledge base by calling an application interface subroutine named "addKB". When the application programmer is finished editing the knowledge base, the edited knowledge base can be saved to a file by calling an application interface subroutine named "saveKb". Then an application interface subroutine named "closeKB" is called to close the knowledge base from use.

In a similar fashion, a number of application interface subroutines 45 are provided for manipulating the contents of the cache 41. Typically this is done to suspend a consultation between the system and the user 36 for a prolonged period of time until the user wants to continue. For diagnostic purposes and for special applications it is desirable to inspect the contents of cache before running or continuing a consultation.

At the start of a consultation, an application interface subroutine named "openCache" is called to open cache for use. The entire cache can be erased by calling an application interface subroutine named "resetCache". This subroutine can also be called to remove a specified entry from cache. To resume a consultation, previously stored contents of cache are loaded from a file by calling an application interface subroutine named "loadCache". Selected entries from cache can be fetched by calling an application interface subroutine named "getCache". An entry can be added to cache by calling an application subroutine named "addCache". The entire contents of cache can be saved in a file by calling an application interface subroutine named "saveCache". The cache is closed from use by calling an application subroutine named "closeCache".

In accordance with another aspect of the present invention, the knowledge base processor 33 permits the application programmer to change the very nature of the language by which knowledge is encoded in the knowledge base 32. This language is defined by the contents of certain memory tables 47 in the memory of the digital computer 31. The inference engine subroutines 35, for example, recognize certain meta-facts 40 in the knowledge base 32 as application defined meta-facts 48. In order to recognize these application defined meta-facts 48, the inference engine subroutines 35 match the entries of the knowledge base 32 to the entries in a table of legally recognized application defined meta-facts 49. In order to add a specified application defined meta-fact to the table 49 of legally recognized meta-facts, the application programmer calls an application interface subroutine 45 named "addMetaFact".

In a similar fashion, the memory tables 47 include a table 50 for storing legal definitions of application defined meta-propositions. During evaluation of propositions, for example during the evaluation of a premise of a rule being invoked, the inference engine subroutines 35 match the proposition or portions thereof to the entries in the table 50 of application defined meta-propositions. In order to add an application defined meta-proposition to the table 50, the application programmer calls an application interface subroutine 45 named "addMetaProp".

Application defined meta-propositions are usually in the form of functions. To permit the application programmer to even further modify the language of the knowledge base, the application programmer is permitted to define certain elementary symbols or "atoms" as operators. The inference engine subroutines 35 distinguish an operator from an elementary expression by matching the expression to the entries stored in an operator table 51, which may include the definitions of application defined operators 52. The application programmer may call an application subroutine called "addOp" to add a specified operator to the application-defined operator definitions 52 in the operator table 51.

When the inference engine subroutines 35 encounter an application defined meta-fact or an application defined meta-proposition, the application programmer must have specified how the meta-fact or meta-proposition is to be evaluated. In accordance with an important aspect of the present invention, the application programmer does this by writing an "evalMetaFact" subroutine or an "evalMetaProp" subroutine, which are examples of application supplied subroutines 53 that are from time-to-time called by the knowledge base processor 33.

The application supplied subroutines 53 include a subroutine named "determine" used for determining the value of an expression after the knowledge base 32 is searched without finding a value by applying the rules 38 or facts 39. The application supplied subroutines 53 also include a subroutine named "error" for indicating that an error has occurred during operation of the knowledge base processor.

The previous examples of application supplied subroutines 53 enable the application programmer to specify actions that should be taken when the knowledge base processor 33 requests assistance in carrying out certain operations. The application supplied subroutines 53 also include subroutines for enabling the application programmer to interrupt or modify the execution of the knowledge base. For this purpose an application supplied subroutine named "event" is called to signal the occurrence of certain important events during the operation of the knowledge base processor 33. These important events include when the inference engine subroutines 35 are beginning to seek a value for an expression, when they have finished seeking an expression, when they have found a value of an expression, when they are noting a value of an expression in the cache, when they are beginning to invoke a knowledge base entry, when they have finished invoking a knowledge base entry, and when they have succeeded in producing a conclusion from the knowledge base entry under evaluation. The knowledge base processor 33 signals the respective action by passing a respective integer value from 1 to 7. To modify the execution by the knowledge base processor 33, the application programmer may write an "event" subroutine which modifies specified values in any of the data structures, or may even modify the very basic dynamic data structures used during subroutine calling to perform an unconventional return to a selected point in the procedure conducted by the knowledge base processor.

One very simple method of altering the execution by the inference engine subroutines 35 is to abort the finding of a value for a specified expression. For this purpose the application program may call an application interface subroutine 54 named "restoreAfterAbort".

In the preferred embodiment as shown in FIG. 1, the knowledge base processor 33 is embodied in the same digital computer 31 which executes the application program 34 and is also preferably written in the same high-level programming language as the application program 34. Therefore, both the application program 34 and knowledge base processor 33 may call the system resident libraries 55 to perform elementary operations. In order to give the application programmer additional flexibility in designing the user interface 37, the preferred form of the knowledge base processor 33, however, does not use the character input and output routines in the system resident libraries 55. Instead, it uses application supplied subroutines 53 named "readch" and "writebuf" to either read a character or write a string buffer, respectively.

A special event signaled by the knowledge base processor 33 to the application program 34 is the loading of an application defined meta-fact 48 into the knowledge base 32. For this purpose the knowledge base processor 33 calls an application supplied subroutine 53 named "metaFactLoaded" each time that an application defined meta-fact 40 is loaded into the knowledge base 32. This gives the application programmer the option of inserting into the knowledge base his or her own "program code" which can be executed in subroutine fashion during the loading of the knowledge base 32 instead of during the execution of the knowledge base when finding the values for specified expressions.

Another way of using application defined subroutines 53 is in the design of a tracing facility. A trace of the important events encountered by the inference engine subroutines 35 can be provided by writing an "event" subroutine which records an ordered list of the event codes along with the expression being sought or the knowledge base entry being invoked. Even more detailed tracing of the operation of the knowledge based processor 33 may use an application supplied subroutine named "demon" which signals every call or return of certain ones of the subroutines of the knowledge base processor 33. The particular subroutine is indicated by a certain function value, as shown below in Table I:

TABLE I

"demon" Parameters

| Function | An integer identification code identifying the particular subroutine. Value ranges for Function: | |
|---|---|---|
| | 100 to 199 | Data Structure Access Routines: |
| | 100 | _addCache( ) |
| | 105 | _addKB( ) |
| | 110 | getState( ) |
| | 115 | setState( ) |
| | 200 to 299 | Inference Engine Routines: |
| | 200 | evalExpr( ) |
| | 205 | evalProp( ) |
| | 210 | evalConclusion( ) |
| | 215 | noteCache( ) |
| | 220 | cfCombine( ) |
| | 225 | addMetaFact( ) |
| | 230 | addMetaProp( ) |
| | 235 | parse( ) |
| | 236 | unParse( ) |
| | 240 | unify( ) |
| | 300 to 399 | Application Interface Routines |
| | 400 to 499 | Application Defined Subroutines |
| Code | Indicates the beginning or the end of the calling function. | |
| | 0 | BEGIN - the subroutine is beginning execution. |
| | 1 | END - the subroutine is ending execution. |

The same integer identification codes used by the "demon" subroutine are also used by the "error" subroutine to indicate the particular subroutine in which an error was detected. The "error" subroutine also provides an error identification code. The possible error identification codes are summarized below in TABLE II:

TABLE II

Error Identification Codes

| 0 | Successful execution |
|---|---|
| −1 to −49 | Error in parsing a string or unparsing a structure. |
| −50 to −59 | Errors associated with meta-facts. |
| −60 to −69 | Errors associated with meta-props. |
| −70 to −79 | Errors associated with Expression State Table handling |
| −80 to −89 | Errors associates with the unifier. |
| −90 to −98 | Errors associated with arithmetic meta-props. |
| −99 | Miscellaneous "internal" errors. |
| −100 | No more memory space. |

A complete working example of the preferred embodiment of the knowledge base processor 33 is given in Appendix VI to the present specification. Included in this program listing are comments defining the parameters for the subroutines in the knowledge base processor 33 and also the application supplied subroutines 53, which are shown as "dummy" functions which do not perform any action.

The preferred embodiment of the knowledge base processor as shown in Appendix VI is written in the "C" programming language. The C programming language is preferred because it permits recursive function calls, it is available for a wide variety of computers, and it has been used to implement a wide variety of applications such as compilers, operating systems, data base systems, real-time systems and document preparation systems. For further information on the C programming language, the reader may consult Kernigham & Ritchie, *The C Programming Language*, Prentice-Hall (1978), which includes *The C Reference Manual*. Although the program listing in Appendix VI should be clear to an experienced C programmer, for less experience programmers its basic operation will become clear upon consideration of the various data structures used by the program, the basic control procedure for the inference engine subroutines, and upon inspection of the sample knowledge base, appliction program and consultation listing included in Appendices II, III, and IV, respectively.

Turning now to FIG. 2, there is shown a diagram generally designated 60 of the basic data structure which is called a "pattern". The pattern consists of a parameter designating the "value type" of the pattern, and a particular one of four different parameters, including either a parameter designating the length of the pattern, an index to a name for the pattern in a symbol table, a long integer number, or a single precision floating value. Therefore, the pattern can represent any expression or value, regardless of whether the expression or value is numeric or symbolic.

Shown in FIG. 3 is a table generally designated 65 showing the meanings of various integral values for the "value type" parameter. The description in the table 65 indicates that a pattern represents either an integer number, a floating point number, an atom symbol, a variable symbol, a pointer to another pattern, or the length of a pattern array.

One of the tasks of the knowledge base processor is to translate or parse the knowledge base language from an English-based format to an internal representation including a series of "patterns". In terms of the English-based language used for writing the knowledge base, an "expression" is a symbol capable of being set to a definite value or values during operation of the inference engine. The knowledge base processor recognizes two formats for an expression, as illustrated in the diagram 70 of FIG. 4. These two formats are an "atom" and a function including an atom functor and one or more arguments such as ARG1 and ARG2. The knowledge base processor recognizes any phrase of characters starting with other than a capital letter as an atom, unless that phrase is a reserved meta-proposition or is designated a label or comment. It should be noted that according to this definition for an "expression", there are a number of statements that may include expressions and meta-propositions which are capable of representing a value but which are not expressions. Such general statements, however, can be evaluated by calling an inference engine subroutine named "evalProp". The statement "atom1 and atom2", for example, is evaluated by finding the values for the two atomic expressions, and then applying the logical "and" meta-proposition.

The difference between expressions and general statements is significant because when the knowledge base processor is told to find the value of a specified expression, for example by calling the "find" subroutine, the inference engine will search the cache and the knowledge base for the expression. A general statement including meta-propositions cannot be evaluated by searching cache and the knowledge base, since meta-propositions are not recognized and evaluated during the process of matching the statement to the knowledge base. If the expression is in the form of a function, the knowledge base is searched for an occurrence of the atom functor, and upon finding a match, the inference engine attempts to match the arguments to respective argument parameters associated with the atom functor in the knowledge base. Since the argument parameters in the knowledge base may include variables for representing patterns, it should be apparent that the arguments ARG1, ARG2 are general statements.

Turning now to FIG. 5, there is shown a diagram generally designated 75 showing how an expression in the form of a function "accnt(tbill,rate)" is internally represented as an array of patterns. The array includes a symbol for the functor atom "accnt", and a pattern for each argument, including the arguments "tbill" and "rate". The array of patterns 76 also includes a prefix pattern 77 which is an integer number indicating the number of following patterns in the array 76.

Turning to FIG. 6 there is shown the internal representation of an expression in the form of a function "accnt(tbill,rate(10.5))" which has arguments that are themselves functions. Each argument that is a function becomes replaced with a pointer pattern 80 indicated by the symbol "*". The pointer points to another pattern array for the function which is the argument, or in the specific example the argument "rate(10.5)".

Associated with each expression defined in the knowledge base 32 is an entry in a determination state table as shown in FIG. 7 and an expression characteristic table as shown in FIG. 8. The determination state table generally designated 85 indicates whether a value or values for each expression have been sought by the inference engine, and whether the inference engine is currently seeking a value for the expression. Therefore, the determination state table stores information about the dynamic state of the knowledge system. On the other hand, the expression characteristic table generally designated 90 in FIG. 8 stores relatively static information about each expression in the knowledge base. Specifically, the expression characteristic table indicates whether each expression is multivalued instead of being single valued, and indicates whether fthe expression has the atypical "nocache" characteristic. If an expression has the "nocache" characteristic, then the knowledge base can be searched to find the expression, but any values that happen to be found will not be stored in cache. Therefore, expressions having the characteristic "nochache" are primarily used for control purposes, for example, to trigger the searching of values for a group of related expressions. Expressions having the "nocache" characteristic may also be viewed as logical flags which are cleared at the start of a consultation and become set when the expression is sought, in which case the logical value of the flag is found in the "sought" column of the determination state table for the expression.

The knowledge base language used by the knowledge base processor of Appendix VI recognizes variables capable of universal instantiation. In other words, when the inference engine subroutines execute or interpret the knowledge base, a variable can be replaced by a pattern representing a number, symbol or pattern array by the process of binding or instantation. The relationship between a variable and its binding is distinguished from the relationship between an expression and its value due to the fact that a variable may be bound and unbound to different patterns, but a value becomes permanently bound or attached to its expression until a corresponding subset of cache is reset. The knowledge base processor recognizes a phrase of characters starting with a capital letter as a variable.

Variables are used in rules so that the rules have universal applicability to more than one object. For the Stock Market Advisor, a rule in the knowledge base of Appendix II is as follows:

if S has unstable-operations
then S has obsolescence.

Due do the fact that the word "has" is an application-defined operator, as more fully described below, this rule is interpreted as if it were written as follows:

if unstable-operations (S)
then obsolesence (S)=yes.

Therefore, the variable S may represent any one of a number of stocks under consideration by the Stock Market Advisor.

Variables can also be used in rules for performing arithmetic calculations. In the knowledge base of the Stock Market Advisor, such a rule is:

if book-value-per-share of S=X and shares-outstanding of S=Y and (X*Y)=VALUE
then book-value of S=VALUE.

This rule is interpreted as if it were written as follows:

if book-value-per-share(S)=X and shares-outstanding(S)=Y and (X*Y)=VALUE
then book-value(S)=VALUE.

In this example, the variables X and Y are used to receive the numerical values of the book-value-per-share of a stock S and the shares-outstanding of the stock S in order to multiply the numerical values together to conclude the book-value of the stock. In contrast to the logical meta-propositions such as "and", "or", and "not", the operands of arithmetic meta-propositions such as "+", "−", "/", "*", "<", ">" are not evaluated by searching the cache and the knowledge base in order to find values for the operands; the operands themselves should be numbers or variables representing numbers. The meta-proposition "=" is a special case in which the value of the expression to the left of the equal sign is compared or asserted as equal to the value to the right of the equal sign. Therefore, in a premise the operand to the left of the equal sign is evaluated by searching cache and the knowledge base, but the operand to the right of the equal sign is not.

The binding or instantiation process for variables is complicated by the necessity of performing backtracking in order to try alternative instantations of variables in an attempt to apply a rule. In general, backtracking is a search procedure that makes guesses at various steps during problem solving and returns to a previous decision point to make another choice when a guess leads to an unacceptable result. During the binding or instantation process upon variables in a rule, the rule may fail for one possible set of bindings of the variables. When this occurs, and there is another possible set of bindings, backtracking is performed by unbinding the variables and binding them to the other possible set of bindings in an attempt to apply the same rule in another way.

The process of binding and unbinding a variable requires some kind of means for keeping track of the current bindings of the variable. The problem is further complicated by the fact that a variable is local to the rule in which it appears. Therefore, associated with each variable and its binding is the environment of the variable, including other variables that may share the same environment and be bound and unbound at the same time. For keeping track of this information the knowledge base processor uses a data structure called the variable binding stack, named "BindStk". The format for the variable binding stack is shown in the diagram generally designated 95 in FIG. 9. The variable binding stack includes an entry generally designated 96 indicating a binding for each variable being bound. This entry includes an environment flag which is equal to zero signifying that the variable binding has the same environment as the previous variable binding in the stack, or is a non zero number indicating a separation between different environments. The entry 96 also includes a pointer to a trail of modifications that must be undone when backtracking. Moreover, the entry 96 includes an integer number designating the variable to distinguish the variable from other variables. This integer number is used internally in lieu of the name of the variable. The entry 96 also includes a pointer to the pattern indicating the binding which the variable represents.

One kind of general statement in the knowledge base language is known as a "proposition". A proposition is defined as a statement that can be evaluated and therefore may represent a particular value. The premise of a rule, for example, must be a proposition, and the conclusion of the rule is asserted in the event that the premise evaluates to a value with a certainly factor of 20 or greater.

The knowledge base processor evaluates a proposition by matching to a number of formats as shown in the diagram 100 in FIG. 10. If the proposition is recognized as an expression, the cache and then the knowledge base are searched to find the value or values for the expression. If the proposition is recognized as a number, then the value of the proposition is the number. If the proposition is recognized as a variable, the variable is replaced with the pattern which the variable represents, and the pattern is evaluated either as an expression or a number.

If a proposition is found to include a meta-proposition or operator, the other portions of the proposition are interpreted in accordance with the definition of the meta-proposition or operator and then the corresponding operation is performed. The operands for an operator are recognized by their position with respect to the operator in consideration of whether the operator is defined as a prefix operator coming before its operand, a postfix operator coming after its operand, or an infix operator coming between its operands.

Turning now to FIG. 11, there is shown a diagram 105 of the format for a "fact" in the knowledge base. A "fact" is a statement that a particular value is known to be a value of a particular expression with a particular degree of confidence indicated by a certainty factor. If the certainty factor is omitted, it is assumed to be 100.

Turning to FIG. 12 there is shown a diagram 110 illustrating the format for a "rule" in the knowledge base. A rule asserts that if a particular proposition has a value with a certainty factor of at least 20, then a particular "fact" is to be asserted. The proposition following the "if" portion of the rule is known as the premise of the rule.

The invocation of a rule and the evaluation of its premise may be interrupted to evaluate other rules for finding the values of expressions in the premise. Therefore, at any time a number of rules, facts or expressions may be under evaluation.

In order to keep track of the chain of reasoning being attempted at any point in the reasoning process, an invocation stack is used to keep track of each rule, fact or expression currently under evaluation.

Figure 13:
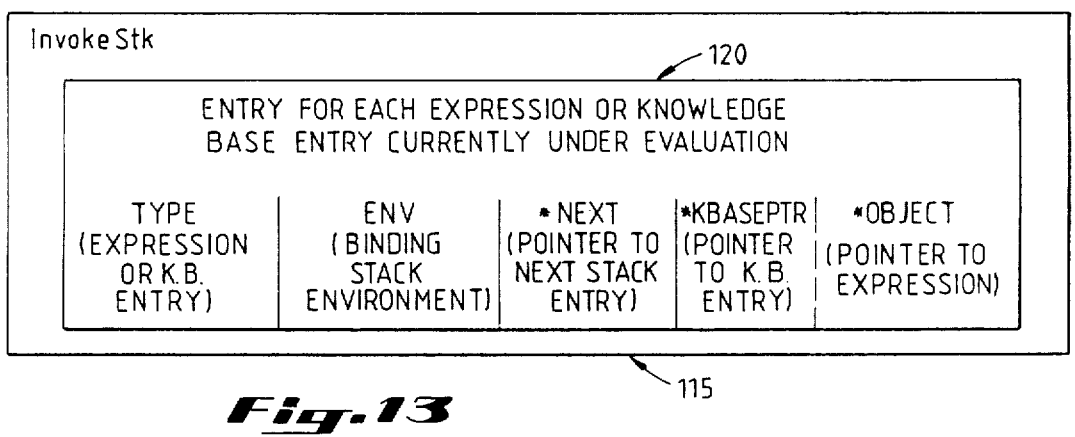
FIG. 13 is a diagram showing the format of an invocation stack for indicating each rule, fact or expression being evaluated by the inference engine.

The format for the invocation stack, named "InvokeStk", is shown in a diagram 115 in FIG. 13. Each expression or knowledge base entry currently under evaluation has a separate entry generally designated 120 in the invocation stack. Each entry includes a type parameter indicating whether the entry is for an expression or for a knowledge base entry, an environment parameter indicating the binding stack environment for the invocation stack entry, a pointer to the next invocation stack entry, and a pointer to the expression or knowledge base entry.

Figure 14:
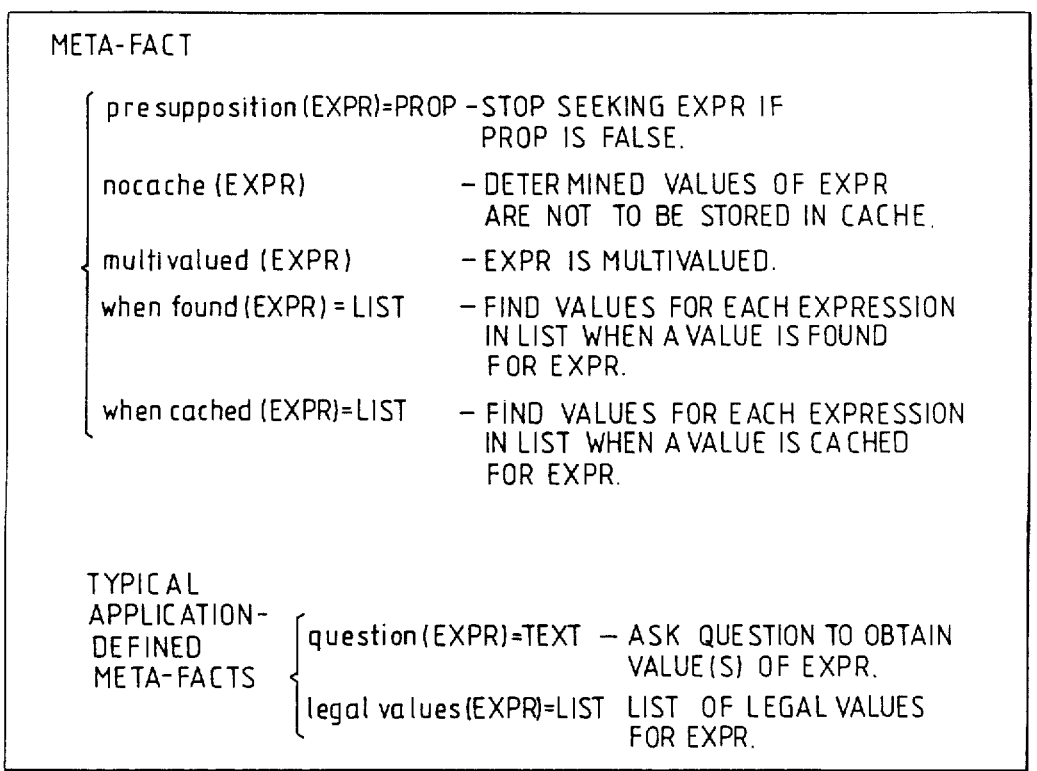
FIG. 14 is a diagram showing various meta-facts which are either internally defined or are typically defined by the application program.

Turning now to FIG. 14, there is shown a table generally designated 125 which illustrates that the knowledge base may include a number of kinds of meta-fact entries. The knowledge base processor recognizes a meta-fact in the form of "presupposition(EXPR)=-PROP" which declares that the proposition PROP presupposes the expression EXPR so that the inference engine should stop seeking a value for the expression if the proposition is false. The knowledge base processor recognizes the meta-fact "nocache(EXPR)" declaring that the expression EXPR should have the "nocache" characteristic. At the start of a consultation, all expressions are assumed not to have the "nocache" characteristic, and when the nocache meta-fact is encountered in the knowledge base, the "nocache" entry in the expression characteristic table for the expression EXPR is changed from "no" to "yes". Similarly at the start of a consultation all expressions are assumed to be single valued, and upon encountering a meta-fact in the form of "multivalued(EXPR)", the multivalued entry in the expression characteristic table for the expression EXPR is changed from "no" to "yes".

The knowledge base processor recognizes a couple of meta-facts which permit the direction of focus of a search in the knowledge base to be diverted when certain information becomes known. A meta-fact in the form of "whenfound(EXPR)=LIST" directs the knowledge base processor to find values for each proposition in the list of propositions LIST when a value is found for the expression EXPR. Similarly, the meta-fact "whencached(EXPR)=LIST" directs the knowledge base processor to find values for each proposition in the list when a value is cached for the expression EXPR. By using meta-facts in the form of "whenfound(EXPR=VALUE)=LIST" and "whencached(EXPR=VALUE)=LIST", respectively, the values for each proposition in the list will be found only when a specific value is found or cached for the expression EXPR.

Although the application programmer is entirely free to define meta-facts, typically the application programmer defines meta-facts to perform user input/output and to declare legal values for expressions. A typical application defined meta-fact in the form of "question(EXPR)"=TEXT is used to ask the user a question specified by the phrase TEXT to obtain a value or values for an expression. An application defined meta-fact in the form of "legalvalues(EXPR)=LIST" is sometimes used to declare a list of legal values for an expression. When the user is asked for a value for an expression and a list of legal values have been defined for that expression, the user's answers are then checked against the list to determine whether the answers are responsive to the question.

Turning now to FIG. 15 there is a diagram 130 showing the format for the knowledge base 32. The knowledge base is organized as a linked list of knowledge base records generally designated 131. Each knowledge base record includes a label pointer for pointing to a label for the corresponding knowledge base entry, a pointer to a "key" which is the expression determined or concluded by the knowledge base entry, an entry pointer which points to the knowledge base entry, an entry type parameter which describes the type of the knowledge base entry, a delete flag which is set to indicate that the knowledge base record will be deleted, a pointer to the next record in the knowledge base, and a flag for indicating whether the knowledge base record is executable. The flag, for example, could be cleared for certain application meta-facts which are executed by the application program only when the knowledge base is loaded.

Turning to FIG. 16 there is shown a table generally designated 132 giving verbal descriptions for the various values of the knowledge base entry type parameter. The knowledge base entry type is positive to indicate that the knowledge base entry is an application-defined meta-fact. The knowledge base entry type has a value of −5, −6, −7, −8, −9, −11 or −15 to indicate that the knowledge base record is a "nocache" meta-fact, a multivalued meta-fact, a presupposition meta-fact, a "whenfound" meta-fact, a rule, a fact, or a "whencached" meta-fact, respectively.

Turning now to FIG. 17 there is shown a diagram generally designated 135 of the format for the cache. The cache is organized as a linked list of entries for each expression having concluded with a value. Each cache entry generally designated 136 includes a pointer to the respective expression, a pointer to the value of the respective expression, a certainty factor for the value, an entry delete flag, a pointer to a reason why the particular value was concluded for the expression including a list of the knowledge base entries confirming or contradicting the particular value, and a pointer to the next cache entry.

Now that the basic data structures for the knowledge base processor in Appendix VI have been described, the basic procedure executed by the inference engine subroutines 35 will be described.

The inference engine subroutines 35 are typically accessed through the "find" subroutine. Turning to FIG. 18, there is shown a flowchart generally designated 140 of the "find" subroutine. In the first step 141, the expression for which a value is to be found is parsed or translated to the internal format described above in connection with FIGS. 2-6. Then in step 142 an inference engine subroutine named "evalExpr" is called to find the value or values for the expression, and to place any value or values that are found in cache. Upon returning from the "find" subroutine 140, the application program obtains the value for the expression from cache.

Turning now to FIG. 19A, there is shown the first part of a flowchart generally designated 150 for the "evalExpr" subroutine. In the first step 151 the application supplied subroutine named "demon" is called to provide a trace of the program execution through the inference engine. Then in step 152 the expression is looked up in the determination state table (see FIG. 7). By inspecting the corresponding "sought" entry of the determination state table, the inference engine determines in step 153 whether the expression has already been sought. If so, then in step 154 the "demon" subroutine is again called, and execution returns. Otherwise, the inference engine must search the knowledge base to find a value for the expression. In step 155 a knowledge base pointer is initialized to start searching at the top of the knowledge base.

In step 157 the knowledge base is searched for the next entry having a key expression field matching the expression being evaluated. As discussed above, the key expression field indicates the expression which the knowledge base entry asserts or concludes. If no knowledge base entry is found in step 157, the bottom of the knowledge base is reached. Therefore, in step 158 the knowledge base pointer is compared to a predetermined value to determine whether the end of the knowledge base was reached. If not, then execution continues on FIG. 19B to execute or interpret the knowledge base entry. For this purpose the knowledge base entry type (see FIG. 16) is inspected to determine the type of the knowledge base entry.

In step 159, if the knowledge base entry is an application defined meta-fact, then execution branches to step 160 to push the invocation stack (see FIG. 13), to call the application supplied subroutine named "evalMetaFact" and to pop the invocation stack.

If the knowledge base entry is a rule as tested in step 161, then in step 162 the application supplied subroutine named "event" is called to signal that a rule is being invoked. Then, in step 163 the rule is evaluated by pushing the invocation stack, calling a subroutine named "evalRule", and popping the invocation stack. Then in step 164 the event subroutine is again called to indicate that the rule has been invoked and to indicate whether the rule succeeded in producing a conclusion and found a value for the expression currently being evaluated.

If the knowledge base entry is a fact, as tested in step 165, the event subroutine is called in step 166 to indicate that a fact is being invoked. Consequently, in step 167 the invocation stack is pushed, the conclusion of the fact is evaluated with the current variable binding, the result is noted in cache, and the invocation stack is popped. The event subroutine is again called in step 168 to indicate that the fact has been invoked and a value has been found for the expression.

If the knowledge base entry is a meta-fact as tested in step 169, then in step 170 the event subroutine is called to indicate that a meta-fact is being invoked. Consequently, in step 171 the invocation stack is pushed, the meta-fact is evaluated, and thereafter the invocation stack is popped. The event subroutine is again called in step 172 to indicate that the meta-fact has been invoked.

After the knowledge base entry has been evaluated, in step 173 the conditions for a single valued cut-off are tested. In other words, searching of the knowledge base terminates if the expression is single valued and the knowledge base entry has concluded a definite value for the expression. If not, the knowledge base pointer is advanced to the next entry in step 174 so that execution may return to step 157 in FIG. 19A to continue searching through the knowledge base. Then, at the end of searching the knowledge base, execution continues in step 175. If the knowledge base has not provided a value for the expression, then in step 176 the application supplied subroutine named "determine" is called as a last resort.

After searching the knowledge base or calling the determine subroutine, in step 177 the entry in the determination state table (see FIG. 7) for the expression is marked to indicate that the expression has been sought, and the invocation stack is popped. Since the expression has been marked as sought, the knowledge base will not again be searched for the same expression unless the determination state table is reset, for example, by calling the subroutine "resetCache". It should be noted that even if the application supplied determine subroutine fails to determine a value for the expression, the system will know that the expression has a value of "unknown" since a value for the sought expression will not be found in cache. Before returning, however, the event subroutine is called in step 178 to indicate that the expression was sought, and the demon subroutine is called in step 179 to indicate that execution is returning from the "evalExpr" subroutine.

Turning now to FIG. 20 there is shown a flowchart generally designated 190 of the subroutine named "evalRule". In order to evaluate the rule, in the first step 191 a variable binding frame is created for the premise of the rule. Similarly, in step 192 a variable binding frame is created for the conclusion of the rule. Steps 191 and 192, for example, match the arguments of an expression in the form of a function to the corresponding variables defined in the rule. Then in step 193 an action parameter is set to a value of "evalConclusion" to indicate that the conclusion of the rule should be noted in the cache if the premise is found to succeed with a certainty factor of 20 or greater. In step 194 a subroutine named "evalProp" is called, and the rule's premise P, conclusion C, binding frame and action are passed as parameters so that the premise will be evaluated and the conclusion will be asserted in the event that the premise is found to have succeeded with a certainty factor of 20 or more.

Turning now to FIG. 21, there is shown a flowchart generally designated 200 of the subroutine named "evalProp" for evaluating a specified proposition P and conditionally asserting a specified action or conclusion C in the context of specified variable bindings. In the first step 201 the application supplied demon subroutine is called. Then in step 202 the metaprop table is searched for a match to the proposition P starting at the bottom of the table so as to search the application-defined meta-propositions before the built in meta-propositions. Every time the application program adds a meta-proposition to the metaprop table by calling the "addMetaProp" subroutine, the newly added meta-proposition is inserted at the bottom of the meta-prop table.

A match between the metaprop table and the proposition is tested in step 203. A match should always occur because the metaprop table includes a template for each legal form of a proposition (see FIG. 10). If the match does not occur, then in step 204 the application supplied subroutine named "error" is called to signal a syntax error, and execution returns.

If the proposition P is matched to an entry in the metaprop table, then in step 205 execution branches if the matching entry is an application defined meta-proposition. If so, then in step 206 the application supplied subroutine named "evalMetaProp" is called to evaluate the application defined meta-proposition. Otherwise in step 207 the built-in meta-proposition is evaluated, depending upon the particular matching template. The evaluation in step 207 may require recursive calls to the evalProp subroutine to reduce compound propositions to simple propositions which contain expressions. These component expressions are evaluated by recursive calls to the subroutine evalExpr of FIGS. 19A and 19B. Once the proposition P is evaluated, the specified action is done in the event that the proposition P has a certainty factor greater or equal 20.

As a final part of step 207, backtracking is performed if a certain repeat flag has been set. The repeat flag may have been set by the creation of the variable binding frame and a recognition at that time of a number of alternative variable bindings. If the repeat flag is set, then a "doAction" subroutine. performs a continuation action by recursively calling the evalProp subroutine to evaluate the proposition for the next possible set of variable bindings, although backtracking will be halted in the case of a single valued cut-off. Otherwise once the proposition is evaluated and conclusions asserted for every possible set of variable bindings, the evaluation of the proposition is finished. Before returning, however, in step 208 the demon subroutine is called to signal the completion of the evaluation process.

This completes the description of the basic procedure followed by the inference engine to interpret the knowledge base. Further details of the procedure are evident from the attached program listing, including English language comments, found in Appendix VI. An outline of the control flow in this program listing is given in Appendix V. The outline clearly illustrates that the program is implemented as a hierarchy of subroutines.

Turning now to Appendix III, there is shown a listing of a Stock Market Advisor application program which illustrates many of the features of the knowledge base processor of Appendix VI. It should be evident that this application program is written in the C programming language. After initializing a number of parameters, the knowledge base processor of Appendix VI is initialized by calling a knowledge base processor subroutine called "initCopernicus". None of the other subroutines of the knowledge base processor should be called before calling this initial subroutine.

Next the application program adds an application defined operator called "infix" which is defined as a prefix operator (indicated by the code FX), a rather high procedure (indicated by the precedence value of 250, the lowest precedence being one and the highest precedence being 254). Then some application defined meta-facts are added to the meta-fact table. First a meta-fact in the form of "question(E)=T" is added. Next a meta-fact in the form of "infix x" is added.

A number of application defined meta-propositions are also added to the knowledge base language syntax. A meta-proposition in the form of "display(E)" is added in order to display or output the value of a specified expression E.

In order to indicate whether a value of an expression has an associated certainty factor of 100, a meta-proposition is added in the form of "E is definite". The return value for this meta-proposition is "yes" cf 100 if the certainty factor associated with a value of the expression E is 100, and otherwise the return value is "no" with a certainty factor of 100. Therefore, to determine whether the expression is definite, its concluded values must be checked to determine whether any one of them has a certainty factor of 100.

A meta-proposition is defined in the form of "E is known" to indicate whether at least one value was concluded about the expression E that has a certainty factor greater or equal to 20. If so, the return value is "yes" cf 100; otherwise, the return value is "no" cf 100.

In order to read the "sought" column of the determination state table for a specified expression (see FIG. 7), a meta-proposition is defined in the form of "E is sought" and returns a value of "yes" cf 100 if the expression has been sought, and otherwise returns a value of "no" cf 100.

In order to indicate whether an expression has one and only one value with an associated certainty factor greater than a cut-off value such as 20, a meta-proposition is defined in the form of "E is unique". The proposition returns a value of "yes" cf 100 if it has only one such value; otherwise, the return value is "no" cf 100.

An expression is said to be unknown if it does not have any value with a certainty factor greater or equal to a cut-off value such as 20. To determine this condition, a meta-proposition is defined in the form of "E is unkown" which returns a value of "yes" cf 100 if the expression E is unknown, and otherwise returns a value of "no" cf 100.

Now that the knowledge base language syntax has been defined, the knowledge base processing begins by opening the Stocks Knowledge Base file for access. The file has a name of "stocks.kb" and the contents of the file are listed in Appendix II. An error message is transmitted to the user in the event that the Stocks Knowledge Base file cannot be opened for some reason. Otherwise, once the Stocks Knowledge Base file is opened, the knowledge base data structure is also opened by calling the subroutine named "openKB". Then the contents of the file are loaded into the knowledge base data structure. Just prior to the actual loading the user is given a message "Loading knowledge base . . . ."

After the knowledge base is loaded, the cache is opened by calling the knowledge base processor subroutine named "openCache".

The user is then given the option to enter stock data either from a file or interactively. If the user desires to use a data file, the file must have the name "stocks.dat", and after the opening of this file the data are transferred directly from the file to the cache. The stock data file should include, for any number of stocks, the name of each stock, its current price, and its five year high. These data items are individually added to cache by calling the knowledge base processor subroutine named "addCache" for each data item. For each stock, the knowledge base processor is asked to find a value for a main goal "recommend" which give a recommendation of whether the stock is a good buy. After giving the recommendations for the stocks, the stock data file is closed.

If the user desires to provide interactively the information about the stocks, the knowledge base processor subroutine named "find" is called prior to the entry of stock data to find a value for the main goal "recommend". The user is prompted for the necessary stock information after certain rules are tried and the system recognizes that the necessary information must be obtained from the user. After a value is found for the main goal "recommend", the cache is closed as well as the knowledge base data structure. Finally, the knowledge base file in the computer's mass storage memory is closed. At this point execution of the main subroutine of the application program is finished.

The application program includes a number of application supplied subroutines. A subroutine named "display" performs the user-defined meta-proposition "display(TEXT)" by printing the text. If the text includes a number of separate items, the items are printed in list form. The "display" function calls another application supplied subroutine named "display item" to display a single item by converting the internal format of the text to an appropriate string of characters. After matching the internal format against certain special cases such as a pre-defined display proposition, a new line, tab, and an integer to dollar-and-cents conversion, then the symbol, variable or structure to be directly printed is unparsed to convert from internal format to a character string. Then, the character string is printed out.

The application supplied display subroutine recognizes dotted pairs representing list structures in the knowledge base language. In order to find any dotted pair in the internal format representing the test, the display subroutine calls another application program subroutine named "isDottedPair".

The Stock Market Advisor application program supplies the subroutine named "readch" in order to read a character from a file and to return the character to the knowledge base processor.

The Stock Market Advisor application program provides the subroutine named "metaFactLoaded" in order to pre-process the "infix" application defined meta-fact when the knowledge base file in the computer's mass storage memory is loaded into the knowledge base data structure. The "infix" meta-fact is processed by interpreting the parameter of the infix meta-fact as an application defined operator to be added to the knowledge base language syntax. The parameter is added to the operator table by calling the knowledge base processor subroutine named "addOp".

The stock market advisor application program supplies the subroutine named "evalMetaFact" in order to evaluate the application defined meta-fact in the form of "question(E)=T". The application program also includes the "evalMetaProp" subroutine for evaluating the application defined meta-propositions. The meta-proposition in the form of "display(E)" is performed by calling the "display" function of the application program and then performing any specified continuation action by calling the knowledge base processor "doAction" subroutine. The other user-defined meta-propositions discussed above are performed by first evaluating the expression parameter of the meta-proposition, checking whether the respective property of the expression is present, and if so doing the specified continuation action by calling the "doAction" subroutine.

The Stock Market Advisor application program includes the "determine" subroutine to determine the value of an expression by asking the user. First the knowledge base processor subroutine "getState" is called to check whether the expression is multivalued. If the expression is multivalued, the user is asked the question, "What are the values of: [name of the expression]?" Otherwise, the user is asked the question, "What is the value of: [name of the expression]?" The user's response is read in and parsed to determine the internal code for the value or values of the expression. Also noted in cache is the reason for the value which is "you said so". This reason is converted to the internal format before being noted in cache with the value or values by calling the knowledge base processor subroutine "noteCache".

The final subroutine of the application program is the application supplied subroutine named "error". The "error" subroutine generates and transmits an error message to the user which includes the function identification code and the error number supplied by the knowledge base processor. This completes the description of the Stock Market Advisor Application Program.

A typical consultation with the Stock Market Advisor is listed in Appendix IV. After the knowledge base was loaded, the application program asked the user whether stock data should be entered from a file. The user answered "no", so that the application program called the "find" subroutine of the knowledge base processor to find a value for the main goal named "recommend". Therefore, the knowledge base processor sought the expression "recommend" by searching the knowledge base of Appendix II.

The very first rule of the knowledge base was invoked causing the expression "buy-or-sell" to be sought. The first knowledge base entry for determining "buy-or-sell" was found to be the application defined meta-fact in the form of "question (buy-or-sell)". Therefore, the user was asked the question "Do you wish to buy or sell stock?" The user answered "buy" causing the second premise clause of the first rule in the knowledge base to be evaluated. Therefore, the expression "recommended-purchases" was sought. This expression was found in the fifth rule in the knowledge base. To evaluate this fifth rule, the expression "stocks" was sought. The first knowledge base entry for determining a value for "stocks" is a question and therefore the user was asked the question, "Which stock do you wish to consider?".

Returning to consideration of the second premise of the first rule for concluding recommended-purchases, the knowledge base processor sought the value of the expression "tek has crashed" which is more formally represented as "crashed(tek)". The word "has" as well as the work "of" were used as parameters for the "infix" application defined meta-fact. During loading of these application defined meta-facts, the words "has" and "of" were consequently defined as infix operators, and upon evaluation their two operands are concatenated or combined to represent a single expression.

The knowledge base processor invoked the first rule for concluding "S has crashed" by binding the atom "tek" to the variable S. To evaluate this rule, the expression "current-price of tek" was sought. The first knowledge base entry for determining a value for this expression was a question, and therefore the user was asked "What was the current price of tek?" The user responded with the value of 1. Therefore, the second clause of the first rule for concluding "S has crashed" was evaluated thereby causing the knowledge base processor to seek the expression "five-year-high of tek". The first knowledge base entry for determining "five-year-high of tek" was a question, and therefore the user was asked "What is the 5 year high of tek?" The user responded 3. This value, however, caused the first rule for concluding the expression "S has crashed" to fail so that the second rule for concluding "S has crashed" was invoked. This second rule, however, also failed with the previously determined value of the current price and 5 year high of tek. Similarly, the third rule for concluding "S has crashed" failed.

The knowledge base processor invoked the fourth rule for concluding "S has crashed" and required a value for the expression "attribute of tek" to evaluate the fourth premise clause of this rule. Upon seeking this expression, a knowledge base entry in the form of "presupposition(attribute of S)" was found, but the knowledge base processor had already found that the value of the expression "buy-or-sell" was "buy" so that the presupposition had no effect. Therefore, the next knowledge base entry caused the user to be asked the question, "Is tek a utility, bank, component-of-djia, one-product-company, highly-volatile-market: Enter one of the above." The user indicated that tek is a bank thereby causing the fourth rule for concluding "S has crashed" to fail since "attribute of tek" is not a utility. Similarly, the fifth rule "S has crashed" also failed.

Upon invoking the next and sixth rule for concluding "S has crashed", the knowledge base processor had to seek the value of the expression "company-value of tek". The knowledge system then asked the question, "What is the current company value of tek?" The user responded 1 million. This value, however, caused the sixth rule concluding "S has crashed" to fail. Consequently the next and seventh rule for concluding "S has crashed" was invoked. To evaluate the last premise clause of this rule, the knowledge base processor sought the value of "bank-size-rating of tek". Upon searching the knowledge base for entries for determining this expression, a presupposition was found for "bank-size-rating of tek" but this presupposition has no effect since the knowledge base processor already had sought "attribute of tek" and had found the value "bank".

To determine "bank-size-rating of tek" a question was found in the knowledge base asking user, "On a national scale, numerically rate tek with other banks. Good approximations will work (1=largest, 2=second):". The user responded 4, and thereby caused the seventh and last rule for concluding "S has crashed" to conclude that the value of "tek has crashed" was "yes" cf 100.

Since the knowledge base processor determined that tek has crashed, execution returned to evaluating the second premise clause of the rule for concluding "recommended-purchases". To evaluate this second clause, the knowledge base processor sought a value for "tek has assets" and invoked the first rule for concluding "S has assets". To evaluate the premise of this rule, the knowledge base processor sought the expression "book-value-per-share of tek". The first knowledge base entry for determining this expression was the question, "What is the current book value per share of tek?" The user responded 0.75 causing the first rule for concluding "S has assets" to fail. Upon invoking the second rule concluding "S has assets", the knowledge base processor had to seek the expression "hidden-assets". The first knowledge base entry for determining "tek has hidden-assets" was a question, "Does tek have hidden (off balance sheet) assets?" The user responded "yes", and the knowledge base processor returned to evaluating the second premise cause of the second rule for concluding "S has assets". This caused the knowledge base processor to seek the expression "hidden-asset-value" resulting in the user being asked the question, "What is the monetary value of these assets?" The user responded 200,000, and the knowledge base processor returned to evaluating the third clause in the premise of the second rule for concluding "S has assets". This in turn caused the knowledge base processor to seek the expression "book-value of S".

To determine the book-value, the knowledge base processor invoked the first rule for concluding "book-value of S". The knowledge base processor recognized that it had already sought "book-value-per-share of tek" and therefore went on to evaluate the second clause of the premise for this rule which required the seeking of the expression "shares-outstanding of tek". To determine the value for this expression, the user was asked "What is the current number of shares outstanding in tek?" The user responded 100,000. As a result, the first rule for concluding "book-value of S" succeeded and concluded that the book-value of tek was 75,000 cf 100.

Returning to the evaluation of the premise of the second rule for concluding "S has assets", the knowledge base processor had to seek the expression "market-value of tek". As a result, the user was asked "What is the current market value of tek?" The user responded 200,000. As a result, the second rule for concluding "S has assets" succeeded in concluding that tek has assets.

The knowledge base processor then returned to the evaluation of the premise of the rule for concluding "recommended-purchases of tek". To evaluate the fourth premise clause, the knowledge base processor had to seek the expression "tek has signs-of-life". As a result, a first rule for concluding "S has signs-of-life" was invoked which in turn caused the knowledge base processor to seek the expression "tek has dividend-in-last-quarter". To determine this expression, the user was asked "In the most recent quarter did tek maintain a dividend?" The user responded "yes", and therefore the first rule for concluding "S has signs-of-life" succeeded in concluding that tek has sign of life.

Returning to the evaluation of the premise for the rule for concluding "recommended-purchases", the knowledge base processor next had to seek the expression "tek has obsolescence". As a result the first rule for concluding this expression was invoked. To evaluate its premise, the knowledge base processor sought the expression "tek has unstable-operations", causing the user to be asked the question "Does tek have many unstable operations or operations is unpredictable foreign countries?" The user responded "no" causing the first rule for concluding "S has obsolescence" to fail. The second rule for concluding "S has obsolescence" also failed because upon interpreting the application defined metaproposition "unknownn", the knowledge base processor called the application supplied subroutine "evalMetaProp" and determined that the expression "tek has obsolescence" was unknown. Consequently, the second rule for concluding "S has obsolescence" succeeded in concluding that tek did not have obsolescence.

The knowledge base processor then returned to evaluating the premise of the rule for concluding "recommended-purchases". To evaluate the sixth clause of the premise, the expression "tek has technical-bottom" was sought. As as result, the user was asked "Has tek reached a technical-bottom in the stock market by demonstrating at least one of the following chart patterns? Double-bottom, vee with six-month high after 90% decline, vee+flag, vee+correction, vee+gap, reverse head-and-shoulders bottom, saucer or congested, climax, saucer+gap; enter 'yes' or 'no':". The user responded "yes" so that the knowledge base processor found that tek has technical-bottom.

Returning to evaluation of the seventh and last clause of the premise for the rule for concluding "recommended-purchases", the expression "tek has technical-turn" was sought. As a result, the user was asked "Have weekly price movements of tek confirmed the commencement of one of the following technical turning patterns? Volume build-up with rising prices, second run, breakout patterns, momentum gaps, 2-hook trend line; enter 'yes' or 'no':". The user responded "yes". Therefore, the knowledge base processor determined that tek had technical turn and the rule for concluding "recommended-purchases" succeeded and concluded that "tek" was a value for the expression "recommended-purchases".

The knowledge base processor returned to the application of the very first rule in the knowledge base, and upon evaluating the third premise clause recognized that "display" was an application defined meta-proposition. Therefore, the "evalMetaProp" subroutine was called resulting in the display of a message to the user saying, "It is recommended that you purchase a stock belonging to tek". Upon returning, the very first rule of the knowledge base succeeded in concluding a value of "yes" cf 100 for the expression "recommend". Since the application program had called the "find" subroutine of the knowledge base processor to find the value of the expression "recommend", execution returned to the application program. The following statements in the application program did not generate any user output, so that the consultation listing was at an end. This completes the description of the Stock Market Advisor programm example.

In view of the above, a knowledge engineering tool has been described that is compatible with conventional computer programming languages and their support facilities such as utility libraries, optimizing compilers and user interfaces. A knowledge base processor has been described for performing symbolic reasoning with respect to knowledge stored in a knowledge base, yet the knowledge base processor comprises an organization of user-callable subroutines written in a conventional computer language. The knowledge base processor may call upon the utility library for the conventional computer programming language. The knowledge base processor can be compiled using an optimizing compiler for the conventional computer programming language. Moreover, the knowledge base processor or its companion application program may use the preexisting user interfaces available in that conventional computer programming language, and as a result, the performance of the knowledge system is enhanced.

An application programmer may use the conventional computer programming language to write an application program that calls selected ones of the subroutines making up the knowledge base processor. The order in which these subroutines are called is determined by the application program and therefore the computer programmer is permitted to use the conventional programming language to specify most of the control knowledge for the knowledge system. Therefore, extensive training in a new programming language is not required. During the interactive portion of a consultation, the calls to the "find" subroutine are used whenever it is desirable to perform symbolic reasoning either to find the value for some object or to exercise judgement at branch points in the application program. Therefore, there may be a clearer and more transparent relationship between the control knowledge supplied by the application program and the judgemental knowledge encoded in the knowledge base.

By using application defined meta-facts, application defined meta-propositions, and application defined operators, the application programmer can extend and enhance the capabilities of the knowledge system by defining the knowledge base language syntax that is optimal for a specific application. As illustrated in the Stock Market Advisor, the application programmer can make the changes to the knowledge base language transparent by application defined meta-facts and application defined meta-propositions that are passed to the application program during the loading of the knowledge base and are thereafter put into the memory tables of the knowledge base processor before the beginning of a consultation. In the Stock Market Advisor, for example, this permitted the rules to be written in a more English-like knowledge base language. The capabilities of the knowledge system can be further enhanced for special applications by interrupting and modifying the control procedure of the inference engine in response to calls to the application supplied "event" subroutine.

INDEX TO APPENDICES

I. GLOSSARY
II. STOCK MARKET ADVISOR KNOWLEDGE BASE
III. STOCK MARKET ADVISOR APPLICATION PROGRAM
IV. STOCK MARKET ADVISOR CONSULTATION LISTING
V. FLOWSHEET OF THE KNOWLEDGE BASE PROCESSOR
VI. KNOWLEDGE BASE PROCESSOR

APPENDIX I

GLOSSARY atom
An atom is the smallest indivisible symbol or expression capable of being set to a value or values during operation of the inference engine. The knowledge base processor recognizes any phrase of characters starting with other than a capital letter as an atom, unless that phrase is a reserved meta-proposition or is designated a label or comment.

backtracking
A search procedure that makes guesses at various points during problem solving and returns to a previous decision point to make another choice when a guess leads to an unacceptable result. Backtracking occurs when the inference engine returns to try alternative instantiations of variables or to test other clauses of a disjunction.

backward-chaining, backchaining
A reasoning strategy produced by the combination of rule-based representation, modus ponens inference, and goal-directed reasoning. In this strategy, a chain of inferences is constructed starting with a rule whose conclusion would immediately provide a solution to the problem (the goal). Then the system works backward, setting up the premise clauses of the rule as subgoals. Other rules whose conclusions could satisfy these subgoals are then invoked, and their premises become subgoals. The process continues working backward until rules are reached whose premises can be verified directly. In an exhaustive backward-chaining system, all possible rules are examined to arrive at a result.

bind, binding, bound
A variable is bound when it is instantiated to (or replaced by) a particular term. Variables may be bound, unbound, and then bound again through the process of backtracking. The term which replaces the variable is called the variable's binding or instantiation.

cache — The cache is the repository of all conclusions made by the inference engine. In a computer system, caching refers to storing information so that it can be accessed quickly. Cache storage is managed so that most-often-used entries are readily available.

case — A diagnosis or consultation concerning a single instance of a problem. Cases are used to develop, expand, and evaluate the performance of knowledge systems.

certainty factor (cf) — A number representing the confidence placed by a user or knowledge system in the validity of a proposition, hypothesis, or rule. The number is not interpreted as a probability, but rather as a subjective index of the amount of evidence that has accumulated confirming the proposition. Confidence factor, cf, certainty, and certainty factor are terms used interchangeably. The certainty factors range from −100 to 100 (from definitely ruled out to definitely certain).

conclusion — The consequent portion of a rule.

conjunction — A proposition consisting of two or more simpler propositions connected by the logical operator "and". For example, healthy and wealthy is a conjunction.

control — Refers to the overall order of problem-solving activities in a knowledge system. Along with representation and inference, control is one important dimension of a knowledge system. Goal-directed reasoning is an example of a control strategy.

disjunction — A disjunction is a proposition that consists of two or more (simpler) propositions connected by the logical operator "or".

domain — A field, discipline, or area of human activity or scholarship such as mathematics, medicine, or physics.

end-user system — A knowledge system that helps or advises a user in a way that parallels the way a human consultant advises a client. The knowledge system may ask questions of the user to gather information from which to infer appropriate advice, and may explain its reasoning so that the user can judge its reliability.

| | |
|---|---|
| expert | A human who can solve problems or perform actions requiring unusual or uncommon skill. The expert's skills are likely to have evolved slowly, and usually require extensive knowledge and lengthy experience. See expertise. |
| expertise | The set of capabilities that underlies the high performance of human experts, including extensive domain knowledge, heuristic rules that simplify and improve approaches to problem-solving, meta-knowledge, and compiled forms of behavior that afford great economy in skilled performance. Expert knowledge is rare, seldom explicit or measurable, and difficult to communicate or acquire. Gained through experience, long periods of training, apprenticeship and observation, it may be organized in subtle and idiosyncratic ways. |
| expert system | A knowledge system that performs at or near the level of human experts. The system achieves high levels of performance on tasks that, for human beings, require years of special education and training. |
| explanation | Motivating, justifying, or rationalizing an activity by supplying information about goals sought or heuristic rules applied during the course of the activity. |
| expression | A symbol capable of being set to a value or values during operation of the inference engine. The value or values are stored in cache. Once set, the value or values remain until a corresponding subset of the cache is reset. The inference engine recognizes an atom or a function having an atomic functor as an expression. Expression values are determined by first searching the knowledge base. |
| fact | An association of an expression with a value. For example the fact:<br><br>best-color = red<br><br>associates the expression best-color with the value red. Facts may be qualified by certainty factors. |
| goal | The result or achievement toward which effort is directed. For the inference engine, a goal is an expression for which a value is being sought. |

| | |
|---|---|
| goal-directed reasoning | A control strategy often used for knowledge systems. Candidate solutions to a problem are considered and evidence is gathered to determine whether each is acceptable. See backward-chaining. |
| heuristic | A rule of thumb, strategy, trick, simplification, or any other kind of device that drastically limits search for solutions in large problem spaces. Heuristics do not guarantee optimal solutions; in fact, they do not guarantee any solution at all. But a heuristic offers solutions that are good enough most of the time. |
| if-then rule | A rule that takes the form: if <premise> then <conclusion>. A certainty factor may be associated with the rule itself. See also rule. |
| inference | The process of deriving new facts from known ones. The method of inference defines the one-step derivations that are legal with respect to a given representation in a knowledge system. Examples of inference methods are modus ponens and inheritance. Together with representation and control, inference is one of the three dimensions of a knowledge system. |
| inference engine | That portion of a knowledge system that reasons over the knowledge base to arrive at conclusions. The inference engine records why it arrives at a conclusion. It also manages the inheritance and the propagation of certainty factors. |
| infix operator | A syntactic operator that is written between two terms to form a compound term. For example, to denote the sum A plus B, we might use "+" as an infix operator: A + B. |
| instantiation | 1) An object that fits the general description of some class or, specifically, a pending process that associates specific data objects with the parameters of a general procedure. 2) A variable's instantiation is its binding. See binding. |
| invoke | The process of testing a rule. When the rule is invoked, the inference engine tests whether the premise of the rule is true. If so, then the rule is said to succeed, and its conclusion is noted in the cache. |

| | |
|---|---|
| justification | The relationship between a conclusion and the facts from which it was inferred. Justifications provide a record of the manner in which conclusions are derived from prior data and conclusions. |
| KB, KB entry, KBS, KE, KS | Abbreviations for knowledge base, knowledge base entry, knowledge-based system, knowledge engineer, and knowledge system, respectively. |
| knowledge | Propositions, heuristic rules, and other data that can improve the efficiency or effectiveness of a problem solver. Types of knowledge can be distinguished in many dimensions such as: symbolic vs. numeric, factual vs. heuristic, imperative vs. declarative, deep vs. shallow. |
| knowledge acquisition | The extraction and representation of knowledge derived from current sources, especially from experts. The activity of transferring or transforming the knowledge and skills from a human expert or other knowledge source into a form usable by a knowledge system. Knowledge acquisition often involves chunking or parsing an expert's knowledge into a collection of if-then rules. |
| knowledge base | The portion of a knowledge system that contains factual knowledge and heuristics about the domain. |
| knowledge base language | A collection of syntactic forms or rules about how to write legal statements, functions, or programs that embody knowledge and may be stored in a knowledge base and interpreted by an inference engine. |
| knowledge base listing | The hard-copy or on-line listing of a knowledge base. Since the knowledge base is completely independent of the inference engine, it can be listed on a line printer or examined on-line using a text editor. |
| knowledge system | A computer system that emulates reasoning tasks by using an "inference engine" to interpret encoded knowledge of human experts stored in a "knowledge base." |
| legal response | A legal response is an answer in the expected form. For example, if the legal response to a question has been specified to be an integer number, a fraction would not be a legal response. |

| | |
|---|---|
| LISP | A list processing computer programming language consisting of symbolic expressions which are either atoms or list structures. LISP has been extensively used to create knowledge systems and knowledge engineering tools. |
| meta- | A prefix that generally indicates that a term is being used to talk about a system rather than being used within the system. For example, a meta-rule is a rule that guides the selection and execution of ordinary rules. It is a rule about rules, and thus lies outside the system of rules themselves. |
| meta-fact | Meta-facts are facts about the knowledge base or the consultation, as opposed to facts about the subject domain. |
| meta-proposition | Meta-propositions are propositions about the knowledge base or about the state of the consultation. |
| modus ponens | A rule of inference that states: "if A then B" is true, and A is true, you can infer that B is true. |
| multivalued | Allowed to have more than one value with definite certainty. When an expression is specified to be multi-valued, the inference engine will continue to seek values for that expression even after one definite value has been found. See single valued cutoff. |
| postfix operators | A syntactic operator that is written after a term to form a compound term. See also infix operator and prefix operator. |
| prefix operators | A syntactic operator that is written before a term to form a compound term. See also infix operator and postfix operator. |
| premise | The "if" part of a rule, which is an arbitrary proposition that can be evaluated during backward- (or forward-) chaining. See rule. |
| presupposition | A condition that must be true in order for some other statement to even make sense. For example, it must have been raining for the question "Has it stopped raining?" to make sense. The presupposition meta-fact can be used to prevent the inference engine from seeking the value of a given expression unless its presupposition is true. |

| | |
|---|---|
| PROLOG | A programming language based on mathematical logic and sometimes used to create knowledge systems and knowledge engineering tools. The name comes from "programming in logic". |
| proposition | A fact, belief, or assertion. A proposition is a statement that can either be true of false. In the knowledge base propositions have a particular syntax. They generally occur as the premise of a rule, but can also occur in certain meta-facts, such as presuppositions and meta-propositions. |
| rule | A pair, composed of an antecedent (known as the premise) and a consequent (known as the conclusion), that can support the deductive process of backward-chaining. Rules are of the form: if <premise> then <conclusion>. The premises and conclusions are made up of propositions. A rule-based system is a system employing if-then rules in its representation of knowledge. |
| single valued cutoff | Refers to the inference engine's behavior when it finds a definite value for an expression. No more values will be sought unless the expression is specified to be multivalued. See multivalued. |
| symbolic programming | Manipulating symbols that represent objects and relationships. Data reduction, data-base management, and word processing are example of conventional or numerical programming. Knowledge systems depend on symbolic programming to manipulate strings of symbols with logical rather than numerical operators. |
| universal instantiation | The rule of inference that allows a variable to be replaced by an arbitrary term. See instantiation. |
| user interface | A subsystem of a knowledge system (or any computing system) with which the human user deals routinely. It aims to be as "natural" as possible, employing language as close as possible to ordinary language (or the stylized language of a given field) and understanding and displaying images, all at speeds that are comfortable and natural for humans. Other subsystems in a knowledge system include the knowledge base and the inference engine. |

| | |
|---|---|
| variable | A symbol capable of representing another number or symbol by the process of binding or instantiation. The knowledge base processor recognizes a phrase of characters starting with a capital letter as a variable. |

APPENDIX II.
STOCK MARKET ADVISOR KNOWLEDGE BASE

```
    /* File Name stocks.kb */
    infix of.
    infix has.

/* ------------------- RECOMMEND ------------------------- */ if  buy-or-sell = buy and
    recommended-purchases = X and
    display([nl,'It is recommended you purchase stock belonging to ',
    X, nl])
then recommend.

if  buy-or-sell = buy and
    display([nl,'Purchase of this stock is NOT recommended.',nl])
then recommend.

if  buy-or-sell = sell and
    recommended-sales = X and
    display([nl,'It is recommended you sell stock belonging to ',X
    ,nl])
then recommend.

if  buy-or-sell = sell and
    display([nl,'Selling of this stock is not recommended at this
    time.',nl])
then recommend.

/* ----------------- RECOMMENDED-PURCHASES ------------------ */ multivalued(recommended-purchases).

if  stocks = S and
    S has crashed and
    S has assets and
    S has signs-of-life and
    S has obsolescence = no and
    S has technical-bottom and
    S has technical-turn
then recommended-purchases = S.

/* ------------------- RECOMMENDED-SALES -------------------- */ multivalued(recommended-sales).

if  stocks = S and
    current-price of S = PRICE and
    bottom-pattern-low-price of S = LOW and
    PRICE < LOW
then recommended-sales = S.

if  stocks = S and
```

```
       holding-time of S = TIME and
       bottom-pattern of S = double-bottom and
       current-price of S = CUR and
       second-low-price of S = LOW and
       (CUR - LOW) / TIME < 1.0
then trend-line of S = penetrated.

if  stocks = S and
    holding-time of S = TIME and
    not(bottom-pattern of S = double-bottom) and
    current-price of S = CUR and
    bottom-pattern-low-price of S = LOW and
    (CUR - LOW) / TIME < 1.0
then trend-line of S = penetrated.

if  stocks = S and
    holding-time of S = TIME and
    TIME >= 12.0 and
    trend-line of S = penetrated
then                     recommended-sales = S.

/* ------------------- ATTRIBUTE of S ------------------------ */ presupposition(attribute of S) = (buy-or-sell = buy).

question(attribute of S) =
    ['Is ', S, ' a: ', nl,
    ' * utility', nl,
    ' * bank', nl,
    ' * component-of-djia', nl,
    ' * one-product-company', nl,
    ' * highly-volatile-market', nl,
    'Enter one of the above.'].

multivalued(attribute of S).

/* ------------------- BANK-SIZE-RANKING of S ---------------- */ presupposition(bank-size-ranking of S) = (attribute of S = bank).

question(bank-size-ranking of S) = ['On a national scale, numerically
rate ', S, ' with other banks.', nl, 'Good approximations will work (1
= largest, 2 = second): '].

/* ------------------- S has CRASHED ------------------------- */ if  current-price of S = PRICE and
    five-year-high of S = HIGH and
    not(HIGH == 0) and
    (PRICE / HIGH) <= 0.2
then S has crashed.

if  current-price of S = PRICE and
    five-year-high of S = HIGH and
    not(HIGH == 0) and
    (PRICE / HIGH) <= 0.25 and
    earnings-high of S = HIGHEARN and
    current-earnings of S = CUREARN and
    (CUREARN / HIGHEARN) >= 0.75
then S has crashed.

if  current-price of S = PRICE and
    five-year-high of S = HIGH and
```

```
    not(HIGH == 0) and
    (PRICE / HIGH) <= 0.3 and
    earnings-high of S = HIGHEARN and
    current-earnings of S = CUREARN and
    not(HIGHEARN == 0) and
    (CUREARN / HIGHEARN) >= 0.75 and
    company-value of S = VALUE and
    VALUE >= 1.0E9
then S has crashed.

if  current-price of S = PRICE and
    five-year-high of S = HIGH and
    not(HIGH == 0) and
    (PRICE / HIGH) <= 0.35 and
    attribute of S = utility
then S has crashed.

if  current-price of S = PRICE and
    five-year-high of S = HIGH and
    (PRICE / HIGH) <= 0.35 and
    attribute of S = component-of-dji
then S has crashed.

if  current-price of S = PRICE and
    five-year-high of S = HIGH and
    not(HIGH == 0) and
    (PRICE / HIGH) <= 0.35 and
    company-value of S = VALUE and
    VALUE >= 2.0E9 /* Value over 2 billion dollars. */
then S has crashed.

if  current-price of S = PRICE and
    five-year-high of S = HIGH and
    not(HIGH == 0) and
    (PRICE / HIGH) <= 0.35 and
    attribute of S = bank and
    bank-size-ranking of S = RANK and
    RANK < 200
then    S has crashed.
/* ------------------- S has ASSETS ---------------------------- */ if  book-value-per-share of S = BOOK and
    current-price of S = MARKET and
    MARKET < BOOK
then    S has assets.

if  S has hidden-assets and
    hidden-asset-value = HIDDEN and
    book-value of S = BOOK and
    market-value of S = MARKET and
    MARKET < (BOOK + HIDDEN)
then    S has assets.

/* ------------------- S has OBSOLESCENCE --------------------- */ if  S has unstable-operations
then    S has obsolescence.

if  S has obsolescence is unknown
then    S has obsolescence = no.

/* ------------------- S has SIGNS-OF-LIFE --------------------- */
```

```
if   S has dividend-in-last-quarter
then      S has signs-of-life.

if   S has earnings-in-last-quarter or
     (company-value of S = VALUE and VALUE >= 1.0E9)
then      S has signs-of-life.

if   S has rising-sales or
     S has market-leadership or
     S has insider-purchases or
     S has corporate-change
then      S has signs-of-life.

/* ------------------- STOCKS -------------------------------- */ multivalued(stocks).

question(stocks) = ['Which stocks do you wish to consider?'].

/* ------------------- BUY-OR-SELL --------------------------- */
question(buy-or-sell) = ['Do you wish to buy or sell stocks?'].

/* ------------------- BOOK-VALUE of S ----------------------- */ if   book-value-per-share of S = X and
     shares-outstanding of S = Y and
     (X * Y) = VALUE
then      book-value of S = VALUE.
question(book-value of S) =
     ['What is the current book value of ', S, '?'].

/* ------------------ BOOK-VALUE-PER-SHARE of S --------------*/
question(book-value-per-share of S) = ['What is the current book value
per share of ', S, '?'].

/* ------------------- BOOK-VALUE-PER-SHARE of S ------------- */ question(shares-outstanding of S) = ['What is the current number of
shares outstanding in ', S, '?'].

/* -------------------- BOOK-VALUE-PER-SHARE of S ------------ */
question(market-value of S) =
     ['What is the current market value of ', S, '?'].

/* -------------------- BOTTOM-PATTERN-LOW-PRICE of S -------- */ question(bottom-pattern-low-price of S) = ['What was the bottom chart
pattern low price of ', S, '?'].

/* -------------------- COMPANY-VALUE of S ------------------- */ question(company-value of S) = ['What is the current company value of
', S, '?'].

/* -------------------- CURRENT-EARNINGS of S ---------------- */ question(current-earnings of S) =
     ['What is the current earnings per share of ', S, '?'].

/* -------------------- CURRENT-PRICE of S ------------------- */ question(current-price of S) = ['What is the current price of ', S,
'?'].
```

```
/* ------------------ EARNINGS-HIGH of S -------------------- */ question(earnings-high of S) =
    ['During the last 5 years, what is the highest earnings per
    share', nl, 'earned by ', S, '?'].

/* ------------------ FIVE-YEAR-HIGH of S ------------------- */ question(five-year-high of S) =
    ['What is the 5 year high of ', S, '?'].

/* ------------------ HIDDEN-ASSET-VALUE -------------------- */ question(hidden-asset-value) =
    ['What is the monetary value of these assets? '].
/* ------------------ HOLDING-TIME of S --------------------- */
question(holding-time of S) =
    ['How many months ago did you purchase shares of ', S, '?'].

/* ------------------ S has TECHNICAL-BOTTOM ---------------- */ question(S has technical-bottom) =
    ['Has ', S, ' reached a technical bottom in the stock market by',
    nl, 'demonstrating at least one of the following chart patterns?',
    nl, '   * Double bottom', nl,
    '   * Vee with 6-month high after 90% decline', nl,
    '   * Vee plus flag', nl,
    '   * Vee plus correction', nl,
    '   * Vee plus gap', nl,
    '   * Reverse head-and-shoulders bottom', nl,
    '   * Saucer or congested', nl,
    '   * Climax', nl,
    '   * Saucer plus gap', nl,
    'Enter "yes" or "no":'].

/* ------------------ S has TECHNICAL-TURN ------------------ */ question(S has technical-turn) =
    ['Have weekly price movements of ', S, ' confirmed the
    commencement', nl 'of one of the following technical turning patterns?', nl,
    '   * Volume build-up with rising prices', nl,
    '   * Second run', nl,
    '   * Breakout patterns', nl,
    '   * Momentum gaps', nl,
    '   * Two-hook trend line', nl,
    'Enter "yes" or "no":'].

/* ------------------ S has UNSTABLE-OPERATIONS ------------- */ question(S has unstable-operations) =
    ['Does ', S, ' have many unstable operations or operations in',
    nl, 'unpredictable foreign countries?'].

/* ------------------ S has DIVIDEND-INCREASE --------------- */ question(S has dividend-increase) =
    ['Has ', S, ' recently increased its dividend?'].

/* ------------------ S has DIVIDEND-IN-LAST-QUARTER -------- */
```

```
question(S has dividend-in-last-quarter) =
    ['In the most recent quarter, did ', S, ' maintain a dividend?'].
/* ------------------ S has EARNINGS-IN-LAST-QUARTER ---------- */ question(S has earnings-in-last-quarter) =
    ['In the most recent quarter, did ', S, ' show earnings?'].

/* ------------------ S has HIDDEN-ASSETS -------------------- */ question(S has hidden-assets) = ['Does ', S, ' have hidden (off
balance sheet) assets?'].

/* ---------------------S has INSIDER-PURCHASES ---------------- */ question(S has insider-purchases) = ['Are many company insiders making
purchases of ', S, '?'].

/* ------------------ S has MARKET-LEADERSHIP ---------------- */ question(S has market-leadership) = ['Does ', S, ' have market
leadership for its products?'].

/* ------------------ S has DIVIDEND-INCREASE ---------------- */ question(S has dividend-increase) = ['Has ', S, ' recently increased
its dividend?'].

/* ------------------ S has DIVIDEND-IN-LAST-QUARTER ---------- */ question(S has dividend-in-last-quarter) = ['In the most recent
quarter, did ', S, ' maintain a dividend?'].

/* ------------------ S has EARNINGS-IN-LAST-QUARTER ---------- */ question(S has earnings-in-last-quarter) =
    ['In the most recent quarter, did ', S, ' show earnings?'].
-------
```

APPENDIX III
STOCK MARKET ADVISOR APPLICATION PROGRAM

```
/****************************************************************
                    STOCK MARKET ADVISOR

****************************************************************/ include <stdio.h>
include "typedef.h"

#define QUESTION        1
define INFIX           2 define DISPLAY         1
define EISDEFINITE     2
#define EISKNOWN        3
#define EISSOUGHT       4
#define EISUNIQUE       5
define EISUNKNOWN      6 define CFCUTOFF        20

FILE *fp;                /* Pointer to Stocks Knowledge Base file. */
```

```c
char *Kbase = "stocksKB";
char *Cache = "stocksCache";
```
Ĉ
```
/****************************************************************
MAIN PROGRAM

MAIN

****************************************************************/ main()

extern FILE *fopen();
    extern int strcmp();
    FILE *stocks_data_file;/* Pointer to stocks data file. */ char    Name[100];
float   CurrentPrice;
float   FiveYearHigh;
int     RetCode; /* Error code returned from Copernicus. */
int     RetCf; /* Certainty factor returned from the Cache. */
    char RetExpr[100];   /* Expression returned from the Cache. */
    char RetValue[100];  /* Value of recommendation in the Cache.
                            */
    char  buf[100];      /* Temporary string buffer. */

/* Initialize Copernicus before operation. */
initCopernicus();

/* Add language operators to the Knowledge Base Language Syntax.
    */
addOp("infix",250,FX,&RetCode);

/* Add some meta-facts to the Meta-Fact Match Table in
          Copernicus. */
    addMetaFact("question(E)=T","E",QUESTION,1,&RetCode);
    addMetaFact("infix X","infix",INFIX,0,&RetCode);

/* Add some meta-props to the Meta-Prop Match Table in
          Copernicus. */
    addMetaProp("display(E)",DISPLAY,&RetCode);
    addMetaProp("E is definite",EISDEFINITE,&RetCode);
    addMetaProp("E is known",EISKNOWN,&RetCode);
    addMetaProp("E is sought",EISSOUGHT,&RetCode);
    addMetaProp("E is unique",EISUNIQUE,&RetCode);
    addMetaProp("E is unknown",EISUNKNOWN,&RetCode);

/* Open the Stocks Knowledge Base file for access. */
    if ((fp = fopen("stocks.kb","r")) == NULL) {
       printf("stocks.kb could not be opened.\n");
       exit(1);
    }

/* Open the Stocks Knowledge Base for access by Copernicus
          routines. */
    openKB(Kbase);

/* Load in the Stocks Knowledge Base. */
    printf("Loading knowledge base...\n");
    printf("\n");
    loadKB(&RetCode);

/* Open the Stocks Cache for access by Copernicus routines.. */
    openCache(Cache);
```

```
/* See if the user wants to read stocks data from a file. */
printf("Do you wish to enter some data on stocks from a
    file?");
    Printf("/n")
printf(">");
scanf("%s",buf);

if (strcmp(buf,"yes")==0) {

/* Open the file containing stock record data. */
if ((stocks_data_file = fopen("stocks.dat","r")) == NULL)
{
exit(1);
}

/* Read in the stock record data, storing this data as
 * factual information in the Stocks Cache. For each
 * stock find recommendations based on information and
 * expertise contained in the Stocks Knowledge Base.
 */
f scan f(stocks_data_file,"%s %f %f",Name ,& Current Price, &
        Five Year High);
while (!feof(stocks_data_file)) {sprintf(buf,"stocks =
        %s",Name);
add Cache (Cache, buf, 0,& RetCode);
sprintf (buf,"current-price of %s = %f", Name,
        Current Price);
add Cache (Cache, buf, 0, & RetCode);
sprintf (buf,"five-year-high of %s = %f",Name,
        Five Year High);
add Cache (Cache, buf, 0, & RetCode);
find ("recommend", & RetCode);
fscanf (stocks_data_file,"%s %f %f", Name, &
        & Five Year High);}
        Current Price, /* Close the stocks data file. */
fclose(stocks_data_file);} else /* Allow the user to interactively provide all
        information. */
find ("recommend",& Ret Code);

/* Close the Stocks Cache for access. */
close Cache (Cache);

/* Close the Stocks Knowledge Base for access. */
closeKB(Kbase);

/* Close the Stocks Knowledge Base file. */
fclose(fp);
/****************************************************************
USER-DEFINED FUNCTION

DISPLAY

PURPOSE
    Perform the user-defined meta-prop "display(TEXT)".

NOTES
    Prints out each item in a list.  If the input is not a list, the
    whole input is printed as a single item.

*****************************************************************/
```

```
display(p,Env)
STRUCT *p;                  /* Structure to be displayed.*/
int Env;                    /* p's variable binding environment.*/

{
    /* Copernicus Routines. */
    extern int addName();
    extern deRefStruct();

STRUCT *TmpStruct;      /* For de-referencing.*/
    int Env1;               /* Variable binding environment.*/
    int RetCode;            /* Success/failure return code.*/ static int FirstTimeFlg = TRUE;
    static int NLIndex;
    static int NullListIndex;

/* Perform certain initializations one time only. */
    if (FirstTimeFlg) {
       FirstTimeFlg = FALSE;
       NLIndex = addName("nl",&RetCode);
       NullListIndex = addName("[]",&RetCode);
    }

/* De-reference the structure to be safe. */
    deRefStruct(p,Env,&p,&Env,&RetCode);

/* As long as we're looking at a dotted pair, output the first
     * element and move on to the next.
     */
    if (isDottedPair(p,Env)) {do {
       /* De-reference each item before displaying it. */
       deRefStruct(p+2,Env,&TmpStruct,&Env1,&RetCode);
       displayItem(TmpStruct,Env1);

/* Move on to next item in the list. */
          deRefStruct(p+3,Env,&p,&Env,&RetCode);

} while (isDottedPair(p,Env));
    }
    else if ((VAL_TYPE(p) == SYMBOL) && (p->value.Name ==
    NullListIndex)) {/* Do nothing: list is [].
        */
    }
    else {/* Item p is a STRING or other structure, not a list. */
        displayItem(p,Env);}
}
/****************************************************************
USER-DEFINED FUNCTION

DISPLAYITEM

PURPOSE
    Called by display() to display a single item.

****************************************************************/
displayItem(Item,Env)
STRUCT *Item;               /* The structure to be displayed.*/
int Env;                    /* Item's variable binding environment.*/

{
    /* Copernicus Routines. */
```

```
extern parse();
extern unParse();
extern int addName();
extern deRefStruct();
extern int pushBindFrame();
extern popBindFrame();
extern unify();

static struct display_prop_table {
   char *Prop;          /* The proposition.*/
   STRUCT *PropForm;    /* Parsed proposition.*/
   int Id;              /* Proposition identifier.*/
} DisplayProp[10] = {
   { "nl",              NULL, 1 },
   { "tab(X)",          NULL, 2 },
   { "$(X)",            NULL, 3 },
   { NULL,              NULL, 0 }
};
static int FirstTimeFlg = TRUE;

int RetCode;         /* Success/failure return code.        */
char *Str;           /* unParsed() item.                    */
char TmpBuf[20];     /* Temporary string.                   */
int Env1;            /* Temporary variable binding frame.   */
int Env2;            /* Temporary variable binding frame.   */
int PropId;          /* display() proposition identifier.   */
int i;

/* Perform certain initializations one time only. */
if (FirstTimeFlg) {FirstTimeFlg = FALSE;

/* Initialize Display proposition match table. */
for (i=0; DisplayProp[i].Prop != NULL; i++) {
parse(DisplayProp[i].Prop,&(DisplayProp[i].PropForm), & Ret Code);
   }
}

/* Find, if possible, a matching proposition.  Not finding one is
 * not an error - it just means the "Item" isn't a pre-defined
 * display() proposition.  Rather, it is a SYMBOL, STRUCTURE, etc.
 * to display.
 */
for (i=0, PropId=-1; DisplayProp[i].Prop != NULL; i++) {
Env1 = pushBindFrame(DisplayProp[i].PropForm);
if (unify(DisplayProp[i].PropForm,Env1,Item,Env)) {
PropId = DisplayProp[i].Id;
popBindFrame(Env1);
   break;
   }
   popBindFrame(Env1);
}

/* Take appropriate action. */
switch(PropId) {
case 1:
/* "nl" - print a newline. */
printf("\n");
break;
case 2:
/* "tab(X)" - print one or more spaces. */
deRefStruct(Item+2,Env,&Item,&Env,&RetCode);
if (VAL_TYPE(Item)==INTNUM) {
for (i=0; i < (int)(Item->value.intVal); i++)
```

```
printf(" ");
}
else {
/* Error condition. */
}
break;
case 3:
/* "$(X)" - convert to dollars and cents. */
deRefStruct(Item+2,Env,&Item,&Env,&RetCode);
if (VAL_TYPE(Item)==FLOATNUM)
sprintf(TmpBuf,"$%.2f",Item->value.floatVal);
else if (VAL_TYPE(Item)==INTNUM)
sprintf(TmpBuf,"$%ld.00",Item->value.intVal);
else {
/* Error condition. */
break;
}

/* Print the dollars/cents string. */
printf(TmpBuf);
break;
default:
/* Must be a SYMBOL, VARIABLE, or STRUCTURE.  Just
 * print it out.
 */
unParse(Item,Env,&Str,0,&RetCode);
printf(Str);
free(Str);
break;

} /* switch */}
/***************************************************************
USER-DEFINED FUNCTION

ISDOTTEDPAIR

PURPOSE

Check whether given structure is a dotted pair (STRUCT block of
    length 3 with dot (".") as principal functor).

This function returns true or false.

***************************************************************/ intisDottedPair(p,Env)STRUCT*p;/* Purported dotted pair. */
int Env;/* Environment of p (-1 if p has no environment). */

{
    /* Copernicus Routines. */
    extern int lookUpName();
    extern deRefStruct();

static int DotIndex;
    static int FirstTimeFlg = TRUE;

int RetCode;

/* Perform one-time-only initializations. */
    if (FirstTimeFlg) {
    FirstTimeFlg = FALSE;
    DotIndex = lookUpName(".");
    }
```

```
    deRefStruct(p,Env,&p,&Env,&RetCode);

/* Test most restrictive condition first ((p+1)->value.Name),
     * even if it is garbage or equal to DotIndex by coincidence.
     */
    if (((p+1)->value.Name == DotIndex) &&
        (VAL_TYPE(p+1) == SYMBOL) &&
        (VAL_TYPE(p) == LENGTH) &&
        (p->value.Length == 3))
    return(TRUE);
    else return(FALSE);
}
/****************************************************************
ENTRY POINT CALLED BY COPERNICUS

READCH

PURPOSE

Read a character from a file.  Return the character to Copernicus.

****************************************************************/ readch(c)
int *c;
{
    extern FILE *fp;
    extern int fgetc();

*c = fgetc(fp);
    if (*c != EOF) *c &= 0x7F; /* Set 8th bit to zero. */
    return;
}
/****************************************************************
ENTRY POINT CALLED FROM COPERNICUS

METAFACTLOADED

PURPOSE

To pre-process one of the user-defined meta-facts before loading.

****************************************************************/
metaFactLoaded(MetaFact, Id, ProceedFlg)
STRUCT                  *MetaFact;
int Id;
int *ProceedFlg;

{
    /* Copernicus Routines and Data Structures. */
    extern addOp();
    extern char *NameTable[];

char *OpString; /* Operator string.  */
    int RetCode; /*
    Success/failure return code.  */

*ProceedFlg = TRUE;   /* First presume meta-fact is to be loaded.
*/

/* Process the meta-fact. */
    switch(Id) {
    case INFIX:
```

```
        if (VAL_TYPE(MetaFact+2) == SYMBOL) {
        OpString = NameTable[(MetaFact+2)->value.Name];
        addOp(OpString, 215, XFY,&RetCode);
        }

/* Zero return code => do not add meta-fact to KB */
        *ProceedFlg = FALSE;
        break;
    default:
        break;
    }
}
/****************************************************************
ENTRY POINT CALLED FROM COPERNICUS

EVALMETAFACT

PURPOSE

To evaluate one of the user-defined meta-facts.

****************************************************************/ evalMetaFact(MetaFact, Key, Env, Id, HaltFlg)
STRUCT *MetaFact;/* KB version of the meta-fact   */
STRUCT*Key;      /* KB version of the meta-fact key (expression) */
int    Env;     /* Environment for variables in MetaFact & Key  */
int    Id;      /* User code number for the meta-fact */
int   *HaltFlg; /* Tells when to stop seeking value            */

{
    /* Copernicus Routines. */
    extern parse();
    extern getState();
    extern _noteCache();
    extern deRefStruct();

static int FirstTimeFlg = TRUE;
    static STRUCT *SaidSoPtr;

STRUCT  *Q;
                /* Text of question. */
    STRUCT  *E;
                /* Expression of concern in the question. */
    STRUCT  *RetE;
                /* Expression returned by getState(). */
    STRUCT  *A;
                /* STRUCT representation of user's answer. */
    char    Response[100];
                /* String representation of user's answer. */
    int     MultiFlg;
                /* Flag denoting expression is multivalued. */
    int     QEnv;
                /* Binding environment for the question. */
    int     EEnv;
                /* Binding environment for the expression. */
    int    *StartPtr;
                /* Pointer into Determination State Table. */
    int     RetCode;
                /* Error code returned by Copernicus. */
```

```
    if (FirstTimeFlg) {
        FirstTimeFlg = FALSE;
        parse("'you said so'",&SaidSoPtr,&RetCode);
    } switch(Id) {
    case QUESTION:
        /* Meta-fact is of the form "question(E) = T".
         * "MetaFact+3" is the text of the question.
         * "Key" is the expression being sought.
         */
        deRefStruct(MetaFact+3,Env,&Q,&QEnv,&RetCode);
        deRefStruct(Key,Env,&E,&EEnv,&RetCode);

/* Display the question and prompt for the response. */
        display(Q,QEnv);
        printf("\n>");
        scanf("%s",Response);

/* Put the response in the Cache as a value for the
         * expression.
         */
        parse(Response,&A,&RetCode);
        StartPtr = NULL;
        getState(E,EEnv,MULTIVAL,&StartPtr,&RetE,&MultiFlg,&RetCode);
        noteCache(E,EEnv,A,100,SaidSoPtr,MultiFlg,HaltFlg,&RetCode);
        break;
    default:         /* No other user-defined meta-facts have been
added. */
        break;
    }
}
/*****************************************************************
ENTRY POINT CALLED FROM COPERNICUS

EVALMETAPROP

PURPOSE

To evaluate the user-defined meta-propositions.

*****************************************************************/ evalMetaProp(Prop,Env,Id,IncomingCf,Action,HaltFlg,Cf,RetCode)

STRUCT      *Prop;/*Proposition to be evaluated.*/
int     Env;  /* Binding environment of Prop.*/
int     Id;   /* Unique identifier of the specific meta-prop.*/
int     IncomingCf; /* Starting CF.  Work down from here.*/
ACTION      *Action;        *
/*What to do if the meta-prop succeeds.*/
int     *HaltFlg;      *
/*Do not to attempt to resatisfy proposition.*/
int     *Cf;  /* Return -100 .. 100*/
int     *RetCode;/* You guessed it.*/

{
    /* Copernicus Routines. */
    extern evalExpr();
    extern _getCache();
    extern doAction();

extern display();
```

```
    STRUCT  *E;  /* Expression named in meta-prop.*/
    STRUCT  *V;  /* Value named in in meta-prop.*
    REASON  *R;  /* Reason from getCache().*/
    int     C;   /* CF named in meta-prop (as an int.).*/
    int         *StartPtr;

/* Assume the last attempt to (re)satisfy the meta-prop
     * will fail.  This is overridden only by a call to doAction().
     */
    *Cf = -100;

*RetCode = 0;
    /* Initialize error code to "success". */

StartPtr = NULL;

/* Copernicus suggests the following defensive check.  As a result, we
 * can count on  Prop  always pointing to the principal connective
 * of the meta-prop.  The length can be inferred from the  Id.
 */
    if (VAL_TYPE(Prop) == LENGTH) Prop++;

switch (Id) {
    case DISPLAY:
    /* User-defined meta-prop of the form "display(E)". */
            display(Prop+1,Env);
            doAction(Action,IncomingCf,HaltFlg,Cf,&RetCode);
            if (RetCode < 0) {
            *HaltFlg = TRUE;
            break;
            }
            if (*HaltFlg == FALSE)
            *Cf = -100;
            /* As if couldn't resatisfy. */
            break;

case EISDEFINITE:
            /* Evaluate the expression. */
            evalExpr(++Prop, Env, RetCode);

/* Check all concluded values for the expression to see
             * if any one has a CF of 100.
             */
            do {  getCache(Cache,Prop,Env,&StartPtr,&E,&V,&C,&R,
            RetCode);
            } while (StartPtr && C < 100);

if (StartPtr) {
/* Must have quit the do-while loop by finding a value with C = 100,
hence "is definite" is true. */
doAction(Action,IncomingCf,HaltFlg,Cf,RetCode); if (*HaltFlg == FALSE)
*Cf = -100; } break;

case EISKNOWN:
            /* Evaluate the expression. */
            evalExpr(++Prop, Env, RetCode);

/* Check to see if at least one value was concluded about
     * the expression that has a CF >= 20.
     */
    do {getCache(Cache,Prop,Env,&StartPtr,&E,&V,&C,&R, RetCode);
            } while (StartPtr && C < CFCUTOFF);
```

```
                if (StartPtr) {
/* Must have quit the do-while loop by finding a value with C >=
CFCUTOFF, hence "is known" is true.
                                                                        */
doAction(Action,IncomingCf,HaltFlg,Cf,RetCode); if (*RetCode < 0)
*HaltFlg = TRUE;

if (*HaltFlg == FALSE) *Cf = -100; }break;

case EISSOUGHT:
        /* Evaluate the expression. If it has already been sought,
         * then evalExpr() will return immediately after checking
         * this. If not, the expression is evaluated and the
         * expression becomes sought.
         */
        evalExpr(++Prop, Env, RetCode);
        if (*RetCode < 0) break;

doAction(Action,IncomingCf,HaltFlg,Cf,RetCode);
        if (*RetCode < 0) *HaltFlg = TRUE;

if (*HaltFlg == FALSE) *Cf = -100;
        break;

case EISUNIQUE:
        /* Evaluate the expression. */
        evalExpr(++Prop, Env, RetCode);

do {_getCache(Cache,Prop,Env,&StartPtr,&E,&V,&C,&R,RetCode);

} while (StartPtr && C < CFCUTOFF);

if (StartPtr) {
        /* Must have quit the do-while loop by finding
         * a value with C >= CFCUTOFF. Continue the
         * search from there to see if there is another.
         */
        do { _getCache(Cache,Prop,Env,&StartPtr,&E,&V,&C,
            &R,RetCode);

} while (StartPtr && C < CFCUTOFF);
    if (StartPtr) {
/*  Found a SECOND value with  C >= CFCUTOFF. * "is unique" is
    false.  Do nothing. */
            }
    else {
/*  Found one and only one value with
    C >= CFCUTOFF. "is unique" is true.   */
    do Action(Action,IncomingCf,HaltFlg,Cf, RetCode);
    if (*RetCode < 0) *HaltFlg = TRUE;

/* As if couldn't resatisfy.*/ if (*HaltFlg == FALSE) *Cf = -100;
            }
        }
        else {
            /* Found no values with  C >= CFCUTOFF.  Do nothing. */
        }
        break;
```

```
    case EISUNKNOWN:
        evalExpr(++Prop, Env, RetCode);

do { _getCache(Cache,Prop,Env,&StartPtr,&E,&V,&C,&R,
            RetCode);
        } while (StartPtr && C < CFCUTOFF);

if (StartPtr) {
            /* Must have quit the do-while loop by finding
             * a value with C >= CFCUTOFF, hence "is unknown"
             * is false.  Do nothing.
             */
        }
        else {
            doAction(Action,IncomingCf,HaltFlg,Cf,RetCode);
            if (*RetCode < 0) *HaltFlg = TRUE;
            if (*HaltFlg == FALSE) *Cf = -100;
        }
        break;
    default:  /* No other meta-props are defined at this stage. */
        break;
    }
}
/***************************************************************
ENTRY POINT CALLED FROM COPERNICUS

DETERMINE

PURPOSE
    Ask an automatic question if there was nothing in the Knowledge
Base to give the value of an expression.

***************************************************************/ determine(E,Env)
STRUCT *E;   /* The expression being sought.*/
int Env;     /* E's variable binding environment.*/

{
    /* Copernicus Routines. */
    extern deRefStruct();
    extern freeStruct();
    extern parse();
    extern unParse();
    extern getState();
    extern _noteCache();

char    *Str;
    char    TempBuf[100];
    int     RetCode;
    STRUCT  *RetE;
    STRUCT  *R;
    STRUCT  *Ans;
    int     HaltFlg;
    int     MVFlg;
    int     *StartPtr;

/* Check if expression is multivalued(). */
    StartPtr = NULL;
    getState(E,Env,MULTIVAL,&StartPtr,&RetE,&MVFlg,&RetCode);

/* Prompt for the expression's value. */
    unParse(E,Env,&Str,0x00,&RetCode);
    if (MVFlg == TRUE)
```

```
    printf("What are the values of: %s?",Str);
else
    printf("What is the value of: %s?",Str);
free(Str);
printf("\n>");

/* Read in user's response. */
scanf("%s",TempBuf);
parse(TempBuf,&Ans,&RetCode);
parse("'you said so'", &R, &RetCode);

/* Note values in Cache. */
HaltFlg = FALSE; /* So _noteCache() won't stop before starting. */
_noteCache(E,Env,Ans,100,R,MVFlg,&HaltFlg,&RetCode);

freeStruct(Ans);
    freeStruct(R);
}
/*****************************************************************
ENTRY POINT CALLED FROM COPERNICUS

ERROR

PURPOSE

Handle errors sent from Copernicus to the application program.

******************************************************************/ error(Function,ErrorNum)
int     Function;
int ErrorNum;

{
    /* Copernicus Data Structures. */
    *extern char ParseTrace[]; /* Parse trace maintained by parser */
    *extern int TraceIndex;    /* Index to last character of trace */
    *extern char *ErrorStr[];  /* Error messages in Copernicus. */ char ErrMessage[200];
    char *p;

printf("\n<%d, %d> %s\n",Function,ErrorNum,ErrorStr[-ErrorNum]);

/* Print parse trace if available (as determined by error number)
*/
    if (ErrorNum <= 0) {
        ParseTrace[TraceIndex] = '\0'; /* NULL terminate. */

/* Replace any NL, CR, or TAB characters with spaces. */
        for (p=ParseTrace; p < &ParseTrace[TraceIndex]; p++)
            if (*p=='\n' || *p=='\r' || *p=='\t') *p = ' ';
        strcat(ParseTrace,"<HERE>\n");
        printf("%s",ParseTrace);
    }
    /* Nothing gets returned to Copernicus. */
}
```

APPENDIX IV
STOCK MARKET ADVISOR CONSULTATION LISTING

```
Loading knowledge base...

Do you wish to enter some data on stocks from a file?
>no
Do you wish to buy or sell stocks?
>buy
Which stocks do you wish to consider?
>tek
What is the current price of tek?
>1
What is the 5 year high of tek?
>3
Is tek a:
    * utility
    * bank
    * component-of-djia
    * one-product-company
    * highly-volatile-market
Enter one of the above.
>bank
What is the current company value of tek?
>1000000
On a national scale, numerically rate tek with other banks.
Good approximations will work (1 = largest, 2 = second):
>4
What is the current book value per share of tek?
>.75
Does tek have hidden (off balance sheet) assets?
>yes
What is the monetary value of these assets?
>200000
What is the current number of shares outstanding in tek?
>100000
What is the current market value of tek?
>200000
In the most recent quarter, did tek maintain a dividend?
>yes
Does tek have many unstable operations or operations in
unpredictable foreign countries?
>no
Has tek reached a technical bottom in the stock market by
demonstrating at least one of the following chart patterns?
    * Double bottom
    * Vee with 6-month high after 90 decline
    * Vee plus flag
    * Vee plus correction
    * Vee plus gap
    * Reverse head-and-shoulders bottom
    * Saucer or congested
    * Climax
    * Saucer plus gap
Enter "yes" or "no":
>yes
Have weekly price movements of tek confirmed the commencement
of one of the following technical turning patterns?
    * Volume build-up with rising prices
    * Second run
    * Breakout patterns
    * Momentum gaps
```

```
* Two-hook trend line
Enter "yes" or "no":
>yes

It is recommended you purchase stock belonging to tek.
```
-------

APPENDIX V

FLOWSHEET

OF THE

KNOWLEDGE BASE PROCESSOR

C>

February 10,1986  17:17:13   FCHART.OUT  Page 1

```
1   addCache
2       parse
3           getToken
4               makeToken
5                   atoi [ext]
6                   atof [ext]
7                   addName
8                       copmalloc
9                           malloc [ext]
10                          error
11                      strcpy [ext]
12                      needsQuotes
13                          strcmp [ext]
14                          islower [ext]
15                          iscsym [ext]
16                          IS_SYMBOL_CHAR [ext]
17                      strcmp [ext]
18                      strlen [ext]
19                      hash
20                      parseError
21                          error
22                  copmalloc ... [see line 8]
23                  PEEK_CHAR [ext]
24                  IS_SPACE [ext]
25                  movmem [ext]
26              numToken
27                  PEEK_CHAR [ext]
28                  isdigit [ext]
29                  READ_CHAR [ext]
30                  UNREAD_CHAR [ext]
31              READ_CHAR [ext]
32              IS_SPACE [ext]
33              IS_END_CHAR [ext]
34              UNREAD_CHAR [ext]
35              quotedAtomToken
36                  memcpy [ext]
37                  copmalloc ... [see line 8]
38                  READ_CHAR [ext]
39                  IS_END_CHAR [ext]
40                  free [ext]
41                  UNREAD_CHAR [ext]
42              free [ext]
43              PEEK_CHAR [ext]
44              islower [ext]
45              alphanumericToken
46                  iscsym [ext]
47                  READ_CHAR [ext]
48                  parseError ... [see line 20]
49                  UNREAD_CHAR [ext]
```

```
50              isupper [ext]
51              isdigit [ext]
52              IS_SYMBOL_CHAR [ext]
53              symbolAtomToken
54                      READ_CHAR [ext]
55                      IS_SYMBOL_CHAR [ext]
56                      parseError ... [see line 20]
57                      UNREAD_CHAR [ext]
58              iscntrl [ext]
59              parseError ... [see line 20]
60      popParseStack
61      copmalloc ... [see line 8]
62      addName ... [see line 7]
63      reduce
64              copmalloc ... [see line 8]
65              popParseStack
66              opType
67              ASSOC [ext]
68              moveArg
69                      movmem [ext]
70              VAL_TYPE [ext]
71              pushParseStack
72                      movmem [ext]
73                      VAL_TYPE [ext]
74      processToken
75              popParseStack
76              opType
77              pushParseStack ... [see line 71]
78              reduceFunctorArgs
79                      popParseStack
80                      copmalloc ... [see line 8]
81                      pushParseStack ... [see line 71]
82                      moveArg ... [see line 68]
83                      HAS_SPACE [ext]
84                      VAL_TYPE [ext]
85                      freeStruct
86                              VAL_TYPE [ext]
87                              ^ freeStruct ^
88                              free [ext]
89                      free [ext]
90              reductionNeededFor
91                      opType
92                      lookUpOp
93                              opType
94                      VAL_TYPE [ext]
95                      ASSOC [ext]
96              reduce ... [see line 63]
97              prec
98                      lookUpOp ... [see line 92]
99                      opType
100                     VAL_TYPE [ext]
101                     ASSOC [ext]
102             VAL_TYPE [ext]
103             HAS_SPACE [ext]
104             reduceList
105                     makeToken ... [see line 4]
106                     popParseStack
107                     makeList
108                             makeDottedPair
109                                     copmalloc ... [see line 8]
110                                     movearg [ext]
111                                     moveArg ... [see line 68]
112                             popParseStack
113                             pushParseStack ... [see line 71]
114                             reduce ... [see line 63]
115                             VAL_TYPE [ext]
116                             ^ makeList ^
117                     VAL_TYPE [ext]
118             ASSOC [ext]
119     lookUpOp ... [see line 92]
```

```
120         movmem [ext]
121         strcmp [ext]
122         addOp
123                 copmalloc ... [see line 8]
124                 opType
125                 addName ... [see line 7]
126                 parseError ... [see line 20]
127         scannerInit
128         VAL_TYPE [ext]
129         resolve
130                 lookUpOp ... [see line 92]
131                 numInterps
132                         markAsUnambig
133                                 lookUpOp ... [see line 92]
134                                 VAL_TYPE [ext]
135                         VAL_TYPE [ext]
136                 selectFrom
137                         opType
138                         numInterps ... [see line 131]
139                         VAL_TYPE [ext]
140                         ASSOC [ext]
141                         HAS_SPACE [ext]
142                 resolveJustP
143                         opType
144                         numInterps ... [see line 131]
145                         selectFrom ... [see line 136]
146                         VAL_TYPE [ext]
147                         ASSOC [ext]
148                 VAL_TYPE [ext]
149                 resolveJustQ
150                         selectFrom ... [see line 136]
151                         opType
152                         VAL_TYPE [ext]
153                         ASSOC [ext]
154                 READ_CHAR [ext]
155                 UNREAD_CHAR [ext]
156         parseError ... [see line 20]
157         freeStruct ... [see line 85]
158 _addCache
159         unify
160                 deRefStruct
161                         bindingIndex
162                                 error
163                         VAL_TYPE [ext]
164                         NAME [ext]
165                 undoBindings
166                 bindVar
167                         addName ... [see line 7]
168                         bindingIndex ... [see line 161]
169                         error
170                 VAL_TYPE [ext]
171                 NAME [ext]
172                 ~ unify ~
173                 error
174         pushBindFrame
175                 pushLocalFrame
176                         VAL_TYPE [ext]
177                         ~ pushLocalFrame ~
178                         error
179                 error
180         popBindFrame
181                 undoBindings
182                 error
183         getBindingPtr
184                 bindingIndex ... [see line 161]
185                 strcmp [ext]
186         _insertCache
187                 copmalloc ... [see line 8]
188                 hashStruct
189                         deRefStruct ... [see line 160]
```

```
190                         VAL_TYPE [ext]
191                         hashStruct2
192                                 deRefStruct ... [see line 160]
193                                 VAL_TYPE [ext]
194                                 hashStruct3
195                                         deRefStruct ... [see line 160]
196                                         VAL_TYPE [ext]
197                                         error
198                                 error
199                         error
200             setState
201                     unify ... [see line 159]
202                     pushBindFrame ... [see line 174]
203                     popBindFrame ... [see line 180]
204                     copmalloc ... [see line 8]
205                     instStruct
206                             copmalloc ... [see line 8]
207                             movmem [ext]
208                             fullBindingIndex
209                                     bindingIndex ... [see line 161]
210                                     VAL_TYPE [ext]
211                             VAL_TYPE [ext]
212                             instStruct
213                             NAME [ext]
214                     hashStruct ... [see line 188]
215                     KEYMATCH [ext]
216             parse ... [see line 2]
217             hashStruct ... [see line 188]
218             KEYMATCH [ext]
219             VAL_TYPE [ext]
220             freeStruct ... [see line 85]
221             error
222     addkB
223             parse ... [see line 2]
224             _addkB
225                     _genLabel
226                             _getkB
227                                     unify ... [see line 159]
228                                     pushBindFrame ... [see line 174]
229                                     popBindFrame ... [see line 180]
230                                     hashStruct ... [see line 188]
231                                     KEYMATCH [ext]
232                                     error
233                             freeStruct ... [see line 85]
234                             sprintf [ext]
235                             parse ... [see line 2]
236                     copmalloc ... [see line 8]
237                     metaFactLoaded
238                     pushBindFrame ... [see line 174]
239                     pushLocalFrame ... [see line 175]
240                     popBindFrame ... [see line 180]
241                     unify ... [see line 159]
242                     instStruct ... [see line 205]
243                     setState ... [see line 200]
244                     _resetkB
245                             resetChar
246                                     unify ... [see line 159]
247                                     pushBindFrame ... [see line 174]
248                                     popBindFrame ... [see line 180]
249                                     freeStruct ... [see line 85]
250                                     free [ext]
251                                     hashStruct ... [see line 188]
252                                     KEYMATCH [ext]
253                             unify ... [see line 159]
254                             pushBindFrame ... [see line 174]
255                             popBindFrame ... [see line 180]
256                             freeStruct ... [see line 85]
257                             free [ext]
258                             hashStruct ... [see line 188]
259                             error
```

```
260              KEYMATCH [ext]
261              pushLocalFrame ... [see line 175]
262              _entryRemoved
263                    resetChar ... [see line 245]
264         freeStruct ... [see line 85]
265         free [ext]
266         movmem [ext]
267         parse ... [see line 2]
268         getBindingPtr ... [see line 183]
269         hashStruct ... [see line 188]
270         KEYMATCH [ext]
271         error
272         setChar
273              unify ... [see line 159]
274              pushBindFrame ... [see line 174]
275              popBindFrame ... [see line 180]
276              copmalloc ... [see line 8]
277              instStruct ... [see line 205]
278              hashStruct ... [see line 188]
279              KEYMATCH [ext]
280    freeStruct ... [see line 85]
281    unParse
282         copmalloc ... [see line 8]
283         strcpy [ext]
284         unParCell
285              strchr [ext]
286              strcat [ext]
287              VAL_TYPE [ext]
288              unParBlock
289                    lookUpOp ... [see line 92]
290                    opType
291                    VAL_TYPE [ext]
292                    ^ unParCell ^
293                    unParList
294                         putUnParBuf
295                              copmalloc ... [see line 8]
296                              strchr [ext]
297                              strlen [ext]
298                              movmem [ext]
299                              free [ext]
300                              iscsym [ext]
301                              IS_SYMBOL_CHAR [ext]
302                         ^ unParCell ^
303                         unParRestList
304                              VAL_TYPE [ext]
305                              putUnParBuf ... [see line 294]
306                              ^ unParCell ^
307                              ^ unParRestList ^
308                    ASSOC [ext]
309                    HAS_SPACE [ext]
310                    putUnParBuf ... [see line 294]
311              putAtomUnParBuf
312                    strchr [ext]
313                    copmalloc ... [see line 8]
314                    NEEDS_QUOTES [ext]
315                    putUnParBuf ... [see line 294]
316                    movmem [ext]
317                    free [ext]
318              fullBindingIndex ... [see line 208]
319              ^ unParCell ^
320              putUnParBuf ... [see line 294]
321              sprintf [ext]
322              itoa [ext]
323         free [ext]
324         VAL_TYPE [ext]
325         unParBlock ... [see line 288]
326    closeKB
327    getCache
328    _getCache1
329         unify ... [see line 159]
```

```
330             pushBindFrame ... [see line 174]
331             popBindFrame ... [see line 180]
332             hashStruct ... [see line 188]
333             KEYMATCH [ext]
334     parse ... [see line 2]
335     unParse ... [see line 281]

336  getKB
337     parse ... [see line 2]
338     _getKB ... [see line 226]
339     unParse ... [see line 281]

340  loadCache
341     parse ... [see line 2]
342     unParse ... [see line 281]
343     noteCache
344             pushBindFrame ... [see line 174]
345             popBindFrame ... [see line 180]
346             getBindingPtr ... [see line 183]
347             parse ... [see line 2]
348             hashStruct ... [see line 188]
349             KEYMATCH [ext]
350             unify ... [see line 159]
351             VAL_TYPE [ext]
352             setState ... [see line 200]
353             freeStruct ... [see line 85]
354             error
355             _getChar
356                     pushBindFrame ... [see line 174]
357                     popBindFrame ... [see line 180]
358                     unify ... [see line 159]
359                     hashStruct ... [see line 188]
360                     KEYMATCH [ext]
361             _noteCache
362                     unify ... [see line 159]
363                     pushBindFrame ... [see line 174]
364                     popBindFrame ... [see line 180]
365                     pushLocalFrame ... [see line 175]
366                     event
367                     _resetCache
368                             unify ... [see line 159]
369                             pushBindFrame ... [see line 174]
370                             popBindFrame ... [see line 180]
371                             resetState
372                                     unify ... [see line 159]
373                                     pushBindFrame ... [see line 174]
374                                     popBindFrame ... [see line 180]
375                                     freeStruct ... [see line 85]
376                                     free [ext]
377                                     hashStruct ... [see line 188]
378                                     KEYMATCH [ext]
379                             freeStruct ... [see line 85]
380                             hashStruct ... [see line 188]
381                             KEYMATCH [ext]
382                             free [ext]
383                     _insertCache ... [see line 186]
384                     instStruct ... [see line 205]
385                     setState ... [see line 200]
386                     setReason
387                             copmalloc ... [see line 8]
388                             pushBindFrame ... [see line 174]
389                             unify ... [see line 159]
390                             popBindFrame ... [see line 180]
391             cfCombine
392                     demon
393                     error
394                     evalWhenCached
395                             parse ... [see line 2]
```

```
396                         pushBindFrame ... [see line 174]
397                         pushLocalFrame ... [see line 175]
398                         unify ... [see line 159]
399                         getBindingPtr ... [see line 183]
400                         isList
401                                 VAL_TYPE [ext]
402                         evalPropList
403                                 evalProp
404                                         deRefStruct ... [see line 160]
405                                         _getCache1 ... [see line 328]
406                                         demon
407                                         parse ... [see line 2]
408                                         hashStruct ... [see line 188]
409                                         KEYMATCH [ext]
410                                         pushBindFrame ... [see line 174]
411                                         unify ... [see line 159]
412                                         getBindingPtr ... [see line 183]
413                                         isArithmetic
414                                                 ^ isArithmetic ^
415                                                 bindingIndex ... [see line 161]
416                                                 initOps
- - - - - - - - - - - - - - - - - - - - - - - - - - - - - - - -
417  <  addName ... [see line 7]
- - - - - - - - - - - - - - - - - - - - - - - - - - - - - - - -
418 .                                           VAL_TYPE [ext]
419                                         popBindFrame ... [see line 180]
420                                         error
421                                 VAL_TYPE [ext]
422                                 ^ evalProp ^
423                                 isNumber
424                                         deRefStruct ... [see line 160]
425                                         VAL_TYPE [ext]
426                         doAction
427                                 ^ evalProp ^
428                                 evalConclusion
- - - - - - - - - - - - - - - - - - - - - - - - - - - - - - - -
429  <  demon
430  <  hashStruct ... [see line 188]
431  <  KEYMATCH [ext]
432  <  pushBindFrame ... [see line 174]
433  <  unify ... [see line 159]
434  <  popBindFrame ... [see line 180]
435  <  getInvoke
436  <  getBindingPtr ... [see line 183]
437  <  ^ evalConclusion ^
438  <  VAL_TYPE [ext]
439  <  error
440  <  ^ _noteCache ^
- - - - - - - - - - - - - - - - - - - - - - - - - - - - - - - -
441                                             evalAction
442                                         evalExpr
443                                             newList
- - - - - - - - - - - - - - - - - - - - - - - - - - - - - - - -
444  <  copmalloc ... [see line 8]
- - - - - - - - - - - - - - - - - - - - - - - - - - - - - - - -
445                                             removeList
- - - - - - - - - - - - - - - - - - - - - - - - - - - - - - - -
446  <  free [ext]
- - - - - - - - - - - - - - - - - - - - - - - - - - - - - - - -
447                                             insertList
- - - - - - - - - - - - - - - - - - - - - - - - - - - - - - - -
448  <  copmalloc ... [see line 8]
- - - - - - - - - - - - - - - - - - - - - - - - - - - - - - - -
449                                                 freeStruct ... [see line 65]
450                                                 copmalloc ... [see line 8]
451                                                 _getKB ... [see line 226]
452                                                 demon
453                                                 getState
- - - - - - - - - - - - - - - - - - - - - - - - - - - - - - - -
454  <  pushBindFrame ... [see line 174]
```

| | | |
|---|---|---|
| 455 | < popBindFrame ... [see line 180] | |
| 456 | < unify ... [see line 159] | |
| 457 | < hasnStruct ... [see line 138] | |
| 458 | < KEYMATCH [ext] | |

| | |
|---|---|
| 459 | event |
| 460 | _getChar ... [see line 355] |
| 461 | instStruct ... [see line 105] |
| 462 | setState ... [see line 200] |
| 463 | pushInvokeStk |

464 < copmalloc ... [see line 8]

| | |
|---|---|
| 465 | pushBindFrame ... [see line 174] |
| 466 | pushLocalFrame ... [see line 175] |
| 467 | unify ... [see line 159] |
| 468 | evalRule |

| | |
|---|---|
| 469 | < parse ... [see line 2] |
| 470 | < pushBindFrame ... [see line 174] |
| 471 | < unify ... [see line 159] |
| 472 | < getBindingPtr ... [see line 183] |
| 473 | < ^ evalProp ^ |
| 474 | < popBindFrame ... [see line 180] |

475      popInvokeStk

476 < free [ext]

| | |
|---|---|
| 477 | evalConclusion ... [see line 423] |
| 478 | evalPresup |

| | |
|---|---|
| 479 | < parse ... [see line 2] |
| 480 | < pushBindFrame ... [see line 174] |
| 481 | < unify ... [see line 159] |
| 482 | < getBindingPtr ... [see line 183] |
| 483 | < ^ evalProp ^ |
| 484 | < popBindFrame ... [see line 180] |

| | |
|---|---|
| 485 | evalMetaFact |
| 486 | popBindFrame ... [see line 180] |
| 487 | determine |
| 488 | resetState ... [see line 371] |
| 489 | evalWhenfound |

| | |
|---|---|
| 490 | < parse ... [see line 2] |
| 491 | < pushBindFrame ... [see line 174] |
| 492 | < unify ... [see line 159] |
| 493 | < getBindingPtr ... [see line 183] |
| 494 | < getCache1 [ext] |
| 495 | < pushLocalFrame ... [see line 175] |
| 496 | < isList ... [see line 400] |
| 497 | < ^ evalPropList ^ |
| 498 | < _getCache1 ... [see line 328] |
| 499 | < popBindFrame ... [see line 180] |

| | |
|---|---|
| 500 | _resetCache ... [see line 367] |
| 501 | free [ext] |
| 502 | pushLocalFrame ... [see line 175] |
| 503 | MIN [ext] |
| 504 | closeCache |
| 505 | isList ... [see line 400] |
| 506 | evalArithmeticProp |
| 507 | arithCalc |

| | |
|---|---|
| 508 | < floor [ext] |
| 509 | < ceil [ext] |
| 510 | < sqrt [ext] |
| 511 | < deRefStruct ... [see line 160] |
| 512 | < error |

```
513  <  initOps ... [see line 416]
514  <  VAL_TYPE [ext]
515  <  ^ arithCalc ^
------------------------------------------------------------
516                                          deRefStruct ... [see line 160]
517                                          VAL_TYPE [ext]
518                                          pushBindFrame ... [see line 174]
519                                          unify ... [see line 159]
520                                          doAction ... [see line 426]
521                                          popBindFrame ... [see line 180]
522                                  cached
523                                          free [ext]
524                                          sprintf [ext]
525                                          strlen [ext]
526                                          addName ... [see line 7]
527                                          copmalloc ... [see line 8]
528                                          deRefStruct ... [see line 160]
529                                          doAction ... [see line 426]
530                                          evalExpr ... [see line 442]
531                                          freeStruct ... [see line 85]
532                                          _getCache
------------------------------------------------------------
533  <  _getCache1 ... [see line 328]
------------------------------------------------------------
534                                          instStruct ... [see line 205]
535                                          parse ... [see line 2]
536                                          popBindFrame ... [see line 180]
537                                          pushBindFrame ... [see line 174]
538                                          unify ... [see line 159]
539                                          unParse ... [see line 281]
540                                          VAL_TYPE [ext]
541                                          getState ... [see line 453]
542                                          closeCache
543                                  isSomething
544                                          free [ext]
545                                          sprintf [ext]
546                                          strlen [ext]
547                                          addName ... [see line 7]
548                                          deRefStruct ... [see line 160]
549                                          doAction ... [see line 426]
550                                          evalExpr ... [see line 442]
551                                          freeStruct ... [see line 85]
552                                          _getCache ... [see line 532]
553                                          instStruct ... [see line 205]
554                                          parse ... [see line 2]
555                                          popBindFrame ... [see line 180]
556                                          pushBindFrame ... [see line 174]
557                                          unify ... [see line 159]
558                                          unParse ... [see line 281]
559                                          VAL_TYPE [ext]
560                                          closeCache
561                                  string
562                                          strcat [ext]
563                                          strncpy [ext]
564                                          strlen [ext]
565                                          free [ext]
566                                          copmalloc ... [see line 8]
567                                          deRefStruct ... [see line 160]
568                                          addName ... [see line 7]
569                                          VAL_TYPE [ext]
570                                          IOputErrString [ext]
571                                          position
------------------------------------------------------------
572  <  strncmp [ext]
573  <  strlen [ext]
------------------------------------------------------------
574                                          pushBindFrame ... [see line 174]
575                                          unify ... [see line 159]
576                                          doAction ... [see line 426]
577                                          popBindFrame ... [see line 180]
```

```
578                                              isDottedPair [ext]
579                                              unParse ... [see line 281]
580                                              strcmp [ext]
581                                          evalMiscProp
582                                              free [ext]
583                                              sprintf [ext]
584                                              strlen [ext]
585                                              addName ... [see line 7]
586                                              deRefStruct ... [see line 160]
587                                              doAction ... [see line 42]
588                                              evalExpr ... [see line 442]
589                                              freeStruct ... [see line 85]
590                                              _getCache ... [see line 532]
591                                              instStruct ... [see line 205]
592                                              isDottedPair [ext]
593                                              parse ... [see line 2]
594                                              popBindFrame ... [see line 180]
595                                              pushBindFrame ... [see line 174]
596                                              unify ... [see line 159]
597                                              unParse ... [see line 281]
598                                              VAL_TYPE [ext]
599                                              pushLocalFrame ... [see line 175]
600                                          closeCache
601                                          mostlikely
- - - - - - - - - - - - - - - - - - - - - - - - - - - - - - - - - - - - - -
602   <  evalExpr ... [see line 442]
603   <  _getCache ... [see line 532]
604   <  instStruct ... [see line 205]
605   <  pushBindFrame ... [see line 174]
606   <  popBindFrame ... [see line 180]
607   <  unify ... [see line 159]
- - - - - - - - - - - - - - - - - - - - - - - - - - - - - - - - - - - - - -
608                                          evalMetaProp
609                                      deRefStruct ... [see line 160]
610                                      isList ... [see line 400]
611                                  popBindFrame ... [see line 180]
612                                  hashStruct ... [see line 188]
613                                  KEYMATCH [ext]
614 .                          demon
615                                  hashStruct ... [see line 188]
616                                  KEYMATCH [ext]
617       free [ext]
618       freeStruct ... [see line 85]

619   loadKB
620       parse ... [see line 2]
621       _addKB ... [see line 224]
622       freeStruct ... [see line 85]

623   openCache 624   openKB
625   resetCache
626       parse ... [see line 2]
627       _resetCache ... [see line 307]
628       freeStruct ... [see line 85]

629   resetKB
630       _resetKB ... [see line 244]
631       freeStruct ... [see line 85]
632       parse ... [see line 2]

633   saveCache
634       writebuf
635       unParse ... [see line 281]
```

```
636    _getCache1 ..., [see line 328]
637    sprintf [ext]
638    free [ext]
639    pushBindFrame ... [see line 174]
640    popBindFrame ... [see line 180]

641    saveKB
642    writebuf
643    unParse ... [see line 281]

644    find
645      parse ... [see line 2]
646      _resetCache ... [see line 367]
647      pushBindFrame ... [see line 174]
648      evalExpr ... [see line 442]
649      popBindFrame ... [see line 180]
650      freeStruct ... [see line 85]

651    saveForAbort 652    restoreAfterAbort
653      getToken ... [see line 3]
654      popParseStack
655      removeList ... [see line 445]
656      getState ... [see line 453]
657      parse ... [see line 2]
658      pushBindFrame ... [see line 174]
659      _resetCache ... [see line 367]
660      popBindFrame ... [see line 180]
661      freeStruct ... [see line 85]
662      VAL_TYPE [ext]
663      undoBindings
664      popInvokeStk ... [see line 475]

665    initCopernicus
666      hashStruct ... [see line 188]
667      parse ... [see line 2]

668    addMetaFact
669      parse ... [see line 2]
670      error
671      hashStruct ... [see line 188]

672    addMetaProp
673      error
674      parse ... [see line 2]
675      hashStruct ... [see line 188]

676    lookUpName
677      hash
678      strcmp [ext]
679      strlen [ext]

680    getReason 681    readc
682      readch
683      movmem [ext]

684    _resetCache1
```

```
685    unify ... [see line 159]
686    pushBindFrame ... [see line 174]
687    popBindFrame ... [see line 180]
688    _getCache1 ... [see line 328]
689    freeStruct ... [see line 85]
690    free [ext]
691    parse ... [see line 2]
692 .  hashStruct ... [see line 188]
693    KEYMATCH [ext]
694    _resetCache ... [see line 367]
695    getBindingPtr ... [see line 183]
696    error
697    pushLocalFrame ... [see line 175]

698  instantiate
699     instStruct ... [see line 205]
700     strcmp [ext]

701  partialInstantiate
702     copyStruct
703             copmalloc ... [see line 8]
704             VAL_TYPE [ext]
705             movmem [ext]
706             copyStruct
707     strcmp [ext]

708  freeList
709     refree
710             refree
711             free [ext]
712     free [ext]
```

APPENDIX VI

KNOWLEDGE BASE PROCESSOR

Copyright (c) 1985 Teknowledge, Inc.

February 12,1986  14:56:32   TYPEDEF.H  Page 1

/******************************************************************* typedef.h

Copyright (c) 1985 Teknowledge, Inc.
                       525 University Ave.
                       Palo Alto, CA 94301
                       (415) 327-6600

PROGRAM
        Copernicus
        Version 1.0

PURPOSE
        Copernicus is an inference engine implemented as a set of subroutines.

FILES
        typedef.h       Type definitions and defines used by all files.

access.c        KB and Cache access functions.

arithcalc.c     Arithmetic expression evaluator.

engine.c        Inference engine code.

error.c         Error codes.

| | | |
|---|---|---|
| | global.c | Global declarations for variables. |
| | metafact.c | Copernicus-defined meta-facts. |
| | metaprop.c | Copernicus-defined meta-propositions. |
| | parsedef.h | Parser header file. |
| | parser.c | Knowledge Base Language parser code. |
| | reason.c | Explanation and Rule Invocation Stack routines. |
| | scanner.c | Scanner (lexical analyzer) for parser. |
| | storage.c | Storage Manager subroutines. |
| | unify.c | The unification and instantiation routines. |
| | unparser.c | unParse() routine code (for parser). |
| | user.c | Default (stubbed out) application-defined routines. |
| | utility.c | Utility routines. |

COMPILER
```
        Version 1.0:
                Computer Innovations Optimizing C86
                Version 2.30F
                IBM-PC
***********************************************************************/
#define TRUE    1
define FALSE   0 define BEGIN   0
define END     1 define LABEL   0
define EXPR    1
#define ENTRY   2

/* Token types for Parser and Scanner. */

/* These definitions are for accessing the ValType field of STRUCT
 *
 * The 8 bits of ValType are broken into three fields, called the
 * SPACE field (bit 7), the OP field (bits 6,5,4) and the TYPE field
 * (bits 3,2,1,0).
 */
#define SPACEMASK       0x80
#define OPMASK          0x70
#define TYPEMASK        0x0F
#define HAS_SPACE(p)    ((p)->ValType & SPACEMASK )
#define OP_TYPE(p)      ((p)->ValType & OPMASK )
#define VAL_TYPE(p)     ((p)->ValType & TYPEMASK )
#define NAME(p)         ((p)->value.Name)

/* The following define the code values for the TYPE field of ValType
 * (bits 3,2,1,0).
 * Example:  if (VAL_TYPE(q+1) != COMMA) { ... }
 *
 * IMPORTANT Note:  At least one of bits 0,1,2 must be nonzero in the
 * TYPE field when it is used to mark an unambiguous syntactic object
 * (token or structure).  Otherwise when bits 0-2 are all zero, the
 * object is ambiguous, and bits 3-7 are used to indicate the *possible*
 * interpretations, using a different coding system.
 * Upshot: dont use the values 0x00 or 0x08 in the TYPE field for
 * unambiguous objects.
 */
#define INTNUM                  0x01
#define FLOATNUM                0x02
#define SYMBOL                  0x03
```

```
#define VARIABLE            0x04
#define OPENPAREN           0x05
#define CLOSEPAREN          0x06
#define COMMA               0x07
#define LENGTH              0x09
#define LEFTBRACKET         0x0A
#define RIGHTBRACKET        0x0B
#define FUNCTOR             0x0C
#define STRUCTURE           0x0D
/* #define <still available>  0x0E */
define ENDTOKEN            0x0F /* The following define the coding scheme for the OP field of ValType
 * (bits 6,5,4).
 */
#define NOTOP   0x00
#define YFX     0x10
#define XFY     0x20
#define XFX     0x30
#define FY      0x40
#define FX      0x50
#define YF      0x60
#define XF      0x70

/* The following define the coding scheme for marking possible interpretations
 * of ambiguous tokens (bits 7-3 of ValType).
 */
#define TERM    0x80
#define FUNC    0x40
#define PREF    0x20
#define INF     0x10
#define POST    0x08

/* States for Object StateTable[]. */
#define SOUGHT          0x01
#define SEEKING         0x02
#define NOCACHE         0x04
#define MULTIVAL        0x08

/* Format for parser quoted strings. */
#define QUOTEPARSE      0x01
#define NOQUOTEPARSE    0x00
/* STRUCT.
 * The "ValType" indicates the type of atom - NUM, VAR, or SYM.
 * The "Op" field, if not 0, is the index into the operator table, OpTable[].
 * Op is non-zero only if the atom is an operator.
 *
 * The legal ValTypes are:
 *      LENGTH
 *      VARIABLE
 *      SYMBOL
 *      INTNUM
 *      FLOATNUM
 *      STRUCTURE
 *
 * The encoding of foo(bar,baz) looks like:
 *
 *      ---------------------------------
 *      |     |     |     |     |
 *      |  3  | foo | bar | baz |
 *      |_____|_____|_____|_____|
 *
 * The first cell is always a "Length" cell (hence the LENGTH ValType).
 * The second cell is always the principal functor. The remaining cells
 * are arguments to the principal functor. If an argument is not atomic,
 * that is, it is a structure itself, then the respective argument contains
 * a pointer to that structure.
 *
 * The encoding of foo(bar,baz(blat)) looks like:
```

```
*   _____
*  |        |       |       |   |   |
*  |   3    |  foo  |  bar  | * |   |
*  |_____|_____|_____|_|_|___|
*                                |
*              ___|_____
*             |        |       |       |
*             |   2    |  baz  | blat  |
*             |_____|_____|_____|
*
* In the above case, the 2nd argument slot (4th slot) will have a ValType
* of STRUCTURE and an ArgPtr pointing to the baz(blat) structure.
*
* Individual STRUCTs may or may not have a functor.  For example, the
* following is perfectly legal:
*
*     foo((bar,baz),blat)
*
* where "(bar,baz)" is a functor-less structure.  In this case, the Name
* field of the principal functor will contain "-1".
*
* Lists are implemented LISP fashion - CONS cells with CARs and CDRs -
* except we call them HEADs and TAILS.  Each cell is a 2 argument structure
* with "." as the principal functor followed by the head and tail arguments.
* In general, the tail argument is a pointer to another list structure.
*
*
* The encoding of [a,b,c] looks like:
*   _____
*  |        |       |       |   |   |
*  |   3    |   .   |   a   | * |   |
*  |_____|_____|_____|_|_|___|
*                                |
*              ___|_____
*             |        |       |       |   |   |
*             |   3    |   .   |   b   | * |   |
*             |_____|_____|_____|_|_|___|
*                                            |
*                         ___|_____
*                        |        |       |       |       |
*                        |   3    |   .   |   c   |  []   |
*                        |_____|_____|_____|_____|
*
*/
typedef struct Struct {
        unsigned char ValType;          /* NUM, VARIABLE, SYMBOL, etc.  */
        union {
                unsigned Length;          /* Num of Args - 0,1,2...       */
                struct Struct *ArgPtr;    /* Argument is a structure.     */
                int     Name;             /* Index into NameTable[].      */
                long    intVal;           /* long integer.                */
                float   floatVal;         /* single precision float.      */
        } value;
} STRUCT;
/* Operator Table.
 * An operator table holds the necessary information about each operator,
 * including the operator's character string, its precedence, and its
 * associativity.
 */
typedef struct optable {
        int     Index;           /* Index into NameTable           */
        int     Prec;            /* Operator Precedence.           */
        unsigned char Assoc;     /* Operator associativity.        */
} OPTABLE;
/* KBASE.
 * The Knowledge Base is indexed by a Key structure corresponding to the
 * expressions in the conclusion part of the KB entry, i.e., the "then"
 * part of the rules.
 *
 * The knowledge base is basically a linked list of entries, one entry per
 * rule/fact, and hence the "Next" field.  This allows the knowledge base
```

```
 * to grow indefinitely (i.e. until memory runs out) and to make insertions
 * at arbitrary points.
 *
 * From time to time, knowledge base
 * entries may be deleted by resetKB(). resetKB() marks an entry's
 * DeleteFlg and will delete the entry if it is not currently being used
 * elsewhere, such as by the rule invocation stack. If an entry IS used
 * elsewhere at the time of deletion marking, deletion is postponed until
 * a subsequent call to resetKB() when the marked entry is more likely to
 * be unused. The subsequent call to resetKB() does not have to reference
 * the previously deleted entry - each call deletes all marked entries if
 * they are no longer referenced.
 *
 * Should it become necessary to keep all or part of the knowledge base on
 * disk in a data base (or other file structure) then this linked-list
 * data structure can be modified very easily to support that mode of
 * operation:
 *      1) Change the Label, Key, and Entry definitions to be data base
 *              indexes (or something equivalent). Instead of being memory
 *              pointers.
 *      2) When an entry is needed, access the data base for the requested
 *              items, using the data base indexes in the KBASE data
 *              structure.
 * If this doesn't suffice, then each KBASE entry record can be put in the
 * data base, although this would greatly slow knowledge base scanning
 * as is needed when executing the knowledge base.
 */
typedef struct kbase {
        STRUCT  *Label;             /* Identifying label (usually unique). */
        STRUCT  *Key;               /* Index expression (object).          */
        STRUCT  *Entry;             /* The knowledge base entry.           */
        short   EntryType;          /* The type of entry.                  */
        unsigned DeleteFlg:1;       /* TRUE == marked for deletion.        */
        unsigned RelEntryFlg:1;     /* TRUE if "executable".               */
        short   RefCnt;             /* 0 if entry not in use,+ve otherwise.*/
        struct kbase *Next;         /* Next KBASE entry.                   */
} KBASE;
/* REASON.
 * Each CACHEREC defined below contains a pointer to a linked list of reasons
 * associated with the conclusion represented by the cache entry.
 */
typedef struct reason {
        STRUCT  *Item;              /* Ptr to the actual reason STRUCT. */
        struct reason *Next;        /* Next reason. */
} REASON;

/* CACHEREC.
 * Each cache entry is a record of the following plus a linked list of value
 * records (if any values
 *
 * The Cache is basically a linked list of entries, one entry per
 * Cache item, and hence the "Next" field. This allows the Cache to
 * grow indefinitely (i.e. until memory runs out) and to make insertions
 * at arbitrary points.
 *
 * From time to time, Cache  entries may be deleted by resetCache().
 * resetCache() marks an entry's
 * DeleteFlg and will delete the entry if it is not currently being used
 * elsewhere, such as by the backtracking stack. If an entry IS used
 * elsewhere at the time of deletion marking, deletion is postponed until
 * a subsequent call to resetCache() when the marked entry is more likely to
 * be unused. The subsequent call to resetCache() does not have to reference
 * the previously deleted entry - each call deletes all marked entries if
 * they are no longer referenced.
 */
typedef struct cacherec {
        STRUCT  *Object;
        STRUCT  *Value;
        short   cf;                 /* Certainty factor.             */
        REASON  *Reason;            /* Ptr to associated reasons.    */
```

```
        char    DeleteFlg;      /* TRUE == marked for deletion.             */
        short   RefCnt;         /* 0 if entry not in use,+ve otherwise.     */
        struct cacherec *Next;  /* Next Cache entry.                        */
} CACHEREC;
/*
 * STATE.
 */
typedef struct state {
        STRUCT  *Expr;
        unsigned State;
        struct state *Next;
} STATE;
/* BINDSTK.
 * The binding stack is used to contain the variable bindings during
 * unifications.  It is easier and cheaper to keep the bindings on a stack
 * than to copy entire structures each time a binding is made during a
 * unification.
 */
typedef struct bindstk {
        int     EnvFlg;         /* if <> 0, start of new environment.       */
        int     Trail;          /* Ptr to the trail of modifications.       */
        int     Var;            /* The variable being bound.                */
        STRUCT  *Struct;        /* The pure code that Var represent.        */
        int     Env;            /* Environment where Code is anchored.      */
} BINDSTK;

/* TRAILSTK.
 * The trail stack contains the list of bindings (index into BindStack)
 * that must be undone when backtracking occurs.
 */
typedef int TRAILSTK;

/* MATCHTAB - Match Table.
 * Table of KB Entry formats allowable in Copernicus.
 * This table is searched in reversed order.  The most specific template
 * should be entered last in the table.  This table is expendable by users.
 *
 * For efficiency, the table will contain both the string and STRUCT
 * version of the entry template and the key.  In all our predefined
 * metafacts, the key is simply a variable.  But meta-fact added by
 * the user program might require more complex key.  This is why we
 * need to keep a parsed version of the key.
 *
 * We should parse the entry and key template together so that their
 * variables are related. Otherwise, they are independent, like
 * in different rules.  Not currently done.
 *
 * When modifying the table, make sure that you update the MatTabIndex
 * initial value.
 */
typedef struct matchtable {
        char    *Template;      /* KB Entry template - e.g. "term".         */
        char    *Key;           /* Key to indexed the KB entry              */
        STRUCT  *TempForm;      /* Parsed form of Template.                 */
        STRUCT  *KeyForm;       /* Parsed form of the Key.                  */
        int     RelEntryFlg;    /* Entry can be "executed"?                 */
        int     Type;           /* Type of the entry.                       */
} MATCHTAB;

/* List of possible entry codes: */
#define NOCACHEDCL      -5
#define MULTIVALDCL     -6
#define PRESUPPOSITION  -7
#define WHENFOUND       -8
#define RULE            -9
#define FACT1           -11
#define FACT2           -12
#define FACT3           -13
#define FACT4           -14
```

```
#define FACT5          -15
#define FACT6          -16
#define FACT7          -17
#define FACT8          -18
#define FACT9          -19
#define WHENCACHED1    -20
define WHENCACHED2    -21 define MATCH_TABLE_LEN 100 define CACHE_TABLE_LEN 20
/* Linked lists */
/* Every list looks like:
 *
 *      list--------v
 *              ----------
 *              |  size  |
 *              |--------|      ---------
 *              |   .____|_____|  .___|_____ item
 *              |  first |      |--------|
 *              ----------      |   .    |
 *                              ----|----
 *                                  |
 *                              ---------
 *                              |   .___|_____ item
 *                              |--------|
 *                              |   .    |
 *                              ----|----
 *                                  |
 *                                next ...
 *
 *      where the item can be a pointer to anything (type cast).
 */ typedef struct listhead {
        int Size;
        struct iteminlist *First;
} LISTHEAD;

typedef struct iteminlist {
        struct iteminlist *Next;
        char *Contents;
} ITEMINLIST;

/* Stack implementation of NoCache list. */
typedef struct nocacheitem {
        STRUCT *Expr;
        int    Level;
} NOCACHEITEM;
/* Changes for instStruct() ...
 *
 * UNIQUEVAR - instStruct() dereferences until a variable is bound,
 *             but in the case of no binding, creates a unique variable
 *             in the name table.
 * NOUNIQUEVAR - instStruct() dereferences until a variable is bound,
 *             but in the case of no binding, returns the variable name
 *             of the last unbound variable.
 */ define UNIQUEVAR      1
define NOUNIQUEVAR    0

/* Back-tracking structure:
 *      Back-tracking is done by recursive calls to evalProp(). The action
 *      to be performed next is stored in the structure below and passed to
 *      the next invocation of evalProp().
```

```
*/ define EVALPROP      1
define EVALCONC      2
define NONE          3 define MULTIPLE      1
define ONCE          2 typedef struct action {
        unsigned char ActionKey;     /* EVALPROP | EVALCONC | NONE    */
        STRUCT *Prop;                /* Prop to evaluate              */
        int    Env;                  /* Environ. where prop vars bound*/
        struct action *Action;       /* Next action prop to evaluate  */
        char RepeatFlg;              /* MULTIPLE calls or ONCE        */
        char MultiFlg;               /* Is expression multivalued?    */
} ACTION;

#define KBENTRY       1
#define OBJECT        2

/* INVOCATION STACK
 *
 * The Invocation Stack contains pointers to each knowledge base entry
 * (rule and fact) and each object (expression) under evaluation by the
 * Inference Engine.
 */
typedef struct invokestk {
        int Type;                    /* OBJECT or KBENTRY.            */
        int Env;                     /* Binding stack environment.    */
        int SucceedFlg;              /* KB entry succeeded.           */
        struct invokestk *Next;      /* Ptr to next stack entry.      */
        union {
                KBASE  *KBasePtr;    /* Knowledge base entry pointer. */
                STRUCT *Object;      /* Object entry.                 */
        } item;
} INVOKESTK;

/* MetaProp Match Table. */ typedef struct metaproptable {
        char   *Template;            /* Metaprop template - e.g. "+". */
        STRUCT *TempForm;            /* Parsed form of Template.      */
        int    Type;                 /* Type of metaprop              */
} METAPROPTAB;

/* List of possible entry codes: */
#define AND         -40
#define OR          -39
#define NOT         -38
#define PLUS        -37
#define MINUS       -36
#define TIMES       -35
#define DIVIDE      -34
#define INTDIV      -33
#define MODDIV      -32
#define FIX         -31
#define FLOAT       -30
#define TRUNCATE    -29
#define REALROUND   -28
#define SQRT        -27
#define LENGTHLIST  -26
#define EQUALS      -25
#define LT          -24
#define GT          -23
#define LTOREQ1     -22
#define LTOREQ2     -21
```

```
#define GTOREQ          -20
#define ISEQTO          -19
define EXPR            -18 define PROP_TABLE_LEN  200 define MIN(x,y)        ((x < y) ? x : y)
/* Parser constants for various tables. */
#define NAME_TABLE_SIZE 4000
#define OP_TABLE_SIZE   300
/***************************************************************** access.c

Copyright (c) 1985 Teknowledge, Inc.
                    525 University Ave.
                    Palo Alto, CA  94301
                    (415) 327-6600

PROGRAM
        COPERNICUS
        Version 1.0 - IBM PC

PURPOSE
        Copernicus is an inference engine implemented as a set of subroutines.

COMPILER
        Version 1.0:
                Computer Innovations Optimizing C86
                IBM-PC SUBROUTINES
        Contained in this file are declarations of the following Application
        Interface subroutines:

Application Interface
        ---------------------
        addCache()
        addKB()
        closeCache()
        closeKB()
        getCache()
        getKB()
        loadCache()
        loadKB()
        noteCache()
        openCache()
        openKB()
        resetCache()
        resetKB()
        saveCache()
        saveKB()

*****************************************************************/ include <stdio.h>
include "typedef.h"
/*****************************************************************
APPLICATION INTERFACE LEVEL

ADDCACHE
```

PURPOSE
        Add an entry pattern (augmenting if necessary) to the cache.

RETURNS
        RetCode = 0 : Successful addition of entry.
********************************************************************/

```
addCache(Name,Entry,InsertPos,RetCode)
char *Name;             /* Cache name.                  */
char *Entry;            /* Entry to insert.             */
int InsertPos;          /* Position of insertion.       */
int *RetCode;           /* Success/failure code.        */

{
        STRUCT *CacheEntry;    /* Parsed form of entry.         */

*RetCode = 0;          /* Set RetCode to "success".     */

/* Parse and validate the string representing a cache entry. */
        parse(Entry,&CacheEntry,RetCode);
        if (*RetCode < 0) return;

/* Call the corresponding Storage Manager Level subroutine. */
        _addCache(Name,CacheEntry,InsertPos,RetCode);
}
```
/********************************************************************
APPLICATION INTERFACE LEVEL

ADDKB

PURPOSE
        Add a knowledge base entry to the knowledge base.

RETURNS
        RetCode = 0 : Successful addition of entry.
********************************************************************/

```
addKB(KBname,Entry,InsertPos,RetLabel,RetCode)
char *KBname;           /* KB name.                     */
char *Entry;            /* KB entry to be inserted.     */
int InsertPos;          /* Position of insertion.       */
char **RetLabel;        /* KB label given to entry.     */
int *RetCode;           /* Success/failure code.        */

{
        STRUCT  *KBentry;      /* Parsed form of entry.          */
        STRUCT  *RetLab;       /* Returned label from _addKB().  */

*RetCode = 0;          /* Set RetCode to "success".      */

/* Parse and validate the string representing a KB entry. */
        parse(Entry,&KBentry,RetCode);
        if (KBentry==NULL || *RetCode<0) return;

/* Call the corresponding Storage Manager Level subroutine.
         * Dispose of the entry structure when finished - _addKB() generates
         * a copy for insertion into the KB.
         */
        _addKB(KBname,KBentry,InsertPos,&RetLab,RetCode);
        freeStruct(KBentry);

/* Unparse the returned label. */
        unParse(RetLab,-1,RetLabel,QUOTEPARSE,RetCode);
}
```
/********************************************************************
APPLICATION INTERFACE LEVEL

CLOSECACHE

PURPOSE

Close a Cache from access.

```
*****************************************************************************/ closeCache(Name,CachePtr)
char *Name;
CACHEREC *CachePtr;

{
        /* Decrement the reference count. */
        if (CachePtr!=NULL && CachePtr->RefCnt>0)
                CachePtr->RefCnt--;
}
/*****************************************************************************
APPLICATION INTERFACE LEVEL
```

CLOSEKB

PURPOSE

Close a Knowledge Base from access.

```
*****************************************************************************/ closeKB(Name,KBPtr)
char *Name;
KBASE *KBPtr;

{
        /* Decrement the reference count. */
        if (KBPtr!=NULL && KBPtr->RefCnt>0)
                KBPtr->RefCnt--;
}
/*****************************************************************************
APPLICATION INTERFACE LEVEL
```

GETCACHE

PURPOSE

Look up an object pattern in the cache returning pointers to
    the matched object, its associated value and certainty factor.

RETURNS

Pointers to the matched object, its associated value and certainty
    factor.

RetCode = 1 : No match found.
    RetCode = 0 : Successful match of object pattern found.

```
*****************************************************************************/
getCache(Name,Expr,StartPtr,RetExpr,RetValue,RetCf,RetCode)
char *Name;             /* The name of the cache.              */
char *Expr;             /* Expr to search for.                 */
CACHEREC **StartPtr;    /* Where to begin search at.           */
char **RetExpr;         /* Returned object.                    */
char **RetValue;        /* Returned value.                     */
int *RetCf;             /* Returned certainty factor.          */
int *RetCode;           /* Success/failure return code.        */

{
        extern _getCache1();
        extern parse();
        extern unParse();

STRUCT *Obj;
```

```
        *RetCode = 0;    /* Set RetCode to "success". */

/* Parse and validate the string representing a kbase object. */
        parse(Expr,&Obj,RetCode);
        if (Obj == NULL) return;

/* Call the corresponding Storage Manager Level subroutine. */
        _getCache1(Name,Obj,-1,StartPtr,RetCode);

/* Unparse the returned expression and value. */
        unParse(StartPtr->Object,-1,RetExpr,QUOTEPARSE,RetCode);
        if (*RetCode != 0) return;
        unParse(StartPtr->Value,-1,RetValue,QUOTEPARSE,RetCode);
        if (*RetCode != 0) return;

/* Return the cf. */
        *RetCf = StartPtr->cf;
}
/************************************************************************
APPLICATION INTERFACE LEVEL

GETKB

PURPOSE
        Look up an entry pattern in the knowledge base and return a pointer to
        its entry.

RETURNS
        A pointer to a matched entry in the knowledge base.

RetCode =  1 : No match found.
        RetCode =  0 : Successful match of entry pattern found.
*************************************************************************/ getKB(KBname,Item,ItemType,StartPtr,RetLabel,RetEntry,RetCode)
char *KBname;               /* Knowledge base name.                  */
char *Item;                 /* Pattern to match against.             */
int  ItemType;              /* Type of KB item, LABEL, EXPR, ENTRY.  */
int  **StartPtr;            /* The entry to begin search at.         */
char **RetLabel;            /* The returned KB label                 */
char **RetEntry;            /* The returned KB entry.                */
int  *RetCode;              /* Success/error return code.            */

{
        STRUCT *KBItem;
        KBASE  *RetKBasePtr;

*RetCode = 0;    /* Set RetCode to "success". */

/* Parse and validate the string representing a kbase object. */
        parse(Item,&KBItem,RetCode);
        if (*RetCode < 0) return;

/* Initialize kbase record pointer to position of search in kbase. */
        RetKBasePtr = (KBASE *) (*StartPtr);

/* Call the corresponding Storage Manager Level subroutine. */
        _getKB(KBname,KBItem,-1,ItemType,&RetKBasePtr,RetCode);
        if (*RetCode < 0 ) return;

/* Re-initialize StartPtr to current position in kbase. */
        *StartPtr = (int *) (RetKBasePtr);

/* Unparse the returned label. */
        unParse(RetKBasePtr->Label,-1,RetLabel,QUOTEPARSE,RetCode);
        if (*RetCode < 0) return;

/* Unparse the returned entry. */
        unParse(RetKBasePtr->Entry,-1,RetEntry,QUOTEPARSE,RetCode);
}
```

```
/****************************************************************************
APPLICATION INTERFACE LEVEL

LOADCACHE

PURPOSE
        Load cache entries from a file into a cache.

RETURNS
        RetCode = 0 : Successful load of cache.
****************************************************************************/ loadCache(RetCode)
int *RetCode;           /* Success/failure return code.          */

{
        STRUCT *p;              /* Parsed Cache entry.                    */
        char *Str;              /* String for unParse()ing struct.        */

*RetCode = 0;           /* Set RetCode to "success".              */

/* While there's still something in the Cache file, read it in and
         * parse it.  When parse() is called with a NULL string (""),
         * parse() takes its input from the Application Supplied Routine
         * readch().
         */
        while(TRUE) {

/* Load/parse the file.  Skip any NULL entries. */
                parse("",&p,RetCode);
                if (*RetCode < 0) continue;     /* Error condition. */

/* End of File?  If so, break out of the loop. */
                if (p==NULL && *RetCode==0) break;

/* Let noteCache() handle it.  noteCache() will
                 * mark the entry as SOUGHT in the Determination
                 * State Table using setState() and will call
                 * _noteCache() to add the entry to the Cache.
                 */
                unParse(p,-1,&Str,0x01,RetCode);
                noteCache("",Str,RetCode);
                free(Str);

/* Discard the parsed structure.  A copy was generated by
                 * _noteCache() for insertion into the Cache.
                 */
                freeStruct(p);
        }
}
/****************************************************************************
APPLICATION INTERFACE LEVEL

LOADKB

PURPOSE
        Load knowledge base entries from a file into a knowledge base.

RETURNS
        RetCode = 0 : Successful load of kbase.
****************************************************************************/ loadKB(RetCode)
int *RetCode;           /* Success/failure return code. */

{
        STRUCT  *p;             /* Parsed KB entry.             */
        STRUCT  *RetLabel;      /* Returned label from _addKB().*/

*RetCode = 0;           /* Set RetCode to "success".    */
```

```
        /* While there's still something in the KB file, read it in and
         * parse it.  When parse() is called with a NULL string (""),
         * parse() takes its input from the User Supplied Routine readch().
         */
        while(TRUE) {

/* Load/parse the file.  Skip any NULL entries. */
                parse("",&p,RetCode);

/* Critical Out-of-Space error.  Abort loading. */
                if (*RetCode == -100) break;
                if (*RetCode < 0) continue;      /* Error condition. */

/* End of File?  If so, break out of the loop. */
                if (p==NULL && *RetCode==0) break;

/* Add the entry at the end (InsertPos = 0) of the
                 * knowledge base.  Get rid of the entry when finished -
                 * a copy is made by _addKB() for insertion into the KB.
                 */
                _addKB("",p,0,&RetLabel,RetCode);
                freeStruct(p);
        }
}
/****************************************************************************
APPLICATION INTERFACE

NOTECACHE

PURPOSE
        Note a fact (conclusion) in the cache.  Calls _noteCache() which does
        cf combinations and implements single value cutoff.  The cache is
        searched for any expressions that match C, and values that match V.
        If any are found, that's when cf combinations are done.

Single value cutoff is implemented by checking all new cache entries
        for certainty factors equal to 100.

RETURN CODES
                RetCode = 0 : Success.
*****************************************************************************/ noteCache(Name,Expression,RetCode)
char    *Name;          /* The name of the cache.                       */
char    *Expression;    /* Expression to be noted.                      */
int     *RetCode;       /* Returned success/failure code.               */

{
        extern int pushBindFrame();
        extern popBindFrame();
        extern getBindingPtr();
        extern parse();
        extern METAPROPTAB CacheMatchTable[];
        extern int CacheTabIndex;

static int FirstTimeFlg = TRUE;
        static STRUCT *Yes;
        static STRUCT *SetByUser;

STRUCT *Entry;          /* Entry to be noted in the cache.       */
        STRUCT *Expr;           /* Expression portion of Entry.          */
        int Env;                /* Binding environment for Expr.         */
        STRUCT *Value;          /* Value of the expression.              */
        short cf;               /* Associated certainty factor of Value. */
        STRUCT *Reason;         /* Reason associated with this conclusion? */
        int MultiFlg = FALSE;   /* Is the expression Expr multivalued?   */
        int HaltFlg = FALSE;    /* Single-value cutoff indicator.        */
        STRUCT *CF;             /* Temporary STRUCT for certainty factor. */
        STRUCT *RetExpr;        /* Dummy unused STRUCT for getState().   */
        int *StartPtr = NULL;   /* Starting position used by getState(). */
```

```
int Env1;               /* Temporary variable binding environment. */
int Env2;               /* Temporary variable binding environment. */
int EntryType;          /* Matched cache entry type.               */
int i;

/* Initialize. */
*RetCode = 0;           /* Set RetCode to "success". */
if (FirstTimeFlg == TRUE) {

FirstTimeFlg = FALSE;
        parse("yes",&Yes,RetCode);
        parse("'set by user'",&SetByUser,RetCode);
}

/* Parse and validate the string representing a cache entry. */
parse(Expression,&Entry,RetCode);
if (*RetCode < 0) return;

/* Search the Cache Match Table of valid Cache entry templates for a
 * match. The most generic templates are at the beginning of the table.
 * The more specific ones are at the end of the table. Because of this,
 * we must search the table backward.
 */
Env1 = pushBindFrame(Entry);    /* Create variable binding frame. */
EntryType = -1;
for (i = CacheTabIndex-1; i >= 0; i--) {
        Env2 = pushBindFrame(CacheMatchTable[i].TempForm);
        if (unify(Entry,Env1,CacheMatchTable[i].TempForm,Env2)) {
                EntryType = CacheMatchTable[i].Type;
                break;
        }
        popBindFrame(Env2); /* Delete variable binding frame. */
} switch (EntryType) {
case FACT1:             /* "E"                                      */
        Expr = Entry;
        Env = Env1;
        Value = Yes;
        cf = 100;
        Reason = SetByUser;
        break;
case FACT2:             /* "E cf CF"                                */
        getBindingPtr("E", Env2, &Expr, &Env);
        Value = Yes;
        getBindingPtr("CF", Env2, &CF, &Env);
        if (VAL_TYPE(CF)==INTNUM)
                cf = CF->value.intVal;
        else
                cf = (CF+1)->value.intVal;
        Reason = SetByUser;
        break;
case FACT3:             /* "E = V"                                  */
        getBindingPtr("E", Env2, &Expr, &Env);
        getBindingPtr("V", Env2, &Value, &Env);
        cf = 100;
        Reason = SetByUser;
        break;
case FACT4:             /* "E = V cf CF"                            */
        getBindingPtr("E", Env2, &Expr, &Env);
        getBindingPtr("V", Env2, &Value, &Env);
        getBindingPtr("CF", Env2, &CF, &Env);
        if (VAL_TYPE(CF)==INTNUM)
                cf = CF->value.intVal;

else
                cf = (CF+1)->value.intVal;
        Reason = SetByUser;
        break;
case FACT5:             /* "E because REASON"                       */
```

```
                getBindingPtr("E", Env2, &Expr, &Env);
                Value = Yes;
                cf = 100;
                getBindingPtr("REASON", Env2, &Reason, &Env);
                break;
    case FACT6:                 /* "E cf CF because REASON"    */
                getBindingPtr("E", Env2, &Expr, &Env);
                Value = Yes;
                getBindingPtr("CF", Env2, &CF, &Env);
                if (VAL_TYPE(CF)==INTNUM)
                        cf = CF->value.intVal;
                else
                        cf = (CF+1)->value.intVal;
                getBindingPtr("REASON", Env2, &Reason, &Env);
                break;
    case FACT7:                 /* "E = V because REASON"      */
                getBindingPtr("E", Env2, &Expr, &Env);
                getBindingPtr("V", Env2, &Value, &Env);
                cf = 100;
                getBindingPtr("REASON", Env2, &Reason, &Env);
                break;
    case FACT8:                 /* "E = V cf CF because REASON" */
                getBindingPtr("E", Env2, &Expr, &Env);
                getBindingPtr("V", Env2, &Value, &Env);
                getBindingPtr("CF", Env2, &CF, &Env);
                if (VAL_TYPE(CF)==INTNUM)
                        cf = CF->value.intVal;
                else
                        cf = (CF+1)->value.intVal;
                getBindingPtr("REASON", Env2, &Reason, &Env);
                break;
    case FACT9:
                /* "E is unknown." - Do not actually note the
                 * entry in the internal cache, but DO mark the
                 * Expression Determination Table for this
                 * entry as having been SOUGHT.
                 */
                getBindingPtr("E",Env2,&Expr,&Env);
                setState(Expr,Env,SOUGHT,RetCode);
                freeStruct(Entry);  /* Destroy the Entry structure. */
                popBindFrame(Env2); /* Destroy variable binding environment. */
                popBindFrame(Env1); /* Destroy variable binding environment. */
                return;
    default:
                /* Invalid cache entry format. */
                *RetCode = -54;
                popBindFrame(Env2); /* Destroy variable binding environment. */
                popBindFrame(Env1); /* Destroy variable binding environment. */
                error(120,-54);
                return;

} /* switch */
    /* Check to see if expression is multivalued. */
    getState(Expr,Env,MULTIVAL,&StartPtr,&RetExpr,&MultiFlg,RetCode);
    if (*RetCode < 0) return;
    if (MultiFlg & MULTIVAL) MultiFlg = TRUE;

/* Add the entry to the Cache by calling the corresponding Storage
     * Manager Level subroutine. Also, mark the expression as being
     * sought in the Expression Determination State Table, since it now
     * has a value.
     */
    _noteCache(Expr,Env,Value,cf,Reason,MultiFlg,&HaltFlg,RetCode);
    setState(Expr,Env,SOUGHT,RetCode);

/* Destroy the Entry structure. _noteCache() generated a copy
     * when the Cache insertion was made.
     */
    freeStruct(Entry);
```

```
        popBindFrame(Env2); /* Destroy variable binding environment. */
        popBindFrame(Env1); /* Destroy variable binding environment. */
}
/***********************************************************************
APPLICATION INTERFACE LEVEL

OPENCACHE

PURPOSE
        Open a Cache for access.

***********************************************************************/ openCache(Name)
char *Name;

{
}
/***********************************************************************
APPLICATION INTERFACE LEVEL

OPENKB

PURPOSE
        Open a Knowledge Base for access.

***********************************************************************/ openKB(Name)
char *Name;

{
}
/***********************************************************************
APPLICATION INTERFACE LEVEL

RESETCACHE
PURPOSE
        Reset entries in the cache.

NOTES
        Now uses a linked list representation of the Cache.
        Has also been modified for application interface (parsing).

RETURNS
        RetCode =  0 : Successful deletion of entry pattern.
***********************************************************************/ resetCache(Name,Expr,RetCode)
char *Name;                     /* Cache name.                         */
char *Expr;                     /* Expr pattern to match against.      */
int  *RetCode;                  /* Success/failure code.               */

{
        extern parse();
        extern _resetCache();
        extern freeStruct();

STRUCT *Obj;

*RetCode = 0;           /* Set RetCode to "success".           */

/* Parse and validate the string representing a cache entry. */
        parse(Expr,&Obj,RetCode);
        if (Obj==NULL || *RetCode<0) return;

/* Call the corresponding Storage Manager Level subroutine. */
        _resetCache(Name,Obj,-1,RetCode);
        freeStruct(Obj);
}
```

```
/**************************************************************************
APPLICATION INTERFACE LEVEL

RESETKB
PURPOSE
        Reset entries in the Knowledge Base.

NOTES
        Now uses a linked list representation of the knowledge base.
        Has also been modified for application interface (parsing of Entry).
RETURNS
        RetCode = 0 : Successful deletion of entry pattern.
***************************************************************************/ resetKB(KBname,Entry,Type,RetCode)
char *KBname;           /* Knowledge base to look in.              */
char *Entry;            /* Entry pattern to match against.         */
int Type;               /* Type flag set to LABEL,EXPR or ENTRY.   */
int *RetCode;           /* Success/failure code.                   */

{
        extern _resetKB();
        extern freeStruct();
        extern parse();

STRUCT *KBentry;        /* Parsed KB entry.                */

*RetCode = 0;           /* Set RetCode to "success".       */

/* Parse and validate the string representing a kbase entry. */
        parse(Entry,&KBentry,RetCode);
        if (KBentry==NULL || *RetCode<0) return;

/* Call the corresponding Storage Manager Level subroutine. */
        _resetKB(KBname,KBentry,-1,Type,RetCode);
        freeStruct(KBentry);
}
/**************************************************************************
APPLICATION INTERFACE LEVEL

SAVECACHE

PURPOSE
        Save a cache to an application-defined stream.
        This routine makes a pass through the Determination Table collecting
        saving expressions which have been sought but not found.

RETURNS
        RetCode = 0 : Successful save of the cache.
***************************************************************************/ saveCache(RetCode)
int *RetCode;           /* Success/failure code.           */

{
        extern int writebuf();
        extern int unParse();
        extern _getCache1();
        extern CACHEREC *CacheHeadPtr;
        extern STATE *StateHeadPtr;

char *Expr;             /* unParse()d expression string.       */
        char *Value;            /* unParse()d value string.            */
        char buf[20];           /* Temp. string formation buf.         */
        CACHEREC *CachePtr;     /* Cache record list pointer.          */
        REASON *ReasonPtr;      /* Reason list pointer.                */
        STATE *StatePtr;        /* State Table list pointer.           */
        int Env1;               /* Temp. variable binding environments. */

*RetCode = 0;           /* Set RetCode to "success".           */
```

```
/* Walk through the cache writing all entries to the
 * defined stream.  The stream is defined by the application
 * program since it is responsible for providing the writebuf()
 * routine.
 */
CachePtr = CacheHeadPtr;
while(CachePtr) {

/* Skip over entries marked for deletion.  Write those not
         * marked for deletion.
         */
        if (CachePtr->DeleteFlg == FALSE) {

/* Write the EXPR = VALUE portion. */
                unParse(CachePtr->Object,-1,&Expr,QUOTEPARSE,RetCode);
                unParse(CachePtr->Value,-1,&Value,QUOTEPARSE,RetCode);
                writebuf(Expr);
                writebuf(" = ");
                writebuf(Value);
                sprintf(buf," cf %d because ",CachePtr->cf);
                writebuf(buf);
                free(Expr);
                free(Value);

/* Print out the reason list. */
                ReasonPtr = CachePtr->Reason;
                while (ReasonPtr != NULL) {

/* Write a reason structure. */
                        unParse(ReasonPtr->Item,-1,&Expr,QUOTEPARSE,RetCode);
                        writebuf(Expr);
                        free(Expr);

/* If more to come, write out "and". */
                        if (ReasonPtr->Next != NULL)
                                writebuf(" and ");

ReasonPtr = ReasonPtr->Next;
                }
                writebuf(".\n");
        }
        CachePtr = CachePtr->Next;
}

/* Walk through the Determination State Table, looking only for
 * expressions which have been marked as SOUGHT, checking
 * for their presence in the Cache (i.e. that they have a
 * determined value). If not, also write these entries to the
 * stream, marking them as "is unknown".
 */
StatePtr = StateHeadPtr;
while (StatePtr) {
        if (StatePtr->State & SOUGHT) {
                CachePtr = NULL;
                Env1 = pushBindFrame(StatePtr->Expr);
                _getCache1("",StatePtr->Expr,Env1,&CachePtr,RetCode);
                popBindFrame(Env1);

/* If matching expression was NOT found in the Cache,
                 * include this expression in the saved file as
                 * an "is unknown".
                 */
                if (CachePtr == NULL) {
                        unParse(StatePtr->Expr,-1,&Expr,QUOTEPARSE,
                                                        RetCode);
                        writebuf(Expr);
                        writebuf(" is unknown.\n");
                        free(Expr);
                }
        }
```

```
            StatePtr = StatePtr->Next;
    }
}
/*****************************************************************************
APPLICATION INTERFACE LEVEL

SAVEKB

PURPOSE
    Save a knowledge base to an application-defined stream.

RETURNS
    RetCode = 0 : Successful save of the kbase.
*****************************************************************************/ saveKB(RetCode)
int *RetCode;           /* Success/failure return code. */

{
    extern int writebuf();
    extern int unParse();
    extern KBASE *KBaseHeadPtr;

char *Entry;        /* unParse()d KB entry.           */
    char *Label;        /* unParse()d KB entry label.     */
    KBASE *KBasePtr;    /* Ptr to KB entry record.        */

*RetCode = 0;       /* Set RetCode to "success".      */

/* Loop thru the KB. */
    KBasePtr = KBaseHeadPtr;
    while(KBasePtr) {

/* Write only those entries NOT marked for deletion. */
        if (KBasePtr->DeleteFlg == FALSE) {
            unParse(KBasePtr->Label,-1,&Label,QUOTEPARSE,RetCode);
            unParse(KBasePtr->Entry,-1,&Entry,QUOTEPARSE,RetCode);
            writebuf(Label);
            writebuf(": ");
            writebuf(Entry);
            writebuf(".\n");
        }
        KBasePtr = KBasePtr->Next;
    }
}
/***************************************************************************** arithcalc.c

Copyright (c) 1985 Teknowledge, Inc.
                  525 University Ave.
                  Palo Alto, CA  94301

PROGRAM
    COPERNICUS
    Version 1.0 - IBM PC

PURPOSE
    This file presently contains just the arithmetic calculator function,
    arithCalc().

SUBROUTINES
    arithCalc()
    isArithmetic()
    isNumber()
```

```
      initOps()              - locally used only
*****************************************************************************/ include <stdio.h>
include "typedef.h"
/* Global definitions for entries which will (except for FirstTimeFlag)
 * contain indexes into the NameTable[] for arithmetic operators/functors.
 */
static int FirstTimeFlg = TRUE;
static int plus;
static int minus;
static int times;
static int divide;
static int intdiv;
static int moddiv;
static int fix;
static int flt;
static int real_round;
static int truncate;
static int sqt;
static int lt;
static int ltoreq1;
static int ltoreq2;
static int gt;
static int gtoreq;
/*****************************************************************************
INFERENCE ENGINE LEVEL

ARITHCALC

PURPOSE
        This function performs the intended binary or unary arithmetic
        operation represented by OpName, on the structure(s) represented by
        X and Y.

RETURNS
        The result of the calculation or comparison is returned in
        RetVal or TruthFlg, respectively. If conversion to float took
        place this is indicated by FloatFlg being set to TRUE which otherwise
        is FALSE.

RETURN CODES
                 RetCode = 0     : Success.
                 RetCode = 90    : Variable X or Y not bound.
                 RetCode = 91    : Unrecognized arithmetic operator.
                 RetCode = 92    : Either X or Y is non-integral.
                 RetCode = 93    : Either X or Y is non-real.
                 RetCode = 94    : X is negative.
*****************************************************************************/ arithCalc(OpName,X,XEnv,Y,YEnv,RetVal,FloatFlg,TruthFlg,RetCode)
int OpName;           /* Operator/functor's index into NameTable[].    */
STRUCT *X;            /* "X" in the "X op Y" arithmetic expression.    */
int XEnv;             /* Variable binding environment for X.           */
STRUCT *Y;            /* "Y" in the "X op Y" arithmetic expression.    */
int YEnv;             /* Variable binding environment for Y.           */
double *RetVal;       /* The returned calculated result.               */
int *FloatFlg;        /* Flag indicating float conversion took place.  */
int *TruthFlg;        /* Set TRUE/FALSE for arithmetic comparisons.    */
int *RetCode;         /* Success/failure return code.                  */

{
        extern double floor();
        extern double ceil();
        extern double sqrt();
        extern deRefStruct();
        extern int error();

STRUCT *XOp;   /* Operator in X when X is an arithmetic expression. */
        STRUCT *YOp;   /* Operator in Y when Y is an arithmetic expression. */
```

```
int XOpName;    /* Index into NameTable[] for XOp. */
int YOpName;    /* Index into NameTable[] for YOp. */
double XRetVal; /* Calculated value of X when X is an expression. */
double YRetVal; /* Calculated value of Y when Y is an expression. */
int i;

*RetCode = 0;           /* Set RetCode to "success". */

/* First time set-up of OpName values for predefined operators
 * or loaded functors such as "sqrt".
 */
if (FirstTimeFlg) {
        FirstTimeFlg = FALSE;
        initOps();
}

/* Get the variable bindings for X. */
deRefStruct(X,XEnv,&X,&XEnv,RetCode);
if (*RetCode < 0) return;

/* Process X accordingly - X should be a structure or number only. */
switch (VAL_TYPE(X)) {
case LENGTH:
        /* Descend structure to operator and call arithCalc()
         * recursively for the binary or unary cases.
         */
        XOp = X+1;
        XOpName = XOp->value.Name;
        if (     (XOpName == plus)      ||
                 (XOpName == minus)     ||
                 (XOpName == times)     ||
                 (XOpName == divide)    ||
                 (XOpName == intdiv)    ||
                 (XOpName == moddiv)    ||
                 (XOpName == lt)        ||
                 (XOpName == ltoreq1)   ||
                 (XOpName == ltoreq2)   ||
                 (XOpName == gt)        ||
                 (XOpName == gtoreq)    )       {
                arithCalc(XOpName,XOp+1,XEnv,XOp+2,XEnv,&XRetVal,
                                FloatFlg,TruthFlg,RetCode);
                if (*RetCode != 0) return;

}
        else if ((XOpName == fix)       ||
                 (XOpName == flt)       ||
                 (XOpName == real_round)||
                 (XOpName == truncate)  ||
                 (XOpName == sqt)       )       {
                arithCalc(XOpName,XOp+1,XEnv,NULL,-1,&XRetVal,
                                FloatFlg,TruthFlg,RetCode);
                if (*RetCode != 0) return;

}
        else {
                *RetCode = -91; /* Unrecognized arithmetic operator. */
                error(206,-91);
                return;
        }
        break;
case FLOATNUM:
        XRetVal = X->value.floatVal;
        *FloatFlg = TRUE;
        break;
case INTNUM:
        XRetVal = X->value.intVal;
        break;
default:
        *RetCode = -90; /* X must be bound to a structure or number. */
        error(206,-90);
        return;
```

```
}   /* switch */ if (Y != NULL) {

/* If binary operator, get the variable bindings for Y. */
        deRefStruct(Y,YEnv,&Y,&YEnv,RetCode);
        if (*RetCode < 0) return;

/* If a binary operation, process Y accordingly - Y should be
         * a structure or number only.
         */
        switch (VAL_TYPE(Y)) {
        case LENGTH:
                /* Descend structure to operator and call arithCalc()
                 * recursively for the binary or unary cases.
                 */
                YOp = Y+1;
                YOpName = YOp->value.Name;
                if (   (YOpName == plus)       ||
                       (YOpName == minus)      ||
                       (YOpName == times)      ||
                       (YOpName == divide)     ||
                       (YOpName == intdiv)     ||
                       (YOpName == moddiv)     ||
                       (YOpName == lt)         ||
                       (YOpName == ltoreq1)    ||
                       (YOpName == ltoreq2)    ||
                       (YOpName == gt)         ||
                       (YOpName == gtoreq)      )  {
                        arithCalc(YOpName,YOp+1,YEnv,YOp+2,YEnv,
                                  &YRetVal,FloatFlg,TruthFlg,RetCode);
                        if (*RetCode != 0) return;
                }
                else if ((YOpName == fix)      ||
                        (YOpName == flt)       ||
                        (YOpName == real_round)||
                        (YOpName == truncate)  ||
                        (YOpName == sqt)        )   {
                        arithCalc(YOpName,YOp+1,YEnv,NULL,-1,&YRetVal,
                                        FloatFlg,TruthFlg,RetCode);
                        if (*RetCode != 0) return;
                }
                else {
                        /* Unrecognized arithmetic operator. */
                        *RetCode = -91;
                        error(206,-91);
                        return;
                }
                break;
        case FLOATNUM:
                YRetVal = Y->value.floatVal;
                *FloatFlg = TRUE;
                break;
        case INTNUM:
                YRetVal = Y->value.intVal;
                break;
        default:
                *RetCode = -90; /* Must bind to structure or number. */
                error(206,-90);
                return;

}   /* switch */
}

*TruthFlg = TRUE;

if (OpName == plus)
        *RetVal = XRetVal + YRetVal;
else if (OpName == minus)
        *RetVal = XRetVal - YRetVal;
```

```
        else if (OpName == times)
                *RetVal = XRetVal * YRetVal;
        else if (OpName == divide) {
                *FloatFlg = TRUE;
                *RetVal = XRetVal / YRetVal;
        }
        else if (OpName == intdiv) {
                if (*FloatFlg) {
                        *RetCode = -92; /* X and Y must both be integers. */
                        *TruthFlg = FALSE;
                        error(206,-92);
                }
                else
                        *RetVal = (long) (XRetVal / YRetVal);
        }
        else if (OpName == moddiv) {
                if (*FloatFlg) {
                        *RetCode = -92; /* X and Y must both be integers. */
                        *TruthFlg = FALSE;
                        error(206,-92);
                }
                else
                        *RetVal = (long) XRetVal % (long) YRetVal;
        }
        else if (OpName == fix)
                *RetVal = floor(XRetVal);
        else if (OpName == flt) {
                *FloatFlg = TRUE;
                *RetVal = XRetVal;
        }
        else if (OpName == real_round) {
                if (*FloatFlg) {
                        *RetVal = floor(XRetVal);
                        YRetVal = XRetVal - *RetVal;
                        if (YRetVal >= 0.5)
                                *RetVal = ceil(XRetVal);
                }
                else {
                        *RetCode = -93; /* X must be real. */
                        *TruthFlg = FALSE;
                        error(206,-93);
                }
        }
        else if (OpName == truncate) {
                if (*FloatFlg)
                        *RetVal = floor(XRetVal);
                else {
                        *RetCode = -93; /* X must be real. */
                        *TruthFlg = FALSE;
                        error(206,-93);
                }
        }
        else if (OpName == sqt) {
                if (XRetVal < 0) {
                        *RetCode = -94; /* X is negative. */
                        *TruthFlg = FALSE;
                        error(206,-94);
                }
                else
                        *RetVal = sqrt(XRetVal);
        }
        else if (OpName == lt) {
                if (XRetVal < YRetVal) return;
                *TruthFlg = FALSE;
        }
        else if ( (OpName == ltoreq1) || (OpName == ltoreq2) ) {
                if (XRetVal <= YRetVal) return;
                *TruthFlg = FALSE;
        }
        else if (OpName == gt) {
                if (XRetVal > YRetVal) return;
                *TruthFlg = FALSE;
```

```
        }
        else if (OpName == gtoreq) {
                if (XRetVal >= YRetVal) return;
                *TruthFlg = FALSE;
        }
        else {
                *RetCode = -91; /* Unrecognized arithmetic operator. */
                *TruthFlg = FALSE;
                error(206,-91);
        }
}

/******************************************************************

ISARITHMETIC

PURPOSE
        Check to see if a structure is an arithmetic constant or an
        arithmetic expression.

RETURNS
        TRUE    The structure is an arithmetic constant or expression
        FALSE   The structure is not an arithmetic constant or expression

******************************************************************/ int
isArithmetic(Struct,Env)
STRUCT *Struct;         /* The structure to be checked..           */
int Env;                /* Struct's variable binding environment.  */

{
        extern int isArithmetic();
        extern int bindingIndex();
        extern BINDSTK BindStack[];
        extern int BindStkIndex;

int OpName;             /* Operator name.                  */
        int i;

/* Initialize operator constants. */
        if (FirstTimeFlg) {
                FirstTimeFlg = FALSE;
                initOps();
        }

/* Sanity check. */
        if (Struct==NULL) return(FALSE);

/* Skip LENGTH header cell. */
        if (VAL_TYPE(Struct)==LENGTH) Struct++;

/* Check for arithmetic constants. */
        switch (VAL_TYPE(Struct)) {
        case INTNUM:
                return(TRUE);
        case FLOATNUM:
                return(TRUE);
        case STRUCTURE:
                return(isArithmetic(Struct->value.ArgPtr,Env));
        case VARIABLE:
                /* Get variable's binding.  If one not present, then the
                 * variable is unbound.  Since arithmetic expressions can't
                 * contain unbound variables, the expression isn't arithmetic.
                 */
                i = bindingIndex(Struct->value.Name,Env);
                if (i == -1) return(FALSE);
```

```
            if (BindStack[i].Struct != NULL)
                    return(isArithmetic(BindStack[i].Struct,
                                        BindStack[i].Env));
            return(FALSE);
    case SYMBOL:
            /* Struct must be a SYMBOL.  If it is an arithmetic operator
             * symbol, descend the structure call isArithmetic()
             * recursively for the binary or unary cases.
             * If it is NOT an arithmetic operator symbol, then the
             * expression isn't arithmetic.
             */
            OpName = Struct->value.Name;
            if (    (OpName == plus)      ||
                    (OpName == minus)     ||
                    (OpName == times)     ||
                    (OpName == divide)    ||
                    (OpName == intdiv)    ||
                    (OpName == moddiv)    ||
                    (OpName == lt)        ||
                    (OpName == ltoreq1)   ||
                    (OpName == ltoreq2)   ||
                    (OpName == gt)        ||
                    (OpName == gtoreq)       )      {
                    if (!isArithmetic(Struct+1,Env)) return(FALSE);
                    return(isArithmetic(Struct+2,Env));
            }

/* Unary operators/functions. */
            else if ((OpName == fix)       ||
                    (OpName == flt)        ||
                    (OpName == real_round)||
                    (OpName == truncate)   ||
                    (OpName == sqt)          )      {
                    return(isArithmetic(Struct+1,Env));
            }
            else {
                    /* Not an arithmetic constant or expression. */
                    return(FALSE);
            }
            break;
    default:
            return(FALSE);

} /* switch */
}

/******************************************************************************

ISNUMBER

PURPOSE
        Test whether a STRUCT is a number.

RETURNS
        True (1)        The structure represents a number, either integer or
                        floating.

False (0)       The Structure is NOT a number.

******************************************************************************/ int
isNumber(Struct,Env)
STRUCT *Struct;         /* The structure to test.                       */
int Env;                /* Struct's variable binding environment.       */

{
        extern deRefStruct();

int RetCode;    /* Success/failure return code.         */
```

```
/* Sanity check. */
if (Struct == NULL) return(FALSE);

/* De-reference the structure in case it is a variable bound
 * to something else.
 */
deRefStruct(Struct,Env,&Struct,&Env,&RetCode);

/* Return TRUE if integer or floating point number;
 * FALSE otherwise.
 */
switch(VAL_TYPE(Struct)) {
case INTNUM:
case FLOATNUM:
        return(TRUE);
default:
        return(FALSE);
}
}
```

/******************************************************************************

INITOPS

PURPOSE
        Initialize static operators for use by the Arithmetic Calculator.

******************************************************************************/

```
static
initOps()
{
        extern int addName();

int RetCode;

plus       = addName("+",&RetCode);
        minus      = addName("-",&RetCode);
        times      = addName("*",&RetCode);
        divide     = addName("/",&RetCode);
        intdiv     = addName("//",&RetCode);
        moddiv     = addName("mod",&RetCode);
        fix        = addName("fix",&RetCode);
        flt        = addName("float",&RetCode);
        real_round = addName("real_round",&RetCode);
        truncate   = addName("truncate",&RetCode);
        sqt        = addName("sqrt",&RetCode);
        lt         = addName("<",&RetCode);
        ltoreq1    = addName("<=",&RetCode);
        ltoreq2    = addName("=<",&RetCode);
        gt         = addName(">",&RetCode);
        gtoreq     = addName(">=",&RetCode);
}
```

/******************************************************************************

ENGINE.C

Copyright (c) 1985 Teknowledge, Inc.
                          525 University Ave.
                          Palo Alto, CA  94301
                          (415) 327-6600

PROGRAM
        Copernicus
        Version 1.0

PURPOSE
        Copernicus is an inference engine implemented as a set of subroutines.

COMPILER
    Version 1.0:
        Computer Innovations Optimizing C86
        IBM-PC SUGGESTIONS
    1) Prefix each Application Program level routine name with "a";
        Prefix each Inference Engine level routine name with "e";
        Prefix each Data Access level routine name with "d".
SUBROUTINES
    find()
    saveForAbort()
    restoreAfterAbort()
    evalExpr()
    evalRule()
    evalConclusion()
    initCopernicus()

NOTES on INPUT MATCHING.
-- Efficient Template Matching --
When matching an incoming KB entry, a tree can be used, unlike the linear
table below. The tree might look something like:

```
                    if P then C
                         |                  |
           if P then E=V                   E--------
                |                           |         |- multivalued(E)
  if P then E=V cf CF                      E=V        |- nocache(E)
                                            | |
                                            | |- presupposition(E) = V
              E=V cf CF   |- whenfound(E) = V
                                       |- legalvals(E) = V
```

If you can descend either left or right, then the match becomes "tighter".
If not, then you have reached the correct match. The may be the way to
structure efficient KB entry input formatting. I'm not quite sure yet.
    --ASF (9/3/85)

-- Extensibility of Match Table --
It also seems very handy to allow the user to insert entries into this
table and to be able to call a user supplied routine when a match is
found. This would allow users to add their own meta-facts and meta-
propositions and take appropriate side effects when they are encountered
during input.
    --ASF (9/3/85)

Match Table.
This table is altered by the first call to addKB(). It parses all forms
(templates) and stores pointers to the returned structures in the already
allocated table.

Table of KB Entry formats allowable in Copernicus.
This table is searched in reversed order. The most specific template
should be entered last in the table. This table is expendable by users.

For efficiency, the table will contain both the string and STRUCT
version of the entry template and the key. In all our predefined
metafacts, the key is simply a variable. But meta-fact added by
the user program might require more complex key. This is why we
need to keep a parsed version of the key.

We should parse the entry and key template together so that their
variables are related. Otherwise, they are independent, like
in different rules. Not currently done.

When modifying the table, make sure that you update the MatTabIndex
initial value.

```
#include <stdio.h>
include "typedef.h"

/****************************************************************************
APPLICATION LEVEL

FIND

PURPOSE
        Find the value of an object. The results are stored in the Cache[].

RETURN CODES
                RetCode = 0 : Success.
****************************************************************************/ find(Object, RetCode)
char    *Object;                /* Object to be found. */
int     *RetCode;               /* Error code.         */

{
        STRUCT *p;
        char *Name;             /* Name of cache. */
        int Env0;               /* Variable binding environment. */

Name = "";      /* To be changed. */
        *RetCode = 0;   /* Initialization of RetCode. */

/* Parse the Object - abort if parse error. */
        parse(Object,&p,RetCode);
        if ((p == NULL) || *RetCode) return;

/* Clear out the pertinent Cache entries. The state table is reset
         * as a side effect of _resetCache().
         */
        Name = NULL;    /* Not used, yet */
        _resetCache(Name,p,-1,RetCode);

/* Seek the values of the object. The object values are
         * stored in the Cache. Subsequent Cache probes by the
         * application programmer will reveal the object's values.
         */
        Env0 = pushBindFrame(p);
        evalExpr(p,Env0,RetCode);
        popBindFrame(Env0);
        freeStruct(p);
}

/****************************************************************************
APPLICATION LAYER

SAVEFORABORT

PURPOSE
        To save the current position of processing with respect to the Binding
        Stack, Invocation Stack, whenfound and nocache list generation.

****************************************************************************/ saveForAbort(Level)
int Level;

{
        /* Imports */
        extern int BindStkIndex;
        extern int InvokeStkNo;
        extern int WhenFndListNo;
        extern int WhenFndEntryNo;
        extern int Rlevel;
        extern int AbortSaveTable[];
```

```
        int i;

/* Move to the appropriate depth in AbortSaveTable[]. Currently,
         * level enumeration starts at 1 and there are 5 entries per level.
         */
        i = --Level * 5;

/* Save the current depth of the Binding Stack. */
        AbortSaveTable[i++] = BindStkIndex;

/* Save the current depth of the Invocation Stack. */
        AbortSaveTable[i++] = InvokeStkNo;

/* Save the current number of whenfound lists. */
        AbortSaveTable[i++] = WhenFndListNo;

/* Save the current number of entries in the current whenfound list. */
        AbortSaveTable[i++] = WhenFndEntryNo;

/* Save the current value of the recursion level of evalExpr(). */
        AbortSaveTable[i] = Rlevel;
}

/*****************************************************************
APPLICATION LAYER

RESTOREAFTERABORT

PURPOSE
        After aborting, to clean up the Parse Stack, Binding Stack, Invocation
        Stack, and the whenfound and nocache lists created by evalExpr().

NOTES
        In addition, the Determination State Table is checked for those
        expressions just marked as SEEKING. A call to resetCache() ensures
        that corresponding entries in the Determination State Table or Cache
        are deleted. This enables the graceful handling of an abort from
        within a consultation.

******************************************************************/ restoreAfterAbort(Level)
int Level;

{
        extern STRUCT *getToken();
        extern STRUCT *popParseStack();
        extern STRUCT *removeList();
        extern STRUCT *ParseStack[];
        extern int getState();
        extern int ParStkIndex;
        extern BINDSTK BindStack[];
        extern int BindStkIndex;
        extern int InvokeStkNo;
        extern int WhenFndListNo;
        extern int WhenFndEntryNo;
        extern LISTHEAD *WhenFndList;
        extern LISTHEAD *NoCacheList;
        extern int Rlevel;
        extern int AbortSaveTable[];

static int FirstTimeFlg = TRUE;    /* Initialization flag. */
        static STRUCT *p1;                 /* Fixed pattern. */

LISTHEAD *ItemHeadPtr;   /* Whenfound list head ptr.            */
        NOCACHEITEM *CacheData;  /* Nocache list head ptr.              */
        STATE *s;                /* Ptr into Determination State Table. */
        STRUCT *p;               /* Temp. pointer in the Parse Stack.   */
        STRUCT *RetExpr;         /* Returned ptr from getState().       */
        STRUCT q[2];             /* Holding cells for getToken().       */
```

```
int PrevBindStkIndex;    /* Previous saved Bind Stack index.    */
int PrevInvokeStkNo;     /* Prev. Invocation Stack head ptr.    */
int PrevWhenFndListNo;   /* Prev. saved no. of whenfound lists. */
int PrevWhenFndEntryNo;  /* Prev. saved no. of whenfound entries.*/
int *StatePtr;           /* Ptr into Determination State Table. */
int RetState;            /* State Flag for matching State Table. */
int Env;                 /* Variable binding environment.       */
int RetCode;             /* Returned error code.                */
int i;

/* One time only initialization.*/
if (FirstTimeFlg) {
        FirstTimeFlg = FALSE;
        parse("ALL",&p1,&RetCode);
}

/* First make a clean-up call to _resetCache() for any expressions
 * not yet fully SOUGHT.
 */
StatePtr = NULL;
Env = pushBindFrame(p1);
do {
        /* Reset any Cache entries that are currently been sought
         * (SEEKING) but but NOT yet marked as completely sought
         * (SOUGHT).
         */
        getState(p1.Env,SEEKING,&StatePtr,&RetExpr,&RetState,&RetCode);
        if ((RetState & SOUGHT) == FALSE)
                _resetCache("",RetExpr,-1,&RetCode);
}
while (StatePtr);
popBindFrame(Env);

/* Move to the appropriate depth in AbortSaveTable[]. Currently,
 * level enumeration starts at 1 and there are 5 entries per level.
 */
i = --Level * 5;

/* Clean up the Parse Stack and throw away tokens up to the
 * next endtoken. Only discard structures with an arith greater
 * than 1. Single tokens are allocated in static memory, and cannot
 * be freed.
 */
while (ParStkIndex > 0) {
        p = popParseStack();
        if (p->value.Length > 1) freeStruct(p);
}

/* If q is not already an ENDTOKEN, scan and discard tokens until
 * an ENDTOKEN is found.
 */
do getToken(q,&RetCode);
while (VAL_TYPE(&q[1]) != ENDTOKEN);

/* Clean up the Binding Stack and restore BindStkIndex to the value
 * saved by saveForAbort().
 */
PrevBindStkIndex = AbortSaveTable[i++];
if (PrevBindStkIndex < BindStkIndex) {
        undoBindings(BindStack[PrevBindStkIndex].Trail);
        BindStkIndex = PrevBindStkIndex;
}

/* Pop off entries from the Invocation Stack back to value of
 * InvokeStkPtr saved by saveForAbort().
 */
PrevInvokeStkNo = AbortSaveTable[i++];
while (InvokeStkNo > PrevInvokeStkNo)
        popInvokeStk();
```

```
        /* Clean up whenfound lists created in evalExpr(). */
        PrevWhenFndListNo  = AbortSaveTable[i++];
        PrevWhenFndEntryNo = AbortSaveTable[i++];
        if (WhenFndListNo >= PrevWhenFndListNo) {

/* Removing new whenfound lists whole. */
                while (WhenFndListNo > PrevWhenFndListNo) {
                        ItemHeadPtr = (LISTHEAD *)
                                        WhenFndList->First->Contents;
                        while ((p = removeList(ItemHeadPtr,0)) != NULL)
                                ;
                        ItemHeadPtr = (LISTHEAD *) removeList(WhenFndList,0);
                        WhenFndListNo--;
                }

/* Removing new entries from the saved whenfound list. */
                ItemHeadPtr = (LISTHEAD *) WhenFndList->First->Contents;
                while (WhenFndEntryNo > PrevWhenFndEntryNo) {
                        p = removeList(ItemHeadPtr,0);
                        WhenFndEntryNo--;
                }
        }

/* Clean up the nocache list created in evalExpr(). */
        Rlevel = AbortSaveTable[i];

if (NoCacheList == NULL) return; /* evalExpr() was not called. */
        while(((CacheData=(NOCACHEITEM *)removeList(NoCacheList,0)) != NULL) &&
              (CacheData->Level >= Rlevel))
                ;
}

/*******************************************************************************
INFERENCE ENGINE

EVALEXPR

PURPOSE
        Evaluate an expression.

NOTES
        The following event codes are signalled via event():

1       SEEKING         - Beginning to seek an expression.
        2       SOUGHT          - Finished seeking an expression.
        3       FOUND           - Found the value of an expression.
        4       NOTING          - Noting a conclusion in the Cache.
        5       INVOKING        - Beginning to invoke a rule or fact.
        6       INVOKED         - Finished invoking a rule or fact.
        7       SUCCEEDED       - An evaluated rule produced a conclusion.
        8       FAILED          - An evaluated rule failed.
        9       ALREADY SOUGHT  - Have already sought this expression.
        10      NOT-FOUND       - Could not conclude about the expression.

RETURNS
        True    If a relevant KB entry for Expr was found.
        False   If no relevant KB entry was found.

RETURN CODES
                RetCode = 0 : Success.
*******************************************************************************/ evalExpr(Expr,Env0,RetCode)
STRUCT *Expr;           /* Expression to seek.                  */
int Env0;               /* Binding environment for Expr.        */
int *RetCode;           /* Success/failure return code.         */

{
        extern LISTHEAD *newList();
        extern STRUCT *removeList();
```

```c
extern int insertList();
extern freeStruct();
extern char *copmalloc();
extern _getKB();
extern LISTHEAD *WhenFndList;
extern LISTHEAD *NoCacheList;
extern INVOKESTK *InvokeStkPtr;
extern int Rlevel;
extern int WhenFndListNo;
extern int WhenFndEntryNo;

static int FirstTimeFlg = TRUE; /* Initialization flag.           */ int     FoundFlg = FALSE;       /* Was relevant KB entry found? */
int     ValueFoundFlg = FALSE;  /* Was value found for Expr?    */
int     MultivalFlg = FALSE;    /* Is Expr multivalued?         */
int     HaltFlg = FALSE;        /* Single value cutoff?         */
int     Env1;                   /* Variable binding frames.     */
STRUCT  *RetExpr;               /* Expr. found by getState().   */
int     RetState;               /* Ret. flag found by getState()*/
KBASE   *KBasePtr;              /* Ptr to KB entry record.      */
int     *StartPtr;              /* Fetch ptr. for getState().   */
NOCACHEITEM *CacheData;
LISTHEAD *Iptr;                 /* List head for whenfound()s.  */

/* Perform initializations. */
demon(200,BEGIN);               /* Signal function entry.       */
*RetCode = 0;                   /* Set RetCode to "success".    */

/* Check Cache before invoking rules.
 * This should be a check for "already sought".
 */
StartPtr = NULL;
getState(Expr,Env0,SOUGHT|SEEKING,&StartPtr,&RetExpr,&RetState,RetCode);
if (RetState) {
        event(9,Expr,NULL,0,Env0);      /* Expr was ALREADY SOUGHT. */
        demon(200,END);
        return;
}

/* One time only initialization. */
if (FirstTimeFlg==TRUE) {
        FirstTimeFlg = FALSE;

/* Start a list for NoCache entries so the Cache
         * can be cleaned.
         */
        NoCacheList = newList();
        if (NoCacheList == NULL) {
                *RetCode = -100;        /* Out of memory. */
                return;
        }

/* Start a list for whenfound() entries so the KBase is
         * only searched once. This list is a global "list of lists",
         * each list being a collection of whenfound() entries for
         * a particular expression. The list-of-lists architecture
         * is needed for the abort routines to allow proper
         * clean-up after an abort.
         */
        WhenFndList = newList();
        if (WhenFndList == NULL) {
                *RetCode = -100;        /* Out of memory. */
                return;
        }
}

/* Create a sub-list to collect whenfound() entries for the
 * current expression.
 */
```

```
Iptr = newList();
if (Iptr == NULL) {
        *RetCode = -100;        /* Out of memory. */
        return;
}

/* Increment the whenfound list number indicator and add the new
 * sub-list to the list of whenfound lists, WhenFndList.
 * Add the sub-list to the beginning (top) of the WhenFndList.
 */
WhenFndEntryNo = 0; /* Initialize whenfound entry number indicator. */
WhenFndListNo++;
insertList(WhenFndList, (STRUCT *)Iptr, 0);

/* Check if multivalued.
 * Have only instantiated variables at this point.  This
 * must be changed later to instantiate variables and do a
 * "Left-handed" unify.
 */
StartPtr = NULL;
getState(Expr,Env0,MULTIVAL,&StartPtr,&RetExpr,&RetState,RetCode);
MultivalFlg = (RetState & MULTIVAL) ? TRUE : FALSE;

/* Check if the expression is nocached. */
StartPtr = NULL;
getState(Expr,Env0,NOCACHE,&StartPtr,&RetExpr,&RetState,RetCode);
if (RetState) {
        /* Insert the object and the recursion level, Rlevel, to a list
         * that behaves like a stack (insert at top, remove from
         * top). The recursion level inside this conditional block
         * is actually the level we will pop back to AFTER exiting
         * evalExpr() i.e. the Cache will be reset at THAT level.
         * NOTE:  The expression must be copied in order to
         *        instantiate in the variable bindings.  Because the
         *        NoCacheList stack is popped one level BACK from where
         *        it is pushed, the variable binding environment CANNOT
         *        be saved - a copy must be made!!
         */
        CacheData = (NOCACHEITEM *)copmalloc(sizeof(NOCACHEITEM));
        if (CacheData == NULL) {
                *RetCode = -100;        /* No more memory space. */
                return;
        }
        instStruct(Expr,Env0,NOUNIQUEVAR,&(CacheData->Expr),RetCode);
        CacheData->Level = Rlevel;
        insertList(NoCacheList, (STRUCT *)CacheData, 0);
}
Rlevel++;               /* Increment Recursion Level counter.    */

/* Mark the current expression as SEEKING. */
setState(Expr,Env0,SEEKING,RetCode);    /* Mark as SEEKING.     */
event(1,Expr,NULL,0,Env0);              /* SEEKING Expr.        */
pushInvokeStk((int *)Expr,OBJECT,Env0,RetCode);

/* Scan Knowledge Base looking for matching (on the key) rules
 * and facts. Check for presuppositions, and user-entered metafacts.
 */
HaltFlg = FALSE;
KBasePtr = NULL;
while(TRUE) {

/* Fetch a matching KB entry. */
        _getKB("",Expr,Env0,EXPR,&KBasePtr,RetCode);
        if (KBasePtr==NULL) break;

/* Bind variables in the entry. */
        Env1 = pushBindFrame(KBasePtr->Key);
        pushLocalFrame(KBasePtr->Entry, Env1);
        pushLocalFrame(KBasePtr->Label, Env1);
        unify(Expr,Env0,KBasePtr->Key,Env1);
```

```c
/* Perform the KB entry evaluation. */
switch (KBasePtr->EntryType) {
case RULE:
        FoundFlg = TRUE;

/* Signal an INVOKING event and evaluate. */
        pushInvokeStk((int *)KBasePtr,KBENTRY,Env1,RetCode);
        event(5,KBasePtr->Entry,KBasePtr->Label,0,Env1);
        evalRule(KBasePtr->Entry,Env1,MultivalFlg,&HaltFlg,
                                            RetCode);

if (InvokeStkPtr->SucceedFlg == TRUE) {
                /* Rule SUCCEEDED. */
                event(7,KBasePtr->Entry,KBasePtr->Label,0,Env1);

/* FOUND a value for Expr. */
                ValueFoundFlg = TRUE;
        }
        else {
                /* Rule FAILED. */
                event(8,KBasePtr->Entry,KBasePtr->Label,0,Env1);
        }

/* Signal entry has been INVOKED. */
        event(6,KBasePtr->Entry,KBasePtr->Label,0,Env1);
        popInvokeStk();
        break;

case FACT1:
case FACT2:
case FACT3:
case FACT4:
        FoundFlg = TRUE;

/* Signal an INVOKING event and evaluate. */
        pushInvokeStk((int *)KBasePtr,KBENTRY,Env1,RetCode);
        event(5,KBasePtr->Entry,KBasePtr->Label,0,Env1);

/* Call evalConclusion() with the current
         * variable binding frame.
         */
        evalConclusion(KBasePtr->Entry,100,Env1,
                MultivalFlg,&HaltFlg,RetCode);

/* Signal entry has been INVOKED. */
        event(6,KBasePtr->Entry,KBasePtr->Label,0,Env1);

/* FOUND a value for Expr. */
        ValueFoundFlg = TRUE;
        popInvokeStk();
        break;

case PRESUPPOSITION:
        /* Signal an INVOKING event and evaluate. */
        event(5,KBasePtr->Entry,KBasePtr->Label,0,Env1);

/* If evalPresup() evaluates to FALSE, immediately
         * stop seeking the object. If TRUE, continue seeking.
         */
        pushInvokeStk((int *)KBasePtr,KBENTRY,Env1,RetCode);
        HaltFlg = !evalPresup(KBasePtr->Entry,Env1,RetCode);
        event(6,KBasePtr->Entry,KBasePtr->Label,0,Env1);
        popInvokeStk();
        break;

case NOCACHEDCL:
case MULTIVALDCL:
        /* These metafacts do not effect execution.
         * Skip over them.
         */
        break;
```

```
            case WHENFOUND:
                    /* Collect the whenfound() entries into a list
                     * for later processing. The actual entry,
                     * as well as the entry's Key and Label
                     * fields are stored as part of the KBASE record
                     * pointed to by KBasePtr. Put the entries at
                     * the BOTTOM of the list.
                     */
                    insertList(lptr,(STRUCT *)KBasePtr,-1);
                    WhenFndEntryNo++;
                    break;

default:
                    /* If a Copernicus KB entry (i.e. EntryType < 0)
                     * then punt.
                     */
                    if (KBasePtr->EntryType < 0) break;

/* Check for user-entered metafacts. Pass the metafact
                     * to the application program only if it is a "relevent
                     * entry", meaning it can be executed. A legalvals()
                     * entry is NOT relevent, while a question() metafact
                     * is.
                     */
                    if (KBasePtr->RelEntryFlg==TRUE) {
                            FoundFlg = TRUE;

/* Signal an INVOKING event and pass the
                             * meta-fact out to the application program.
                             */
                            pushInvokeStk((int *)KBasePtr,KBENTRY,Env1,RetCode);
                            event(5,KBasePtr->Entry,KBasePtr->Label,0,Env1);
                            evalMetaFact(KBasePtr->Entry,KBasePtr->Key,
                                    Env1,KBasePtr->EntryType,&HaltFlg);

/* Signal INVOKED. */
                            event(6,KBasePtr->Entry,KBasePtr->Label,0,Env1);
                            popInvokeStk();
                    }
                    break;

} /* switch */ popBindFrame(Env1);     /* Destroy var. binding frame. */

/* If the HaltFlg was set somewhere, this indicates single
             * value cutoff has occurred. The KB scan should immediately
             * stop.
             */
            if (HaltFlg==TRUE) break;      /* Stop KB scan.         */

} /* while */

/* Check if a value was found for the expression given a relevant
 * entry was - if this is not the case, signal this to the user.
 */
if (FoundFlg==TRUE && ValueFoundFlg==TRUE)
        event(3,Expr,NULL,0,Env0);      /* Expr FOUND. */
else if (FoundFlg==TRUE && ValueFoundFlg==FALSE)
        event(10,Expr,NULL,0,Env0);     /* Expr NOT FOUND. */

/* Check if any relevant KB entries were found. If none, invoke
 * the user-defined routine determine() to ask for a value for Expr.
 */
if (FoundFlg==FALSE && HaltFlg==FALSE)
        determine(Expr,Env0);
```

StopSeek:
```
        /* Mark the object as "was sought" and retract the SEEKING state.
         * Pop the expression off of the Invocation Stack.
         */
        setState(Expr,Env0,SOUGHT,RetCode);
        resetState(Expr,Env0,SEEKING,RetCode);
        event(2,Expr,NULL,0,Env0);      /* FINISHED SEEKING.            */
        popInvokeStk();                 /* Pop Expr.                    */

/* Locate any additional whenfound() entries not found by the
         * above KB scan which may have terminated because of single value
         * cutoff.
         */
        while (KBasePtr != NULL) {

/* Fetch a matching KB entry. */
                _getKB("",Expr,Env0,EXPR,&KBasePtr,RetCode);
                if (KBasePtr==NULL) break;

/* Is it a whenfound() entry? */
                if (KBasePtr->EntryType == WHENFOUND) {

/* Formulate a pointer to the current KBASE record for
                         * pushing onto the Invocation Stack.
                         */
                        insertList(Iptr,(STRUCT *)KBasePtr,-1);
                        WhenFndEntryNo++;
                }
        }

/* Process any whenfound() entries found along the way.
         * Pop off the whenfound() entry as well as the whenfound()'s key
         * and Label.
         *
         * Unify the Key with the Expr being sought to bind any
         * of the variables in the Key.
         */
        while ((KBasePtr = (KBASE *)removeList(Iptr, 0)) != NULL) {

/* Get the whenfound()'s Key and Label.  Pull entries from
                 * the TOP of the list in order to process them in the
                 * order they were found during the KB scan (placed on the
                 * list).
                 */
                WhenFndEntryNo--;

/* Re-unify the Key with the sought Expr to bind the Key's
                 * variables (remember we popped these bindings in the above
                 * KB-scan). The unify() is for variable binding side
                 * effects only.
                 */
                Env1 = pushBindFrame(KBasePtr->Entry);
                pushLocalFrame(KBasePtr->Key,Env1);
                pushLocalFrame(KBasePtr->Label,Env1);
                unify(Expr,Env0,KBasePtr->Key,Env1);    /* Bind vars. */

/* Put the entry on the Rule Invocation Stack,
                 * then signal an INVOKING event.
                 */
                pushInvokeStk((int *)KBasePtr,KBENTRY,Env1,RetCode);
                event(5,KBasePtr->Entry,KBasePtr->Label,0,Env1);

/* Evaluate the whenfound(). */
                evalWhenfound(KBasePtr->Entry,Env1,RetCode);
                event(6,KBasePtr->Entry,NULL,0,Env1);   /* has been INVOKED. */
                popBindFrame(Env1);
                popInvokeStk();
        }
```

```
/* Free up list header cell, and decrement the whenfound list
 * number indicator.  Pop the TOP list header cell.
 */
Iptr = (LISTHEAD *)removeList(WhenFndList,0);
/*
 * DEBUG
 * Should be able to free(Iptr) here, but for some reason we cannot.
 * This bears investigating.
 */
        WhenFndListNo--;

/* Process NoCache - Check the NoCache stack for nocache()
         * expressions.  If the expression on the stack has an
         * associated recursion level higher than the current level,
         * then the cache must be reset for this object.  If the recursion
         * level is 1 then remove all cache items in the list, since
         * they are conclusions and are not needed by propositions at a
         * higher recursion level.
         */
        while((CacheData = (NOCACHEITEM *)removeList(NoCacheList, 0)) != NULL){
                if ((CacheData->Level == Rlevel) || (Rlevel == 1)) {
                        _resetCache("",CacheData->Expr,-1,RetCode);
                        freeStruct(CacheData->Expr);
                        free((char *) CacheData);
                }
                else {
                        /* Put Cache item back on the stack. */
                        insertList(NoCacheList,(STRUCT *)CacheData,0);
                        break;
                }
        }
        Rlevel--;                       /* Decrement Recursion Level.  */
        demon(200,END);                 /* Signal end of subroutine.   */
}

/****************************************************************************
STATIC
                        EVALRULE (try)

PURPOSE
        Evaluate a rule, calling EvalObject recursively as required.
        The caller must pass the environment where the Entry variables
        are bound.  The caller is responsible for popping the bindstack.

RETURN VALUES
        HaltFlg returns True if evalProp() stopped on single value
        cutoff.

RETURN CODES
        RetCode = 0 : Success.
****************************************************************************/ static
evalRule(Entry,Env0,MultiVal,HaltFlg,RetCode)
STRUCT *Entry;
int Env0;               /* Binding environment for Entry variables.   */
int MultiVal;           /* Is Entry multivalued?                      */
int *HaltFlg;           /* True if evalProp stopped on single value.  */
int *RetCode;

{
        static int FirstTimeFlg = TRUE;
        static STRUCT *p1;

STRUCT  *C;             /* Conclusion structure.              */
        STRUCT  *P;             /* Premise structure.                 */
        ACTION Action;          /* Continuation action block.         */
        int Env1;               /* Variable binding environment.      */
        int BoundEnv1;          /* Temp. variable binding environment.*/
```

```
        int     BoundEnv2;          /* Temp. variable binding environment.  */
        int     RetCf = 100;        /* Returned certainty factor.           */

*RetCode = 0;               /* Set RetCode to "success".            */

/* For first invocation of evalRule() only, create certain patterns
         * to match against. This may be replaced by a larger table at
         * a later date.
         */
        if (FirstTimeFlg) {
                FirstTimeFlg = FALSE;
                parse("if P then C",&p1,RetCode);
        }

/* Rule. Extract premise and conclusion. */
        Env1 = pushBindFrame(p1);       /* Create variable binding frames. */
        if (unify(p1,Env1,Entry,Env0)) {
                getBindingPtr("P", Env1, &P, &BoundEnv1);
                getBindingPtr("C", Env1, &C, &BoundEnv2);
                Action.Actionkey     = EVALCONC;
                Action.Prop          = C;
                Action.Env           = BoundEnv2;
                Action.Action        = NULL;
                Action.RepeatFlg     = MULTIPLE;
                Action.MultiFlg      = MultiVal;
                evalProp(P,BoundEnv1,100,&Action,HaltFlg,&RetCf,RetCode);
        }
        else
                *RetCode = -110;        /* ERROR (bad rule format).     */
        popBindFrame(Env1);             /* Destroy variable binding frame. */
}

/*****************************************************************************
INFERENCE ENGINE

EVALCONCLUSION

PURPOSE
        Store a clause and its value in the Cache[].

RETURNS
        TRUE    Conclusion made.
        FALSE   Single value cutoff took place.

RETURN CODES
                RetCode =   0 : Success.
*****************************************************************************/ evalConclusion(Conc,cf,Env0,MultiVal,HaltFlg,RetCode)
STRUCT  *Conc;          /* The clause to be stored.                 */
int     cf;             /* Premise cf, 100 for Facts.               */
int     Env0;           /* Conc's variable binding environment.     */
int     MultiVal;       /* Is the conclusion multivalued?           */
int     *HaltFlg;       /* Has evaluation been halted?              */
int     *RetCode;       /* Return codes for errors.                 */

{
        static int FirstTimeFlg = TRUE;
        static struct conctable {
                char    *Template;
                STRUCT  *TempForm;
                int     Type;
        } ConcTable[] = {
                { "C1 and C2",          NULL, 1 },
                { "E = V cf CF",        NULL, 2 },
                { "E = V",              NULL, 3 },
                { "E cf CF",            NULL, 4 },
                { "E",                  NULL, 5 },
                { NULL, NULL, 0 }
        };
```

```
        static int ConcTableLength;
        static STRUCT *Yes;

STRUCT *C1;             /* Left-hand conclusion.                */
        STRUCT *C2;             /* Right-hand conclusion.               */
        STRUCT *V;              /* Value structure.                     */
        STRUCT *CF;             /* Certainty factor structure.          */
        STRUCT *E;              /* Expression structure.                */
        int Env1;               /* Variable binding environment.        */
        int BoundEnv;           /* Temp. variable binding environment.  */
        int CFnew;              /* Computed certainty factor.           */
        int Type;               /* Conclusion type identifier.          */
        int *StackPtr;          /* Invocation Stack search ptr.         */
        int EntryType;          /* Identifying code for entry format.   */
        int *RetEntry;          /* Entry returned by getInvoke().       */
        int EntryEnv;           /* Var. binding environment.            */
        INVOKESTK *InvokePtr;   /* Ptr to Invocation Stack entry.       */
        KBASE *KBasePtr;        /* Ptr to Knowledge Base record.        */ int i;

/* Initialization. */
        demon(210,BEGIN);               /* Signal start of routine. */
        *RetCode = 0;                   /* Set RetCode to "success". */

/* For the first invocation only of evalConclusion(), create
         * certain patterns for matching.
         */
        if (FirstTimeFlg) {
                FirstTimeFlg = FALSE;
                parse("yes",&Yes,RetCode);
                for (i=0; ConcTable[i].Template != NULL; i++) {
                        parse(ConcTable[i].Template,&ConcTable[i].TempForm,
                                                        RetCode);
                }
                ConcTableLength = i;
        }

/* Scan table of legal conclusion types for matching entry.
         * Once a match is found, leaving the binding environment on
         * the Binding Stack for use by the individual cases below.
         */
        for (i=0,Type=-1; i<ConcTableLength; i++) {
                Env1 = pushBindFrame(ConcTable[i].TempForm);
                if (unify(Conc,Env0,ConcTable[i].TempForm,Env1)) {
                        Type = ConcTable[i].Type;
                        break;
                }
                popBindFrame(Env1);             /* Destroy var. bind. frame. */
        }

/* Fetch the associated kbase entry label from the Invocation
         * Stack for noting in the Cache along with the conclusion.
         * NOTE:  The top-most Invocation Stack entry should ALWAYS be the
         * current rule (the one making a conclusion) at this stage.
         */
        StackPtr = NULL;
        getInvoke(&StackPtr,&EntryType,&RetEntry,&EntryEnv);
        InvokePtr = (INVOKESTK *) StackPtr;
        InvokePtr->SucceedFlg = TRUE;           /* Rule SUCCEEDED. */
        KBasePtr = (KBASE *)(RetEntry);

/* Take action based on conclusion type. */
        switch(Type) {
        case 1:         /* C1 and C2. */
                /* Evaluate first conclusion. */
                getBindingPtr("C1",Env1,&C1,&BoundEnv);
                evalConclusion(C1,cf,BoundEnv,MultiVal,HaltFlg,RetCode);
```

```
        /* Did Single Value cutoff occur? */
        if (*HaltFlg==TRUE) {
                popBindFrame(Env1);
                demon(210,END);
                return;
        }

/* Evaluate second conclusion. */
        getBindingPtr("C2",Env1,&C2,&BoundEnv);
        evalConclusion(C2,cf,BoundEnv,MultiVal,HaltFlg,RetCode);
        break;

case 2:         /* E = V of CF. */
        getBindingPtr("V",Env1,&V,&BoundEnv);
        getBindingPtr("CF",Env1,&CF,&BoundEnv);
        getBindingPtr("E",Env1,&E,&BoundEnv);

/* Process the value bound to the variable CF. */
        switch(VAL_TYPE(CF)) {
        case INTNUM:
                CFnew = CF->value.intVal;
                break;
        case FLOATNUM:
                CFnew = (int) CF->value.floatVal;
                break;
        default:        /* Variable CF not bound to a number. */
                *RetCode = -90;
                error(210,-90);
                popBindFrame(Env1);
                return;
        }
        _noteCache(E,BoundEnv,V,(CFnew*cf)/100,KBasePtr->Label,
                                        MultiVal,HaltFlg,RetCode);
        break;

case 3:         /* E = V */
        getBindingPtr("V",Env1,&V,&BoundEnv);
        getBindingPtr("E",Env1,&E,&BoundEnv);
        _noteCache(E,BoundEnv,V,cf,KBasePtr->Label,MultiVal,HaltFlg,
                                                        RetCode);
        break;

case 4:         /* E of CF */
        getBindingPtr("CF",Env1,&CF,&BoundEnv);
        getBindingPtr("E",Env1,&E,&BoundEnv);

/* Process the value bound to the variable CF. */
        switch(VAL_TYPE(CF)) {
        case INTNUM:
                CFnew = CF->value.intVal;
                break;
        case FLOATNUM:
                CFnew = (int) CF->value.floatVal;
                break;
        default:        /* Variable CF not bound to a number. */
                *RetCode = -90;
                error(210,-90);
                popBindFrame(Env1);
                return;
        }
        _noteCache(E,BoundEnv,Yes,(CFnew*cf)/100,KBasePtr->Label,
                                        MultiVal,HaltFlg,RetCode);
        break;

case 5:         /* E */
        getBindingPtr("E",Env1,&E,&BoundEnv);
        _noteCache(E,BoundEnv,Yes,cf,KBasePtr->Label,MultiVal,HaltFlg,
                                                        RetCode);
        break;
```

```
        default:
                /* No match was found.  This is an error case. */
                break;
        } /* switch */

/* Clean up. */
        if (Type!=-1) popBindFrame(Env1);     /* Destroy binding frame. */
        demon(210,END);                        /* Signal end of routine. */
}
/********************************************************************
INFERENCE ENGINE

INITCOPERNICUS

PURPOSE
        To set-up, for use of Copernicus routines, fixed patterns and
        associated binding environments for matching against.

RETURN CODES
                RetCode =   0 : Success.
*********************************************************************/ initCopernicus()

{
        int RetCode;
        int i;

extern parse();
        extern MATCHTAB MatchTable[];
        extern int MatTabIndex;
        extern METAPROPTAB MetaPropTable[];
        extern int PropTabIndex;
        extern METAPROPTAB CacheMatchTable[];
        extern int CacheTabIndex;

/* Initialize the Knowledge Base entry match table used in
         * _addKB().
         */
        for (i=0; MatchTable[i].Template != NULL; i++) {
                parse(MatchTable[i].Template,&(MatchTable[i].TempForm),
                                                        &RetCode);
                parse(MatchTable[i].key,&(MatchTable[i].KeyForm),&RetCode);
        }
        MatTabIndex = i;

/* Initialize the meta-proposition match table used by
         * evalProp().
         */
        for (i=0; MetaPropTable[i].Template != NULL; i++) {
                parse(MetaPropTable[i].Template,&(MetaPropTable[i].TempForm),
                                                        &RetCode);
        }
        PropTabIndex = i;

/* Initialize the cache entry match table used by
         * noteCache().
         */
        for (i=0; CacheMatchTable[i].Template != NULL; i++) {
                parse(CacheMatchTable[i].Template,
                        &(CacheMatchTable[i].TempForm),&RetCode);
        }
        CacheTabIndex = i;
}
```

February 12, 1986 15:0:0    C:\PATENT\error.c    Page 1

```
/************************************************************************
                              ERROR.C

Copyright (c) 1985 Teknowledge, Inc.
                            525 University Ave.
                            Suite 200
                            Palo Alto, CA  94301
                            (415) 327-6600

PROGRAM
        Copernicus
        Version 1.0

PURPOSE
        Copernicus is an inference engine implemented as a set of subroutines.

COMPILER
        Version 1.0:
                Computer Innovations Optimizing C86
                IBM-PC
REVISIONS

************************************************************************/ char *ErrorStr[] = {
"System. No more memory space for allocation.",/* This should be Error<-100> */
"Syntax. <Reduce Error> - Nothing on stack.",
"Syntax. <Reduce Error> - Missing operator.",
"Syntax. Missing '(' to match ')'.",
"Syntax. Missing '[' to match ']'.",
"Syntax. Can't build token.  Possible premature end of file.",  /* 5 */
"Syntax. Illegal operator definition.",
"Syntax. Premature end of file or end of string.",
"Syntax. Missing ')' to match '('.",
"Syntax. Missing ']' to match '['.",
"<Error 10>",
"<Error 11>",
"<Error 12>",
"<Error 13>",
"<Error 14>",
"Syntax. Illegal operator combination.", /* 15 */
"Syntax. Missing comma or operator.",
"Syntax. Missing expression within ()'s.",
"Syntax. Mismatched brackets:  [) or (].",
"Syntax. Illegal arguments to functor.",
"Syntax. Missing list element.",         /* 20 */
"Syntax. Illegal contents of list.",
"Syntax. Incomplete term or misplaced ']' or ')'.",
"Syntax. Use single quotes (') for strings.",
"Syntax. Unexpected comma.",
"Symbol too long.  Excess characters ignored.  Use quotes for long symbols.", /*25*/
"Syntax. Too many digits in number.  Cannot process.",
"Syntax. Unrecognized character.  Cannot process.",
"unParBlock() - Internal error",
"unParCell() - Internal error",
"<Error 30>",
"<Error 31>",
"<Error 32>",
"<Error 33>",
"<Error 34>",
"<Error 35>",
"<Error 36>",
```

```
"<Error 37>",
"<Error 38>",
"<Error 39>",
"<Error 40>",
"<Error 41>",
"<Error 42>",
"<Error 43>",
"<Error 44>",
"<Error 45>",
"<Error 46>",
"<Error 47>",
"<Error 48>",
"<Error 49>",
"Syntax or illegal entry type for user-defined meta-fact.",
"Meta-fact match table is full.",
"Meta-fact does not match a meta-fact template.",
"User-defined meta-fact id must be positive.",
"Invalid cache entry format.",
"Illegal item type for knowledge base item.",
"<Error 56>",
"<Error 57>",
"<Error 58>",
"<Error 59>",
"Syntax. User-defined meta-prop.",
"Meta-prop match table is full.",
"Meta-prop does not match a meta-prop template.",
"User-defined meta-prop id must be positive.",
"<Error 64>",
"<Error 65>",
"<Error 66>",
"<Error 67>",
"<Error 68>",
"<Error 69>",
"Attempted get of an illegal bit-pattern for object state.",
"Attempted set of an illegal bit-pattern for object state.",
"<Error 72>",
"<Error 73>",
"<Error 74>",
"<Error 75>",
"<Error 76>",
"<Error 77>",
"<Error 78>",
"<Error 79>",
"unify(). Invalid structure.",
"instStruct(). Null argument.",
"getBinding(). Variable not in environment.",
"getFullBinding(). Variable not in environment.",
"bindVar(). Variable already bound.",
"pushBindFrame(). BindStack[] overflow.",
"<Error 86>",
"<Error 87>",
"<Error 88>",
"<Error 89>",
"Variable not bound to a number.",
"Unrecognized arithmetic operator.",
"Number in arithmetic expression is non-integral.",
"Number in arithmetic expression is non-real.",
"Number in arithmetic expression is negative.",
"<Error 95>",
"<Error 96>",
"<Error 97>",
"<Error 98>",
"Error. Possible internal bug.\nContact Teknowledge Produce Support (415-327-6600).",
"System. No more memory space for allocation.",
"addName(). NameTable[] is overflow.",
"addOp(). OpTable[] is overflow."
};
```

```
/****************************************************************************
                                    global.c Copyright (c) 1985 Teknowledge, Inc.
                    525 University Ave.
                    Palo Alto, CA  94301
                    (415) 327-6600

PROGRAM
        COPERNICUS
        Version 1.0 - IBM PC

PURPOSE
        Copernicus is an inference engine implemented as a set of subroutines.

COMPILER
        Version 1.0:
                Computer Innovations Optimizing C86
                IBM-PC GLOBAL DECLARATIONS
        Contained in this file are global declarations for variables used
        across the various Copernicus subroutines. Collecting these variables
        in the one file facilitates cleaning up on abort.

****************************************************************************/ include <stdio.h>
include "typedef.h"

/* The Knowledge Base.
 * The Knowledge Base head-pointer, KBaseHeadPtr, points to the first entered
 * kbase list node or entry, while the tail-pointer, KBaseTailPtr, points to
 * last entered. Both pointers are initialized to assure an empty list on
 * entry.
 */
KBASE *KBaseHeadPtr = NULL;
KBASE *KBaseTailPtr = NULL;

/* The Mini-Knowledge Base.
 * This small knowledge base consists of WHENCACHED1/WHENCACHED2 entry types
 * and solely exists for efficient searching by evalWhenCached().
 * The mini knowledge base head-pointer, MiniKBHeadPtr, points to the last
 * entered list node or entry.
 */
KBASE *MiniKBHeadPtr = NULL;
KBASE *MiniKBTailPtr = NULL;

/* The Cache.
 * The Cache head-pointer, CacheHeadPtr, points to the first entered
 * Cache list node or entry, while the tail-pointer, CacheTailPtr, points to
 * last entered. Both pointers are initialized to assure an empty list on
 * entry.
 */
CACHEREC *CacheHeadPtr = NULL;
CACHEREC *CacheTailPtr = NULL;

/* The State Table.
 * The State Table head-pointer, StateHeadPtr points to the first entered
 * State Table list node or entry and is initialized to assure an empty list
```

```c
 * entry. The State Table is designed to hold the SOUGHT/SEEKING states of
 * the object. Another table, dubbed the Characteristics Table, holds the
 * MULTIVALUED/NOCACHE characteristics of the object.
 */
STATE *StateHeadPtr = NULL;
STATE *CharHeadPtr  = NULL;

/* The Meta-Fact Match Table.
 * Table of KB Entry formats allowable in Copernicus.
 * This table is searched in reversed order. The most specific template
 * should be entered last in the table. This table is expendable by users.
 *
 * For efficiency, the table will contain both the string and STRUCT
 * version of the entry template and the key. In all our predefined
 * metafacts, the key is simply a variable. But meta-fact added by
 * the user program might require more complex key. This is why we
 * need to keep a parsed version of the key.
 *
 * When modifying the table, make sure that you update the MatTabIndex
 * initial value.
 */
MATCHTAB MatchTable[MATCH_TABLE_LEN] = {
{ "E",                        "E",   NULL, NULL, TRUE, FACT1 },
{ "E of CF",                  "E",   NULL, NULL, TRUE, FACT2 },
{ "E = V",                    "E",   NULL, NULL, TRUE, FACT3 },
{ "E = V of CF",              "E",   NULL, NULL, TRUE, FACT4 },
{ "nocache(E)",               "E",   NULL, NULL, TRUE, NOCACHEDCL },  /* 5 */
{ "nocache(E)=yes",           "E",   NULL, NULL, TRUE, NOCACHEDCL },
{ "multivalued(E)",           "E",   NULL, NULL, TRUE, MULTIVALDCL },
{ "multivalued(E)=yes",       "E",   NULL, NULL, TRUE, MULTIVALDCL },
{ "presupposition(E)=P",      "E",   NULL, NULL, TRUE, PRESUPPOSITION },
{ "whenfound(E) = I",         "E",   NULL, NULL, TRUE, WHENFOUND },   /* 10 */
{ "whenfound(E=V) = I",       "E",   NULL, NULL, TRUE, WHENFOUND },
{ "whencached(E) = I",        "E",   NULL, NULL, TRUE, WHENCACHED1 },
{ "whencached(E=V) = I",      "E",   NULL, NULL, TRUE, WHENCACHED2 },
{ "if P then E",              "E",   NULL, NULL, TRUE, RULE },
{ "if P then E = V",          "E",   NULL, NULL, TRUE, RULE },        /* 15 */
{ "if P then E of CF",        "E",   NULL, NULL, TRUE, RULE },
{ "if P then E = V of CF",    "E",   NULL, NULL, TRUE, RULE },
{ "if P then E and W",        "E",   NULL, NULL, TRUE, RULE },
{ "if P then E = V and W",    "E",   NULL, NULL, TRUE, RULE },
{ "if P then E of CF and W",  "E",   NULL, NULL, TRUE, RULE },        /* 20 */
{ "if P then E = V of CF and W","E", NULL, NULL, TRUE, RULE }
};
/* Number of initial entries in MatchTable[] */
int MatTabIndex = 21;

/* The Meta-Prop Match Table.
 * Table of meta-prop formats allowable in Copernicus.
 *
 * This table is searched in reversed order. The most specific template
 * should be entered last in the table. This table is expendable by users
 * via addMetaProp(). For efficiency, the table will contain both the string
 * and STRUCT version of the entry template. When modifying the table, make
 * sure that you update the PropTabIndex initial value.
 */
METAPROPTAB MetaPropTable[PROP_TABLE_LEN] = {
        { "X",              NULL, EXPR },
        { "X == Y",         NULL, ISEQTO},
        { "X >= Y",         NULL, GTOREQ},
        { "X =< Y",         NULL, LTOREQ2},
        { "X <= Y",         NULL, LTOREQ1},
        { "X > Y",          NULL, GT},
        { "X < Y",          NULL, LT},
        { "X = Y",          NULL, EQUALS},
        { "length([]) = Z", NULL, LENGTHLIST},
        { "length([X|Y]) = Z", NULL, LENGTHLIST},
        { "sqrt(X) = Y",    NULL, SQRT},
        { "real_round(X) = Y",NULL,REALROUND},
        { "truncate(X) = Y", NULL, TRUNCATE},
```

```
        { "float(X) = Y",     NULL, FLOAT},
        { "fix(X) = Y", NULL, FIX},
        { "X mod Y = Z",NULL, MODDIV},
        { "X // Y = Z", NULL, INTDIV},
        { "X / Y = Z",  NULL, DIVIDE},
        { "X * Y = Z",  NULL, TIMES},
        { "X - Y = Z",  NULL, MINUS},
        { "X + Y = Z",  NULL, PLUS},
        { "not X",      NULL, NOT},
        { "X or Y",     NULL, OR},
        { "X and Y",    NULL, AND}
};

/* Number of initial entries in MetaPropTable[] */
int PropTabIndex = 24;

/* The Cache Entry Match Table.
 * Table of Cache Entry formats allowable in Copernicus.
 * This table is searched in reversed order.  The most specific template
 * should be entered last in the table.  This table is expendable by users.
 *
 * When modifying the table, make sure that you update the CacheTabIndex
 * initial value. Note the table is of the same structure form as for the
 * MetaPropTable[].
 */
METAPROPTAB CacheMatchTable[CACHE_TABLE_LEN] = {
        { "E",                          NULL, FACT1 },
        { "E cf CF",                    NULL, FACT2 },
        { "E = V",                      NULL, FACT3 },
        { "E = V cf CF",                NULL, FACT4 },
        { "E because REASON",           NULL, FACT5 },
        { "E cf CF because REASON",     NULL, FACT6 },
        { "E = V because REASON",       NULL, FACT7 },
        { "E = V cf CF because REASON", NULL, FACT8 },
        { "E is unknown",               NULL, FACT9 },
};

/* Number of initial entries CacheMatchTable[] */
int CacheTabIndex = 9;

/* Head-pointer to the Invocation Stack. */
INVOKESTK *InvokeStkPtr = NULL;

/* Number of entries pushed on Invocation Stack. */
int InvokeStkNo = 0;

/* Flag for aborting execution. */
int AbortFlg;

/* List of nocache entries.    */
LISTHEAD *NoCacheList = NULL;

/* List of whenfound entries.  */
LISTHEAD *WhenFndList = NULL;

/* Recursion level of evalExpr(). */
int Rlevel = 0;

/* Whenfound list number indicator. */
int WhenFndListNo = 0;

/* Whenfound entry number indicator. */
int WhenFndEntryNo = 0;

/* Table for use in saving for, and restoring from, aborts. */
int AbortSaveTable[50];
```

```
/****************************************************************

METAFACT.C

Copyright (c) 1985 Teknowledge, Inc.
                       525 University Ave.
                       Suite 200
                       Palo Alto, CA  94301
                       (415) 327-6600

PROGRAM
        Copernicus
        Version 1.0

PURPOSE
        Copernicus is an inference engine implemented as a set of subroutines.

COMPILER
        Version 1.0:
                Computer Innovations Optimizing C86
                IBM-PC SUBROUTINES
        addMetaFact()
        evalPresup()
        evalWhenfound()
        evalWhenCached()
        isList()
        evalPropList()

****************************************************************/ include <stdio.h>
include "typedef.h"
/****************************************************************
APPLICATION LEVEL

ADDMETAFACT [225]

PURPOSE
        Add a meta-fact to the match table.  When Copernicus encounters
        this meta-fact when evaluating an object, it calls evalMetaFact().

NOTES
        It might also be desirable to notify the user program when an entry
        has been put in the KB that matches the meta-fact.  This function
        would be called metaFactAdded().

RETURN CODES
                RetCode =   0 : Success.
                RetCode = -51 : Meta-fact MatchTable is full.
                RetCode = -53 : Meta-fact ID is not positive.

****************************************************************/ addMetaFact(Entry, Key, Type, ReleventEntryFlg,RetCode)
char *Entry;            /* Template of the meta-fact                */
char *Key;              /* Key under which meta-fact is indexed.    */
int Type;               /* ID number to identify the metafact.      */
int ReleventEntryFlg;   /* Can meta-fact be evaluated?              */
int *RetCode;           /* Success/failure return code.             */
```

```
{
        extern parse();
        extern error();
        extern MATCHTAB MatchTable[];
        extern int MatTabIndex;

STRUCT *p;              /* Parsed meta-fact Entry structure.  */
        STRUCT *q;              /* Parsed meta-fact key structure.    */

*RetCode = 0;           /* Set RetCode to "success".          */

/* Verify that the table is not full. */
        if (MatTabIndex >= MATCH_TABLE_LEN) {
                *RetCode = -51;         /* Meta-fact MatchTable is full. */
                error(225,-51);
                return;
        }

/* Validate the Type value.  Must be positive. */
        if (Type < 0) {
                *RetCode = -53;
                error(225,-53);         /* "ID" code must be positive. */
                return;
        }

/* Parse and validate the Entry, Key, and Type. */
        parse(Entry,&p,RetCode);
        if (*RetCode < 0) return;
        parse(Key,&q,RetCode);
        if (*RetCode < 0) return;
        if ((p == (STRUCT *)NULL) || (q == (STRUCT *)NULL)) return;

/* Add the entry to the MatchTable[]. */
        MatchTable[MatTabIndex].TempForm     = p;
        MatchTable[MatTabIndex].KeyForm      = q;
        MatchTable[MatTabIndex].RelEntryFlg  = RelaventEntryFlg;
        MatchTable[MatTabIndex++].Type       = Type;
}
/****************************************************************************

EVALPRESUP

PURPOSE
        Evaluate a presupposition() meta-fact.
        Entry is of the form presupposition(E) = P.

RETURNS
        The cf of the presupposition.

****************************************************************************/
int
evalPresup(Entry,EntryEnv,RetCode)
STRUCT *Entry;          /* Presuposition structure.            */
int EntryEnv;           /* Entry variable binding environment. */
int *RetCode;           /* Success/failure return code.        */

{
        extern parse();
        extern int pushBindFrame();
        extern int unify();
        extern getBindingPtr();
        extern evalProp();
        extern popBindFrame();

static int FirstTimeFlg = TRUE;
        static STRUCT *p1;

STRUCT *q;              /* Temporary structure.                */
        ACTION Action;          /* Next action for evalProp().         */
        int Env1;               /* Variable binding environment.       */
```

```
        int BoundEnv;           /* Variable binding environment.        */
        int RetCf;              /* Ret. Cert. Factor from evalProp().   */
        int HaltFlg = FALSE;    /* Single value cutoff flag.            */

*RetCode = 0;           /* Set RetCode to "success".            */

/* For first invocation of evalEntry() only, create certain patterns
         * to match against. This may be replaced by a larger table at
         * a later date.
         */
        if (FirstTimeFlg) {
                FirstTimeFlg = FALSE;
                parse("presupposition(E) = P",&p1,RetCode);
        }

/* Compare the actual presupposition structure. */
        Env1 = pushBindFrame(p1);       /* New variable binding frame. */
        unify(p1,Env1,Entry,EntryEnv);  /* Bind variables. */
        getBindingPtr("P",Env1,&q,&BoundEnv);

/* Fill in an Action block and evaluate the proposition. */
        Action.ActionKey        = NONE;
        Action.Prop             = NULL;
        Action.Env              = EntryEnv;
        Action.Action           = NULL;
        Action.RepeatFlg        = ONCE;
        evalProp(q,BoundEnv,100,&Action,&HaltFlg,&RetCf,RetCode);
        popBindFrame(Env1);             /* Destroy variable binding frame. */ return( (RetCf>=20) ? TRUE : FALSE );
}
/****************************************************************
                        EVALWHENFOUND PURPOSE
        Process whenfound, calling evalPropList() as needed.

SUGGESTIONS
        1) Pass the EntryType into evalWhenfound(). This will eliminate the
           nested if-then.

RETURN CODES
        RetCode = 0 : Success.
****************************************************************/
evalWhenfound(Entry,Env0,RetCode)
STRUCT *Entry;          /* Partially instantiated KB entry.     */
int Env0;               /* Binding environment for Entry.       */
int *RetCode;           /* Success/failure return code.         */

{
        extern parse();
        extern int pushBindFrame();
        extern int unify();
        extern getBindingPtr();
        extern getCache1();
        extern pushLocalFrame();
        extern isList();
        extern evalPropList();

static int FirstTimeFlg = TRUE;
        static STRUCT *p1;
        static STRUCT *p2;

STRUCT  *E;             /* De-referenced expression.            */
        STRUCT  *V;             /* De-referenced value.                 */
        STRUCT  *I;             /* De-referenced proposition list.      */
        CACHEREC *CachePtr;     /* Ptr. to last fetched Cache entry.    */
        int Env1;               /* Temp. variable binding environment.  */
        int Env2;               /* Temp. variable binding environment.  */
```

```
    int BoundEnv1;          /* Expr binding environment.         */
    int BoundEnv2;          /* Value binding environment.        */
    int BoundEnv3;          /* Proposition list binding environment.*/

*RetCode = 0;           /* Set RetCode to "success".         */

/* For first invocation of evalEntry() only, create certain patterns
     * to match against. This may be replaced by a larger table at
     * a later date.
     */
    if (FirstTimeFlg) {
            FirstTimeFlg = FALSE;
            parse("whenfound(E) = I",&p1,RetCode);
            parse("whenfound(E = V) = I",&p2,RetCode);
    }
    /* Is it a whenfound with a value -- whenfound(E=V) = I */
    Env2 = pushBindFrame(p2);       /* Create binding frame. */
    if (unify(p2,Env2,Entry,Env0)) {
            getBindingPtr("E",Env2,&E,&BoundEnv1);
            getBindingPtr("V",Env2,&V,&BoundEnv2);
            getBindingPtr("I",Env2,&I,&BoundEnv3);

/* Search the cache for evidence that E=V. If found,
             * go off and evaluate I.
             */
            CachePtr = NULL;        /* Initialize the search. */
            do {
                    _getCache("",E,BoundEnv1,&CachePtr,RetCode);
                    if (CachePtr==NULL) break;

/* Structures in the Cache have no variable bindings,
                     * so a binding environment must be created for them.
                     * Unify the RetExpr against E and the RetVal against
                     * V to bind the variables.
                     * NOTE: Unlike the whenfound(E) case, whenfound(E=V)
                     *       only fires for values known with a CF >= 20.
                     */
                    Env1 = pushBindFrame(CachePtr->Object);
                    pushLocalFrame(CachePtr->Value,Env1);
                    unify(E,BoundEnv1,CachePtr->Object,Env1);
                    if (unify(V,BoundEnv2,CachePtr->Value,Env1) &&
                            CachePtr->cf >= 20) {

/* Evaluate each proposition in I. */
                            evalPropList(I,BoundEnv3,RetCode);
                    }
                    popBindFrame(Env1);
            } while(CachePtr);
    } else {
            /* Unconditional whenfound -- whenfound(E) = I */
            Env1 = pushBindFrame(p1);
            unify(p1,Env1,Entry,Env0);
            getBindingPtr("I",Env1,&I,&BoundEnv3);

/* Evaluate each proposition in I. */
            evalPropList(I,BoundEnv3,RetCode);

popBindFrame(Env1);     /* Destroy variable binding frame. */
    } popBindFrame(Env2);
}
/***********************************************************************

EVALWHENCACHED

PURPOSE
        Search for matches in the mini-knowledge base containing whencached
        entries only. Process matched entries by calling evalPropList().
```

```
RETURN CODES
            RetCode = 0 : Success.
*********************************************************************/ evalWhenCached(Expr,Val,cf,Env,RetCode)
STRUCT *Expr;           /* Conclusion noted in cache.               */
STRUCT *Val;            /* Value of conclusion noted in cache.      */
short  cf;              /* Certainty factor of the Expr=Val.        */
int    Env;             /* Binding environment for variables in E and V.*/
int    *RetCode;        /* Success/failure return code.             */

{
        extern parse();
        extern int pushBindFrame();
        extern pushLocalFrame();
        extern int unify();
        extern getBindingPtr();
        extern isList();
        extern evalPropList();
        extern popBindFrame();
        extern KBASE *MiniKBheadPtr;

static int FirstTimeFlg = TRUE;
        static STRUCT *p1;
        static STRUCT *p2;

KBASE *KBasePtr;        /* Ptr. to whencached() KB entry.   */
        STRUCT *I;              /* De-referenced proposition list.  */
        STRUCT *V;              /* De-referenced value.             */
        int Env1;               /* Temp. variable binding environment. */
        int Env2;               /* Temp. variable binding environment. */
        int Bound1;             /* De-referenced var. binding env.  */
        int Bound2;             /* De-referenced var. binding env.  */

/* Initialize. */
        *RetCode = 0;

/* Set up patterns for unification the first time through. */
        if (FirstTimeFlg) {
                FirstTimeFlg = FALSE;
                parse("whencached(E) = I",&p1,RetCode);
                parse("whencached(E=V) = I",&p2,RetCode);
        }

/* Search for matches in the whencached() mini-KB containing
         * whencached entries.
         */
         KBasePtr = MiniKBheadPtr;
         while (KBasePtr) {

/* Skip over entries marked for deletion. */
                if (KBasePtr->DeleteFlg==TRUE) {
                        KBasePtr = KBasePtr->Next;
                        continue;
                }

/* Create a variable binding frame, and push the Entry,
                 * key, and Label fields for use below (the Label field
                 * could be used in evalProp() ).
                 */
                Env1 = pushBindFrame(KBasePtr->Key);
                pushLocalFrame(KBasePtr->Entry,Env1);
                pushLocalFrame(KBasePtr->Label,Env1);

if (unify(KBasePtr->Key,Env1,Expr,Env)) {

/* The whencached() entry in the mini-KB matches the
                         * conclusion (key only).
                         */
                        switch(KBasePtr->EntryType) {
                        case WHENCACHED1:       /* whencached(E) = I */
```

```
                        Env2 = pushBindFrame(p1);
                        unify(KBasePtr->Entry,Env1,p1,Env2);
                        getBindingPtr("I",Env2,&I,&Bound2);

/* Evaluate each proposition in I. */
                        evalPropList(I,Bound2,RetCode);
                        popBindFrame(Env2);
                        break;

case WHENCACHED2:       /* whencached(E=V) = I */
                        /* Bind variables between the entry and
                         * the template.
                         */
                        Env2 = pushBindFrame(p2);
                        unify(KBasePtr->Entry,Env1,p2,Env2);

/* Bind variables between the E=V and
                         * the list of propositions.
                         * NOTE:  E,V, and I should all be in the
                         *        same binding environment in order to
                         *        communicate variable bindings to the
                         *        proposition list.
                         * NOTE: whencached(E=V) fires only for
                         *        cfs >= 20.  This is different than
                         *        whencached(E) which fires for all cfs.
                         */
                        getBindingPtr("V",Env2,&V,&Bound1);
                        getBindingPtr("I",Env2,&I,&Bound2);
                        if (unify(V,Bound1,Val,Env) && cf>=20) {

/* Evaluate each proposition in I. */
                                evalPropList(I,Bound2,RetCode);
                        }
                        popBindFrame(Env2);
                        break;

} /* switch */
            }
            popBindFrame(Env1);

/* Advance to next entry. */
            KBasePtr = KBasePtr->Next;
        } /* while */
}
February 12,1986  14:  5    C:\PATENT\metafact.c  Page 1

/************************************************************************
                                ISLIST

PURPOSE
        To test a structure and find the list functor for lists of
        expressions.
RETURNS
        True if the structure is that of a list of expressions.
************************************************************************/
int
isList(s)
STRUCT *s;

{
        extern int DotIndex;    /* Imported from the parse.c module.   */ return( ((s+1)->value.Name == DotIndex) &&
                (VAL_TYPE(s+1) == SYMBOL) &&
                (VAL_TYPE(s) == LENGTH) &&
                (s->value.Length == 3) );
}
```

```
/************************************************************************
                        EVALPROPLIST

PURPOSE
        Evaluate a list of propositions or a single proposition, each
        in turn, starting with the first proposition.

RETURN CODES
                RetCode =   0 : Success.
*************************************************************************/ evalPropList(Prop,Env,RetCode)
STRUCT *Prop;           /* List of propositions, or single prop.    */
int Env;                /* Binding environment for proposition list. */
int *RetCode;           /* Success/failure return code.             */

{
        extern evalProp();
        extern deRefStruct();
        extern int isList();

ACTION Action;      /* Action continuation task block.       */
        int HaltFlg;        /* Stop seeking current expression?      */
        int RetCf;          /* CF of the evaluated proposition.      */

/* Initialize. */
        *RetCode = 0;

/* Is Prop a single proposition or a list of propositions? */
        if (!isList(Prop)) {
                /* Fill in an Action block and evaluate the proposition. */
                Action.ActionKey        = NONE;
                Action.Prop             = NULL;
                Action.Env              = Env;
                Action.Action           = NULL;
                Action.RepeatFlg        = ONCE;
                HaltFlg = FALSE;
                evalProp(Prop,Env,100,&Action,&HaltFlg,&RetCf,RetCode);
                return;
        }

/* Prop is a list of propositions.  Loop thru the list,
         * evaluating each one.
         */
        while(TRUE) {

/* De-reference any variables or structures. */
                deRefStruct(Prop,Env,&Prop,&Env,RetCode);

/* If not a list, then stop. */
                if (!isList(Prop)) break;

/* Fill in an Action block and evaluate the proposition. */
                Action.ActionKey        = NONE;
                Action.Prop             = NULL;
                Action.Env              = Env;
                Action.Action           = NULL;
                Action.RepeatFlg        = ONCE;
                evalProp(Prop+2,Env,100,&Action,&HaltFlg,&RetCf,RetCode);

/* Move on to the next entry in the list if no problems. */
                if (*RetCode < 0) break;
                Prop += 3;              /* Next list element. */
        }
}
```

```
/************************************************************************* metaprop.c

Copyright (c) 1985 Teknowledge, Inc.
                 525 University Ave.
                 Palo Alto, CA 94301
                 (415) 327-6600

PROGRAM
        Copernicus
        Version 1.0

PURPOSE
        Copernicus is an inference engine implemented as a set of subroutines.

COMPILER
        Version 1.0
                Computer Innovations Optimizing C86
                IBM-PC SUBROUTINES
        addMetaProp()
        evalProp()
        evalArithmeticProp()
        doAction()
*************************************************************************/ include <stdio.h>
include "typedef.h"
/*************************************************************************
APPLICATION LEVEL

ADDMETAPROP [230]

PURPOSE
        Add a meta-prop to the match table.  When Copernicus encounters
        this meta-prop when evaluating a clause it calls evalMetaProp().

NOTES
        It might also be desirable to notify the user program when a
        proposition has been put in the KB that matches the meta-prop.
        This function would be called metaPropAdded().

RETURN CODES
                RetCode =   0 : Success.
                RetCode =  -61 : Meta-prop table is full.
                RetCode =  -63 : Type "ID" code must be positive.

*************************************************************************/ addMetaProp(MetaProp,Type,RetCode)
char    *MetaProp;      /* Template of the meta-prop.                   */
int     Type;           /* A positive number to identify the metaprop.  */
int     *RetCode;       /* Success/failure return code.                 */

{
        extern METAPROPTAB MetaPropTable[];
        extern int PropTabIndex;

STRUCT *mp;

*RetCode = 0;   /* Set RetCode to "success". */
```

```
        /* Verify that the table is not full. */
        if (PropTabIndex >= PROP_TABLE_LEN) {
                *RetCode = -61;  /* MetaPropTable full. */
                error(230,-61);
                return;
        }

/* Validate Type "ID" code.  Must be positive. */
        if (Type < 0) {
                *RetCode = -63;
                error(230,-63);         /* ID code must be positive. */
                return;
        }

/* Parse and validate the meta-prop. */
        parse(MetaProp,&mp,RetCode);
        if (*RetCode<0 || mp==NULL) return;

/* Add the entry to the MetaPropTable[]. */
        MetaPropTable[PropTabIndex].Template = MetaProp;
        MetaPropTable[PropTabIndex].TempForm = mp;
        MetaPropTable[PropTabIndex++].Type = Type;
}
/****************************************************************
INFERENCE ENGINE

EVALPROP

PURPOSE
        Evaluate a clause, recursively calling evalProp() and evalExpr()
        if necessary.

RETURNS
        CF of the clause.  HaltFlg returns True if DoAction() halted
        for single value cutoff.

RETURN CODES
                RetCode =  0 : Success.
                RetCode = -62 : Prop does not match valid meta-prop template.
****************************************************************/ evalProp(Prop,EnvProp,PremCf,Action,HaltFlg,PropCf,RetCode)
STRUCT  *Prop;          /* The clause to be evaluated.          */
int     EnvProp;        /* The environment of the proposition.  */
int     PremCf;         /* Premise certainty factor.            */
ACTION  *Action;        /* Action for successful proposition.   */
int     *HaltFlg;       /* TRUE if halted for single valued expr.*/
int     *PropCf;        /* CF returned by evalProp().           */
int     *RetCode;       /* Success/failure return code.         */

{
        extern deRefStruct();
        extern _getCache1();
        extern METAPROPTAB MetaPropTable[];
        extern int PropTabIndex;

static int FirstTimeFlg = TRUE; /* Initialization done?         */
        static STRUCT *Yes;             /* Implied "yes" for EXPR case. */
        static STRUCT *LengthList;      /* For calculating list lengths.*/

STRUCT  *OldProp;               /* Ptr to original proposition. */
        int     PropID;                 /* Assigned prop. identifier.   */
        STRUCT  *Value;                 /* Temporary structure ptr.     */
        CACHEREC *CachePtr;             /* Cache position-keeper.       */
        int     MatchFoundFlg;          /* Match found in MetaPropTable */
        int     Env;                    /* Temp variable binding frame. */
        int     Env1;                   /* Temp variable binding frame. */
        ACTION  NextAction;             /* Continuation block.          */
        STRUCT  RV;
        int     i;
```

```
/* Initialization. */
demon(205,BEGIN);       /* Signal start of function.          */
*RetCode = 0;           /* Set RetCode to "success".          */
*PropCf = PremCf;       /* Initialize returned certainty.     */

/* Perform certain initializations during the first invocation of
 * evalProp().
 */
if (FirstTimeFlg) {
        FirstTimeFlg = FALSE;
        parse("yes",&Yes,RetCode);
        parse("length(LIST)",&LengthList,RetCode);
}

/* De-reference any pointers and variables in the incoming
 * proposition. This simplifies the code in the below switch()
 * statement.
 */
deRefStruct(Prop,EnvProp,&Prop,&EnvProp,RetCode);
if (Prop == NULL) return;                               /* Error. */

/* Search for the MetaPropTable for a matching template. The
 * table is searched in reverse order, application-defined
 * meta-propositions being tried first as they are at the end of
 * the table.
 */
MatchFoundFlg = FALSE;
for (i=PropTabIndex-1; i>=0 && MatchFoundFlg==FALSE; i--) {

/* Push a variable binding frame for the template and
         * check for a match.
         */
        Env = pushBindFrame(MetaPropTable[i].TempForm);
        if (unify(Prop,EnvProp,MetaPropTable[i].TempForm,Env)) {
                MatchFoundFlg = TRUE;
                PropID = MetaPropTable[i].Type;

/* Now, for a terrific bit of weirdness. The minus
                 * and hyphen are overloaded operators and a check
                 * must be made to distinguish between the two.
                 * X - Y = Z (arithmetic subtraction) will
                 * unfortunately match X = Y!!
                 *
                 * The check is simple, both X and Y must be
                 * either arithmetic constants (integers or reals)
                 * or arithmetic expressions, like "(3+float(X))".
                 */
                if (PropID==MINUS) {
                        getBindingPtr("X",Env,&Value,&Env1);
                        if (!isArithmetic(Value,Env1))
                                MatchFoundFlg = FALSE;
                        getBindingPtr("Y",Env,&Value,&Env1);
                        if (!isArithmetic(Value,Env1))
                                MatchFoundFlg = FALSE;
                }
        }
        popBindFrame(Env);      /* Destroy variable binding frame. */
}

/* Sanity check. */
if (MatchFoundFlg==FALSE) {
        *RetCode = -62; /* Doesn't match valid meta-prop template. */
        error(205,-62);
        return;
}

/* Skip the "length" header cell in all cases. */
OldProp = Prop;
if (VAL_TYPE(Prop) == LENGTH) Prop++;
```

```
/* Process pre-defined meta-prop according to unique id. */
switch (PropID) {
case AND:       /* Meta-prop is of form "X and Y". */
        NextAction.ActionKey    = EVALPROP;
        NextAction.Prop         = Prop+2;
        NextAction.Env          = EnvProp;
        NextAction.Action       = Action;
        NextAction.RepeatFlg    = MULTIPLE;
        NextAction.MultiFlg     = TRUE;
        evalProp(Prop+1,EnvProp,PremCf,&NextAction,HaltFlg,PropCf,RetCode);
        break;

case OR:        /* Meta-prop is of form "X or Y". */
        evalProp(Prop+1,EnvProp,PremCf,Action,HaltFlg,PropCf,RetCode);
        if (*HaltFlg == FALSE)
                evalProp(Prop+2,EnvProp,PremCf,Action,HaltFlg,PropCf,
                                                RetCode);
        break;
case EQUALS:    /* Meta-prop is of form "X = Y". */
        /* Special Case:
         * If the expression is a number (real or integer) or a
         * variable bound directly to a number, then
         * don't evaluate (seek) the values of the expression.
         * Just compare it directly to the value.
         */
        if (isNumber(Prop+1,EnvProp)) {

/* Does the number unify with the value? If so,
                 * the proposition succeeds and the continuation
                 * action is performed.
                 */
                if (unify(Prop+1,EnvProp,Prop+2,EnvProp))
                        doAction(Action,PremCf,HaltFlg,PropCf,RetCode);
                else
                        *PropCf = -100;
                break;
        }

/* Does the Expr exist? If not, find its value. If it
         * can't be found, return - the clause has failed.
         */
        evalExpr(Prop+1,EnvProp,RetCode);

/* Search Cache for matching entries. Looking for E = V.
         * Initialize *PropCf to -100, which it will remain unless
         * evaluation is halted by the HaltFlg.
         */
        *PropCf = -100;
        CachePtr = NULL;
        do {
                /* Fetch a matching Cache entry. */
                _getCache1("",Prop+1,EnvProp,&CachePtr,RetCode);
                if (CachePtr==NULL) break;

/* Make sure both the EXPR and the VALUE match.
                 * Bind any variables that need binding.
                 */
                Env = pushBindFrame(CachePtr->Object);
                pushLocalFrame(CachePtr->Value,Env);
                if (unify(Prop+1,EnvProp,CachePtr->Object,Env) &&
                        unify(Prop+2,EnvProp,CachePtr->Value,Env)) {

/* Continue further only if the premise CF
                         * stays above 20.
                         */
                        *PropCf = MIN(CachePtr->cf,PremCf);
                        if (*PropCf >= 20) {

/* doAction() performs the required
                                 * action - EVALPROP or EVALCONC.
```

```
                         * If single value cutoff took place,
                         * doAction() returns FALSE for HaltFlg
                         * and the Cache scan is aborted.
                         */
                        doAction(Action,*PropCf,HaltFlg,
                                        PropCf,RetCode);
                        if (*HaltFlg == .TRUE) {
                                popBindFrame(Env);
                                break;
                        }
                }

/* Reset *PropCf to assume no more values
                 * will be found. i.e. as if the "last"
                 * attempt to find a value fails.
                 */
                *PropCf = -100;
        }
        popBindFrame(Env);
    } while(TRUE);

closeCache("",CachePtr);
    break;
case EXPR:
    /* Special Case:
     * If the expression is a number (real or integer) or a
     * variable bound directly to a number, then
     * don't evaluate (seek) the values of the expression.
     * The proposition MUST fail, because unifying a number with
     * "yes" will fail.
     */
    if (isNumber(OldProp,EnvProp)) {
            *PropCf = -100;
            break;
    }

/* Does the Expr exist? If not, find its value. If it
     * can't be found, return - the clause has failed.
     * Must use "OldProp" instead of "Prop" as the proposition
     * may look like :
     *      foo(bar,baz)
     * and, so we want to point to the structure header Cell
     * (Length header cell).
     */
    evalExpr(OldProp,EnvProp,RetCode);

/* Search Cache for matching entries. Looking for E = V.
     * Initialize *PropCf to -100, which it will remain unless
     * evaluation is halted by the HaltFlg.
     */
    *PropCf = -100;
    CachePtr = NULL;
    do {
            /* Fetch a matching Cache entry. */
            _getCache1("",OldProp,EnvProp,&CachePtr,RetCode);
            if (CachePtr==NULL) break;

/* Make sure both the EXPR and the VALUE match.
             * Bind any variables that need binding.
             */
            Env = pushBindFrame(CachePtr->Object);
            pushLocalFrame(CachePtr->Value,Env);
            if (unify(OldProp,EnvProp,CachePtr->Object,Env) &&
                    unify(Yes,EnvProp,CachePtr->Value,Env)) {

/* Continue further only if the premise CF
                     * stays above 20.
                     */
                    *PropCf = MIN(CachePtr->cf,PremCf);
                    if (*PropCf >= 20) {
```

```
                    /* doAction() performs the required
                     * action - EVALPROP or EVALCONC.
                     * If single value cutoff took place,
                     * doAction() returns FALSE for HaltFlg
                     * and the Cache scan is aborted.
                     */
                    doAction(Action,*PropCf,HaltFlg,
                                    PropCf,RetCode);
                    if (*HaltFlg == TRUE) {
                            popBindFrame(Env);
                            break;
                    }
            }

/* Reset *PropCf to assume no more values
             * will be found. i.e. as if the "last"
             * attempt to find a value fails.
             */
            *PropCf = -100;
        }
            popBindFrame(Env);
        } while(TRUE);

/* Close the Cache from use. */
        closeCache("",CachePtr);
        break;

case ISEQTO:
        /* Make sure both the EXPR and the VALUE match.
         * Bind any variables that need binding.
         * doAction() performs the required continuation
         * function and sets the HaltFlg if single value
         * cutoff took place.
         */
        if (unify(Prop+1,EnvProp,Prop+2,EnvProp))
                doAction(Action,PremCf,HaltFlg,PropCf,RetCode);
        if (*HaltFlg == FALSE) *PropCf = -100;
        break;

case NOT:       /* Metaprop is of the form "not X". */
        /* Want to evaluate the "not"ed proposition ONLY once. All
         * we're interested in is the returned CF of the proposition
         * (PropCf). If less than 20, the continuation is performed,
         * that is, the "not" succeeds. Otherwise, the not "fails",
         * and no action is taken.
         */
        NextAction.ActionKey    = NONE;
        NextAction.Prop         = NULL;
        NextAction.Env          = EnvProp;
        NextAction.Action       = NULL;
        NextAction.RepeatFlg    = ONCE;
        NextAction.MultiFlg     = TRUE;
        evalProp(Prop+1,EnvProp,PremCf,&NextAction,HaltFlg,PropCf,RetCode);

/* Reset the HaltFlg to FALSE and perform the continuation
         * if the "not" succeeded (the "not"ed proposition failed).
         * In the above evalProp() call, HaltFlg is used strictly for
         * local purposes. The HaltFlg we want to actually pass back
         * is the one returned by doAction() below, or FALSE if
         * the "not" fails.
         */
        *HaltFlg = FALSE;
        if (*PropCf < 20)
                doAction(Action,PremCf,HaltFlg,PropCf,RetCode);
        else
                *PropCf = -100;         /* The NOT failed. */
        break;

case LENGTHLIST:
        /* Calculate the length of the list. First, extract the
```

```
                    * list.  Then walk down the list until the bottom is found.
                    */
                    Env = pushBindFrame(LengthList);
                    unify(Prop+1,EnvProp,LengthList,Env);
                    getBindingPtr("LIST",Env,&Value,&Env1);
                    for (i=0; ; i++) {
                            /* Skip "Length" header cell. */
                            if (VAL_TYPE(Value)==LENGTH) Value++;

/* If the second argument of the list cell is NOT
                             * a structure, then the bottom has been found.  If
                             * not, keep on looking.
                             */
                            if (VAL_TYPE(Value+2) != STRUCTURE) break;
                            Value = (Value+2)->value.ArgPtr;
                    }
                    popBindFrame(Env);

/* Set up a "Value" structure to compare against Z. */
                    RV.ValType = INTNUM;
                    RV.value.intVal = (i==0) ? 0 : i+1;

/* Unify the local structure against Z.  Unify() handles the
                     * possibilities of Z being a bound/unbound variable or a
                     * number representation to compare against.  RV, of course,
                     * is always bound since it was created above.
                     */
                    Env = pushBindFrame(&RV);
                    if (unify(Prop+2,EnvProp,&RV,Env))
                            doAction(Action,PremCf,HaltFlg,PropCf,RetCode);
                    popBindFrame(Env);
                    if (*HaltFlg==FALSE) *PropCf = -100;
                    break;

case PLUS:
            case MINUS:
            case TIMES:
            case DIVIDE:
            case INTDIV:
            case MODDIV:
            case FIX:
            case FLOAT:
            case TRUNCATE:
            case REALROUND:
            case SQRT:
            case LT:
            case GT:
            case LTOREQ1:
            case LTOREQ2:
            case GTOREQ:
                    evalArithmeticProp(OldProp,EnvProp,PropID,PremCf,Action,
                                                    HaltFlg,PropCf,RetCode);
                    break;

default:
                    /* If a application-defined meta-proposition, (i.e.,
                     * PropID > 0), pass it to the application program for
                     * evaluation.
                     */
                    if (PropID >= 0) {
                            evalMetaProp(OldProp,EnvProp,PropID,PremCf,Action,
                                                    HaltFlg,PropCf,RetCode);
                    }
                    else {
                            /* This case should never happen, but if it does,
                             * we will recover gracefully.
                             */
                            *PropCf = -100;
                    }
                    break;
```

```
        } /* switch */ demon(CCS,END);         /* Signal end of function. */
}
/****************************************************************************

EVALARITHMETICPROP

PURPOSE
        Evaluate arithmetic propositions.

****************************************************************************/ evalArithmeticProp(Prop,EnvProp,PropID,PremCf,Action,HaltFlg,PropCf,RetCode)
STRUCT  *Prop;              /* The clause to be evaluated.        */
int     EnvProp;            /* The environment of the proposition. */
int     PropID;             /* Unique identifier for proposition.  */
int     PremCf;             /* Premise certainty factor.           */
ACTION  *Action;            /* Action for successful proposition.  */
int     *HaltFlg;           /* TRUE if halted for single valued expr.*/
int     *PropCf;            /* CF returned by evalProp().          */
int     *RetCode;           /* Success/failure return code.        */

{
        extern int arithCalc();
        extern deRefStruct();

STRUCT *OldProp;                /* Ptr to original proposition. */
        int Env;                        /* Temp variable binding env.   */
        int OpEnv;                      /* Temp variable binding env.   */
        double RetVal;                  /* Value of calculation.        */
        int FloatFlg = FALSE;           /* INT or FLOAT Retval?         */
        int TruthFlg = FALSE;           /* Arithmetic prop succeeded?   */
        int OpName;                     /* Name of aritnmetic operator. */
        STRUCT *Op;                     /* Arithmetic operator struct.  */
        STRUCT RV;                      /* Temp. structure cell.        */

/* Skip the "length" header cell in all cases. */
        OldProp = Prop;
        if (VAL_TYPE(Prop) == LENGTH)  Prop++;

/* Evaluate the proposition. */
        switch (PropID) {
        case PLUS:
        case MINUS:
        case TIMES:
        case DIVIDE:
        case INTDIV:
        case MODDIV:
        case FIX:
        case FLOAT:
        case TRUNCATE:
        case REALROUND:
        case SQRT:
                /* Meta-prop is of form:
                 *      "X op Y = Z"  "op" is an arithmetic binary operator
                 *      "fix(X) = Z"
                 *      "float(X) = Z"
                 *      "truncate(X) = Z"
                 *      "real_round(X) = Z"
                 *      "sqrt(X) = Z"
                 *
                 * Descend to "X op Y = Z" structure and skip
                 * past LENGTH cell to point to "op".  "op" may be +,*, etc.
                 * or fix, float, etc.
                 */
                deRefStruct(Prop+1,EnvProp,&Op,&OpEnv,RetCode);
                deRefStruct(Op+1,OpEnv,&Op,&OpEnv,RetCode);
                OpName = Op->value.Name;
```

```
switch (PropID) {
case FIX:
case FLOAT:
case TRUNCATE:
case REALROUND:
case SQRT:
        /* Op+1 is the argument's value, e.g. the "X" in
         * sqrt(X).
         */
        arithCalc(OpName,Op+1,OpEnv,NULL,OpEnv,&RetVal,
                        &FloatFlg,&TruthFlg,RetCode);
        break;
default:
        /* Op+1 and Op+2 are the argument values, e.g.
         * the "3" and "4" in "3 + 4".
         */
        arithCalc(OpName,Op+1,OpEnv,Op+2,OpEnv,&RetVal,
                        &FloatFlg,&TruthFlg,RetCode);
        break;
}

/* Check for error from arithCalc(). */
if (*RetCode != 0) {
        *PropCf = -100; /* Proposition has failed. */
        break;
}

/* Create a local structure containing the calculated value
 * for unification with the right-hand side of the meta-prop.
 */
if (FloatFlg) {
        RV.ValType = FLOATNUM;
        RV.value.floatVal = (float)RetVal;
}
else {
        RV.ValType = INTNUM;
        RV.value.intVal = (long)RetVal;
}

/* Unify the local structure against Z. Unify() handles the
 * possibilities of Z being a bound/unbound variable or a
 * number representation to compare against. RV, since it
 * was created above, is always bound.
 */
Env = pushBindFrame(&RV);
        if (unify(Prop+2,EnvProp,&RV,Env))
                doAction(Action,PremCf,HaltFlg,PropCf,RetCode);
        popBindFrame(Env);
        if (*HaltFlg == FALSE) *PropCf = -100;
        break;

case LT:
case GT:
case LTOREQ1:
case LTOREQ2:
case GTOREQ:
        /* Prop is pointing to "op". Set up arguments for call
         * to the arithmetic expression calculator.
         */
        OpName = Prop->value.Name;
        arithCalc(OpName,Prop+1,EnvProp,Prop+2,EnvProp,&RetVal,
                        &FloatFlg,&TruthFlg,RetCode);

/* Check for error from arithCalc(). */
        if (*RetCode != 0) {
                *PropCf = -100; /* Proposition has failed. */
                break;
        }
```

```
                /* If the arithmetic proposition succeeded, then do the
                 * continuation.
                 */
                if (TruthFlg)
                        doAction(Action,PremCf,HaltFlg,PropCf,RetCode);
                if (*HaltFlg == FALSE) *PropCf = -100;
                break;

} /* switch */
}
/****************************************************************************

DOACTION

PURPOSE
        Implements back-tracking using the C run-time stack.

RETURNS
        TRUE    Action taken.
        FALSE   Single value cutoff took place.

RETURN CODES
                RetCode =   0 : Success.
****************************************************************************/ doAction(Action,cf,HaltFlg,PropCf,RetCode)
ACTION *Action;          /* Action block to do.              */
int cf;                  /* CF of Action.                    */
int *HaltFlg;            /* Single value cutoff occur?       */
int *PropCf;             /* CF returned by evalProp().       */
int *RetCode;            /* Success/failure code.            */

{
        /* Set the returned certainty factor to be that of the incoming
         * certainty factor of the proposition.  If anyone wants to change
         * it, they can, e.g. evalProp() or evalConclusion().
         */
        *PropCf = cf;

/* Sanity check. */
        if (Action==NULL) return;

/* Take appropriate action. */
        switch(Action->ActionKey) {
        case EVALPROP:
                evalProp(Action->Prop,Action->Env,cf,Action->Action,
                        HaltFlg,PropCf,RetCode);
                break;
        case EVALCONC:
                /* evalConclusion() returns TRUE or FALSE depending on if
                 * single value cutoff took place.
                 */
                evalConclusion(Action->Prop,
                        cf,Action->Env,Action->MultiFlg,HaltFlg,RetCode);
                break;
        case NONE:
                /* Useful for presupposition(); stop after 1 evaluation. */
                break;
        default:
                /* Not one of Copernicus's, so must be an application
                 * defined Action.
                 */
                evalAction(Action,cf,HaltFlg,PropCf,RetCode);
                break;
        }
        /* Set HaltFlg if Action is to be performed only once. */
        if (Action->RepeatFlg == ONCE) *HaltFlg = TRUE;
}
```

February 12,1986 14:56:41    PARSEDEF.H  Page 1

```
/****************************************************************************
                              parsedef.h Copyright (c) 1985 Teknowledge, Inc.
                      525 University Ave.
                      Palo Alto, CA 94301
                      (415) 327-6600

PROGRAM
        Copernicus
        Version 1.0 - IBM PC

NOTES
        This file contains type and macro definitions which are used
        in two or more of the files related to the Copernicus parser.
        Those files are
                parser.c
                scanner.c
                unparser.c

****************************************************************************/

/* Nice prime numbers for efficient hashing. */
#define NAME_DIR_SIZE   401
define OP_DIR_SIZE     67 define PARSE_STACK_SIZE 100
define TRACE_BUF_SIZE  500
#define SHIFT_AMT       TRACE_BUF_SIZE/5

/* TOKEN_BUF_SIZE is the size of the static buffer used for most incoming
 * tokens.  (243 = 3^5, a natural number to use for such an application.)
 */
define TOKEN_BUF_SIZE  243 define MINPREC 1
define MAXPREC 254

/* UNREAD_CHAR() and READ_CHAR() are implemented as macros instead of as
 * function calls.  These routines are used so often, using them in-line
 * eliminates the function call overhead, resulting in a 5% performance
 * improvement.  About 4% of the increase is due to UNREAD_CHAR(); about
 * 1% of the increase is due to READ_CHAR().
 */
#define UNREAD_CHAR(c)  (ReadBuf[ReadBufIndex++] = c)
#define READ_CHAR()     ((ReadBufIndex>0) ? ReadBuf[--ReadBufIndex] : readc())
#define PEEK_CHAR()     ((ReadBufIndex>0) ? ReadBuf[ReadBufIndex-1] : (ReadBuf[ReadBufIndex++]=
eadc()))

#define IS_SYMBOL_CHAR(c)       strchr(SymbolChar,c)
#define IS_END_CHAR(c)  (c=='\0' || c==EOF)
/* The need for revising isspace() arises because fgetc() is not
 * stripping the 8th bit.  Thus when the file contains ASCII 0x0D 0x8A rather
 * than 0x0D 0x0A, fgetc() is not able to recognize this as a CRLF which it
 * would translate into the single character 0x0A.  Thus 0x0D is being
 * passed up the line, which the scanner getToken() is not able to
 * recognize as white space.  By the time we strip the 8th bit in readc()
 * it is already too late.  Thus we need to recognize linefeed ('\r') as
 * a space also.
 * Checks for ' ','\n','\t' or '\r'.
 */
#define IS_SPACE(c)     (isspace(c)||(c=='\r'))
```

```
/* The table of predefined operators has slightly different structure than
 * OpTable. Namely, the first field is a string rather than an index into
 * the NameTable. It is not possible to know what the indices into the
 * NameTable will be until run time. Otherwise OPTABLE and PDOPTABLE are
 * the same.
 */
typedef struct pdops {
        char    *OpString;
        int     Prec;
        unsigned char Assoc;
} PDOPTABLE;

typedef struct dirlist {
        int     TableIndex;             /* Index into NameTable[].       */
        struct dirlist *next;           /* Next block in chain.          */
} DIRLIST;

/* The following macros are for accessing the information in
 * NamePropTable[]
 */
#define QUOTEMASK       0x01
#define NEEDS_QUOTES(i) (NamePropTable[i] & QUOTEMASK)

/* The following macros need to be moved to typedef.h.
 * The following macros are for accessing the ValType field of STRUCT.
 */
#define ASSOCMASK       0x70
#define ASSOC(p)        ((p)->ValType & ASSOCMASK)
February 12,1986  14.  47    C:\PATENT\parser.c  Page 1
```

/********************************************************************** parser.c

Copyright (c) 1985 Teknowledge, Inc.
                    525 University Ave.
                    Palo Alto, CA  94301
                    (415) 327-6600

PROGRAM
        Copernicus
        Version 1.0 - IBM PC

NOTES
        The parser below is an "Operator Precedence" parser which uses a
        stack to hold the tokens/structures while "shift-reduce" operations
        are carried out based on the precedences of the tokens.

IMPROVEMENTS
        1) Rename NameTable[] to SymTable[].

SUBROUTINES
        parse()
        lookUpName()
        lookUpOp()
        makeDottedPair()
        makeList()
        markAsUnambig()
        moveArg()
        numInterps()
        opType()
        parseError()
        pushParseStack()

```
        popParseStack()
        prec()
        processToken()
        reduce()
        reduceFunctorArgs()
        reduceList()
        reductionNeededFor()
        resolve()
        resolveJustP()
        resolveJustQ()
        selectFrom()
HIERARCHY OF PROCEDURES parse(Str)                       Entry point to parser.  Returns a structure.
    scannerInit(Str)             Set up for input from string or reader()
    getToken()                   Entry point to scanner.  Returns a token.
        quotedAtomToken(char,&token)    recognizes ' and "-ed strings
        numToken(char,&token)           recognizes integers and reals
        alphanumericToken(char,&token)  recognizes symbols & variables
        symbolAtomToken(char,&token)    recognizes symbol atoms
        makeToken(string,type)          builds token in memory,
                                        returns its address
            copmalloc(...)              Copernicus memory allocation
            addName(string,RetCode)     adds string to NameTable[],
                                        returns its index resolve(p,q)                 Disambiguates p, partially disambigs q
        selectFrom(Code,token)          bookkeeper: winnows possibilities
                                        for token
        resolveJustP(p,q)               subcase when q is unambig.
        resolveJustQ(p,q)               subcase when p is unambig.
        numInterps(token)               counts # of possibilities
        lookUpOp(NameIndex,OpType)      location of Op in OpTable[]

processToken(p)       prepare parse stack for incoming token  p, then
                          (usually) put  p  on stack.
        reductionNeededFor(Prec,Assoc)  tells whether parse stack
                                        needs to be reduced before
                                        putting  p  on.
        opType(Assoc)                   input: FX, XFY, NOTOP, etc
                                        output:PREF, INF, POST or NOTOP
        lookUpOp(NameIndex,OpType)      as above
        StackPrec                       precedence of stacked operator
                                        to be compared with Prec of
                                        incoming token.
        StackAssoc                      associativity of stacked op.

reduce()                     glom together an operator with its
                                 arguments (all on the stack)
        copmalloc(...)
        moveArg( , )      shift data around while glomming reduceList()                 glom together the elements of a list
                                 on the stack
        makeList(i)                     do it for a nonempty list
                                        starting at ParseStack[i+1]
            makeToken(...)      build the empty list at tail
            makeDottedPair( , )     form basic building block
                copmalloc(...)  as above reduceFunctorArgs()          glom together a functor and its argum's parseError(ErrorNum)     print corresponding error message
    error(Function,ErrorNum)                 does the printing

***********************************************************************/
        #include <stdio.h>
        #include "typedef.h"
        #include "parsedef.h"
```

```c
/*
 * EXTERNS
 * These must be declared as externs here as they are used in macros
 * defined in parsedef.h
 */
extern char ReadBuf[];
extern int ReadBufIndex;

/* The following string contains all the characters that constitute the
 * class of "symbol characters".  A SYMBOLATOM consists of any string of
 * such symbols.  Note that ,|()[] are NOT part of this class, but . is.
 *
 * This string is used by the macro IS_SYMBOL_CHAR(c).
 */
char *SymbolChar = ":.+-*\/^<>=`~?#$&%{}";
/* OpTable[].
 * The operator table is a table of pre-defined and user defined operators.
 * There are 3 fields:
 *      Index
 *      Precedence
 *      Associativity
 *
 * NOTE: The CLOSEPAREN, ")", should have the same precedence as the
 * COMMA, ",".  This is to allow the CLOSEPAREN to reduce() the ParseStack[]
 * of any unfinished business before the structure is built.
 *
 */
OPTABLE OpTable[OP_TABLE_SIZE];
int OpTabIndex = 0;

/* These pre-defined operators are loaded into OpTable[] by parse() during
 * an initialization phase.
 * Note: LAST STRING MUST BE NULL to mark the end of the array for
 * the loop that processes this array.
 */
static
PDOPTABLE PreDefinedOps[] = {
        {       "mod",   245,    XFX },
        {       "*",     240,    YFX },
        {       "/",     240,    YFX },
        {       "//",    240,    YFX },
        {       "-",     240,     FX },
        {       "+",     235,    YFX },
        {       "-",     235,    XFY },
        {       "$",     235,     FX },
        {       "is",    210,    YFX },
        {       "=",     200,    XFX },
        {       "==",    200,    XFX },
        {       ">=",    200,    XFX },
        {       "<=",    200,    XFX },
        {       "=<",    200,    XFX },
        {       ">",     200,    XFX },
        {       "<",     200,    XFX },
        {       ".",     190,    XFY },
        {       "not",   160,     FY },
        {       "of",    150,    XFY },
        {       "or",    140,    XFY },
        {       "and",   130,    XFY },
        {       "because", 120,  XFY },
        {       "then",  110,    XFY },
        {       "if",    100,     FX },
        {       ":",      90,    XFX },
        {       ",",      50,    XFY },
        {       "|",      50,    XFX },
        {       ")",      50,    NOTOP },
        {       "]",      50,    NOTOP },
        {       "(",      40,    NOTOP },
        {       "[",      40,    NOTOP },
        {       NULL,      0,    NOTOP }
};
```

```
/* Name Table.
 * As the parser (i.e., the scanner) scans tokens, new symbol (atom) and
 * variable names are placed in the Name Table. This allows an index to
 * be substituted for the symbol text string in the data structures.
 * Anytime the text string for a symbol is needed, a quick access to the
 * Name Table is all that is needed.
 *
 * Properties of names are stored in a "parallel" array, NamePropTable[].
 * Parallel means that properties of NameTable[i] are given in
 * NamePropTable[i]. Currently, the low bit of NamePropTable[i] is
 * set to 1 if quote marks are needed whenever NameTable[i] is printed
 * out as an atom and it is desired that the printout be parseable by
 * the parser.
 *
 * Hashing is used for fast string lookup and storage in NameTable[]. To
 * facilitate this, a directory/index structure is used called NameDir[].
 * The hashing process produces a starting index into NameDir[]. If the
 * string is to be found, then it will be referenced in the chain of blocks
 * beginning there. The reference in each block in the chain is an integer
 * offset into NameTable[]. Obviously, each reference must be checked to
 * conclusively check that a string is already in the NameTable[].
 *
 * This hashing directory definitely adds space overhead, but, it certainly
 * enhances performance.
 */
char    *NameTable[NAME_TABLE_SIZE];
unsigned char NamePropTable[NAME_TABLE_SIZE];
int     NamTabIndex = 0;        /* Next empty NameTable[] slot. */
int     HyphenIndex;            /* }                            */
int     BarIndex;               /* }                            */
int     NullListIndex;          /* } Commonly sought indices    */
int     DotIndex;               /* } into the NameTable[].      */
int     CommaIndex;             /* }                            */
int     CommaPrec;              /* Commonly needed precedence.  */
/* HASH TABLE DIRECTORIES
 */
DIRLIST *NameDir[NAME_DIR_SIZE];        /* Directory to symbol entries. */
DIRLIST *OpDir[OP_DIR_SIZE];            /* Directory to operator entries. */
/* Parse Stack.
 * The parser is an "Operator Precedence" parser, which uses a stack
 * for storing the tokens/structures for "shift-reduce" operations.
 */
STRUCT  *ParseStack[PARSE_STACK_SIZE];
int     ParStkIndex = 0;
STRUCT  TokenStack[PARSE_STACK_SIZE * 2];       /* 2 cells per token */ int ReadStringFlg = TRUE;       /* Read from string or user supplied func. */

/* Parse Trace.
 * The parser builds the parse trace buffer as it collects tokens. If/when
 * an error is encountered, the caller is able to check the parse trace
 * buffer to see the point where the offending problem occured.
 *
 * The Trace buffer size is very critical to speed performance of the
 * Parser. If the size is shorter than most individual rules, then a
 * call to movmem() in READ_CHAR() is made to shift the buffer downward to
 * make space for the rest of the rule. This movmem() call is expensive.
 */
char ParseTrace[TRACE_BUF_SIZE];
int TraceIndex;
/****************************************************************************

PARSE

PURPOSE
        Parse a text string and produce the resulting structure.

NOTES
        parse() can be called either with a string or a NULL text string
        (""). Calling parse() with a text string will cause only that
``` string to be parsed and the resulting structure returned. Calling
parse() with a NULL text string will cause parse() to take its
input, via getToken(), from the user supplied routine readcn().

RETURNS
A pointer to the parsed structure. If end of file is encountered,
returns NULL with a RetCode of 0. If a syntax error is encountered,
returns NULL with a RetCode < 0 (ranging from -1 to -492. Following
a syntax error, all tokens are discarded up to the next ENDTOKEN (end
of file, end of string or period).

**********************************************************************/

```
parse(Str,RetStruct,RetCode)
char *Str;              /* String to parse.              */
STRUCT **RetStruct;     /* Returned structure.           */
int *RetCode;           /* Success/failure return code. */

{
        extern STRUCT *getToken();
        extern STRUCT *popParseStack();
        extern char *copmalloc();
        extern int addName();
        extern int reduce();
        extern int processToken();
        extern int lookUpOp();
        extern int movmem();
        extern int strcmp();
        extern int ReadBufIndex;
        extern int ParStkIndex;
        extern OPTABLE OpTable[];
        extern char *NameTable[];
        extern int HyphenIndex;
        extern int BarIndex;
        extern int NullListIndex;
        extern int DotIndex;
        extern int CommaIndex;
        extern int CommaPrec;

static int FirstTimeFlg = TRUE; /* For initializations.            */
        static STRUCT p0[2];            /* Holding cell for incoming token. */
        static STRUCT q0[2];            /* Holding cell for incoming token. */

STRUCT  *p;                     /* Pointer to a holding cell.  */
        STRUCT  *q;                     /* Pointer to a holding cell.  */
        STRUCT  *r;                     /* Pointer to a holding cell.  */
        int     i;                      /* Index into NameTable[].     */
        int     Err;                    /* Code number for syntax error. */

/* Perform initializations. This occurs only once per invocation
         * of Copernicus, during the first call to parse().
         */
        if (FirstTimeFlg) {
                FirstTimeFlg = FALSE;

/* Load pre-defined operators into OpTable[]. Add the
                 * operator names to NameTable[] as a side effect of addOp().
                 * Store some of the most commonly sought values in
                 * static variables to speed up parsing.
                 */
                for (i=0; PreDefinedOps[i].OpString != NULL; i++) {
                        addOp(PreDefinedOps[i].OpString,PreDefinedOps[i].Prec,
                                                PreDefinedOps[i].Assoc,&Err);
                }

HyphenIndex     = addName("-",RetCode);
                BarIndex        = addName("|",RetCode);
                NullListIndex   = addName("[]",RetCode);
                DotIndex        = addName(".",RetCode);
```

```
        CommaIndex      = addName(",",RetCode);
        CommaPrec = OpTableLookUpOp(CommaIndex,INF)].Prec;
}

/* Read input from a string or from a user supplied function?
 * When starting to read from an application-defined stream, the
 * ReadBuf[] must be reset (ReadBufIndex set to 0) to eliminate
 * any NULL chars left over by previous string parses as part of
 * the character lookahead mechanisms.
 */
if (strcmp(Str,"")==0) {
        if (ReadStringFlg==TRUE)
                ReadBufIndex = 0;       /* Must reset on file entry. */
        ReadStringFlg = FALSE;
}
else ReadStringFlg = TRUE;

scannerInit(Str);               /* Give scanner something to do.*/
ParStkIndex = 0;                /* Clear parse stack.            */
*RetCode = 0;                   /* Success, until proven otherwise. */
p = NULL;
q = q0;
r = p0;

/* Get first token and make sure it is not an ENDTOKEN. */
if (getToken(q,&Err) == (STRUCT *)NULL)
        goto cleanup;
else if (VAL_TYPE(q+1) == ENDTOKEN) {
        *RetStruct = NULL;
        return;
}
/****************************************************************
 *
 * The following loop is the HEART OF THE PARSER.
 *
 * Tokens are grabbed from the input stream and placed into q.
 * From q  they move over to  p  and thence onto the parse stack.
 * r  is just a holding pointer for the next value of  q.
 * This loop continues until a NULL token is received (indicating
 * a syntax error) or an ENDTOKEN is received, or until one of
 * the called routines returns an error code.
 *
 ****************************************************************/ for ( ; Err >= 0; p=q, q=r, r=p, getToken(q,&Err)) { if ((Err=resolve(p,q)) < 0) goto syntaxgoof;

if ((Err=processToken(p)) < 0) goto syntaxgoof;

if (VAL_TYPE(q+1) == ENDTOKEN) {
                while (ParStkIndex > 1)
                        if ((Err=reduce()) < 0) goto syntaxgoof;

p = popParseStack(); /* MAY be NULL */
                /* HOW might the returned struct be NULL?  I wrote
                 * that but now (10/26) I don't remember.
                 */
                if (p == NULL) {
                        *RetStruct = NULL;
                        return;
                }
                else if (p->value.Length > 1) {
                        *RetStruct = p;
                        return;
                }
                else {
                        /* Need to copy single token into a new
                         * memory area, as single tokens are held in
                         * static memory cells.
                         */
```

```
                q = (STRUCT *)copmalloc(sizeof(STRUCT) * 2);
                if (q == NULL) {
                        *RetCode = -100;
                        *RetStruct = NULL;
                        return;
                }
                movmem(p,q,sizeof(STRUCT) * 2);
                *RetStruct = q;
                return;
            }
        }
    } syntaxgoof:
        /* Get here if some routine detected a syntax error.  We
         * must call error routine, set the RetCode and clean up
         * working memory.
         */
        parseError(Err);        /* Print out error code. */ cleanup:
        /* Set RetCode, clean up the parse stack and throw
         * away tokens up to the next endtoken.
         */
        *RetCode = Err;
        while (ParStkIndex > 0) {
                p = popParseStack();
                if (p->value.Length > 1) freeStruct(p);
        }

/* If  q  is not already an ENDTOKEN, scan and discard tokens until
         * an ENDTOKEN is found.
         */
        while (VAL_TYPE(q+1)!=ENDTOKEN)
                getToken(q,&Err);
}
/*********************************************************************

LOOKUPNAME

PURPOSE
        Look up a name in the NameTable[].

RETURNS
        The index of the NameTable[] entry, if found.
        -1 if the entry is not found.

**********************************************************************/ int
lookUpName(Name)
char    *Name;          /* The string to be looked up in the NameTable[]. */

{
        extern int hash();
        extern int strcmp();
        extern char *NameTable[];
        extern DIRLIST *NameDir[];

DIRLIST *p;             /* Ptr to an entry in NameDir[]. */
        int     hashval;        /* Hashing index into NameDir[] for Name. */
        int     j;

/* Search name table for Name.  If found, return index into
         * NameTable[].  Searching is accomplished by first consulting
         * the NameDir[], a directory for NameTable[].
         */
        hashval = hash(Name,strlen(Name),NAME_DIR_SIZE);
        for (p = NameDir[hashval]; p != NULL; p = p->next) {
                j = p->TableIndex;
                if (strcmp(Name,NameTable[j]) == 0) return(j);
```

```
        }
                return(-1);     /* Name not found.        */
}
/******************************************************************************

LOOKUPOP

PURPOSE
        Look up a symbol in the operator table, OpTable[], to see if
        it is a specified type of operator.

RETURNS
        Index   Index of the operator in OpTable[], if found.
        -1      The operator is not found in OpTable[].

******************************************************************************/ int
lookUpOp(i,OpType)
int i;                  /* Index into the NameTable.            */
unsigned char OpType;   /* PREFix, INFix, POSTfix.              */

{
        extern unsigned char opType();
        extern OPTABLE OpTable[];
        extern DIRLIST *OpDir[];

DIRLIST *p;             /* A pointer entry in OpDir[]. */
        OPTABLE *q;             /* Ptr to an individual entry in OpTable[]. */
        int     hashval;        /* Hashing index into OpDir[] for i. */
        int     j;

hashval = i % OP_DIR_SIZE;

/* Search the OpTable for an index matching  i  and associativity
         * matching that required by OpType.  Return pointer into OpTable
         * if successful, otherwise return -1.
         */
        for (p = OpDir[hashval]; p != NULL; p = p->next) {
                j = p->TableIndex;
                q = &OpTable[j];
                if ((i == q->Index) && (OpType == opType(q->Assoc))) return(j);
        } return(-1);     /* Symbol is not the desired type of operator. */
}
/******************************************************************************

MAKEDOTTEDPAIR

PURPOSE
        To allocate space for a basic list structure element, the dotted
        pair: ".(a,b)".

RETURNS
        A pointer to the allocated structure.

******************************************************************************/

STRUCT *
makeDottedPair(p,q,SpaceOrNot)
STRUCT *p;                      /* Head of the dotted pair.             */
STRUCT *q;                      /* Tail of the dotted pair.             */
unsigned char SpaceOrNot;       /* Desired setting of the space flag.   */

{
        extern char *copmalloc();
        extern int movearg();
        extern int NullListIndex;
```

```
        STRUCT  *pair;           /* The dotted pair itself.    */

/* Allocate space for the dotted pair. */
        pair = (STRUCT *)copmalloc(sizeof(STRUCT)*4);
        if (pair==NULL) return(NULL);   /* Out of memory space. */

/* Initialize Length header cell. */
        pair->ValType = LENGTH;
        pair->value.Length = 3;

/* The functor is ".", a right associative infix operator - initialize
         * the next cell representing "." .
         */
        ++pair;
        pair->ValType = SpaceOrNot|XFY|SYMBOL;
        pair->value.Name = DotIndex;

/* The next cell should be the first member of the pair. */
        moveArg(p,++pair);

/* Fill the next cell with either q or [] if q is NULL. */
        ++pair;
        if (q==NULL) {
                /* Signal to put [] as second argument to dotted pair */
                pair->ValType = SYMBOL;
                pair->value.Name = NullListIndex;
        }
        else
                moveArg(q,pair);

return(pair-3);  /* Return pointer to Length header cell. */
}
/************************************************************************

MAKELIST

PURPOSE
        When called as  makelist(i)  interprets the parse stack items
        between  ParseStack[i+1]  and the top of the parse stack as the
        contents of a bracketed list.  Puts the resulting list at
        position ParseStack[i] which is the new top of the parse
        stack.

RETURNS
        Negative error code if syntax error encountered.  Otherwise returns
        +1, with the side effect of the list being put on top of the
        Parse Stack.

NOTE
        Works by recursive descent, calling itself whenever a comma is
        encountered.

Does not handle the empty list, because that conflicts with its
        being called recursively.  The empty list is already handled by
        the calling routine (reduceList()).

************************************************************************/
int
makeList(i)
int     i;      /* Index into Parse Stack.  Either comma or left bracket. */

{
        extern STRUCT *makeDottedPair();
        extern STRUCT *popParseStack();
        extern int pushParseStack();
        extern int reduce();
        extern STRUCT *ParseStack[];
        extern int ParStkIndex;

STRUCT *ListPtr;         /* Ptr generated by makeDottedPair(). */
```

```
        STRUCT *p;               /* Ptr to Parse Stack element.       */
        int Err;                 /* Syntax error number to return.    */
        unsigned char SpaceOrNot; /* For call to makeDottedPair().    */ if (((i >= ParStkIndex) || (i < 0)) {

/* Parser bug.  Routine should never be called
                 * with i not pointing to a valid parse stack element.
                 */
                return(-99);
        }
        else if (i == ParStkIndex-1) return(-20);  /* Missing list element */
        else if (i == ParStkIndex-2) {

/* Only one element in the list which is of form: "[a]".
                 * Make a dotted pair with that element as first arg, "[]"
                 * as the second argument i.e. ".(a,[])".
                 */
                p = popParseStack();
                SpaceOrNot = 0;                    /* No space.          */
                ListPtr = makeDottedPair(p,NULL,SpaceOrNot);
                popParseStack();                   /* Discard "[" or ","  */
                pushParseStack(ListPtr);           /* New top of Parse Stack. */
                return(1);                         /* Success.           */
        }
        else if (VAL_TYPE(p=(ParseStack[i+2]+1)) == COMMA) {

/* More than one element in the list e.g. "[a,b]"
                 * Process by recursively calling makeList() - to end up
                 * with, for example, ".(a, .(b,[]))".
                 * Note p has been set to the STRUCT pointer contained at the
                 * Parse Stack position [i+2], and that this assignment is
                 * done here for possible use at the next branch of this
                 * "if-else-if" construct.
                 */
                SpaceOrNot = 0;         /* No space.            */
                Err = makeList(i+2);    /* Do rest of list.     */
                if (Err < 0) return(Err);
                p = popParseStack();    /* Tail of the list.    */
                ListPtr = makeDottedPair(popParseStack(),p,SpaceOrNot);
                popParseStack();        /* Discard "[" or ",".  */
                pushParseStack(ListPtr);/* New top of Parse Stack.  */
                return(1);              /* Success.             */
        }
        else if ((p->value.Name == BarIndex) && (VAL_TYPE(p) == SYMBOL)) {

/* "|" separator present in list e.g. of form:
                 *      [a | [b,c,d] ]
                 */
                SpaceOrNot = 0;
                while (ParStkIndex > i+4)
                        if ((Err=reduce()) < 0) return(Err);

if (ParStkIndex < i+4) return(-99); /* Shouldn't happen? */ p = popParseStack();    /* Tail of list (after the |)   */
                popParseStack();        /* Discard the "|". */
                ListPtr = makeDottedPair(popParseStack(),p,SpaceOrNot);
                popParseStack();        /* Discard the "[" or ",". */
                pushParseStack(ListPtr);/* New top of Parse Stack. */
                return(1);              /* Success.             */
        }
        else {
                return(-21);    /* Illegal list contents.       */
        }
}
/*******************************************************************************
```

PURPOSE
    Reset the bit codes of a token after the token has been
    determined to be unambiguous.

NOTES
    This procedure assumes that the calling procedure has determined
    that the token has exactly one possible interpretation: No test
    for that is done here. Therefore this routine picks the first
    (presumably only) remaining interpretation and freezes it in
    concrete.

*****************************************************************/

```c
markAsUnamoig(p)
STRUCT *p;       /* The incoming token to be marked as unambiguous. */

{
        extern int lookUpOp();
        extern OPTABLE OpTable[];

STRUCT *q;                 /* Set to p+1. */
        int j;                     /* Index into OpTable[]. */
        unsigned char *pValType;   /* Set to &(p->ValType) for optimization. */

/* Do nothing if p is already so "marked".      */
        if ((p == NULL) || (VAL_TYPE(p) == LENGTH)) return(1);

q = p+1;
        pValType = &(p->ValType);

if (*pValType & FUNC) {

/* The SPACE field is here being used to distinguish
                 * between functors that are VARIABLES and functors that
                 * are not variables (i.e. are SYMBOLS or COMMAS).
                 * This is possible since no functor can have a space
                 * after it, so the SPACE field is redundant for functors.
                 * Later in reduce() this field will be checked before
                 * converting the marker FUNCTOR back into either SYMBOL
                 * or VARIABLE. Then the field will have yet a third use,
                 * namely to mark whether there is a space after the close
                 * parenthesis of the structure.
                 */
                if (VAL_TYPE(q) == VARIABLE)
                        q->ValType = FUNCTOR | SPACEMASK;
                else
                        q->ValType = FUNCTOR;
        }
        else if (*pValType & PREF) {
                j = lookUpOp(q->value.Name,PREF);
                q->ValType |= OpTable[j].Assoc;
        }
        else if (*pValType & INF) {
                j = lookUpOp(q->value.Name,INF);
                q->ValType |= OpTable[j].Assoc;
        }
        else if (*pValType & POST) {
                j = lookUpOp(q->value.Name,POST);
                q->ValType |= OpTable[j].Assoc;
        }
        else if (*pValType & TERM) {
                /* No change in q->ValType [i.e. (p+1)->ValType] is needed. */
        }
        else {
                /* Parser bug: this should never happen. */
                return(-99);
        }

*pValType = LENGTH;
        return(1);
}
```

```
/******************************************************************

MOVEARG

PURPOSE
        Transfer a syntactic object from one place to another in the
        process of building up a complicated syntactic structure.

NOTE
        If the source is a single token (value.Length == 1) we simply
        copy the data from the second source cell over to the destination.
        Otherwise we call the destination a STRUCTURE and make its value a
        pointer to the source.

******************************************************************/ moveArg(Source,Dest)
STRUCT  *Source;        /* Ptr to source token(s). */
STRUCT  *Dest;          /* Destination pointer. */

{
        extern int movmem();

if (Source->value.Length == 1) {

/* Skip Length header cell and copy information cell
                 * to destination.
                 */
                movmem(Source+1,Dest,sizeof(STRUCT));
        }
        else {
                /* Construct a STRUCTURE cell copy. */
                Dest->ValType       = STRUCTURE;
                Dest->value.ArgPtr  = Source;
        }
}
/******************************************************************

NUMINTERPS

PURPOSE
        Returns the number of possible interpretations of an ambiguous
        token, counting anything over 2 as 2.

RETURNS
        Integer representing the number of possible interpretations of the
        token.

NOTES
        If the number of interpretations is found to be 1, the
        previously ambiguous token is marked as unambiguous, i.e. the
        header field is set back to LENGTH and the TYPE field of the
        second cell is set correctly.

******************************************************************/
int
numInterps(p)
STRUCT *p;      /* Header cell for a token or for an item on parse stack */

{
        extern int markAsUnambig();

if ((p==NULL) || (VAL_TYPE(p) == LENGTH)) return(1);

/* Most efficient way to get the information needed. Previous
         * coding of this routine soaked up 13% of parser's run time.
         */
        switch ((p->ValType)&0xF8) {
        case 0:
                return(0);
```

```
        case TERM:
        case FUNC:
        case PREF:
        case INF:
        case POST:
                /* Unambiguous interpretation. */
                markAsUnambig(p);
                return(1);
        default:
                /* Number of possible interpretations is 2 or more but
                 * good enough to mark as just 2.
                 */
                return(2);
        }
}
/****************************************************************************

OPTYPE

PURPOSE:
        Classify an operator as being either PREFix, INFix or POSTfix,
        based on its being FX, FY, XFX, etc.

RETURNS
        An unsigned char representing the bit-field code of the designated
        classification.

****************************************************************************/
unsigned char
opType(Code)
unsigned char Code;     /* Operator's OpType code. */

{
        switch (Code) {
        case FX:
        case FY:        /* Classify as PREFix. */
                return((unsigned char)PREF);
        case XFX:
        case XFY:
        case YFX:       /* Classify as INFix. */
                return((unsigned char)INF);
        case XF:
        case YF:        /* Classify as POSTfix. */
                return((unsigned char)POST);
        default:        /* Classify as NOT an Operator. */
                return((unsigned char)NOTOP);
        }
}
/****************************************************************************

PARSEERROR

PURPOSE
        Calls the user supplied routine error() with appropriate error
        information.

NOTES
        At the present time, parseError() does nothing more than pass an
        error message to error(). In the future, it will combine this
        information with line number and other contextual information.

****************************************************************************/
parseError(ErrorNum)
int ErrorNum;           /* Associated error number. */

{
        if (ErrorNum <= -900) {
                ErrorNum = -99; /* Still keeping "99" as special error no. */
        }
        error(235,ErrorNum);    /* Function id for parse() is 235. */
}
``` atom (NUM, VARIABLE, SYMBOL), then a precedence of 256, the highest
value possible, is returned. This ensures the atom will be
automatically pushed on the ParseStack[].

*****************************************************************/

```
int
prec(p)
STRUCT *p;      /* Ptr to the operator in question. */

{
        extern int lookUpOp();
        extern unsigned char opType();
        extern OPTABLE OpTable[];

STRUCT *q;      /* Temporary STRUCT ptr for slight optimization. */
        int     j;

q = p+1;

switch (VAL_TYPE(q)) {
        case SYMBOL:
        case VARIABLE:
        case COMMA:
        case OPENPAREN:
        case LEFTBRACKET:
        case CLOSEPAREN:
        case RIGHTBRACKET:
        case FUNCTOR:           /* Look up index in OpTable[]. */
                j = lookUpOp(q->value.Name,opType(ASSOC(q)));
                return(OpTable[j].Prec);
        case ENDTOKEN:
                return(-1);     /* Given lowest precedence. */
        default:                /* Integers, floats, variables, ...?? */
                return(256);    /* Given highest precedence. */
        }
}
```

/*****************************************************************

PROCESSTOKEN

PURPOSE
        Push a single unambiguous token onto the Parse Stack after reducing
        operators with higher precedence already on the stack.

RETURNS:
        1 if successful,
        negative error code if syntax error detected.

*****************************************************************/

```
int
processToken(p)
STRUCT *p;      /* Ptr to token to be processed. */

{
        extern STRUCT *popParseStack();
        extern unsigned char opType();
        extern int pushParseStack();
        extern int reduceFunctorArgs();
        extern int reductionNeededFor();
        extern int reduce();
        extern int prec();
        extern STRUCT *ParseStack[];
        extern int ParStkIndex;

STRUCT  *q;             /* Set to p+1 for slight optimization. */
        STRUCT  *r;             /* Temporary STRUCT ptr for optimization. */
        STRUCT  *tos;           /* Top of parse stack. */
        int     i;              /* Index into the ParseStack[]. */
        int     Prec;           /* Precedence of p. */
```

```
/******************************************************************************

PUSHPARSESTACK

PURPOSE
        Push a token or structure onto the Parse Stack.

******************************************************************************/ pushParseStack(p)
STRUCT *p;              /* Token to be pushed onto the Parse Stack. */

{
        extern int movmem();
        extern STRUCT *ParseStack[];
        extern STRUCT TokenStack[];
        extern int ParStkIndex;

STRUCT *q;      /* Temporary STRUCT ptr for slight optimization. */ if (p->value.Length == 1) {

/* Set new token in static memory represented by TokenStack[]. */
                q = ParseStack[ParStkIndex] = &TokenStack[2*ParStkIndex];

/* Move the contents of token to new TokenStack[] address. */
                movmem(p,q,2*sizeof(STRUCT));
                ParStkIndex++;
        }
        else
                /* Memory for the token already allocated by copmalloc(). */
                ParseStack[ParStkIndex++] = p;
}
/******************************************************************************

POPPARSESTACK

PURPOSE
        Remove a token or structure from the Parse Stack.

RETURNS
        Returns a pointer to the removed token.

******************************************************************************/

STRUCT *
popParseStack()

{
        extern STRUCT *ParseStack[];
        extern int ParStkIndex;

if (ParStkIndex > 0) {
                ParStkIndex--;
                return(ParseStack[ParStkIndex]);
        }
        else return(NULL);      /* Parse Stack is empty. */
}
/******************************************************************************

PREC

PURPOSE
        Return the precedence value of an operator.

RETURNS
        An integer representing the precedence of the operator.

NOTES
        Prec() is used only to look up the precedence of tokens about to be
        placed on the ParseStack[]. For this reason, if an object is an
```

```
unsigned char Assoc;      /* Associativity of p. */
int      Err;             /* Error code returned by called routines. */

/* Sanity check */
if (p == NULL) return(1);

q = p+1;

/* Process the new token. */
switch(VAL_TYPE(q)) {
case OPENPAREN:                  /* "(" */
case LEFTBRACKET:                /* "[" */
        pushParseStack(p); /* Just push onto Parse Stack and return. */
        return(1);
case CLOSEPAREN:                 /* ")" */
        /* Prepare the Parse Stack, reducing as required. */
        Prec = prec(p);
        while ((Err=reductionNeededFor(Prec,NOTOP)) > 0)
                if ((Err=reduce()) < 0) return(Err);
        if (Err < 0) return(Err);

/* Search for the opening parentheses. */
        for (i = ParStkIndex-1; r = ParseStack[i]+1 ; i--) {
                if (i < 0) return(-3);   /* Missing '(' to match ')'. */
                else if (VAL_TYPE(r) == OPENPAREN)
                        break;           /* Exit loop. */
                else if (VAL_TYPE(r) == LEFTBRACKET)
                        return(-18);     /* Mismatched brackets. */
        }

/* Take care of it if it's a functor with its arguments. */
        if ((i>0) && (VAL_TYPE(ParseStack[i-1]+1) == FUNCTOR)) {
                /* Mark FUNCTOR as having a space if the closing
                 * parenthesis had a space after it.  This mark
                 * will be interpreted by the unparser.
                 */
                Err = reduceFunctorArgs(i-1);
                if (Err > 0) {
                        (ParseStack[ParStkIndex-1]+1)->ValType |=
                                HAS_SPACE(q);
                        /* Note: Throw away ')' */
                }
                return(Err);
        }

/* It must be parentheses used for grouping.   */
        while (ParStkIndex > i+2)
                if ((Err=reduce()) < 0) return(Err);

if (ParStkIndex < i+2) {
                /* Missing expression within ()'s */
                return(-17);
        }

/* Put the structure in place of the OPENPAREN, on
         * top of the parse stack.
         */
                                /* Note: Discard close parenthesis.*/
        p = popParseStack();    /* The expression between ()'s  */
        popParseStack();        /* Discard the open parenthesis.*/
        pushParseStack(p);
        return(1);
case RIGHTBRACKET:               /* "]" */
        /* Reduce any expressions on the ParseStack[] before
         * building the list structure.
         */
        Prec = prec(p);
        while ((Err=reductionNeededFor(Prec,NOTOP)) > 0)
                if ((Err=reduce()) < 0) return(Err);
        if (Err < 0) return(Err);
```

```
                    Err = reduceList();
                    if (Err > 0) {
                            (ParseStack[ParStkIndex-1]+1)->ValType |= HAS_SPACE(q);
                            /* Note: Discard the "]". */
                    }
                    return(Err);
        case INTNUM:
        case FLOATNUM:
                    /* If top of stack is a unary minus sign token, combine to
                     * form a negative number.  Otherwise goto default case.
                     */
                    if (ParStkIndex <= 0) {

/* Parse stack is empty.  Easy case:    */
                            pushParseStack(p);
                            return(1);
                    }
                    else tos = ParseStack[ParStkIndex-1];

if ( ((tos+1)->value.Name == HyphenIndex)        &&
                         (opType(ASSOC(tos+1)) == PREF)              &&
                         (tos->value.Length == 1)               )    {
                            if (VAL_TYPE(q) == INTNUM)
                                    q->value.intVal = -(q->value.intVal);
                            else
                                    q->value.floatVal = -(q->value.floatVal);
                            popParseStack();            /* Discard "-" */
                            pushParseStack(p);
                            return(1);
                    }
                    /* else fall through to default case: */
        default:
                    Prec = prec(p);
                    Assoc = ASSOC(q);
                    while ( ( (Err=reductionNeededFor(Prec,Assoc)) > 0) &&
                            ( (Err=reduce()) > 0)    )
                            ;
                    if (Err < 0) return(Err);
                    pushParseStack(p); /* Safe to push on parse stack. */
                    return(1);

} /* switch */
}
/*************************************************************************

REDUCE

PURPOSE
        Reduce an INFIX, PREFIX, or POSTFIX operator and the appropriate
        arguments on the ParseStack[] to a single structure on the
        ParseStack[].

RETURNS
        An integer representing success (1) or a negative error code
        representing failure [-1, -2, -8 or -9].

*************************************************************************/
int
reduce()

{
        extern char *copmalloc();
        extern STRUCT *popParseStack();
        extern unsigned char opType();

STRUCT *j;          /* Index into token record stream.   */
        STRUCT *k;          /* Index into token record stream.   */
        STRUCT *l;          /* Index into token record stream.   */
        STRUCT *new;        /* Resulting (reduced) structure.    */
```

```
        if ((j = popParseStack()) == NULL)
                return(-1);     /* Reduce error - Nothing on stack. */
        if ((k = popParseStack()) == NULL)
                return(-1);     /* Reduce error - Nothing on stack. */ if ((opType(ASSOC(k+1))==INF) && (k->value.Length == 1)) {
                if ((l = popParseStack()) == NULL)
                        return(-1);     /* Reduce error - Nothing on stack. */

/* Allocate a new structure. */
                new = (STRUCT *)copmalloc(sizeof(STRUCT) * 4);
                if (new==NULL) return(-100);
                new->ValType        = LENGTH;
                new->value.Length   = 3;

moveArg(k,new+1);
                moveArg(l,new+2);
                moveArg(j,new+3);

if (VAL_TYPE(new+1) == COMMA) {
                        /* We now know the COMMA isn't a separator for
                         * list elements or functor arguments:  it's
                         * a real infix operator.
                         */
                        (new+1)->ValType = XFY | SYMBOL;
                } pushParseStack(new);    /* Put the result on the stack. */
                return(1);
        }
        else if ((opType(ASSOC(j+1))==POST) && (j->value.Length == 1)) {

/* Allocate a new structure. */
                new = (STRUCT *)copmalloc(sizeof(STRUCT) * 3);
                if (new==NULL) return(-100);
                new->ValType        = LENGTH;
                new->value.Length   = 2;

moveArg(j,new+1);
                moveArg(k,new+2);

pushParseStack(new);    /* Put the result on the stack. */
                return(1);
        }
        else if ((opType(ASSOC(k+1))==PREF) && (k->value.Length == 1)) {

/* Allocate a new structure. */
                new = (STRUCT *)copmalloc(sizeof(STRUCT) * 3);
                if (new==NULL) return(-100);
                new->ValType        = LENGTH;
                new->value.Length   = 2;

moveArg(k,new+1);
                moveArg(j,new+2);

pushParseStack(new);    /* Put the result on the stack. */
                return(1);
        }
        else if ((VAL_TYPE(k+1)==OPENPAREN) || (VAL_TYPE(j+1)==OPENPAREN))
                return(-8);     /* reduce(): Missing matching ')'. */
        else if ((VAL_TYPE(k+1)==LEFTBRACKET) || (VAL_TYPE(j+1)==RIGHTBRACKET))
                return(-9);     /* reduce(): Missing matching ']'. */
        else    return(-2);     /* reduce(): Missing operator. */
}
/****************************************************************************

REDUCEFUNCTOPARGS

PURPOSE
        Reduce a functor and its arguments on the ParseStack[] into a single
        multi-argument structure.
```

NOTES

```
        reduceFunctorArgs() reduces structures of the form:

foo(bar,baz,blat)

with any number of arguments.

The calling routine is responsible for determining the
        existence and location of the functor in the parse stack.
        This routine reports an error if the stack does not
        contain the following types of items:

FUNCTOR OPENPAREN ARG1 COMMA ARG2 COMMA ARG3 etc ending with the last argument, of which there must be at least one.
*********************************************************************/
int
reduceFunctorArgs(FunctorIndex)
int     FunctorIndex;           /* Location of the functor in parse stack. */

{
        extern STRUCT *popParseStack();
        extern char *copmalloc();
        extern int pushParseStack();

STRUCT  *p;             /* Pointer to new structure to be built. */
        STRUCT  *q;             /* Temporary pointer to commas & (.      */
        int     j;              /* Index into new structure.             */
        int     NumArgs;        /* Number of arguments to the functor.   */

/* Every other item between FUNCTOR and top of stack is an
         * argument.
         */
        NumArgs = (ParStkIndex-FunctorIndex-1);
        if (NumArgs%2) {
                /* Not an even number of items betw. functor & top of stack. */
                return(-19); /* Illegal args to functor */
        }
        else NumArgs /= 2;

/* Create a new argument block and fill header cell. */
        p = (STRUCT *)copmalloc(sizeof(STRUCT) * (NumArgs+2));
        if (p==NULL) return(-100);      /* Out of memory space. */
        p->ValType      = LENGTH;
        p->value.Length = NumArgs+1;

/* Loop to copy the arguments off the parse stack one by one, from
         * last to first.  The last time through the loop, the functor
         * itself is copied.
         */
        for (j=NumArgs; j>=0; j--) {
                moveArg(popParseStack(),p+j+1); /* Probably should validate */

/* Delete the COMMA or OPENPAREN */
                switch (j) { /* j-th argument was just copied. */
                case 0:
                        /* 0-th argument is the functor itself.
                         * Re-mark the functor (which was just copied)
                         * as a symbol or variable, as appropriate.
                         *
                         * NOTE: The SPACE field of the functor was marked
                         *       in markAsUnambig(). If the functor was a
                         *       VARIABLE; otherwise it is unmarked and the
                         *       functor is a SYMBOL (or COMMA which we mark
                         *       as a SYMBOL). This INTENTIONALLY resets the
                         *       SPACE field to 0 and the ASSOC field to
                         *       NOTOP (i.e. 0).
                         */
                        if (HAS_SPACE(p+1))
```

```
                                (p+1)->ValType = VARIABLE;
                        else
                                (p+1)->ValType = SYMBOL;
                        break;
                case 1:
                        q = popParseStack();
                        if (VAL_TYPE(q+1) == OPENPAREN) {
                                /* All is well */
                                break;
                        }
                        else {
                                /* I believe this is impossible. */
                                for ( ; j <= NumArgs; j++) {
                                        if (VAL_TYPE(p+j+1) == STRUCTURE)
                                                freeStruct((p+j+1)->value.ArgPtr);
                                }
                                free(p);
                                if (q->value.Length > 1) freeStruct(q);
                                return(-99);    /* parser bug */
                        }
                        break;
                default:
                        q = popParseStack();
                        if (VAL_TYPE(q+1) == COMMA) {
                                /* All is well */
                                break;
                        }
                        else {
                                /* False alarm.  Deallocate the new block,
                                 * after freeing any structures the arguments
                                 * may be pointing to.
                                 */
                                for ( ; j <= NumArgs; j++) {
                                        if (VAL_TYPE(p+j+1) == STRUCTURE)
                                                freeStruct((p+j+1)->value.ArgPtr);
                                }
                                free(p);
                                if (q->value.Length > 1) freeStruct(q);
                                return(-19);    /* Illegal args to functor. */
                        }
                        break;

} /* switch */
        } pushParseStack(p);      /* Put result on the ParseStack[]. */
        return(1);              /* Success! */
}
/****************************************************************************

REDUCELIST

PUPROSE
        Reduce a set of structures on the ParseStack[] into a single
        list structure.

RETURNS
        Negative error code if syntax error encountered, otherwise +1.

NOTES
        reduceList() reduces structures of the form:

[bar,baz,blat]  - 2 argument structure with "." principal functor
        []              - empty list
        [foobar]
****************************************************************************/
int
reduceList()

{
```

```
        extern STRUCT *makeToken();
        extern STRUCT *popParseStack();
        extern STRUCT *ParseStack[];
        extern int ParStkIndex;
        extern int makeList();

STRUCT  *p;     /* Temporary STRUCT ptr for slight optimization. */
        int     i;      /* Index into ParseStack[]                      */

/* Search for the opening bracket. */
        for (i = ParStkIndex-1; ; i--) {
                if (i < 0) return(-4);  /* Missing '[' to match ']'. */
                else if (VAL_TYPE(ParseStack[i]+1) == LEFTBRACKET)
                        break;   /* exit loop */
                else if (VAL_TYPE(ParseStack[i]+1) == OPENPAREN)
                        return(-18); /* Mismatched brackets */
        } if (i == ParStkIndex-1) {
                /* Empty list. */
                popParseStack();            /* Discard the "[".            */
                p = &TokenStack[2 * ParStkIndex]; /* Point to static memory. */
                makeToken(p,"[]",SYMBOL);    /* Build token there.    */
                ParseStack[ParStkIndex++] = p;  /* pushParseStack(p).  */
                return(1);
        }
        else {
                /* Nonempty list.       */
                return(makeList(i));
        }
}
/***********************************************************************

REDUCTIONNEEDEDFOR

PURPOSE:
        Determine whether a reduction should be performed on the Parse
        Stack to accommodate an incoming token of precedence Prec and
        associativity Assoc.

RETURNS:
        1 if a reduction is needed.
        0 if no reduction is needed.
        Negative error code if syntax error detected.
***********************************************************************/ int
reductionNeededFor(Prec,Assoc)
int     Prec;           /* The precedence of the incoming token. */
unsigned char Assoc;    /* The associativity of the incoming token. */

{
        extern unsigned char opType();
        extern int lookUpOp();
        extern STRUCT *ParseStack[];
        extern OPTABLE OpTable[];
        extern int ParStkIndex;

STRUCT  *p;             /* Temporary STRUCT ptr for optimization. */
        unsigned char StackAssoc; /* */
        int StackPrec;
        int i;
        int j;

/* Return with no reduction needed for an empty Parse Stack. */
        if ((i=ParStkIndex)==0) return(0);

/* Check whether top of Parse Stack is a term. */
        if (ParseStack[--i]->value.Length > 1) goto seconditem;
```

```
p = ParseStack[i]+1;    /* Optimizing assignment. */

/* If incoming token is '(' or '[', no reduction is required at
 * this point.
 */
if ((VAL_TYPE(p)==OPENPAREN) || (VAL_TYPE(p)==LEFTBRACKET)) return(0);

/* Check for a postfix, prefix or infix operator. */
switch (opType(ASSOC(p))) {
case POST: /* A postfix operator implies we need to reduce the
            * Parse Stack at this point.
            */
        return(1);
case PREF:
case INF: /* No reduction is required at this point if the token
           * is a prefix or infix operator.
           */
        return(0);
case NOTOP: /* Token is not an operator. */
        goto seconditem;
default:
        return(-99); /* Parser bug. */
} seconditem:
/* Top of stack was a term or beginning of a term.  (Proof?)
 */
if ((Assoc == FX) || (Assoc == FY))
        return(-16);    /* Missing comma or operator. */

/* The next item down, if it exists, must be an operator or
 * open parenthesis or bracket.
 */ if (i == 0) return(0);          /* No second item.  OK. */

/* Signal an error when two consecutive terms on the Parse Stack. */
if (ParseStack[--i]->value.Length > 1) return(-16);

p = ParseStack[i]+1;
if ((VAL_TYPE(p)==OPENPAREN) || (VAL_TYPE(p)==LEFTBRACKET)) return(0);

StackAssoc = ASSOC(p);
switch (StackAssoc) {
case NOTOP:
case XF:
case YF:
        return(-16);    /* Two consecutive terms on stack. */
default:
        j=lookUpOp(p->value.Name,opType(StackAssoc));
        StackPrec = OpTable[j].Prec;
        if (StackPrec > Prec) return(1);
        else if (StackPrec < Prec) return(0);

/* The two operators have equal precedence.  Check
         * associativities.
         *
         * The following four cases are handled separately for
         * clarity and for ease of modification, though it makes
         * some of the tests redundant (i.e. same thing happens
         * regardless of outcome).
         *
         * Discretion is being used here in handling technically
         * illegal combinations of operators of equal precedence.
         * The way these cases are being resolved is subject to
         * revision.
         */
        if (StackAssoc == FY || StackAssoc == XFY) {
                if (Assoc == YF || Assoc == YFX) {
```

```
                        /* Technically an error:  ?FY T YF?.
                         * However, we'll associate to the left.
                         */
                        return(1);
                }
                else {
                        /* Assoc == XF or XFX or XFY */
                        return(0);
                }
        }
        else {
                /* StackAssoc == XF or XFX or XFY */
                if (Assoc == YF || Assoc == YFX) {
                        return(1);
                }
                else {
                        /* Technically an error:  ?FX T XF?.
                         * However, we'll associate to the right.
                         */
                        return(0);
                }
        }
        break;
    } /* switch */
}
/*******************************************************************************

RESOLVE

PURPOSE
        To select proper interpretation of a token (p) waiting to go
        onto the ParseStack by looking at the token that comes after
        it (q).  Also narrows down the possible interpretations of  q.

RETURNS:
        1 if successful, negative error number if all interpretations
        of some token (either  p  or  q) are ruled out.

NOTES
        Disambiguation is based on one-token lookahead (q):
        ----------------------   -------  -------
        |   |   |   |   |   | <== |   | <== |   |
        ----------------------   -------  -------
            ParseStack             p        q P is actually a pointer to two STRUCT cells.

------            ----------------------
                | p--|--------->  | LENGTH  | Val Codes|
                ------            ----------------------
                                  |    1    | NAME,etc |
                                  ----------------------
                                       p        p+1

The LENGTH field (p->ValType) is either "LENGTH" (macro for 0x09)
        if  p  is already unambiguous, or it contains information on the
        POSSIBLE interpretations of the token.  Five bits are used:
                bit     interpretation
                7       1 = could be a plain atom (0 = couldn't be)
                6       1 = could be a functor
                5       1 = could be a prefix operator
                4       1 = could be an infix operator
                3       1 = could be a postfix operator
                2,1,0   always 0

As a result of passing through resolve(p,q),  p  is completely
        disambiguated, and  q  is disambiguated as much as possible
        based on how  p  was resolved.  When a token is completely
        disambiguated, its LENGTH field is set back to "LENGTH" and
        the Val Code field ((p+1)->ValType) is set properly (particularly
        the OP bits, bits 6,5,4).
```

```c
resolve(p,q)
STRUCT *p;
STRUCT *q;

{
        extern int lookUpOp();
extern int numInterps();
extern int selectFrom();
extern int resolveJustP();
extern OPTABLE OpTable[];

int     j;                      /* NameTable[]/OpTable[] index. */
char LookAheadChar;
int Tie;
int Prec;
int MaxPrec;                    /* For searching for the        */
unsigned char OpType;
unsigned char MaxOpType;        /* ... operator with highest */
STRUCT *Token;
STRUCT *MaxToken;               /*       ... precedence         */

/* The very first step is to see what is possible for  q  a priori
 * (without looking at p). If there is any possible ambiguity in
 * q  it will be detected at this point. After this, any token
 * with ValType of its header cell equal to LENGTH can be assumed
 * to be unambiguous and to have the ValType of its second cell
 * marked properly.
 */
switch (VAL_TYPE(q+1)) {
case SYMBOL:
case VARIABLE:
        /* These types of tokens can always be terms, and
         * they might be functors or operators.
         */
        q->ValType = TERM|FUNC|PREF|INF|POST; /* totally ambiguous. */
        selectFrom(TERM|FUNC|PREF|INF|POST, q);
        break;
case COMMA:
        /* COMMA can ONLY be a functor or an infix operator. We
         * do not allow commas to be interpreted as terms. We do
         * not allow the KE to declare comma to be any other type
         * of operator.
         */
        q->ValType = FUNC|INF;
        selectFrom(FUNC|INF, q);
        break;
default:
        /* All other types of tokens are unambiguous. */
        break;
}

/* If one of the tokens is unambiguous, then only the other
 * one needs to be resolved.
 */
if ((p==NULL) || (VAL_TYPE(p) == LENGTH))
        return(resolveJustQ(p,q));
else if (VAL_TYPE(q)==LENGTH)
        return(resolveJustP(p,q));

/* Get here iff both  p  and  q  are ambiguous.
 *  p  canNOT be a FUNCTOR if you get here, since  q  cannot
 * be an OPENPAREN since  q  is ambiguous.
 */
selectFrom(TERM|PREF|INF|POST, p);
if (VAL_TYPE(p) == LENGTH) return(resolveJustQ(p,q));

/*
 * The possibilities for  q  are (almost any) subset of
```

```
 *
 *              {term, functor, prefix, infix, postfix}.
 *
 * The possibilities for  p  are reduced to one of the following sets,
 * since  p  has been resolved against the token that came before it.
 *
 *              {term, prefix}
 *              {infix, postfix}.
 */
if (!(q->ValType & (INF | POST))) {
        p->ValType = p->ValType & (INF | PREF);
        if (numInterps(p) == 1)
                return(resolveJustQ(p,q));
        else
                /* Parser bug: that should have settled p. */
                return(-99);
}

/* At this point, if one of the possibilities for  q  is  functor,
 * we do a one character lookahead and declare  q  to be a functor if
 * and only if the character after  q  is a "(".
 */
if (q->ValType & FUNC) { /* q  could be a functor. */
        LookAheadChar = READ_CHAR();
        UNREAD_CHAR(LookAheadChar);
        if (LookAheadChar == '(') {
                selectFrom(FUNC,q);
                selectFrom(PREF|INF, p);
                if (VAL_TYPE(p) != LENGTH)
                        return(-99);
                else
                        return(1);
        }
        else {
                selectFrom(TERM|PREF|INF|POST, q);
                if (VAL_TYPE(q)==LENGTH) return(resolveJustP(p,q));
        }
}

/* Unary minus sign gets special treatment:  If - is still
 * ambiguous as between unary minus and binary minus (and
 * God forbid postfix or term), rule out unary minus!!
 * This is specifically designed to allow the desired interpretation
 * of expressions like "battery-not-charged", which is
 * "-(battery,-(not,charged))" rather than
 * "-(battery,not(-(charged)))".
 *
 * One consequence of this is that  "not -3"  is parsed as
 * -(not,3)  rather than  not(-3).
 * Hopefully it will not have other undesirable consequences.
 */
if ((q+1)->value.Name == HyphenIndex) q->ValType &= ~PREF;

/* The set of possibilities for  p  is either
 *      {term, prefix} or
 *      {infix, postfix}.
 *
 * There are 6 possible sets of possibilities for q:
 *      {term, infix}
 *      {term, postfix}
 *      {term, infix, postfix}
 *      {term, prefix, infix}
 *      {term, prefix, postfix}
 *      {term, prefix, infix, postfix}.
 *
 * We shall pick the operator of highest precedence and resolve in
 * favor of it.
 */
```

```
/* Initialize for the search */
Tie = TRUE;
MaxToken = NULL;
MaxOpType = NOTOP;
MaxPrec = MINPREC;

Token = p;
tokenloop: {  /* Do it once for  p  and once for  q.    */

OpType = PREF;
        typeloop: { /* Do it for PREF, INF and POST.    */ if ((Token->ValType)&OpType) {
                        /* This token can be this type of operator */
                        j = lookupOp((Token+1)->value.Name,OpType);
                        if ((Prec = OpTable[j].Prec) > MaxPrec) {
                                Tie = FALSE;
                                MaxPrec = Prec;
                                MaxToken = Token;
                                MaxOpType = OpType;
                        }
                        else if (Prec == MaxPrec) {
                                Tie = TRUE;
                        }
                }
                switch (OpType) {
                case PREF:
                        OpType = INF;
                        goto typeloop;
                case INF:
                        OpType = POST;
                        goto typeloop;
                case POST:
                        break;
                }
        } /* Typeloop */
        if (Token == p) {
                Token = q;
                goto tokenloop;
        }
} /* Tokenloop */ if (Tie) return(-15);  /* Illegal operator combination. */
else if (MaxToken == p) {
        selectFrom(MaxOpType,p);
        return(resolveJustQ(p,q));
}
else if (MaxToken == q) {
        selectFrom(MaxOpType,q);
        return(resolveJustP(p,q));
} return(-99);    /* Parser bug if you get here. */
}
/************************************************************************

RESOLVEJUSTP

PURPOSE
        Resolve token  p  in case  q  is unambiguous and  p  is ambiguous.

RETURNS
        1 if successful, negative error code if no interpretation of  p
        is consistent with  q  or if it can't resolve between two or more
        possible interpretations.  (This is different than resolveJustQ,
        which is satisfied if  q  is only partially disambiguated.)

NOTE
        It is an error to call this routine if  q  is ambiguous
        or if  q  is  NULL.
```

```
        If  p  is unambiguous upon entry, this routine will
        verify that the interpretations of  p  and  q  are consistent
        with each other.

RETURNS
        +1 if successful. (Side effect:  p  is disambiguated).
        Negative error code if no interpretation of  p  is consistent
        with  q  and with the previous restrictions put on  p.

*****************************************************************************/
int
resolveJustP(p,q)
STRUCT *p;
STRUCT *q;

{
        extern unsigned char opType();
        extern int numInterps();
        extern int selectFrom();

if ((q==NULL) || (VAL_TYPE(q) != LENGTH)) {
                /* Parser bug:  q is ambiguous.  Shouldn't have called
                 * this routine.
                 */
                return(-99);
        }

/* If  p  is unambiguous, we will mark it as if it were an
         * ambiguous token with just one possible interpretation.
         * That makes its treatment uniform in rest of procedure.
         */
        if (VAL_TYPE(p) == LENGTH) {
                switch (VAL_TYPE(p+1)) {
                case SYMBOL:
                case VARIABLE:
                case COMMA:
                        if (ASSOC(p+1) == NOTOP)
                                p->ValType = TERM;
                        else
                                p->ValType = opType(ASSOC(p+1));
                        break;
                case FUNCTOR:
                        p->ValType = FUNC;
                        break;
                default:
                        break;
                }
        } switch(opType(ASSOC(q+1))) {
case INF:
case POST:
        selectFrom(TERM|POST, p);
        if (numInterps(p) != 1) return(-15); /* Illegal op. combo. */
        else return(1);
case PREF:
        selectFrom(PREF|INF, p);
        if (numInterps(p) != 1) return(-15); /* Illegal op. combo. */
        else return(1);
case NOTOP:
        break;
default:
        return(-99);    /* Parser bug.                          */
}

/* q is not an operator. */
switch (VAL_TYPE(q+1)) {
case CLOSEPAREN:
case RIGHTBRACKET:
case ENDTOKEN:
```

```c
                selectFrom(TERM|POST, p);
                if (numInterps(p) != 1) {
                        /* Incomplete term or misplaced ']' or ')'. */
                        return(-22);
                }
                else return(1);
        case OPENPAREN:
                if (p->ValType & FUNC) {
                        selectFrom(FUNC, p);
                        if (numInterps(p) != 1) return(-99);
                        else return(1);
                }
                else {
                        selectFrom(PREF|INF, p);
                        if (numInterps(p) != 1) return(-16); /* Missing , or op. */
                        else return(1);
                }
        default:
                /* case symbol, functor, integer, float,
                 * variable, or leftbracket:
                 */
                selectFrom(PREF|INF, p);
                if (numInterps(p) != 1) return(-16); /* Missing , or op. */
                else return(1);
        }
}
/************************************************************************

RESOLVEJUSTQ

PURPOSE
        Given that  p  is unambiguous, reduce the number of possibilities for
        q as much as possible and then return.

RETURNS
        Number of interpretations of  q, if greater than 0.  Negative
        error code if no interpretations of  q  consistent with  p  are
        possible.

NOTE
        Can only be called if  p  is an UNAMBIGUOUS token.

This is really just one case of  resolve(p,q)  which has been
        separated out to shorten that procedure.  But it also means it
        can be called from several places within  resolve, as soon as
        p  has been disambiguated.

*************************************************************************/ resolveJustQ(p,q)
STRUCT *p;
STRUCT *q;

{
        extern int selectFrom();

unsigned char   OpType;
        extern unsigned char opType();

if (VAL_TYPE(q)==LENGTH) {
                /* q has ALREADY been disambiguated. */
                if (p == NULL) return(1);
                else if ((VAL_TYPE(p+1)==FUNCTOR) && (VAL_TYPE(q+1) != OPENPAREN))
                        return(-24);    /* Unexpected comma.     */
                else
                        return(1);
        } if (p == NULL) {
                /* q is the very first token. */
```

```
                return(selectFrom(TERM|FUNC|PREF, q));
}
else if (VAL_TYPE(p)!=LENGTH) {
        /* Parser bug: this routine should not have been called. */
        return(-99);
} if (VAL_TYPE(p+1) == FUNCTOR) {
        if (VAL_TYPE(q+1) == OPENPAREN) return(1);
        else if ((p+1)->value.Name == CommaIndex)
                return(-24); /* Unexpected Comma. */
        else
                return(-99);
}

OpType = opType(ASSOC(p+1));
if (OpType==NOTOP || OpType==POST) {

/* "p" is either a postfix operator or not an operator
         * at all.
         */
        switch(VAL_TYPE(p+1)) {
        case INTNUM:
        case FLOATNUM:
        case CLOSEPAREN:
        case RIGHTBRACKET:
        case SYMBOL:
        case VARIABLE:
                /* p just ended a term. Must be followed by an
                 * operator or an ending symbol.
                 */
                switch(VAL_TYPE(q+1)) {
                case INTNUM:
                case FLOATNUM:
                case OPENPAREN:
                case LEFTBRACKET:
                        return(-16); /* Missing , or op. */
                case SYMBOL:
                case VARIABLE:
                case COMMA:
                        if (selectFrom(INF|POST, q) < 0) return(-16);
                        else return(1);
                case CLOSEPAREN:
                case RIGHTBRACKET:
                case ENDTOKEN:
                        return(1);
                }
                break;
        case COMMA:
                /* If Comma is not an infix, it must be a functor.
                 * But we already handled functors.
                 */
                return(-99);

case OPENPAREN:
                switch(VAL_TYPE(q+1)) {
                case INTNUM:
                case FLOATNUM:
                case OPENPAREN:
                case LEFTBRACKET:
                        return(1);
                case SYMBOL:
                case VARIABLE:
                        selectFrom(TERM|FUNC|PREF,q);
                        return(1);
                case COMMA:
                        if (selectFrom(FUNC, q) < 0) {
                                /* Illegal operator combination. */
                                return(-15);
                        }
```

```
                    else return(1);
            case CLOSEPAREN:
                    /* Missing expr. within ()'s. */
                    return(-17);
            case RIGHTBRACKET:
                    /* Mismatched brackets: [) or (]. */
                    return(-18);
            case ENDTOKEN:
                    /* Premature end of file or string. */
                    return(-7);

} /* switch */
            break;
    case LEFTBRACKET:
            switch(VAL_TYPE(q+1)) {
            case INTNUM:
            case FLOATNUM:
            case OPENPAREN:
            case LEFTBRACKET:
            case RIGHTBRACKET:
                    return(1);
            case CLOSEPAREN:
                    return(-18); /* Mismatched brackets: [) or (]. */
            case ENDTOKEN:
                    return(-7); /* Premature end of file or string. */
            case SYMBOL:
            case VARIABLE:
                    selectFrom(TERM|FUNC|PREF,q);
                    return(1);
            case COMMA:
                    if (selectFrom(FUNC, q) < 0) return(-15); /* Illegal op. combi
tion.*/
                    else return(1);
            }
            break;
    case FUNCTOR:
            if (VAL_TYPE(q+1) == OPENPAREN) return(1);
            else return(-99);

} /* switch */
}

/* Get to here if and only if  p  is either an infix or prefix
 * operator.
 */
switch(VAL_TYPE(q+1)) {
case SYMBOL:
case VARIABLE:
        selectFrom(TERM|FUNC|PREF, q);
        return(1);
case COMMA:
        if (selectFrom(FUNC, q) < 0) return(-15); /* Illegal op. comb.*/
        else return(1);
case INTNUM:
case FLOATNUM:
case OPENPAREN:
case LEFTBRACKET:
        return(1);
case CLOSEPAREN:
case RIGHTBRACKET:
case ENDTOKEN:
        return(-15); /* Illegal operator combination. */
}
}
/****************************************************************************
                            SELECTFROM
```

PURPOSE
    Reduce the possible interpretations of a token to a subset of
    those specified in the first argument.

CALL selectFrom(Options,q) where:
        Options specifies a set of interpretations to choose from
            (e.g. Options == TERM | FUNC | PREF)

q       is a token which is either ambiguous or has never
            been "resolved" before.

RETURNS

+1     At least one of the specified interpretations is consistent
          with the given token.

-1     Otherwise.

As a side effect, if more than one of the interpretations is
consistent, the token is marked as ambiguous, with the consistent
interpretations marked. IF exactly one is consistent, then
the token is marked as unambiguous and the appropriate OP field
code is set.

```
*************************************************************************/
int
selectFrom(Options,q)
unsigned char Options;    /* Bitfield set of options to choose.   */
STRUCT *q;                /* The token needing resolution.        */

{
        extern unsigned char opType();
        extern int numInterps();
        extern unsigned char NamePropTable[];

unsigned char OpType;

if ((q==NULL) || (Options & 0x07)) {
                /* Improper call to the routine. */
                return(-99);
        } if (!Options) {
                /* Certainly can't satisfy a request with no options.  */
                return(-1);
        } switch(VAL_TYPE(q+1)) {
        case COMMA:
                /* Only two possible interpretations of commas. */
                Options = Options & (FUNC|INF);
                if (!Options) return(-1);
                break;
        case SYMBOL:
        case VARIABLE:
                break;
        case INTNUM:
        case FLOATNUM:
                if (TERM & Options) return(1);
                else return(-1);
        case FUNCTOR:
                /* If marked as FUNCTOR, must already be unambiguous. */
                if (FUNC & Options) return(1);
                else return(-1);
        default:
                /* No other tokens can be terms, functors or operators. */
                return(-1);
        }

/* Get here if  q  is a COMMA, VARIABLE, or SYMBOL.  */

/* If  q  is unambiguous, see if its interpretation agrees with one
         * of the options specified in Options.
```

```
    */
    if (VAL_TYPE(q)==LENGTH) {
            if ((OpType = opType(ASSOC(q+1))) != NOTOP) {
                    if (Options & OpType) return(1);
                    else return(-1);
            }
            /* Since functors have been screened for in the first switch,
             * any unambiguous comma, variable or symbol which is not
             * an operator must be a term.
             */
            else if (TERM & Options) return(1);
            else return(-1);
    }

/* Get here if  q  is ambiguous.
     * Now rule out those options from Options which can't be satisfied by
     * q.
     */

/* Work backwards from what  q  is ALREADY reduced to. */
    Options &= q->ValType;

/* Only allow those operators which the NamePropTable[] says are
     * declared for  q.
     */
    Options &= (TERM|FUNC|NamePropTable[(q+1)->value.Name]);

/* Don't allow functor if there's a space after. */
    if (HAS_SPACE(q+1)) Options &= ~FUNC;

/* See what, if any, options are left for  q. */
    q->ValType = Options;
    if (!Options) return(-1);                /* No options left. */
    else return(numInterps(q));
}
February 12,1986  14:58:23   C:\PATENT\reason.c  Page 1

/*********************************************************************

REASON.C

Copyright (C) 1985 Teknowledge, Inc.
                        525 University Ave.
                        Palo Alto, CA  94301
                        (415) 327-6600

PROGRAM
        COPERNICUS
        Version 1.0 - IBM PC

PURPOSE
        Copernicus is an inference engine implemented as a set of subroutines.

COMPILER
        Version 1.0:
                Computer Innovations Optimizing C86
                IBM-PC SUBROUTINES
        Contained in this file are declarations of the following Invocation
        Stack and Reason handling functions:

pushInvokeStk()
        popInvokeStk()
```

```
            getInvoke()
            getReason()
            setReason()

***************************************************************/ include <stdio.h>
include "typedef.h"
/***************************************************************
INFERENCE ENGINE
                        PUSHINVOKESTK PURPOSE
        Add an entry to the Invocation Stack.  The Invocation Stack contains
        all knowledge base entries (rules and facts) and objects (expressions)
        currently under consideration.

***************************************************************/ pushInvokeStk(EntryPtr,EntryType,EntryEnv,RetCode)
int *EntryPtr;          /* The entry to be pushed.                   */
int EntryType;          /* The entry's type (KBENTRY or OBJECT).     */
int EntryEnv;           /* The entry's binding environment index.    */
int *RetCode;           /* Success/failure return code.              */

{
        extern char *copmalloc();
        extern INVOKESTK *InvokeStkPtr;
        extern int InvokeStkNo;

INVOKESTK *p;

/* Allocate storage for new entry. */
        p = (INVOKESTK *) copmalloc(sizeof(INVOKESTK));
        if (p == (INVOKESTK *)NULL) {
                *RetCode = -100;        /* No more storage space. */
                return;
        }

/* Load information into the new entry on the Invocation Stack. */
        p->Type = EntryType;
        p->Env  = EntryEnv;
        p->SucceedFlg = FALSE;
        if (EntryType == OBJECT)
                p->item.Object = (STRUCT *) EntryPtr;
        else
                p->item.KBasePtr = (KBASE *) EntryPtr;

/* Insert at top of stack, reset top of stack pointer and
         * Invocation Stack counter.
         */
        p->Next = InvokeStkPtr;
        InvokeStkPtr = p;
        InvokeStkNo++;
}
/***************************************************************
INFERENCE ENGINE
                        POPINVOKESTK PURPOSE
        Remove the most recent entry from the Invocation Stack.

***************************************************************/ popInvokeStk()

{
        extern INVOKESTK *InvokeStkPtr;
        extern int InvokeStkNo;
```

```
        INVOKESTK *p;

/* Unlink and delete top entry, and decrement the Invocation Stack
         * counter.
         */
        if (InvokeStkPtr != (INVOKESTK *)NULL) {
                p = InvokeStkPtr->Next;
                free(InvokeStkPtr);
                InvokeStkPtr = p;
                InvokeStkNo--;
        }
}
/****************************************************************************
INFERENCE ENGINE
                                GETINVOKE PURPOSE
        Examine the Invocation Stack.
****************************************************************************/ getInvoke(StkPtr,EntryType,Entry,EntryEnv)
int **StkPtr;           /* Ptr to entry where search should begin.    */
int *EntryType;         /* Returned entry type (KBENTRY or OBJECT).   */
int **Entry;            /* The actual KB or Object entry.             */
int *EntryEnv;          /* The entry's binding environment index.     */

{
        extern INVOKESTK *InvokeStkPtr;

INVOKESTK *p;

/* After first checking incoming StkPtr, either start fetching
         * from the top of stack or begin fetching with the entry pointed to
         * in the stack list.
         */
        p = (INVOKESTK *) (*StkPtr);
        if (p == (INVOKESTK *)NULL)
                p = InvokeStkPtr;
        else
                p = p->Next;    /* New starting point. */

/* Return (by reference) the stack entry fields. */
        *EntryType = p->Type;
        if (p->Type == KBENTRY)
                *Entry = (int *)(p->item.KBasePtr);
        else
                *Entry = (int *)(p->item.Object);
        *EntryEnv = p->Env;
        *StkPtr = (int *)p;
}
/****************************************************************************
INFERENCE ENGINE
                                GETREASON

****************************************************************************/ getReason(StartPtr,Reason)
int *StartPtr;          /* A pointer into the Cache.                  */
REASON **Reason;        /* Ptr to ptr to returned associated reason.  */

{
        CACHEREC *CachePtr;

CachePtr = (CACHEREC *) StartPtr;
        if (CachePtr == (CACHEREC *)NULL)
                *Reason = (REASON *)NULL;
        else
                *Reason = CachePtr->Reason;
}
```

```
/****************************************************************
INFERENCE ENGINE
                            SETREASON

PURPOSE
        Add a "reason" (a rule label or other structure) to a Cache entry.

RETURN CODES
        0       Successful addition of reason to Reason List.
        3       Reason was NOT added to the Reason List.
****************************************************************/ setReason(CachePtr,Item,RetCode)
CACHEREC *CachePtr;     /* The entry to attach the reason to.       */
STRUCT *Item;           /* Struct. representing the actual reason.  */
int *RetCode;           /* Success/failure return code.             */

{
        extern char *copmalloc();

REASON *q;
        int Env1;       /* Binding environment. */
        int Env2;

*RetCode = 0;   /* Set "success/failure" code to "success". */

/* Check that the reason is not already present in the list.
         * If it is, don't add it a second time.
         */
        q = CachePtr->Reason;
        while(q) {
                Env1 = pushBindFrame(q->Item);
                Env2 = pushBindFrame(Item);
                if (unify(q->Item,Env1,Item,Env2)) {
                        *RetCode = 3;   /* Reason was not added to the list. */
                        popBindFrame(Env2);
                        popBindFrame(Env1);
                        return;
                }
                popBindFrame(Env2);
                popBindFrame(Env1);
                q = q->Next;
        }

/* Allocate storage for a new reason structure. */
        q = (REASON *) copmalloc(sizeof(REASON));
        if (q == (REASON *)NULL) {
                *RetCode = -100;        /* No more storage space. */
                return;
        }

/* Load fields and link-in. */
        q->Item = Item;
        q->Next = CachePtr->Reason;
        CachePtr->Reason = q;
}
/**************************************************************** scanner.c

Copyright (C) 1985 Teknowledge, Inc.
                    525 University Ave.
                    Palo Alto, CA  94301
                    (415) 327-6600

PROGRAM
        Copernicus
        Version 1.0 - IBM PC
```

NOTES
This is the "tokenizer" or lexical analyzer. It reads input from
either a string, pointed to by the global variable Str, or
the user-supplied function readc(). Which one it does is determined
by the global flag ReadStringFlg.

Entry point to the scanner is through the procedure getToken().

SUBROUTINES
        getToken()
        addName()
        addOp()
        alphanumericToken()
        hash()
        makeToken()
        needsQuotes()
        numToken()
        quotedAtomToken()
        readc()
        scannerInit()
        symbolAtomToken()

*************************************************************************/

```
#include <stdio.h>
include "typedef.h"
#include "parsedef.h"
include <ctype.h>        /* Character test macros. */ char    *StrPos;          /* Marker for next char to be read from Str.    */
char    *Str;

char    ReadBuf[100];
int     ReadBufIndex=0;   /* Must be set to 0 for proper initialization. */ extern char *SymbolChar;
```
/************************************************************************

GETTOKEN

PURPOSE
        Scan a rule string Str into a token stream.
NOTES
        Each token in the string is transformed into a block of two
        structures of type STRUCT.

The first STRUCT cell always contains LENGTH in the ValType field,
        and 1 in the value field. The second STRUCT cell contains
        the classification of the token in its ValType field (e.g.
        SYMBOL, OPENPAREN, etc), and the appropriate specifics in the
        value field (usually an index into the NameTable[]).

TokenBuf[] is a fixed size static buffer used for collecting the
        characters in most tokens except quoted atoms. Hence all
        tokens except quoted atoms are limited to TOKEN_BUF_SIZE-1
        characters.

RETURNS
        A token with related information.
        If unexpected end-of-file is encountered, an error message is
        printed and NULL is returned.

*RetCode is set to 0 for success. Otherwise it is set to
        a negative error code. The possible errors from the
        tokenizer getToken() are:

-7:  untimely EOF in comment or quoted string.
                -25: Too many characters to fit into token buffer
                -26: too many characters to fit into token buffer
                -27: unrecognized character.

```
*********************************************************************/
STRUCT *
getToken(p,RetCode)
STRUCT *p;              /* Ptr to two STRUCT cells to hold token.    */
int *RetCode;           /* Success/failure return code.              */

{
        extern STRUCT *makeToken();
        extern int numToken();

register int c;
        register int c1;
        char TokenBuf[TOKEN_BUF_SIZE];
        char *str;              /* Dynamically allocated buffer.        */
        int RetVal;             /* 0(not num); 1(int); 2(float), <0(error) */

*RetCode = 0;           /* Success, until proven otherwise.     */ startparse:
        /* Scan past blanks, CRs, NLs, and TABs.
         * NOTE: Can't embed the READ_CHAR() macro inside the IS_SPACE()
         * macro, because READ_CHAR() would get expanded at least twice,
         * causing 2 or more characters to be read when only one is needed.
         */
        for (c=READ_CHAR(); IS_SPACE(c) ; c=READ_CHAR()) ;

/* Strip comments. Scan until a comment delimiter is found.
         * NOTE: There is no capability for comment nesting yet. This
         * can be installed by using a nesting depth counter, incrementing
         * the counter when a begin comment delimiter is encountered and
         * decrementing the counter when an end comment delimiter is
         * encountered.
         */
        if (c == '/') {
                if ((c1=READ_CHAR())=='*') {
                        loop1:
                        c = READ_CHAR();
                        if (IS_END_CHAR(c)) {
                                /* Untimely EOF found. */
                                *RetCode = -7;
                                return((STRUCT *)NULL);
                        }
                        if (c=='*') {
                                if ((c=READ_CHAR())=='/') goto startparse;
                                else UNREAD_CHAR(c);
                        }
                        goto loop1;
                }
                else UNREAD_CHAR(c1);
        }

/* Build token. The real work begins here. */
        switch(c) {
        case '\0':
        case EOF: return(makeToken(p,"eof",ENDTOKEN));
        case '(': return(makeToken(p,"(",OPENPAREN));
        case ')': return(makeToken(p,")",CLOSEPAREN));
        case '[': return(makeToken(p,"[",LEFTBRACKET));
        case ']': return(makeToken(p,"]",RIGHTBRACKET));
        case ',': return(makeToken(p,",",COMMA));
        case '|': return(makeToken(p,"|",SYMBOL));
        case '"':
        case '\'':
                /* An atom entered between single or double quotes. */
                if ((RetVal = quotedAtomToken(c,&str)) < 0) {
                        /* Parsing error of some sort.*/
                        *RetCode = RetVal;
                        return((STRUCT *)NULL);
                }
```

```
            makeToken(p,str,SYMBOL);
            free(str);      /* Dynamic buffer for quoted strings. */
            return(p);
    case '.':
            /* Dot followed by white space or EOF or EOS is a terminator.
             * Otherwise it's a functor, beginning of a real number, or
             * part of a symboltoken.
             * NOTE:  Shouldn't embed the PEEK_CHAR() macro inside the
             * IS_SPACE() or IS_END_CHAR() macros.  This is very bad
             * practice that will only sneak up behind you and bite!!
             */
            c1 = PEEK_CHAR();
            if (IS_SPACE(c1) || IS_END_CHAR(c1))
                    return(makeToken(p,". ",ENDTOKEN));
            break;
    default:
            /* No match found - it could be a symbol or a number. */
            break;
    } /* switch */

/* Most common case first for speed optimization: */
    if (islower(c)) {
            /* Lower case letter denotes beginning of an unquoted atom. */
            alphanumericToken(c,TokenBuf);
            makeToken(p,TokenBuf,SYMBOL);
            return(p);
    }
    if (isupper(c) || (c == '_')) {
            /* Upper case letter or _ denotes beginning of a variable. */
            alphanumericToken(c,TokenBuf);
            makeToken(p,TokenBuf,VARIABLE);
            return(p);
    }

/* numToken()  must come before  symbolToken(), otherwise leading
     * decimal point will not be recognized as decimal point.
     */
    if (isdigit(c) || (c == '.')) {
            /* Look for a real or integer number. */
            switch (RetVal = numToken(c,TokenBuf)) {
            case 0:
                    /* Not a number. */
                    break;
            case 1:
                    /* Integer number. */
                    makeToken(p,TokenBuf,INTNUM);
                    return(p);
            case 2:
                    /* Floating point number. */
                    makeToken(p,TokenBuf,FLOATNUM);
                    return(p);
            default:
                    /* Syntax error. (i.e. buffer overflow) */
                    *RetCode = RetVal;
                    return((STRUCT *)NULL);
            }
    } if (IS_SYMBOL_CHAR(c)) {
            /* Special symbol denotes beginning of a "symbol atom", i.e.
             * an atom make up entirely of special characters.  The
             * list of special characters is maintained in a global
             * string  SymbolChar.  At this writing
             *         SymbolChar = "+-*\/<>=`~:.?#$&%{}"
             */
            symbolAtomToken(c,TokenBuf);
            makeToken(p,TokenBuf,SYMBOL);
            return(p);
    }
```

```
        /* Unrecognized character.  If it's not a control character,
         * issue a diagnostic message.  In any case, ignore the
         * character and continue parsing with the next character.
         */
        if (!isentrl(c))
                parseError(-27);
        goto startparse;

}
/******************************************************************************

ADDNAME

PURPOSE
        Adds Name to NameTable[], if not already present.  If already
        present, no action is taken.

RETURNS
        Index   Index of newly added Name in NameTable[].
        -1      NameTable[] overflow.  Too many entries.

RETURN CODES
                *RetCode =    0 : Success.
                *RetCode =  -101 : NameTable[] is full.
******************************************************************************/ int
addName(Name,RetCode)
char    *Name;                  /* Name to add to the symbol table.     */
int     *RetCode;               /* Success/failure return code.         */

{
        extern char *copmalloc();
        extern char *strcpy();
        extern unsigned char needsQuotes();
        extern int strcmp();
        extern DIRLIST *NameDir[];
        extern char *NameTable[];
        extern int NamTabIndex;
        extern unsigned char NamePropTable[];

char    *s;
        int     hashval;        /* Hashed value of Name string.         */
        DIRLIST *p;             /* Ptr to Hash Directory.               */
        int     Len;            /* Length of the string to be added.    */

*RetCode = 0; /* Assume success until disproven. */

/* Search name table for Name.  If found, return index into
         * NameTable[].  Searching is accomplished by first consulting
         * the NameDir[], a directory for NameTable[].
         *
         * Note: since the length of Name was being computed anyway
         * at the end of this routine, we compute it here and use it's
         * value to spruce up the hashing algorithm.
         */
        Len = strlen(Name);
        hashval = hash(Name,Len,NAME_DIR_SIZE);
        for (p = NameDir[hashval]; p != NULL; p = p->next)
                if (strcmp(Name,NameTable[p->TableIndex]) == 0)
                        return(p->TableIndex);

/* Name not present.  Before adding name, check for
         * NameTable[] overflow.
         */
        if (NamTabIndex >= NAME_TABLE_SIZE) {
                *RetCode = -101;
                parseError(-101);
                return(-1);
        }
```

```
        /* Add directory entry to NameDir[].
         * Then, add name to name table, NameTable[].
         */
        p = (DIRLIST *)copmalloc(sizeof(DIRLIST));
        if (p==NULL) {
                *RetCode = -100;        /* Out-of-Space error.  */
                return(-1);
        }
        p->TableIndex = NamTabIndex;
        p->next = NameDir[hashval];
        NameDir[hashval] = p;

/* Add the name to the name table. */
        s = (char *)copmalloc(Len+1);
        if (s==NULL) {
                *RetCode = -100;        /* Out-of-Space error.  */
                return(-1);
        }
        strcpy(s,Name);
        NameTable[NamTabIndex] = s;
        NamePropTable[NamTabIndex] = needsQuotes(s);
        NamTabIndex++;
        return(NamTabIndex-1);
}
/****************************************************************************

ADDOP

PURPOSE
        Add operator to OpTable[].

NOTES
        Side effect: operator string also added to NameTable[] if not
        already there.

RETURNS
        -1      OpTable[] out of space.  Returning a -1 causes the operator
                not to be declared at all.  -1 is understood by other routines
                to mean "not an operator".

Index   Index into OpTable[] of the added operator.

NOTES

RETURN CODES
                *RetCode =    0 : Success.
                *RetCode = -102 : OpTable[] is full.
****************************************************************************/
int
addOp(OpString,Prec,Assoc,RetCode)
char      *OpString;      /* Operator string to add.            */
int       Prec;           /* Precedence of the operator.        */
unsigned char Assoc;      /* Op. associativity: XFX,XFY, etc.   */
int       *RetCode;       /* Success/failure return code.       */

{
        extern char *copmalloc();
        extern unsigned char opType();
        extern int addName();
        extern DIRLIST *OpDir[];
        extern OPTABLE OpTable[];
        extern int OpTabIndex;
        extern unsigned char NamePropTable[];

int    i;                 /* Index into NameTable[].             */
        int    j;                 /* Index into OpTable[].               */
        int    hashval;           /* Hashed value of i.                  */
        DIRLIST *Cur;             /* To walk through linked list of OpDir.*/
        DIRLIST *Last;
```

```
unsigned char OpType;    /* Type of operator: INF, PREF, POST.  */

*RetCode = 0;            /* Assume success. */

/* Add string to name table, reporting failure if unsuccessful.
 * Error routine is called and *RetCode is set by addName()
 * if there is an error.
 */
if ((i=addName(OpString,RetCode)) == -1) {
        return(-1);
}

/* For efficiency the hash function is hard coded, since it is
 * so simple.  Be SURE that  lookUpOp() is using the same
 * hash function, and that both were compiled with the same value
 * of OP_DIR_SIZE.
 */
hashval = i % OP_DIR_SIZE;
OpType = opType(Assoc);

/* See if string has already been defined as the same type of
 * operator.
 */
for (Last=NULL,Cur=OpDir[hashval]; Cur!=NULL; Last=Cur,Cur=Cur->next) {
        j = Cur->TableIndex;
        if ((i == OpTable[j].Index) &&
            (OpType == opType(OpTable[j].Assoc))) {
                /* Operator already declared with that OpType:
                 * overwrite previous declaration.
                 */
                OpTable[j].Assoc = Assoc;
                OpTable[j].Prec  = Prec;
                return(j);
        }
}

/* Operator not previously declared with that OpType.  Must add.
 * Is the operator table, OpTable[], full?
 */
if (OpTabIndex >= OP_TABLE_SIZE) {
        parseError(-102);
        *RetCode = -102;       /* Out of memory */
        return(-1);
}

/* Insert new entry at end of OpTable. */
j=OpTabIndex++;
OpTable[j].Index = i;
OpTable[j].Assoc = Assoc;
OpTable[j].Prec  = Prec;

/* Insert corresponding entry in the OpDir.
 * Note that new entry goes at the tail of the list.  The
 * most frequently accessed entries will be the pre-defined
 * operators, and they should go first in the linked lists.
 */
Cur = (DIRLIST *)copmalloc(sizeof(DIRLIST));
if (Cur==NULL) {
        *RetCode = -100;
        return(-1);
}
Cur->TableIndex = j;
Cur->next = NULL;
if (Last != NULL)
        Last->next = Cur;
else
        OpDir[hashval] = Cur;

/* Mark in NamePropTable[i] that i-th name can be an operator
 * of type OpType.
 */
```

```
NamePropTable[i] != OpType;

return(j);
}
/*****************************************************************************

ALPHANUMERICTOKEN

PURPOSE
        Parse an unquoted atom beginning with a lower case letter,
        or parse a variable beginning with an uppercase letter or _.
NOTES
        The CALLING routine must test the first character to see that
        it is of the right type.  Subsequent characters are restricted
        to:
                        A..Z
                        a..z
                        0..9
                        _       (underscore)

These are precisely the characters recognized by  iscsym(c),
        a C library function.

RETURNS
        Length of token found.
        Never fails, as calling routine guarantees at least one character
        belongs to token.

*****************************************************************************/ int
alphanumericToken(c,token)
int c;                  /* First character of the token.        */
char *token;            /* Token to be returned.                */

{
        int CharCnt;

*token++ = c;
        CharCnt = 1;
        while (iscsym(c=READ_CHAR())) {
                /* a..z, A..Z, 0..9, '_'. */
                if (++CharCnt >= TOKEN_BUF_SIZE) {
                        parseError(-25); /* Symbol too long. Use quotes. */

/* Recover gracefully: simply ignore remaining
                         * characters of token and proceed.
                         */
                        CharCnt--;
                        while (iscsym(c=READ_CHAR()));
                        break;
                }
                *token++ = c;
        }
        UNREAD_CHAR(c);
        *token = '\0';                  /* Null terminate.              */
        return(CharCnt);
}
/*****************************************************************************

HASH

PURPOSE
        Hash a string and return a hash value.

RETURNS
        Hashed value for string - 0 <= hashval < HashSize.

NOTES
        hash() functions by simply adding up the character values in the
        input string and forms the remainder modulo the HashSize, usually
``` the size of the hash table.  This is not the best algorithm, but
it is simple and it works.

Only the first 10 characters are used when summing.  This reduces
overhead when long strings, such as questions and explanation
paragraphs, are hashed.

Included the parameter Len (length of the string being hashed)
for efficiency, since it turned out that the only routines calling
hash could either easily calculate the length of the string, or
needed to anyway.

*****************************************************************/

```c
hash(Str,Len,HashSize)
char    *Str;           /* String to be hashed.                        */
int     Len;            /* Length of string to be hashed (for efficiency). */
int     HashSize;       /* Size of hash table.                         */

{
        register int hashval;

hashval = Len;
        if (Len > 10) Len = 10;
        while (Len--)
                hashval += *Str++;

return(hashval % HashSize);
}
```

/*****************************************************************

MAKETOKEN

PURPOSE
        Fill in data for a new token.

RETURNS
        Pointer to the new token (as well as filling in the data).

IMPROVEMENT:
        Check for success of addName calls, return NULL if unsuccessful.

*****************************************************************/

```c
STRUCT *
makeToken(p,token,ValType)
STRUCT *p;                   /* Ptr to STRUCT cells to hold token.  */
char *token;                 /* Token string to be added.           */
unsigned char ValType;       /* Token type (INTNUM, SYMBOL), etc.   */

{
        extern long atoi();
        extern double atof();
        extern int addName();

int     c;
        int     Err;

Err = 0;

/* Fill in the length header call. */
        p->ValType = LENGTH;
        p->value.Length = 1;

/* Fill in the 2nd (token) cell. */
        c = PEEK_CHAR();
        if (IS_SPACE(c)) {
                (p+1)->ValType = ValType | SPACEMASK;  /* Set space flag */
        }
```

```
        else {
                (p+1)->ValType = ValType;
        } switch(ValType) {
        case FLOATNUM:
                (p+1)->value.floatVal = (float)atof(token);
                break;
        case INTNUM:
                (p+1)->value.intVal = (long)atoi(token);
                break;
        default:
                /* Put symbol in NameTable[]. save it's index. */
                (p+1)->value.Name = addName(token,&Err);
                break;
        } return(p);
}
/****************************************************************

NEEDSQUOTES

PURPOSE
        To determine whether a string NEEDS quote marks when it is
        printed out as an atom.

RETURNS
        Returns unsigned char which the calling routine will use
        as a mask for setting the appropriate value to NamePropTable[].
        The codes are:
                0x01 if quotes are needed.
                0x00 if quotes are not needed.

NOTES
        The types of atoms which do not need quotes are

LOWER (LOWER | UPPER | DIGIT | '_')*
                (SYMBOLCHAR)+ and special cases:

[]              (empty list)
                ,               (comma)

The C function  iscsym(c)  recognizes members of
        LOWER | UPPER | DIGIT | '_'.  The macro IS_SYMBOL_CHAR(c)
        recognizes members of SYMBOLCHAR.

For example,  'a b' needs quotes since it contains a space,
        but 'verylongatom' does not need quotes, even if it is entered
        with quotes.

Special note:  because only quoted atoms can grow to arbitrary
        length, an atom also needs quotes if it is longer than
        TOKEN_BUF_SIZE.

****************************************************************/ unsigned char
needsQuotes(Str)
char *Str;              /* String to be assessed.               */

{
        extern int strcmp();

int     c;
        int     SpaceLeft;
```

```
        SpaceLeft = TOKEN_BUF_SIZE;
        if (islower(*Str)) {                    /* a..z */
                while ((c=*++Str)&&(--SpaceLeft))
                        if (!iscsym(c)) return(0x01);
                if (!SpaceLeft) return(0x01);
                else return(0x00);
        }
        else if (IS_SYMBOL_CHAR(*Str)) {
                while ((c=*++Str) && (--SpaceLeft))
                        if (!IS_SYMBOL_CHAR(c)) return(0x01);
                if (!SpaceLeft) return(0x01);
                else return(0x00);
        }
        else if (strcmp(Str,"[]")==0)  return(0x00);

else if (strcmp(Str,",")==0)   return(0x00);

else return(0x01);
}
/****************************************************************

NUMTOKEN

PURPOSE
        Parse an integer or real (floating) valued number.

RETURNS
        +2 if floating point number is found.
        +1 if integer number is found.
         0 if no number is found
        Negative error code if syntax error is encountered (actually
                the only case is -26: buffer overflow).

TokenBuf is filled with the characters of the number.

NOTE
        It is the responsibility of the calling routine to validate that
        the input character  c  is either a digit or a dot (purported
        decimal point).  If it's not a dot, this routine assumes it's
        a digit.

****************************************************************/ int
numToken(c,TokenBuf)
int c;                  /* First char of purported number.      */
char *TokenBuf;         /* Returned token (by reference).       */

{
        char *Cur;
        int CharCnt;
        int c1;         /* Lookahead character.                 */
        int c2;         /* Lookahead character.                 */
        int RetVal;     /* Value returned to calling routine.   */

Cur = TokenBuf;
        CharCnt = 0;
        RetVal = 1;             /* Assume it's an integer.      */

/* First check whether input is indeed a number.  The only case
         * in doubt is an incoming dot:  Is it a decimal point?
         */
        if (c == '.') {
                c1 = PEEK_CHAR();
                if (isdigit(c1)) {
                        /* It IS a number. */
                        RetVal = 2;     /* Floating point, in fact. */
                        CharCnt++;
                        *Cur++ = '0';   /* Tack on leading zero, (not '\0') */
                }
```

```
                else {
                        return(0);      /* It's not a number. */
                }
        }
        /* From here on we know we have an integer or real, we're just
         * deciding how many characters belong to it.
         *
         * As you might guess, Error 26 is "Too many digits in number."
         */

/* Process leading digits, if any.  If leading char was a dot, this
         * while loop will not execute and  c  will still be the dot.
         */
        while (isdigit(c)) {
                if (++CharCnt >= TOKEN_BUF_SIZE)
                        return(-26);
                *Cur++ = c;
                c = READ_CHAR();
        }

/* If a '.' follows, it's either
         *   (1) part of the number if a digit is after it, or
         *   (2) not part of the number.
         * In case (1) suck up all the digits after it.
         */
        if (c == '.') {
                c1 = READ_CHAR();
                if (isdigit(c1)) {
                        RetVal = 2;     /* It's a float. */
                        if ((CharCnt += 2) >= TOKEN_BUF_SIZE) return(-26);
                        *Cur++ = c;
                        *Cur++ = c1;
                        while (isdigit(c = READ_CHAR())) {
                                if (++CharCnt >= TOKEN_BUF_SIZE)
                                        return(-26);
                                *Cur++ = c;
                        }
                }
                else    UNREAD_CHAR(c1);
        }

/* If an 'E' or an 'e' follows, it's either
         *   (1) part of the number, if a digit (optionally preceded
         *       by a sign) follows it, or
         *   (2) not part of the number.
         * In case (1) suck up (the sign and) all the digits following it.
         */
        if ((c == 'E') || (c == 'e')) {
                c1 = READ_CHAR();
                if (isdigit(c1)) {
                        RetVal = 2;     /* It's a float. */
                        if ((CharCnt += 2) >= TOKEN_BUF_SIZE)
                                return(-26);
                        *Cur++ = c;
                        *Cur++ = c1;
                        while (isdigit(c = READ_CHAR())) {
                                if (++CharCnt >= TOKEN_BUF_SIZE)
                                        return(-26);
                                *Cur++ = c;
                        }
                }
                else if ((c1 == '+') || (c1 == '-')) {
                        c2 = READ_CHAR();
                        if (isdigit(c2)) {
                                RetVal = 2;     /* It's a float. */
                                if ((CharCnt += 3) >= TOKEN_BUF_SIZE)
                                        return(-26);
                                *Cur++ = c;
                                *Cur++ = c1;
                                *Cur++ = c2;
```

```
                        while (isdigit(c = READ_CHAR())) {
                                if (++CharCnt >= TOKEN_BUF_SIZE)
                                        return(-26);
                                *Cur++ = c;
                        }
                }
                else {
                        UNREAD_CHAR(c2);
                        UNREAD_CHAR(c1);
                }
        }
        else    UNREAD_CHAR(c1);
    }

UNREAD_CHAR(c);
    *Cur = '\0';
    return(RetVal);
}
/****************************************************************

QUOTEDATOMTOKEN

PURPOSE
        Process a quoted atom or string atom.  Quoted atoms are delimited
        by single quotes, strings by double quotes.

NOTES
        This routine processes strings that are delimited by either "" or
        by '' (or in fact whatever character the input argument  c  equals).
        You cannot, however, mix and match the delimiters.

This routine always succeeds unless eof is detected.

RETURNS
        The length of the string (possibly 0).
        -100 - out of memory space for string buffer.
         -7 - if string ends prematurely without closing quote.
****************************************************************/ int
quotedAtomToken(c,tokenptr)
int     c;                      /* The opening quote mark        */
char    **tokenptr;             /* The returned token string.    */

{
        extern char *memcpy();
        extern char *copmalloc();

char *p;
        char *q;
        char *p1;
        int BuffSize;
        int CharCnt;
        int CloseQuote;

/* The closing quote must be of the same type (single or double)
         * as the opening quote, so remember it.
         */
        CloseQuote = c;

/* Copy characters into string until the corresponding
         * close quote is found.  But if the close
         * quote is immediately followed by another close quote, then
         * continue copying - the second close quote is intended to
         * be included as part of the string.
         */
        BuffSize = TOKEN_BUF_SIZE;
        CharCnt = 0;
        p1 = p = copmalloc(BuffSize * sizeof(char));
        if (p==NULL) return(-100);      /* Out of memory space. */
```

```
        while (((c = READ_CHAR()) != CloseQuote) ||
               ((c = READ_CHAR()) == CloseQuote)) {
                if (IS_END_CHAR(c)) {
                        /* Premature eof or end of string */
                        return(-7);
                }
                if (CharCnt == BuffSize-1) {
                        BuffSize *= 2;
                        q = copmalloc(BuffSize * sizeof(char));
                        if (q==NULL) return(0);
                        memcpy(q,p,CharCnt);
                        free(p);
                        p = q;
                        p1 = p+CharCnt;
                }
                CharCnt++;
                *p1++ = c;
        } /* while */

UNREAD_CHAR(c);
        *p1 = '\0';
        *tokenptr = p;
        return(CharCnt);
}
/****************************************************************

READC

PURPOSE
        Fetch the next character from either a text string or from the user
        supplied routine, readch().

NOTES
        This routine is extremely performance critical.  Most of the time
        spent in the parser is spent in this routine.

****************************************************************/ int readc()

{
        extern int readch();
        extern int movmem();
        extern char ParseTrace[];
        extern int TraceIndex;
        extern int ReadStringFlg;

int c;

/* If reading from an input string, get a char from there. */
        if (ReadStringFlg) {
                c = *StrPos++;
        }

/* Reading from user-supplied routine. */
        else {
                readch(&c);
        }

/* Add character to parse trace buffer.  When the trace buffer
         * gets full, the first X characters are deleted by shifting
         * the remaining characters down by X characters.  X, the shift
         * amount, is calculated to be 20% of the ParseTrace[] buffer size.
         */
        if (TraceIndex >= TRACE_BUF_SIZE-5)
                movmem(ParseTrace+SHIFT_AMT,ParseTrace,TraceIndex-=SHIFT_AMT);

return(ParseTrace[TraceIndex++] = c);
}
```

```
/****************************************************************

SCANNERINIT

PURPOSE
        Initialize the scanner (i.e., the getToken() function) with a new
        string to parse.

****************************************************************/ scannerInit(TextStr)
char    *TextStr;
{
        extern char ParseTrace[];
        extern int TraceIndex;
        extern int ReadStringFlg;

if (ReadStringFlg) ReadBufIndex=0;  /* Defensive */
        StrPos = Str = TextStr;
        ParseTrace[0] = '\0';               /* Clear parse trace buffer.    */
        TraceIndex = 0;
}
/****************************************************************

SYMBOLATOMTOKEN

PURPOSE
        Parse a "symbol atom", i.e. an atom consisting entirely of
        special symbols.

NOTE
        The symbols are contained in a string SymbolChar, which at
        this writing consists of "+-*\/<>='~:.?#$&%{}". Check the
        declaration of SymbolChar to verify.

****************************************************************/ int
symbolAtomToken(c,p)
int     c;              /* The first character.         */
char    *p;             /* The token buffer to be filled.       */

{
        int     CharCnt;

*p++ = c;               /* Put first char in token buffer. */
        CharCnt = 1;

/* Coding note: can't use "while" loop syntax, because can't
         * nest macros. (i.e. while (IS_SYMBOL_CHAR(c=READ_CHAR())) . )
         */
        for (c=READ_CHAR(); IS_SYMBOL_CHAR(c); c=READ_CHAR()) {
                /* c belongs to a set of predefined symbols, those
                 * contained in the global string SymbolChar.
                 */

/* Check for buffer overflow. Need room for final '\0'. */
                if (++CharCnt >= TOKEN_BUF_SIZE) {
                        parseError(-25); /* Symbol too long. Use quotes. */

/* Recover gracefully: simply ignore remaining
                         * characters of token and proceed.
                         */
                        CharCnt--;
                        for (c=READ_CHAR(); IS_SYMBOL_CHAR(c); c=READ_CHAR());
                        break;
                }
                *p++ = c;

} /* for */
```

```
        UNREAD_CHAR(c);
        *p = '\0';
        return(CharCnt);
}
/*********************************************************************** storage.c

Copyright (C) 1985 Teknowledge, Inc.
                    525 University Ave.
                    Palo Alto, CA  94301
                    (415) 327-6600

PROGRAM
        COPERNICUS
        Version 1.0 - IBM PC

PURPOSE
        Copernicus is an inference engine implemented as a set of subroutines.

COMPILER
        Version 1.0:
                Computer Innovations Optimizing C86
                IBM-PC SUBROUTINES
        Contained in this file are declarations of the following
        Storage Manager and Inference Engine Level subroutines:

Storage Manager
        ---------------
        _addCache()
        _insertCache()
        _addKB()
        _genLabel()
        _getCache()
        _getKB()
        _noteCache()
        _resetCache()
        _resetKB()

Inference Engine
        ----------------
        getState()
        setState()
        resetChar()
        resetState()
        cfCombine()

***********************************************************************/
#include <stdio.h>
include "typedef.h"
/***********************************************************************
STORAGE MANAGER LEVEL

_ADDCACHE [120]

PURPOSE
        Add an entry structure (augmenting if necessary) to the cache.

NOTES
        If InsertPos is larger than the size of the Cache, the entry will
        be inserted at the end.  This is not an error condition.
```

```
RETURNS
        RetCode = 0 : Successful addition of entry.
********************************************************************/

_addCache(Name,Entry,InsertPos,RetCode)
char *Name;             /* Cache name.                        */
STRUCT *Entry;          /* Entry to be inserted.              */
int InsertPos;          /* Position of insertion.             */
int *RetCode;           /* Success/failure return code.       */

{
        extern int unify();
        extern int pushBindFrame();
        extern popBindFrame();
        extern getBindingPtr();
        extern _insertCache();
        extern setState();
        extern parse();
        extern METAPROPTAB CacheMatchTable[];
        extern int CacheTabIndex;

static int FirstTimeFlg = TRUE;
        static STRUCT *Yes;
        static STRUCT *SetByUser;

STRUCT *Entry;          /* Entry to be noted in the cache.    */
        STRUCT *Expr;           /* Expression portion of Entry.       */
        int Env;                /* Binding environment for Expr.      */
        STRUCT *Value;          /* Value of the expression.           */
        short cf;               /* Associated certainty factor of Value. */
        STRUCT *Reason;         /* Reason associated with this conclusion? */
        STRUCT *CF;             /* Temporary STRUCT for certainty factor. */
        int Env1;               /* Temporary variable binding environment. */
        int Env2;               /* Temporary variable binding environment. */
        int EntryType;          /* Matched cache entry type.          */
        int i;

/* Initialize. */
        *RetCode = 0;           /* Set RetCode to "success". */
        if (FirstTimeFlg == TRUE) {
                FirstTimeFlg = FALSE;
                parse("yes",&Yes,RetCode);
                parse("'set by user'",&SetByUser,RetCode);
        }

/* Search the Cache Match Table of valid Cache entry templates for a
         * match. The most generic templates are at the beginning of the table.
         * The more specific ones are at the end of the table. Because of this,
         * we must search the table backward.
         */
        Env1 = pushBindFrame(Entry);    /* Create variable binding frame. */
        EntryType = -1;
        for (i = CacheTabIndex-1; i >= 0; i--) {
                Env2 = pushBindFrame(CacheMatchTable[i].TempForm);
                if (unify(Entry,Env1,CacheMatchTable[i].TempForm,Env2)) {
                        EntryType = CacheMatchTable[i].Type;
                        break;
                }
                popBindFrame(Env2); /* Delete variable binding frame. */
        } switch (EntryType) {
        case FACT1:             /* "E"                                */
                Expr = Entry;
                Env = Env1;
                Value = Yes;
                cf = 100;
                Reason = SetByUser;
                break;
```

```
case FACT2:              /* "E cf CF"                          */
        getBindingPtr("E", Env2, &Expr, &Env);
        Value = Yes;
        getBindingPtr("CF", Env2, &CF, &Env);
        if (VAL_TYPE(CF)==INTNUM)
                cf = CF->value.intVal;
        else
                cf = (CF+1)->value.intVal;
        Reason = SetByUser;
        break;
case FACT3:              /* "E = V"                            */
        getBindingPtr("E", Env2, &Expr, &Env);
        getBindingPtr("V", Env2, &Value, &Env);
        cf = 100;
        Reason = SetByUser;
        break;
case FACT4:              /* "E = V cf CF"                      */
        getBindingPtr("E", Env2, &Expr, &Env);
        getBindingPtr("V", Env2, &Value, &Env);
        getBindingPtr("CF", Env2, &CF, &Env);
        if (VAL_TYPE(CF)==INTNUM)
                cf = CF->value.intVal;
        else
                cf = (CF+1)->value.intVal;
        Reason = SetByUser;
        break;
case FACT5:              /* "E because REASON"                 */
        getBindingPtr("E", Env2, &Expr, &Env);
        Value = Yes;
        cf = 100;
        getBindingPtr("REASON", Env2, &Reason, &Env);
        break;
case FACT6:              /* "E cf CF because REASON"           */
        getBindingPtr("E", Env2, &Expr, &Env);
        Value = Yes;
        getBindingPtr("CF", Env2, &CF, &Env);
        if (VAL_TYPE(CF)==INTNUM)
                cf = CF->value.intVal;
        else
                cf = (CF+1)->value.intVal;
        getBindingPtr("REASON", Env2, &Reason, &Env);
        break;
case FACT7:              /* "E = V because REASON"             */
        getBindingPtr("E", Env2, &Expr, &Env);
        getBindingPtr("V", Env2, &Value, &Env);
        cf = 100;
        getBindingPtr("REASON", Env2, &Reason, &Env);
        break;
case FACT8:              /* "E = V cf CF because REASON" */
        getBindingPtr("E", Env2, &Expr, &Env);
        getBindingPtr("V", Env2, &Value, &Env);
        getBindingPtr("CF", Env2, &CF, &Env);
        if (VAL_TYPE(CF)==INTNUM)
                cf = CF->value.intVal;
        else
                cf = (CF+1)->value.intVal;
        getBindingPtr("REASON", Env2, &Reason, &Env);
        break;
case FACT9:
        /* "E is unknown."  - Do not actually note the
         * entry in the internal cache, but DO mark the
         * Expression Determination Table for this
         * entry as having been SOUGHT.
         */
        getBindingPtr("E",Env2,&Expr,&Env);
        setState(Expr,Env,SOUGHT,RetCode);
        freeStruct(Entry);   /* Destroy entry structure. */
        popBindFrame(Env2);  /* Destroy variable binding environment. */
        popBindFrame(Env1);  /* Destroy variable binding environment. */
        return;
```

```
        default:
                /* Invalid cache entry format. */
                *RetCode = -54;
                popBindFrame(Env2); /* Destroy variable binding environment. */
                popBindFrame(Env1); /* Destroy variable binding environment. */
                error(120,-54);
                return;

} /* switch */ popBindFrame(Env2); /* Destroy variable binding environment. */
        popBindFrame(Env1); /* Destroy variable binding environment. */

/* Insert the entry into the Cache by calling _insertCache().
         * Also mark the expression as being sought in the Expression
         * Determination State Table, since it now has a value.
         */
        _insertCache("",Expr,Value,cf,InsertPos,Reason,RetCode);
        setState(Expr,Env,SOUGHT,RetCode);
}
/***************************************************************************

_INSERTCACHE

NOTES
        _insertCache() is used by both _addCache() and by _noteCache().

Storage for the Expr and Value structures are assumed to have been
        generated elsewhere.
***************************************************************************/

_insertCache(Name,Expr,Value,cf,InsertPos,Reason,RetCode)
char *Name;             /* Cache name <NOT USED>.               */
STRUCT *Expr;           /* Expression being inserted.           */
STRUCT *Value;          /* Value being inserted.                */
int cf;                 /* Certainty factor of Expr=Value.      */
int InsertPos;          /* Position of insertion in Cache.      */
STRUCT *Reason;         /* The concluding "reason".             */
int *RetCode;           /* Success/failure return code.         */

{
        extern char *copmalloc();
        extern CACHEREC *CacheHeadPtr;
        extern CACHEREC *CacheTailPtr;

CACHEREC *LastCachePtr; /* Chase ptr. for walking lists.        */
        CACHEREC *CachePtr;     /* Current entry pointer in list.       */
        int i;

/* Initialize return code. */
        *RetCode = 0;

/* Allocate storage in Cache and fill in the Cache entry. */
        CachePtr = (CACHEREC *) copmalloc(sizeof(CACHEREC));
        if (CachePtr == NULL) {
                *RetCode = -100;        /* No more storage space ! */
                return;
        }
        CachePtr->Object = Expr;
        CachePtr->Value = Value;
        CachePtr->cf = cf;
        CachePtr->DeleteFlg = FALSE;
        CachePtr->RefCnt = 0;
        if (Reason != NULL) {

/* Allocate a new Reason structure and install the Reason. */
                CachePtr->Reason = (REASON *)copmalloc(sizeof(REASON));
                if (CachePtr->Reason == NULL) {
```

```
                *RetCode = -100;
                return;
        }
        CachePtr->Reason->Item = Reason;
        CachePtr->Reason->Next = NULL;
    }
    else {
        CachePtr->Reason = NULL;
    }

/* Install in cache linked list. */
    switch (InsertPos) {
    case 1:         /*Install at front of cache. */
        CachePtr->Next = CacheHeadPtr;
        CacheHeadPtr = CachePtr;
        if (CacheTailPtr == NULL) {     /* Cache was empty. */
            CacheTailPtr = CachePtr;
            CacheTailPtr->Next = NULL;
        }
        break;
    case 0:         /*Install at rear of cache. */
        CachePtr->Next = NULL;
        if (CacheHeadPtr == NULL)       /* Cache was empty. */
            CacheHeadPtr = CacheTailPtr = CachePtr;
        else {
            CacheTailPtr->Next = CachePtr;
            CacheTailPtr = CachePtr;
        }
        break;
    default:
        /* Install at InsertPos'th position in cache, the
         * convention followed being the entry is inserted
         * as the first entry, in the case of an empty list,
         * and as the last entry, in the case of InsertPos
         * being greater than the total number of entries.
         */
        if (CacheHeadPtr == NULL) {     /* Cache was empty. */
            CacheHeadPtr = CacheTailPtr = CachePtr;
            CacheTailPtr->Next = NULL;
        }
        else {
            LastCachePtr = CacheHeadPtr;
            i = 2;
            while ( (i < InsertPos) &&
                    (LastCachePtr->Next != NULL) ) {
                LastCachePtr = LastCachePtr->Next;
                i++;
            }
            CachePtr->Next = LastCachePtr->Next;
            LastCachePtr->Next = CachePtr;
            if (CachePtr->Next == NULL) /* End of list. */
                CacheTailPtr = CachePtr;
        }
        break;

} /* switch */
}
/******************************************************************************
STORAGE MANAGER LEVEL _AddKB [105]

PURPOSE
    Add a parsed structure to the knowledge base.

NOTES
    A copy of the KB entry's components is ALWAYS generated by
    the instStruct() calls below, so routines calling _addKB() should
    free() the structures (if they desire) passed into _addKB().
```

RETURNS
        RetCode =  2 : User-defined metafact was not entered.
        RetCode =  0 : Successful addition of entry.
        RetCode = -52: Doesn't match valid template.

*****************************************************************************/

_addKB(KBname,KBentry,InsertPos,RetLabel,RetCode)
char *KBname;           /* Name of KB to be added to.            */
STRUCT *KBentry;        /* Entry to be added to KB.              */
int InsertPos;          /* Position of insertion into KB.        */
STRUCT **RetLabel;      /* Label provided/generated for entry.   */
int *RetCode;           /* Success/failure return code.          */

{
        extern STRUCT *_genLabel();
        extern char *copmalloc();
        extern int metaFactLoaded();
        extern int pushBindFrame();
        extern pushLocalFrame();
        extern int popBindFrame();
        extern int unify();
        extern instStruct();
        extern setState();
        extern _resetKB();
        extern int freeStruct();
        extern free();
        extern movmem();
        extern KBASE *KBaseHeadPtr;
        extern KBASE *KBaseTailPtr;
        extern KBASE *MiniKBHeadPtr;
        extern KBASE *MiniKBTailPtr;
        extern MATCHTAB MatchTable[];
        extern int MatTabIndex;

static int FirstTimeFlg = TRUE;
        static STRUCT *p1;

KBASE *LastKBasePtr;    /* Chase pointer for insertion.          */
        KBASE *KBasePtr;        /* Ptr. to new entry.                    */
        KBASE *MiniKBasePtr;    /* Ptr. to whenCached() mini-kb.         */
        STRUCT *TmpLabel;       /* Temporary label structure.            */
        STRUCT *TmpEntry;       /* Temporary entry structure.            */
        int Env1;               /* Variable binding environment.         */
        int Env2;               /* Variable binding environment.         */
        int TmpEnv;             /* Temp. variable binding environment.   */
        int MatchFoundFlg=FALSE;/* KB entry matches legal template?      */
        int ProceedFlg=TRUE;    /* Add application-defined entry to KB?  */
        int i;

*RetCode = 0;           /* Set RetCode to "success". */

/* Sanity check. */
        if (KBentry == NULL) return;

/* If this is the first time addKB() has been called, create
         * certain patterns used for unification.  No need re-creating
         * them each time addKB() is invoked!
         */
        if (FirstTimeFlg) {
                FirstTimeFlg = FALSE;
                parse("L:E",&p1,RetCode);
        }

/* Allocate storage for the new kbase entry. */
        KBasePtr = (KBASE *) copmalloc(sizeof(KBASE));
        if (KBasePtr == NULL) {
                *RetCode = -100;        /* No more storage space ! */
                *RetLabel = NULL;
                return;
        }

```
KBasePtr->RelEntryFlg    = TRUE;
KBasePtr->DeleteFlg      = FALSE;
KBasePtr->RefCnt         = 0;
KBasePtr->Label          = NULL;

/* If KBentry is of the form "L:X", separate the label from the
 * entry.
 */
Env1 = pushBindFrame(KBentry);  /* Create variable binding frames. */
Env2 = pushBindFrame(p1);
if (unify(KBentry,Env1,p1,Env2)) {
        getBindingPtr("L",Env2,&TmpLabel,&TmpEnv);
        getBindingPtr("E",Env2,&TmpEntry,&TmpEnv);
}
else {
        TmpLabel = NULL;
        TmpEntry = KBentry;
}
popBindFrame(Env2);     /* Destroy variable binding frame. */
popBindFrame(Env1);

/* Search the list of valid KB entry templates for a match. When
 * one is found, instantiate the "key" expression and
 * put it in the KB.
 *
 * The most generic templates are at the beginning of the table.
 * The more specific ones, including all the user-entered meta-facts,
 * are found at the end of the table. Because of this, we must
 * search the table backward.
 */
Env1 = pushBindFrame(TmpEntry); /* Create var. bind frame. */
pushLocalFrame(TmpLabel,Env1);
for (i= MatTabIndex - 1; i >= 0; i--) {

Env2 = pushBindFrame(MatchTable[i].TempForm);
        if (unify(TmpEntry,Env1,MatchTable[i].TempForm,Env2)) {

/* Make sure all variables in each part of the
                 * MatchTable[] entry (TempForm & KeyForm) are
                 * accounted for.
                 */
                pushLocalFrame(MatchTable[i].KeyForm,Env2);

/* Create a copy of the Entry, Key, and Label
                 * structures.
                 *
                 * NOTE: All 3 structures must be instStruct()ed
                 * at this point to allow proper variable sharing.
                 * For example:
                 *      X:whencached(X) = display(X)
                 * should be expanded to:
                 *      E=V:whencached(E=V) = display(E=V)
                 */
                instStruct(MatchTable[i].KeyForm,Env2,NOUNIQUEVAR,
                                &(KBasePtr->Key),RetCode);
                instStruct(TmpEntry,Env1,NOUNIQUEVAR,
                                &(KBasePtr->Entry),RetCode);
                instStruct(TmpLabel,Env1,NOUNIQUEVAR,
                                &(KBasePtr->Label),RetCode);
                KBasePtr->EntryType = MatchTable[i].Type;
                KBasePtr->RelEntryFlg = MatchTable[i].RelEntryFlg;
                MatchFoundFlg = TRUE;
                popBindFrame(Env2);     /* Del. var binding frame. */
                break;
        }
        popBindFrame(Env2);     /* Del. var binding frame. */
}
popBindFrame(Env1);

/* If no match was found report an error. Note that if the parser
```

```
 * has done its job we should never get down to here.
 */
if (MatchFoundFlg == FALSE) {
        *RetCode = -52;
        *RetLabel = NULL;
        error(105,-52);         /* Doesn't match valid template. */

/* KBasePtr has not been linked into kbase list
         * yet so we can throw the KBASE structure away here.
         */
        free((char *) KBasePtr);
        return;
}
/* If user-defined meta-fact, notify user program, allowing the user
 * to process and signal back to _addKB() whether to proceed with
 * the insertion of the entry into the kbase.
 */
if (KBasePtr->EntryType >= 0) {
        metaFactLoaded(KBasePtr->Entry,KBasePtr->EntryType,&ProceedFlg);

/* If the user-defined routine metaFactLoaded tells us not
         * to proceed with the addition of the entry, we then return
         * after cleaning up.
         */
        if (ProceedFlg == FALSE) {
                *RetLabel = NULL;
                *RetCode = 2;   /* Meta-fact not entered. */

/* KBasePtr has not been linked into kbase list
                 * yet so we can throw the KBASE structure away here.
                 */
                freeStruct(KBasePtr->Entry);
                freeStruct(KBasePtr->Key);
                freeStruct(KBasePtr->Label);
                free((char *) KBasePtr);
                return;
        }
}

/* Perform special processing based on the KB entry's label. */
if (KBasePtr->Label != NULL) {

/* Overwrite any rules having the same designated label,
         * so delete these from the KB.
         */
        _resetKB(KBname,KBasePtr->Label,-1,LABEL,RetCode);
}
else {
        /* No label was provided.  Generate one. */
        KBasePtr->Label = _genLabel();
}

/* Insert into kbase linked list. */
switch (InsertPos) {
case 1:         /* Install at front of kbase. */
        KBasePtr->Next = KBaseHeadPtr;
        KBaseHeadPtr = KBasePtr;
        if (KBaseTailPtr == NULL) {
                KBaseTailPtr = KBasePtr;
                KBaseTailPtr->Next = NULL;
        }
        break;
case 0:         /* Install at rear of kbase.*/
        KBasePtr->Next = NULL;
        if (KBaseHeadPtr == NULL)       /* Kbase was empty. */
                KBaseHeadPtr = KBaseTailPtr = KBasePtr;
        else {
                KBaseTailPtr->Next = KBasePtr;
                KBaseTailPtr = KBasePtr;
        }
```

```
                break;
    default:
            /* Install at InsertPos'th position in kbase, the
             * convention followed being the entry is inserted
             * as the first entry, in the case of an empty list,
             * and as the last entry, in the case of InsertPos
             * being greater than the total number of entries.
             */
            if (KBaseHeadPtr == NULL) {    /* KBase was empty. */
                    KBaseHeadPtr = KBaseTailPtr = KBasePtr;
                    KBaseTailPtr->Next = NULL;
            }
            else {
                    LastKBasePtr = KBaseHeadPtr;
                    i = 2;
                    while ( (i < InsertPos) &&
                            (LastKBasePtr->Next != NULL) ) {
                            LastKBasePtr = LastKBasePtr->Next;
                            i++;
                    }
                    KBasePtr->Next = LastKBasePtr->Next;
                    LastKBasePtr->Next = KBasePtr;
                    if (KBasePtr->Next == NULL) /* End of list. */
                            KBaseTailPtr = KBasePtr;
            }
            break;
    }

/* Further process knowledge base entry according to its type. */
    switch(KBasePtr->EntryType) {
    case MULTIVALDCL:       /* Object is multivalued. */
            Env1 = pushBindFrame(KBasePtr->Key);
            setState(KBasePtr->Key,Env1,MULTIVAL,RetCode);
            popBindFrame(Env1);
            break;
    case NOCACHEDCL:        /* Object value not to be placed in cache. */
            Env1 = pushBindFrame(KBasePtr->Key);
            setState(KBasePtr->Key,Env1,NOCACHE,RetCode);
            popBindFrame(Env1);
            break;
    case WHENCACHED1:
    case WHENCACHED2:
            /* Allocate storage for the new mini-kbase entry. */
            MiniKBasePtr = (KBASE *) copmalloc(sizeof(KBASE));
            if (MiniKBasePtr == NULL) {
                    *RetCode = -100;
                    *RetLabel = NULL;       /* No more storage space ! */
                    return;
            }

/* Copy kbase entry contents to mini-kbase. */
            movmem(KBasePtr,MiniKBasePtr,sizeof(KBASE));

/* Install at rear of the Mini-KB. */
            MiniKBasePtr->Next = NULL;
            if (MiniKBHeadPtr == NULL)      /* kbase was empty. */
                    MiniKBHeadPtr = MiniKBTailPtr = MiniKBasePtr;
            else {
                    MiniKBTailPtr->Next = MiniKBasePtr;
                    MiniKBTailPtr = MiniKBasePtr;
            }
            break;
    default:                /* Else do nothing. */
            break;
    }

/* Return the KB label associated with the entry. */
    *RetLabel = KBasePtr->Label;
}
```

```
/*****************************************************************************
STATIC

_GENLABEL

PURPOSE
        Generate a KB entry label.

RETURNS
        Label structure.

NOTES
        The labels should be of the form 'kb-23'.  This way, only one
        atom is used for all label.  Until the parser is ready,
        we will use labels of the form 'kb23'.

*****************************************************************************/
static
STRUCT *
_genLabel()
{
        extern _getKB();
        extern int freeStruct();
        extern sprintf();
        extern parse();

static int Num = 1;     /* Label number.                        */ char Label[15];         /* Generated label string.              */
        STRUCT *LabStruct;      /* Parsed label structure.              */
        KBASE *KBasePtr;        /* KB entry pointer.                    */
        int RetCode;            /* Success/failure return code.         */

/* Create a new label, using the next available number (Num).
         * Must verify that the user has not already used that label.
         * If so, loop and create a new label.
         */
        while (TRUE) {
                /* Create the new label. */
                sprintf(Label,"kb-%d",Num++);
                parse(Label,&LabStruct,&RetCode);

/* Check to see if it already exists in the KB.  If not,
                 * return the new label structure.
                 */
                KBasePtr = NULL;
                _getKB("",LabStruct,-1,LABEL,&KBasePtr,&RetCode);
                if (KBasePtr==NULL) return(LabStruct);

/* The label already exists. free() up the copy and try
                 * again.
                 */
                freeStruct(LabStruct);
        }
}
/*****************************************************************************
STORAGE MANAGER LEVEL

_GETCACHE

PURPOSE
        Look up an expression and its value in the Cache, returning pointers
        to the matched expression, its associated value and certainty factor.

NOTES
        Expr, the search expression, can have a variable binding environment
        that is either valid (i.e. >= 0) or -1.  The -1 value indicates the
        absense of a binding frame, and one must be pushed for the search
        expression.
```

RETURNS
Pointers to the expression, its associated value and certainty factor.

RetCode = 1 : No match found.
RetCode = 0 : Successful match of object structure found.
*******************************************************************/

```
_getCache(Name,Expr,Env,CachePtr,RetExpr,RetVal,RetCf,RetReason,RetCode)
char *Name;              /* The name of the cache.                  */
STRUCT *Expr;            /* Pointer to object to match against.     */
int Env;                 /* Variable binding environment for Expr.  */
CACHEREC **CachePtr;     /* Where to begin search at.               */
STRUCT **RetExpr;        /* Returned matching object.               */
STRUCT **RetVal;         /* Returned matching value.                */
int *RetCf;              /* Returned matching certainty factor.     */
REASON **RetReason;      /* Returned ptr to Reason List.            */
int *RetCode;            /* Success/failure return code.            */

{
        extern _getCache1();

*RetCode = 0;            /* Set RetCode to "success".       */

_getCache1(Name,Expr,Env,CachePtr,RetCode);
        if (*CachePtr==NULL) {
                *RetCf          = 0;
                *RetExpr        = NULL;
                *RetVal         = NULL;
                *RetReason      = NULL;
        }
        else {
                *RetCf          = (*CachePtr)->cf;
                *RetExpr        = (*CachePtr)->Object;
                *RetVal         = (*CachePtr)->Value;
                *RetReason      = (*CachePtr)->Reason;
        }

}
```

/**********************************************************************
STORAGE MANAGER LEVEL

_GETCACHE1 [124]

PURPOSE
Look up an expression and its value in the Cache, returning pointers
to the matched expression, its associated value and certainty factor.

NOTES
Expr, the search expression, can have a variable binding environment
that is either valid (i.e. >= 0) or -1. The -1 value indicates the
absense of a binding frame, and one must be pushed for the search
expression.

RETURNS
Pointers to the expression, its associated value and certainty factor.

RetCode = 1 : No match found.
RetCode = 0 : Successful match of object structure found.
*******************************************************************/

```
_getCache1(Name,Expr,Env,StartPtr,RetCode)
char *Name;              /* The name of the cache.                  */
STRUCT *Expr;            /* Pointer to object to match against.     */
int Env;                 /* Variable binding environment for Expr.  */
int **StartPtr;          /* Where to begin search at.               */
int *RetCode;            /* Success/failure return code.            */

{
        extern int unify();
        extern int pushBindFrame();
```

```
extern popBindFrame();
extern CACHEREC *CacheHeadPtr;
extern CACHEREC *CacheTailPtr;

CACHEREC *CachePtr;
int Env1;               /* Variable binding environment.        */
int Env2;               /* Variable binding environment.        */

*RetCode = 0;           /* Set RetCode to "success".            */

/* After checking value of incoming cache position keeper,
 * initialize CachePtr to point to head of cache list OR start
 * searching from the next position in the list.
 */
CachePtr = (CACHEREC *) (*StartPtr);
if (CachePtr == NULL)                   /* This is a "FIRST" fetch. */
        CachePtr = CacheHeadPtr;
else {
        /* First decrement RefCnt to signify that this entry is
         * done with, then advance pointer in the cache (this is a
         * "NEXT" fetch).
         */
        CachePtr->RefCnt--;
        CachePtr = CachePtr->Next;
}

/* Create a variable binding frame for the search expression if
 * one was not already provided (i.e. Env == -1).
 */
Env1 = (Env == -1) ? pushBindFrame(Expr) : Env;

/* Scan cache for matches. If one is found, return it. The
 * position of CachePtr is adjusted across multiple calls to
 * _getCache() because it is passed by reference back and forth.
 */
while(CachePtr) {
        if (CachePtr->DeleteFlg == FALSE) {
                Env2 = pushBindFrame(CachePtr->Object);
                if (unify(CachePtr->Object,Env2,Expr,Env1)) {

/* Increment RefCnt field to signify that
                         * this entry is to be used at the level at
                         * which _getCache() was called.
                         */
                        CachePtr->RefCnt++;

/* Explicit cast of CachePtr back to pointer
                         * of type int (i.e the thing StartPtr points
                         * to).
                         */
                        *StartPtr = (int *) CachePtr;

/* Destroy variable binding frames. */
                        popBindFrame(Env2);
                        if (Env==-1) popBindFrame(Env1);
                        return;
                }
                popBindFrame(Env2);
        }
        CachePtr = CachePtr->Next;
}

/* Destroy variable binding frame. */
if (Env==-1) popBindFrame(Env1);

/* No match found - signal by NULLing Cache position-keeper
 * and setting RetCode.
 */
*StartPtr       = NULL;
*RetCode        = 1;            /* No match found. */
}
```

```
/****************************************************************
STORAGE MANAGER LEVEL

_GETKB [125]

PURPOSE
        Look up an entry structure in the knowledge base and return a pointer
        to its entry.

Item's variable binding environment, Env, may be -1 indicating the
        absence of a variable binding environment on the Binding Stack.
        This is a convenience to the user.

RETURNS
        A pointer to a matched entry structure in the knowledge base.

RetCode =  1 : No match found.
        RetCode =  0 : Successful match of entry pattern found.
        RetCode = -55: Invalid type of kbase entry.
****************************************************************/

_getKB(KBname,Item,Env,ItemType,RetKBasePtr,RetCode)
char *KBname;               /* Knowledge base name.                       */
STRUCT *Item;               /* Pointer to kbase item to match against.    */
int Env;                    /* Item's variable binding environment.       */
int ItemType;               /* Type of kbase item, LABEL, EXPR or ENTRY.  */
KBASE **RetKBasePtr;        /* Returned ptr to ptr to kbase record.       */
int *RetCode;               /* Success/failure return code.               */

{
        extern int unify();
        extern int pushBindFrame();
        extern popBindFrame();
        extern KBASE *KBaseHeadPtr;

KBASE *KBasePtr;        /* Ptr to KB record structure.            */
        int MatchFoundFlg;      /* Was a matching entry found?            */
        int Env1;               /* Variable binding environment.          */
        int Env2;               /* Variable binding environment.          */

*RetCode = 0;           /* Set RetCode to "success".              */

/* After checking value of incoming kbase position keeper,
         * initialize KBasePtr to point to head of kbase list OR start
         * searching from the next position in list.
         */
        KBasePtr = *RetKBasePtr;
        if (KBasePtr == NULL)           /* This is a "FIRST" fetch. */
                KBasePtr = KBaseHeadPtr;
        else {
                /* First decrement RefCnt to signify that this entry is
                 * done with, then advance pointer in the cache (this is a
                 * "NEXT" fetch).
                 */
                KBasePtr->RefCnt--;
                KBasePtr = KBasePtr->Next;
        }

/* Create a variable binding frame ONLY if one has not already
         * been created, ie. Env==-1 indicating the absence of a binding
         * environment.
         */
        Env1 = (Env==-1) ? pushBindFrame(Item) : Env;

/* Scan kbase for matches. If one is found, return it. The
         * position of KBasePtr is adjusted across multiple calls to
         * _getKB() because it is passed back and forth by reference
         * via *RetKBasePtr.
         */
        MatchFoundFlg = FALSE;
        while(KBasePtr) {
```

```c
/* Skip over entries marked for deletion. */
if (KBasePtr->DeleteFlg == TRUE) {
        KBasePtr = KBasePtr->Next;
        continue;
}

/* Create variable binding frame for KB Label,Entry or Key.
 * If the two entries match, mark the KB entry for deletion.
 */
switch (ItemType) {
case LABEL:
        /* Mark for deletion kbase entries with labels
         * matching Item.
         */
        Env2 = pushBindFrame(KBasePtr->Label);
        if (unify(Item,Env1,KBasePtr->Label,Env2)) {
                MatchFoundFlg = TRUE;
        }
        break;
case ENTRY:
        /* Mark for deletion kbase entries matching Item. */
        Env2 = pushBindFrame(KBasePtr->Entry);
        if (unify(Item,Env1,KBasePtr->Entry,Env2)) {
                MatchFoundFlg = TRUE;
        }
        break;
case EXPR:
        /* Mark for deletion kbase entries concluding
         * about Item.
         */
        Env2 = pushBindFrame(KBasePtr->Key);
        if (unify(Item,Env1,KBasePtr->Key,Env2)) {
                MatchFoundFlg = TRUE;
        }
        break;
default:
        /* Invalid ItemType field for a kbase entry. */
        *RetCode = -55;
        error(125,-55);
                if (Env==-1) popBindFrame(Env1);
                return;

} /* switch */

/* Destroy variable binding frame and advance KB pointer. */
        popBindFrame(Env2);

/* Increment RefCnt field to signify that
         * this entry is to be used, and destroy
         * variable binding frames.
         */
        if (MatchFoundFlg == TRUE) {
                KBasePtr->RefCnt++;
                *RetKBasePtr = KBasePtr;
                if (Env==-1) popBindFrame(Env1);
                return;
        }
        else {
                /* Go around again. */
                KBasePtr = KBasePtr->Next;
        }
}

/* Destroy variable binding frame ONLY if one was created locally. */
if (Env==-1) popBindFrame(Env1);

/* No match found - signal by NULLing kbase pointer
 * and setting RetCode to 1.
 */
*RetKBasePtr = NULL;
*RetCode = 1;           /* No match found. */
}
```

```
/***************************************************************
STORAGE MANAGER

_noteCache [126]

PURPOSE
        Note a fact (conclusion) in the cache. This does cf combinations
        and implements single value cutoff. The cache is searched for any
        expressions that match C, and values that match V. If any are found,
        that's when cf combinations are done.

Single value cutoff is implemented by checking all new cache entries
        for certainty factors equal to 100.

RETURN CODES
                RetCode = 0 : Success.
****************************************************************/

_noteCache(C,Env,V,cf,Reason,MultiFlg,HaltFlg,RetCode)
STRUCT  *C;             /* Expression to be noted.              */
int     Env;            /* Binding environment for C.           */
STRUCT  *V;             /* Value of expression V.               */
int     cf;             /* Certainty factor of V.               */
STRUCT  *Reason;        /* Reason associated with conclusion C. */
int     MultiFlg;       /* Is the expression C multivalued?     */
int     *HaltFlg;       /* SV cutoff indicator.                 */
int     *RetCode;       /* Returned success/failure code.       */
{
        extern int unify();
        extern int pushBindFrame();
        extern popBindFrame();
        extern pushLocalFrame();
        extern event();
        extern _resetCache();
        extern _insertCache();
        extern instStruct();
        extern setState();
        extern setReason();
        extern cfCombine();
        extern int evalWhenCached();
        extern CACHEREC *CacheHeadPtr;

STRUCT *Expr;           /* Instantiated Expression structure.   */
        STRUCT *Value;          /* Instantiated Value structure.        */
        STRUCT *NewReason;      /* Instantiated Reason structure.       */
        CACHEREC *CachePtr;     /* Ptr. for walking thru Cache list.    */
        int Env1;               /* Temp. variable binding environment.  */

/* Initialization. */
        if (*HaltFlg) return;   /* Sanity check.                        */
        demon(126,BEGIN);       /* Signal start of routine.             */
        event(4,C,V,cf,Env);    /* NOTING conclusion.                   */
        *RetCode = 0;           /* Set RetCode to "success".            */
        /* If single value cutoff is necessary, reset the Cache
         * for the expression and add the entry at the rear of the Cache.
         * This is a common case, so putting it first is efficient.
         */
        if (!MultiFlg && cf==100) {
                _resetCache("",C,Env,RetCode);
                *HaltFlg = TRUE;
                instStruct(C,Env,NOUNIQUEVAR,&Expr,RetCode);
                instStruct(V,Env,NOUNIQUEVAR,&Value,RetCode);
                instStruct(Reason,Env,NOUNIQUEVAR,&NewReason,RetCode);
                _insertCache("",Expr,Value,cf,0,NewReason,RetCode);
                setState(C,Env,SEEKING,RetCode);

/* Any whencached() metafact entries? */
                evalWhenCached(C,V,cf,Env,RetCode);
                demon(126,END);
```

```
                return;
        }

/* Scan Cache for a match.  If one is found, do a certainty
         * factor combination.
         */
        CachePtr = CacheHeadPtr; /* Start at the beginning of Cache. */
        while(CachePtr) {

/* Skip over entries marked for deletion. */
                if (CachePtr->DeleteFlg == TRUE) {
                        CachePtr = CachePtr->Next; /* Move on to next entry. */
                        continue;
                }

/* If the conclusion and value are already in the Cache,
                 * then combine certainty factors and don't duplicate.
                 */
                Env1 = pushBindFrame(CachePtr->Object);
                pushLocalFrame(CachePtr->Value,Env1);
                if (unify(CachePtr->Object,Env1,C,Env) &&
                    unify(CachePtr->Value,Env1,V,Env)) {
                        popBindFrame(Env1);     /* Destroy var. bind. frame.*/

/* Perform certainty factor combination. cfCombine()
                         * should NOT generate a new cf of 100 or -100; only
                         * +99 or -99 is possible or some value in between.
                         * Therefore, there is no need to check for single
                         * value cutoff at this point.
                         */
                        cfCombine(CachePtr->cf,cf,&(CachePtr->cf),RetCode);

/* Add the concluding "reason" to the
                         * Reason List for the Cache entry.
                         */
                        instStruct(Reason,Env,NOUNIQUEVAR,&NewReason,RetCode);
                        setReason(CachePtr,NewReason,RetCode);

/* Any whencached() metafact entries? */
                        evalWhenCached(C,V,CachePtr->cf,Env,RetCode);
                        demon(126,END);
                        return;
                }
                popBindFrame(Env1);     /* Destroy var. bind. frames. */
                CachePtr = CachePtr->Next; /* Move on to the next entry. */
        }

/* A match was not found.  Add the new entry at the end of
         * the Cache.
         */
        instStruct(C,Env,NOUNIQUEVAR,&Expr,RetCode);
        instStruct(V,Env,NOUNIQUEVAR,&Value,RetCode);
        instStruct(Reason,Env,NOUNIQUEVAR,&NewReason,RetCode);
        _insertCache("",Expr,Value,cf,0,NewReason,RetCode);

/* Any whencached() metafact entries? */
        evalWhenCached(C,V,cf,Env,RetCode);
        demon(126,END);
}
/************************************************************************
STORAGE MANAGER LEVEL

_RESETCACHE C1273

PURPOSE
        Reset entries in the cache.

NOTES
        Now uses a linked list representation of the Cache.

Expr's variable binding environment, Env, can be -1 indicating
        the absence of a binding environment.  This is a convenience to
        the user.
```

RETURNS
            RetCode =  0 : Successful deletion of entry pattern.
**********************************************************************/

_resetCache(Name,Expr,Env,RetCode)
char *Name;              /* Cache name.                              */
STRUCT *Expr;            /* Expression to be reset in Cache.         */
int Env;                 /* Expr's variable binding environment.     */
int *RetCode;            /* Success/failure code.                    */

{
        extern int unify();
        extern int pushBindFrame();
        extern popBindFrame();
        extern resetState();
        extern int freeStruct();
        extern CACHEREC *CacheHeadPtr;
        extern CACHEREC *CacheTailPtr;

CACHEREC *CachePtr;      /* Ptr to Cache entry.                  */
        CACHEREC *LastCachePtr;  /* Chase ptr. for walking down Cache.   */
        int Env1;                /* Variable binding environment.        */
        int Env2;                /* Variable binding environment.        */
        REASON *Reason;          /* Reason list pointer.                 */
        REASON *LastReason;      /* Chase ptr. for walking thru Reason.  */

*RetCode = 0;            /* Set RetCode to "success".            */

/* First reset the State Table for the entry.
         * 0xffff means reset all bits and remove the entry from the
         * Determination State Table.
         */
        resetState(Expr,Env,0xffff,RetCode);

/* Initialize cache list pointers. */
        LastCachePtr = CachePtr = CacheHeadPtr;

/* Create variable binding frame and check for match in the cache. */
        Env1 = (Env==-1) ? pushBindFrame(Expr) : Env;
        while (CachePtr) {
                /* Create variable binding frames and match the two
                 * expressions.  If they match, mark the entry for
                 * deletion.
                 */
                Env2 = pushBindFrame(CachePtr->Object);
                if (unify(Expr,Env1,CachePtr->Object,Env2))
                        CachePtr->DeleteFlg = TRUE; /* Mark for deletion. */
                popBindFrame(Env2);     /* Destroy variable binding frame. */

/* If the entry was marked for deletion, delete the entry
                 * if it is not in use elsewhere in the system.
                 */
                if ( (CachePtr->DeleteFlg) && (CachePtr->RefCnt == 0) ) {

/* Unlink the entry. */
                        LastCachePtr->Next = CachePtr->Next;
                        if (CachePtr == CacheHeadPtr) {

/* Reset head ptr if to be deleted. */
                                CacheHeadPtr = LastCachePtr
                                             = CachePtr->Next;

/* Free the entry and cache list node. */
                                freeStruct(CachePtr->Object);
                                freeStruct(CachePtr->Value);
                                Reason = CachePtr->Reason;
                                while (Reason) {
                                        freeStruct(Reason->Item);
                                        LastReason = Reason;
                                        Reason = Reason->Next;
                                        free((char *) LastReason);

```
                        }
                        free((char *) CachePtr);
                        CachePtr = CacheHeadPtr;
                }
                else {
                                /* Free the entry and cache list node. */
                                freeStruct(CachePtr->Object);
                                freeStruct(CachePtr->Value);
                                Reason = CachePtr->Reason;
                                while (Reason) {
                                        freeStruct(Reason->Item);
                                        LastReason = Reason;
                                        Reason = Reason->Next;
                                        free((char *) LastReason);
                                }
                                free((char *) CachePtr);
                                CachePtr = LastCachePtr->Next;
                        }
                }
                else {
                        /* Advance pointers down the list. */
                        LastCachePtr = CachePtr;
                        CachePtr = CachePtr->Next;
                }
        }
        /* Pop the variable binding environment only if it was pushed
         * locally because Expr's binding environment, Env, was -1.
         */
        if (Env==-1) popBindFrame(Env1);/* Destroy variable binding frame. */

CacheTailPtr = LastCachePtr;    /* In case tail ptr was deleted. */
}
/****************************************************************************
STORAGE MANAGER LEVEL _RESETCACHE1 [126]
PURPOSE
        Reset matching entries in the Cache.

NOTES
        If the Entry is a simple expression [_resetCache1(...E...)] then
        the Determination State Table entry for the expression is deleted.
        Otherwise, the Determination State Table is untouched, even if
        all values for the expression in the entry are removed from the
        Cache.

Expr's variable binding environment, Env, can be -1 indicating
        the absence of a binding environment.  This is a convenience to
        the user.

RETURNS
        RetCode = 0 : Successful deletion of entry pattern.
****************************************************************************/

_resetCache1(Name,Entry,Env,RetCode)
char *Name;             /* Cache name.                           */
STRUCT *Entry;          /* Entry to be reset in Cache.           */
int Env;                /* Expr's variable binding environment.  */
int *RetCode;           /* Success/failure retrun code.          */

{
        extern int unify();
        extern int pushBindFrame();
        extern popBindFrame();
        extern _getCache1();
        extern int freeStruct();
        extern free();
        extern CACHEREC *CacheHeadPtr;
        extern CACHEREC *CacheTailPtr;
        extern METAPROPTAB CacheMatchTable[];
```

```c
extern int CacheTabIndex;

static int FirstTimeFlg = TRUE;
static STRUCT *VAR;

CACHEREC *CachePtr;        /* Ptr to Cache entry.                     */
CACHEREC *LastCachePtr;    /* Chase ptr. for walking down Cache.      */
int Env1;                  /* Binding environment for Entry.          */
int Env2;                  /* Binding environment for template.       */
int Env3;                  /* Cache entry binding environment.        */
int ExprEnv;               /* Expression binding environment.         */
int ValueEnv;              /* Value binding environment.              */
int CfEnv;                 /* Certainty factor binding environment.   */
STRUCT *Expr;              /* De-referenced expression structure.     */
STRUCT *Value;             /* De-referenced value structure.          */
STRUCT *Cf;                /* De-referenced cert. factor struct.      */
STRUCT LocCf;              /* Temp. certainty factor structure.       */
REASON *Reason;            /* Reason List ptr. for Cache entry.       */
REASON *LastReason;        /* Chase ptr. for walking Reason List.     */
int EntryType;             /* ID code for entry format.               */
int i;

*RetCode = 0;              /* Set RetCode to "success".               */

/* One-time-only initializations. */
if (FirstTimeFlg == TRUE) {
        FirstTimeFlg = FALSE;
        parse("X",&VAR,RetCode);
}

/* Search the Cache Match Table of valid Cache entry templates for a
 * match. The most generic templates are at the beginning of the table.
 * The more specific ones are at the end of the table. Because of this,
 * we must search the table backward.
 */
Env1 = (Env==-1) ? pushBindFrame(Entry) : Env;
EntryType = -1;
for (i = CacheTabIndex-1; i >= 0; i--) {
        Env2 = pushBindFrame(CacheMatchTable[i].TempForm);
        if (unify(Entry,Env1,CacheMatchTable[i].TempForm,Env2)) {
                EntryType = CacheMatchTable[i].Type;
                break;
        }
        popBindFrame(Env2); /* Delete variable binding frame. */
} switch (EntryType) {
case FACT1:                /* "E". */
        /* The "entry" is the expression to be reset. Kill
         * all Cache values and all matching Determination State
         * Table entries (_resetCache() will remove the Determination
         * State Table entries).
         */
        _resetCache(Name,Entry,Env1,RetCode);
        popBindFrame(Env2);
        if (Env==-1) popBindFrame(Env1);
        return;
case FACT2:                /* "E of CF". */
        getBindingPtr("E",Env2,&Expr,&ExprEnv);
        Value    = VAR;
        ValueEnv = -1;
        getBindingPtr("CF",Env2,&Cf,&CfEnv);
        break;
case FACT3:                /* "E = V" */
        getBindingPtr("E",Env2,&Expr,&ExprEnv);
        getBindingPtr("V",Env2,&Value,&ValueEnv);
        Cf       = VAR;
        CfEnv    = -1;
        break;
```

```
case FACT4:              /* "E = V cf CF". */
        getBindingPtr("E",Env2,&Expr,&ExprEnv);
        getBindingPtr("V",Env2,&Value,&ValueEnv);
        getBindingPtr("CF",Env2,&Cf,&CfEnv);
        break;
case FACT9:
        /* "E is unknown." */
        getBindingPtr("E",Env2,&Expr,&ExprEnv);
        resetState(Expr,ExprEnv,0xffff,RetCode);
        popBindFrame(Env2);
        if (Env==-1) popBindFrame(Env1);
        return;
default:
        /* Invalid cache entry format. */
        *RetCode = -54;
        popBindFrame(Env2); /* Destroy variable binding environment. */
        if (Env==-1) popBindFrame(Env1);
        error(128,-54);
        return;

} /* switch */

/* Initialize cache list pointers. */
LastCachePtr = CachePtr = CacheHeadPtr;
while (CachePtr) {

/* Create variable binding frames and match the two
         * expressions.  If they match, mark the entry for
         * deletion.
         */
        Env3 = pushBindFrame(CachePtr->Object);
        if (!unify(Expr,ExprEnv,CachePtr->Object,Env3)) {
                goto delete;
        }

/* Does the value match? */
        pushLocalFrame(CachePtr->Value,Env3);
        if (!unify(Value,ValueEnv,CachePtr->Value,Env3)) {
                goto delete;
        }

/* Does the certainty factor match? */
        LocCf.ValType = INTNUM;
        LocCf.value.intVal = CachePtr->cf;
        pushLocalFrame(&LocCf,Env3);
        if (!unify(Cf,CfEnv,&LocCf,Env3)) {
                goto delete;
        }

CachePtr->DeleteFlg = TRUE;     /* Mark for deletion. */
delete:
        popBindFrame(Env3);

/* If the entry was marked for deletion, delete the entry
         * if it is not in use elsewhere in the system.
         */
        if ( (CachePtr->DeleteFlg) && (CachePtr->RefCnt == 0) ) {

/* Unlink the entry. */
                LastCachePtr->Next = CachePtr->Next;
                if (CachePtr == CacheHeadPtr) {

/* Reset head ptr if to be deleted. */
                        CacheHeadPtr = LastCachePtr
                                     = CachePtr->Next;

/* Free the entry and cache list node. */
                        freeStruct(CachePtr->Object);
                        freeStruct(CachePtr->Value);
                        Reason = CachePtr->Reason;
```

```
                        while (Reason) {
                                freeStruct(Reason->Item);
                                LastReason = Reason;
                                Reason = Reason->Next;
                                free((char *) LastReason);
                        }
                        free((char *) CachePtr);
                        CachePtr = CacheHeadPtr;
                }
                else {
                        /* Free the entry and cache list node. */
                        freeStruct(CachePtr->Object);
                        freeStruct(CachePtr->Value);
                        Reason = CachePtr->Reason;
                        while (Reason) {
                                freeStruct(Reason->Item);
                                LastReason = Reason;
                                Reason = Reason->Next;
                                free((char *) LastReason);
                        }
                        free((char *) CachePtr);
                        CachePtr = LastCachePtr->Next;
                }

}
        else {
                /* Advance pointers down the list. */
                LastCachePtr = CachePtr;
                CachePtr = CachePtr->Next;
        }
}

/* Pop the variable binding environment only if it was pushed
 * locally because Expr's binding environment, Env, was -1.
 */
if (Env==-1) popBindFrame(Env1);/* Destroy variable binding frame. */

CacheTailPtr = LastCachePtr;    /* In case tail ptr was deleted. */
}
/*****************************************************************
STORAGE MANAGER LEVEL _RESETKB (1293
PURPOSE
        Reset entries in the Knowledge Base.

NOTES
        Now uses a linked list representation of the Knowledge Base.

Item's variable binding environment, Env, may be -1 indicating
        the absence of a variable binding environment on the Binding Stack.
        This is a convenience to the caller.

RETURNS
        RetCode =  0 : Successful deletion of entry pattern.
        RetCode = -55: Invalid type of kbase entry.
*****************************************************************/

_resetKB(KBname,Item,Env,ItemType,RetCode)
char *KBname;           /* Knowledge base to look in.          */
STRUCT *Item;           /* KB item to be reset.                */
int Env;                /* Item's variable binding environment. */
int ItemType;           /* KB item type: LABEL, EXPR or ENTRY. */
int *RetCode;           /* Success/failure return code.        */

{
        extern resetChar();
        extern int unify();
        extern int pushBindFrame();
        extern popBindFrame();
        extern int freeStruct();
```

```c
extern free();
extern KBASE *KBaseHeadPtr;
extern KBASE *KBaseTailPtr;
extern KBASE *MiniKBHeadPtr;
extern KBASE *MiniKBTailPtr;

KBASE *KBasePtr;           /* Ptr to KB entry record.              */
KBASE *LastKBasePtr;       /* Chase pointer for walking down list. */
int Env1;                  /* Variable binding environment.        */
int Env2;                  /* Variable binding environment.        */

*RetCode = 0;              /* Set RetCode to "success".            */

/* If Item is of type EXPR, reset the Characteristic Table
 * containing multivalued/nocache information for entries concluding
 * about Item.
 */
if (ItemType == EXPR)
        resetChar(Item,Env,0xffff,RetCode);
if (*RetCode != 0) return;

/* Create variable binding frame for the incoming entry ONLY
 * if one does not already exist (Env == -1).
 */
Env1 = (Env==-1) ? pushBindFrame(Item) : Env;

/* First check for WHENCACHED1/WHENCACHED2 entries in the
 * mini-kbase.
 */
LastKBasePtr = KBasePtr = MiniKBHeadPtr;
while (KBasePtr) {

/* Create variable binding frame for mini-KB Label,Entry or
         * Key. If the entries match, mark the mini-KB entry for
         * deletion.
         */
        switch (ItemType) {
        case LABEL:
                /* Mark for deletion kbase entries with labels
                 * matching Item.
                 */
                Env2 = pushBindFrame(KBasePtr->Label);
                if (unify(Item,Env1,KBasePtr->Label,Env2))
                        KBasePtr->DeleteFlg = TRUE;
                break;
        case ENTRY:
                /* Mark for deletion kbase entries matching
                 * Item.
                 */
                Env2 = pushBindFrame(KBasePtr->Entry);
                if (unify(Item,Env1,KBasePtr->Entry,Env2))
                        KBasePtr->DeleteFlg = TRUE;
                break;
        case EXPR:
                /* Mark for deletion kbase entries concluding
                 * about Item.
                 */
                Env2 = pushBindFrame(KBasePtr->Key);
                if (unify(Item,Env1,KBasePtr->Key,Env2))
                        KBasePtr->DeleteFlg = TRUE;
                break;
        default:        /* Invalid ItemType field for a kbase entry. */
                *RetCode = -55;
                error(129,-55);
                if (Env==-1) popBindFrame(Env1);
                return;
        } popBindFrame(Env2);     /* Destroy variable binding frame. */
```

```c
                /* If the entry was marked for deletion, delete the entry
                 * if it is not in use elsewhere in the system.
                 */
                if ((KBasePtr->DeleteFlg==TRUE) && (KBasePtr->RefCnt==0)) {

/* Unlink the entry. */
                        LastKBasePtr->Next = KBasePtr->Next;
                        if (KBasePtr == MiniKBHeadPtr) {
                            /* Reset head ptr if to be deleted. */
                            MiniKBHeadPtr = LastKBasePtr
                                          = KBasePtr->Next;

/* Free the mini-kbase list node.  DO NOT
                             * free() the Entry, key, or Label fields -
                             * they are still referenced by the regular
                             * kbase.  free() only the mini-kbase list
                             * record.
                             */
                            free((char *) KBasePtr);
                            KBasePtr = MiniKBHeadPtr;
                        }
                        else {
                            /* Free the mini-kbase list node.  DO NOT
                             * free() the Entry, key, or Label fields -
                             * they are still referenced by the regular
                             * kbase.  free() only the mini-kbase list
                             * record.
                             */
                            free((char *) KBasePtr);
                            KBasePtr = LastKBasePtr->Next;
                        }
                }
                else {
                        /* Advance pointers down the list. */
                        LastKBasePtr = KBasePtr;
                        KBasePtr = KBasePtr->Next;
                }
        }
        MiniKBTailPtr = LastKBasePtr; /* In case tail ptr was deleted. */

/* Now that the whencached() mini-kbase has been cleared of the
         * appropriate entries, initialize the regular kbase list pointers
         * and walk thru kbase looking for matching entries.
         */
        LastKBasePtr = KBasePtr = KBaseHeadPtr;
        while (KBasePtr) {

/* Create variable binding frame for KB Label,Entry or key.
                 * If the two entries match, mark the KB entry for deletion.
                 */
                switch (ItemType) {
                case LABEL:
                        /* Mark for deletion kbase entries with labels
                         * matching Item.
                         */
                        Env2 = pushBindFrame(KBasePtr->Label);
                        if (unify(Item,Env1,KBasePtr->Label,Env2))
                                KBasePtr->DeleteFlg = TRUE;
                        break;
                case ENTRY:
                        /* Mark for deletion kbase entries matching Item. */
                        Env2 = pushBindFrame(KBasePtr->Entry);
                        if (unify(Item,Env1,KBasePtr->Entry,Env2))
                                KBasePtr->DeleteFlg = TRUE;
                        break;
                case EXPR:
                        /* Mark for deletion kbase entries concluding
                         * about Item.
                         */
                        Env2 = pushBindFrame(KBasePtr->key);
```

```
            if (unify(Item,Env1,KBasePtr->Key,Env2))
                KBasePtr->DeleteFlg = TRUE;
        break;
default:
        /* Invalid ItemType field for a kbase entry. */
        *RetCode = -56;
        error(129,-56);
        if (Env==-1) popBindFrame(Env1);
        return;

} /* switch */

/* Remove appropriate Characteristic Table information,
 * if necessary.
 */
if (KBasePtr->DeleteFlg == TRUE) {
        switch(KBasePtr->EntryType) {
        case MULTIVALDCL:
                /* Push all components of the entry; we don't
                 * want to leave anyone out.
                 */
                pushLocalFrame(KBasePtr->Label,Env2);
                pushLocalFrame(KBasePtr->Key,Env2);
                pushLocalFrame(KBasePtr->Entry,Env2);
                resetChar(KBasePtr->Key,Env2,MULTIVAL,RetCode);
                break;
        case NOCACHEDCL:
                /* Push all components of the entry; we don't
                 * want to leave anyone out.
                 */
                pushLocalFrame(KBasePtr->Label,Env2);
                pushLocalFrame(KBasePtr->Key,Env2);
                pushLocalFrame(KBasePtr->Entry,Env2);
                resetChar(KBasePtr->Key,Env2,NOCACHE,RetCode);
                break;

} /* switch */
} popBindFrame(Env2);    /* Destroy variable binding frame. */

/* If the entry was marked for deletion, delete the entry
 * IFF it is not in use elsewhere in the system.
 */
if ((KBasePtr->DeleteFlg==TRUE) && (KBasePtr->RefCnt==0)) {

/* Unlink the entry. */
        LastKBasePtr->Next = KBasePtr->Next;
        if (KBasePtr == KBaseHeadPtr) {
                /* Reset head ptr if to be deleted. */
                KBaseHeadPtr = LastKBasePtr
                             = KBasePtr->Next;

/* Free the entry and kbase list node. */
                freeStruct(KBasePtr->Entry);
                freeStruct(KBasePtr->Key);
                freeStruct(KBasePtr->Label);
                free((char *) KBasePtr);
                KBasePtr = KBaseHeadPtr;
        }
        else {
                /* Free the entry and kbase list node. */
                freeStruct(KBasePtr->Entry);
                freeStruct(KBasePtr->Key);
                freeStruct(KBasePtr->Label);
                free((char *) KBasePtr);
                KBasePtr = LastKBasePtr->Next;
        }
}
else {
```

```c
                /* Advance pointers down the list. */
                LastKBasePtr = KBasePtr;
                KBasePtr = KBasePtr->Next;
        }
    }
    KBaseTailPtr = LastKBasePtr;    /* In case tail ptr was deleted. */

/* Destroy variable binding frame for the incoming entry ONLY
     * if one was created locally - Env == -1.
     */
    if (Env==-1) popBindFrame(Env1);
}
/*****************************************************************************
INFERENCE ENGINE LEVEL

GETSTATE C::OC

PURPOSE
        Get the state of an expression.

NOTES
        Now uses a linked list representation of the State Table and
        companion Characteristic Table: the former contains the
        SOUGHT/SEEKING information about an object, the latter the
        MULTIVALUED/NOCACHE information (in the form of bit patterns
        constituting the State entry in the respective tables).

RETURNS
        RetCode =  1    : No bit-pattern match found.
        RetCode =  0    : Successful match found.
        RetCode = -70   : Illegal bit pattern for State.
*****************************************************************************/ getState(Expr,Env,State,StartPtr,RetExpr,RetState,RetCode)
STRUCT *Expr;                   /* Expression to match against.     */
int Env;                        /* Variable binding environment for Expr.*/
unsigned State;                 /* State to check for.              */
int **StartPtr;                 /* Where to start looking.          */
STRUCT **RetExpr;               /* Returned matching expression.    */
int *RetState;                  /* State variable entry - bit field. */
int *RetCode;                   /* Success/failure return code.     */

{
        extern int pushBindFrame();
        extern popBindFrame();
        extern int unify();
        extern STATE *StateHeadPtr;
        extern STATE *CharHeadPtr;

STATE   *StatePtr;      /* Ptr to next State Table entry.   */
        int     Env1;           /* Variable binding environment.    */

*RetCode = 0;           /* Set RetCode to "success".        */

/* Set up the incoming position-keeper. */
        StatePtr = (STATE *) (*StartPtr);

/* Determine in which table to check for the expression's
         * state: the State Table proper or the Characteristics Table
         * (multivalued/nocache). Then initialize StatePtr accordingly.
         */
        if ( (State & SOUGHT) || (State & SEEKING) ||
             (State & (SOUGHT | SEEKING)) ) {
                if (StatePtr == NULL)
                        StatePtr = StateHeadPtr;   /* First-time fetch. */
                else
                        StatePtr = StatePtr->Next; /* Next-time fetch. */
        }
        else if ( (State & MULTIVAL) || (State & NOCACHE) ||
                  (State & (MULTIVAL | NOCACHE)) ) {
```

```
                    if (StatePtr == NULL)
                            StatePtr = CharHeadPtr;    /* First-time fetch. */
                    else
                            StatePtr = StatePtr->Next; /* Next-time fetch. */
            }
            else {
                    *RetCode = -70;          /* Illegal bit pattern for state. */
                    *StartPtr = NULL;
                    *RetState = 0;
                    *RetExpr = NULL;
                    error(110,-70);
                    return;
            }

/* Search the State or Characteristics Table for a matching
             * expression.
             */
            while (StatePtr) {
                    Env1 = pushBindFrame(StatePtr->Expr);
                    if ((StatePtr->State & State)   &&
                        (unify(Expr,Env,StatePtr->Expr,Env1)) ) {

/* Explicit cast of StatePtr back to pointer
                             * of type int (i.e the thing StartPtr points
                             * to).
                             */
                            *StartPtr = (int *) StatePtr;
                            *RetExpr = StatePtr->Expr;
                            *RetState = StatePtr->State;
                            popBindFrame(Env1);
                            return;
                    }
                    popBindFrame(Env1);
                    StatePtr = StatePtr->Next;
            }

/* No matching expression/state found. */
            *RetCode = 1;                    /* No bit-pattern match found. */
            *StartPtr = NULL;
            *RetExpr = NULL;
            *RetState = 0;
}
/*******************************************************************
STORAGE MANAGER LEVEL

SETSTATE [1183]

PURPOSE
        Set the state of an expression.

NOTES
        The state "setting" is additive. For example, if the State Table
        entry for Expr is already marked SEEKING, setState(..SOUGHT..) will
        OR the 2 bit patterns together, resulting in EXPR being marked
        SEEKING|SOUGHT.

Uses a linked list representation of the Determination Table and
        companion Characteristic Table: the former contains the
        SOUGHT/SEEKING information about an object, the latter the
        MULTIVALUED/NOCACHE information (in the form of bit patterns
        constituting the State entry in the respective tables).

RETURNS
        RetCode =  0 : Successful addition of a table entry.
        RetCode = -7 : Illegal bit-pattern for an Expression state.
*******************************************************************/ setState(Expr,Env,State,RetCode)
STRUCT *Expr;          /* The expression being sought in State Table. */
int Env;               /* Expr's variable binding environment.        */
unsigned State;        /* The state to assign for Expr.               */
```

```
int *RetCode;          /* Success/failure return code.                */

{
        extern int unify();
        extern int pushBindFrame();
        extern popBindFrame();
        extern char *copmalloc();
        extern instStruct();
        extern STATE *StateHeadPtr;
        extern STATE *CharHeadPtr;

int Env1;               /* Variable binding environment.       */
        int CharTableFlg=FALSE; /* Is entry a characteristic state?    */
        int StateTableFlg=FALSE;/* Is entry a determination state?     */
        STATE *LastStatePtr;    /* Chase ptr for walking thru lists.   */
        STATE *StatePtr;        /* Ptr to current table entry.         */

*RetCode = 0;           /* Set RetCode to "success".           */

/* Determine in which table to check for the Expr's
         * state: the Determination Table or the Characteristics Table
         * (multivalued/nocache). Then initialize StatePtr accordingly.
         */
        if ( (State & SOUGHT) || (State & SEEKING) ||
             (State & (SOUGHT | SEEKING)) ) {
                StateTableFlg = TRUE;
                StatePtr = StateHeadPtr;
        }
        else if ( (State & MULTIVAL) || (State & NOCACHE) ||
                  (State & (MULTIVAL | NOCACHE)) ) {
                CharTableFlg = TRUE;
                StatePtr = CharHeadPtr;
        }
        else {
                *RetCode = -71;       /* Illegal bit pattern for a State. */
                error(115,-71);
                return;
        }

/* Search the Determination or Characteristics Table for a
         * matching expression.
         */
        while (StatePtr) {

/* If the expression matches, set its state. */
                Env1 = pushBindFrame(StatePtr->Expr);
                if (unify(Expr,Env,StatePtr->Expr,Env1)) {
                        StatePtr->State |= State;  /* Set additional state. */
                        popBindFrame(Env1);
                        return;
                }
                popBindFrame(Env1);

/* Advance to the next entry. */
                LastStatePtr = StatePtr;
                StatePtr = StatePtr->Next;
        }

/* No match found. Add to end of Determination/Characteristics Table
         * list.
         */
        StatePtr = (STATE *)copmalloc(sizeof(STATE));
        if (StatePtr == NULL) {
                *RetCode = -100;      /* No more storage space! */
                return;
        }

/* Link in the new entry. */
        StatePtr->Next = NULL;
        if ( (StateTableFlg) && (StateHeadPtr == NULL) )
```

```
                StateHeadPtr = StatePtr;
        else if ( (CharTableFlg) && (CharHeadPtr == NULL) )
                CharHeadPtr = StatePtr;
        else
                LastStatePtr->Next = StatePtr;   /* Insert in list. */

/* Fill in the entry's fields. */
        instStruct(Expr,Env,NONUNIQUEVAR,&(StatePtr->Expr),RetCode);
        StatePtr->State = State;
}
/*****************************************************************************
INFERENCE ENGINE LEVEL

RESETSTATE [140]

PURPOSE
        Clear out the Determination State Table entries for a particular
        expression.

NOTES
        Uses a linked list representation for the Determination State Table.
        Contains information for:
                SEEKING
                SOUGHT Only the states (bit fields) specified are reset.  If this causes
        all bits to be set to 0, then the entire entry is removed from
        the list.

RETURNS
        RetCode =  0 : Successful deletion of an object's table entries.
*****************************************************************************/
resetState(Expr,Env,Mask,RetCode)
STRUCT *Expr;           /* The expression whose state is reset.     */
int Env;                /* Expr's variable binding environment.     */
int Mask;               /* Bitfield mask indicating bits to be reset. */
int *RetCode;           /* Success/failure return code.             */

{
        extern int unify();
        extern int pushBindFrame();
        extern popBindFrame();
        extern int freeStruct();
        extern free();
        extern STATE *StateHeadPtr;

int     Env0;           /* Variable binding environment.       */
        int     Env1;           /* Variable binding environment.       */
        STATE   *StatePtr;      /* Ptr. to Determination Table entry.  */
        STATE   *LastStatePtr;  /* Chase ptr. for walking thru list.   */

*RetCode = 0;           /* Set RetCode to "success".           */

/* Create a variable binding environment for Expr ONLY if one
         * was not already created, i.e., Env==-1.
         */
        Env0 = (Env==-1) ? pushBindFrame(Expr) : Env;

/* Search the Determination State Table for a matching expression,
         * clearing out the table in the process.
         */
        StatePtr = LastStatePtr = StateHeadPtr;
        while(StatePtr) {

/* Create variable binding frames.  And see if the
                 * expression matches the Determination State Table
                 * expression.
                 */
                Env1 = pushBindFrame(StatePtr->Expr);
                if (unify(Expr,Env0,StatePtr->Expr,Env1)) {
```

```
                /* Reset the appropriate bits. */
                StatePtr->State &= ~Mask;

/* Unlink the entry ONLY if all bits have been
                 * reset to 0.
                 */
                if (StatePtr->State != 0) {
                        /* Advance pointers down the list. */
                        LastStatePtr = StatePtr;
                        StatePtr = StatePtr->Next;
                        popBindFrame(Env1);
                        continue;
                }

/* Unlink the entry. */
                LastStatePtr->Next = StatePtr->Next;
                if (StatePtr == StateHeadPtr) {

/* Reset head ptr if to be deleted. */
                        StateHeadPtr = LastStatePtr
                                     = StatePtr->Next;

/* Free the entry and State Table list node. */
                        freeStruct(StatePtr->Expr);
                        StatePtr->State = 0;
                        free((char *) StatePtr);
                        StatePtr = StateHeadPtr;
                }
                else {
                        /* Free the entry and State Table list node. */
                        freeStruct(StatePtr->Expr);
                        StatePtr->State = 0;
                        free((char *) StatePtr);
                        StatePtr = LastStatePtr->Next;
                }
        }
        else {
                /* Advance pointers down the list. */
                LastStatePtr = StatePtr;
                StatePtr = StatePtr->Next;
        }

/* Destroy variable binding frames. */
        popBindFrame(Env1);
    }

/* Destroy Expr's variable binding environment ONLY if it was
     * created locally.
     */
    if (Env==-1) popBindFrame(Env0);
}
/*******************************************************************************
INFERENCE ENGINE LEVEL

RESETCHAR [145]

PURPOSE
        Clear out the Characteristics Table entries for a particular object.

NOTES
        Uses a linked list representation of the Characteristics Table
        as for the companion State Table: the latter contains the
        SOUGHT/SEEKING information about an object, the former the
        MULTIVALUED/NOCACHE information (in the form of bit patterns
        constituting the State entry in the respective tables).

Expr's variable binding environment, Env, may be -1, indicating
        the absence of a binding environment. This is a convenience to
        the user.
```

```
RETURNS
        RetCode = 0 : Successful deletion of an object's table entries.
***************************************************************************/ resetChar(Expr,Env,Mask,RetCode)
STRUCT *Expr;           /* The expression whose state is reset.        */
int Env;                /* Expr's variable binding environment.        */
int Mask;               /* Mask of bits to be reset.                   */
int *RetCode;           /* Success/failure return code.                */

{
        extern int unify();
        extern int pushBindFrame();
        extern popBindFrame();
        extern int freeStruct();
        extern free();
        extern STATE *CharHeadPtr;

int Env0;               /* Variable binding environment.       */
        int Env1;               /* Variable binding environment.       */
        STATE *StatePtr;        /* Ptr to current Char. Table entry.   */
        STATE *LastStatePtr;    /* Ptr to last Char Table entry.       */

*RetCode = 0;           /* Set RetCode to "success".           */

/* Create a variable binding environment for Expr ONLY if one
         * does not already exist, i.e., Env==-1.
         */
        Env0 = (Env==-1) ? pushBindFrame(Expr) : Env;

/* Search the Characteristics Table for a matching object,
         * clearing out the table in the process.
         */
        StatePtr = LastStatePtr = CharHeadPtr;
        while(StatePtr) {
                /* Create variable binding environment and check for
                 * a match on the expression.
                 */
                Env1 = pushBindFrame(StatePtr->Expr);
                if (unify(Expr,Env0,StatePtr->Expr,Env1)) {

/* Reset "Masked" bits. */
                        StatePtr->State &= ~Mask;

/* Unlink the entry ONLY if all characteristic
                         * bits have been reset to 0.
                         */
                        if (StatePtr->State != 0) {
                                /* Advance pointers down the list. */
                                LastStatePtr = StatePtr;
                                StatePtr = StatePtr->Next;
                                popBindFrame(Env1);
                                continue;
                        }

/* Unlink the entry. */
                        LastStatePtr->Next = StatePtr->Next;
                        if (StatePtr == CharHeadPtr) {

/* Reset head ptr if to be deleted. */
                                CharHeadPtr = LastStatePtr
                                            = StatePtr->Next;

/* Free the entry and State Table list node. */
                                freeStruct(StatePtr->Expr);
                                StatePtr->State = 0;
                                free((char *) StatePtr);
                                StatePtr = CharHeadPtr;
                        }
                        else {
```

```
            /* Free the entry and State Table list node. */
            freeStruct(StatePtr->Expr);
            StatePtr->State = 0;
            free((char *) StatePtr);
            StatePtr = LastStatePtr->Next;
        }
    }
    else {
        /* Advance pointers down the list. */
        LastStatePtr = StatePtr;
        StatePtr = StatePtr->Next;
    }

/* Destroy variable binding frames. */
    popBindFrame(Env1);
}

/* Destroy Expr's variable binding environment ONLY if one was
 * created locally.
 */
if (Env==-1) popBindFrame(Env0);
}
/****************************************************************
INFERENCE ENGINE

CFCOMBINE [220]

PURPOSE
    Combine two integer Certainty Factors to produce one resulting
    certainty factor.

NOTES
    Restrictions:
        * Should never get a CF > 100 or < -100.
        * If OLD CF is 100 or -100, then RESULT is OLD
        * Should be able to get up to a CF of 99 with lesser CFs.

RETURNS
    Integer CF

****************************************************************/ cfCombine(cf1, cf2, RetCf, RetCode)
int     cf1;        /* 1st certainty factor to be combined.      */
int     cf2;        /* 2nd certainty factor to be combined.      */
int     *RetCf;     /* The returned, combined certainty factor.  */
int     *RetCode;   /* Success/failure return code.              */

{
    int cfmin;

/* Initialization. */
    demon(220,BEGIN);
    *RetCode = 0;

if (cf1<-100 || cf2<-100 || cf1>100 || cf2>100) {

/* CFs must be between -100 and 100 */
        *RetCode = -111;
        error(220,-111);
    }
    else if (cf1 == 100 || cf2 == 100)
        *RetCf = 100;

else if (cf1 == -100 || cf2 == -100)
        *RetCf = -100;

else if (cf1 >= 0 && cf2 >= 0)
        *RetCf = ((cf1 + cf2) * 100 - cf1*cf2) / 100;
```

```
        else if (cf1 <= 0 && cf2 <= 0)
                *RetCf = (((cf1 + cf2) * 100 + cf1*cf2) / 100);

else if (cf1 < 0) {
                cfmin = (-cf1 < cf2) ? -cf1 : cf2;      /* min(cf1,cf2) */
                *RetCf = (((cf1 + cf2) * 100) / (100 - cfmin));
        }
        else {
                cfmin = (cf1 < -cf2) ? cf1 : -cf2;      /* min cf1,cf2 */
                *RetCf = (((cf1 + cf2) * 100) / (100 - cfmin));
        }
        demon(220, END);
}
/***************************************************************************** unify.c

Copyright (C) 1985 Teknowledge, Inc.
                       525 University Ave.
                       Suite 200
                       Palo Alto, CA  94301
                       (415) 327-6600

PROGRAM
        Copernicus
        Version 1.0

PURPOSE
        Provides the unification/instantiation capabilities of Copernicus.

COMPILER
        Version 1.0:
                Computer Innovations Optimizing C86
                IBM-PC SUBROUTINES
        unify()
        instantiate()
        partialInstantiate()
        instStruct()
        deRefStruct()
        bindingIndex()
        getBindingPtr()
        fullBindingIndex()
        bindVar()
        pushBindFrame()
        popBindFrame()
        pushLocalFrame()
        undoBindings()
*****************************************************************************/ include <stdio.h>
include "typedef.h"
/* Binding Stack.
 * The binding stack index, BindStkIndex, always points to the next
 * available BindStack[] slot, i.e., it points one above the top stack
 * entry.
 */
#define BINDSTACK_LEN   500

BINDSTK BindStack[BINDSTACK_LEN];
int     BindStkIndex = 0;
```

```
/* Trail Stack.
 * The trail stack index, TrailStkIndex, always points to the next
 * available TrailStack[] slot, i.e., it points one above the top stack
 * entry.
 */
TRAILSTK TrailStack[500];
int      TrailStkIndex = 0;
/****************************************************************
INFERENCE ENGINE

UNIFY

PURPOSE
        Unify one structure against a second structure.  Bind variables
        from one structure to the other by placing bindings on the
        variable Binding Stack, BindStack[].

RETURNS
        True    Unification succeeded.
        False   Unification failed.

NOTES
        unify() binds variables by putting their bindings on BindStack[],
        the variable binding stack.  The bindings are NOT copied, only
        pointers to them are put on the stack.  This greatly enhances
        efficiency.  If you desire actual instantiations - that is, actual
        copies of the structures - then first use unify() to bind the
        variables followed by instantiate() to copy the bindings.

The binding may go in either direction, depending on which
        environment is more recent, thus the order of the arguments is not
        important.
****************************************************************/ int
unify(Struct1,Env1,Struct2,Env2)
STRUCT *Struct1;        /* 1st structure to be unified with 2nd.       */
int Env1;               /* Variable binding environment for Struct1.   */
STRUCT *Struct2;        /* 2nd structure to be unified with the 1st.   */
int Env2;               /* Variable binding environment for Struct2.   */

{
        extern deRefStruct();
        extern undoBindings();
        extern bindVar();
        extern int TrailStkIndex;

int CurTrailIndex;      /* Current Trail Stack top-of-stack.   */
        unsigned int Length;    /* Length of structure.                */
        int RetCode;            /* Success/failure return code.        */
        int i;

/* Remember current position in Trail[] so that if/when unify()
         * fails, the partial bindings can be undone with ease.
         */
        CurTrailIndex = TrailStkIndex;

/* Simplify the entry.  If it's a structure of length 1, skip
         * the length count.  If it's a bound variable, use its binding.
         * If it's a pointer to a structure, use that structure.
         */
        deRefStruct(Struct1,Env1,&Struct1,&Env1,&RetCode);
        if (Struct1 == NULL) return(FALSE);             /* Error. */
        deRefStruct(Struct2,Env2,&Struct2,&Env2,&RetCode);
        if (Struct2 == NULL) return(FALSE);             /* Error. */

/* Struct1 and Struct2 can now be variables only if they were unbound.
         * This code unifies them.  If we have only one variable, we bind it
         * to the other structure.  If both are variables, we first verify if
         * they are the same.  Otherwise, we bind the variable in the older
```

```
 * (pushed on the stack first) environment to the more recent.
 */
if (VAL_TYPE(Struct1)==VARIABLE && VAL_TYPE(Struct2)==VARIABLE) {
        if (Env1==Env2 && NAME(Struct1)==NAME(Struct2))
                return(TRUE);
        if (Env2 > Env1) {
                /* Env2 is more recent.  Bind Struct1 to Struct2. */
                bindVar(NAME(Struct2),Env2,Struct1,Env1);
                return(TRUE);
        }
        else {
                /* Env1 is more recent.  Bind Struct2 to Struct1. */
                bindVar(NAME(Struct1),Env1,Struct2,Env2);
                return(TRUE);
        }
}
if (VAL_TYPE(Struct1) == VARIABLE) {
        bindVar(NAME(Struct1),Env1,Struct2,Env2);
        return(TRUE);
}
if (VAL_TYPE(Struct2) == VARIABLE) {
        bindVar(NAME(Struct2),Env2,Struct1,Env1);
        return(TRUE);
}

/* Neither of the arguments are variable now.  Compare their types
 * and values.  For structures, try to unify each of their components.
 * At this point, we only have structures of length greater than 1.
 * If the structures don't match, undo their bindings.
 */
if (VAL_TYPE(Struct1) != VAL_TYPE(Struct2))
        return(FALSE);

switch(VAL_TYPE(Struct1)) {
case SYMBOL:
        return((NAME(Struct1) == NAME(Struct2)) ? TRUE : FALSE);
case INTNUM:
        return((Struct1->value.intVal == Struct2->value.intVal) ?
                TRUE : FALSE);
case FLOATNUM:
        /* for floating point, verify if they are within reasonable
         * range.  (TO BE DONE)
         */
        return((Struct1->value.floatVal == Struct2->value.floatVal) ?
                TRUE : FALSE);
case LENGTH:
        /* Verify if structures have same length.  If so, try to
         * unify each of the components.  If we don't succeed, we
         * will want to undo the bindings that were done during
         * those unifications.
         */
        Length = Struct1->value.Length;
        if (Struct2->value.Length != Length)
                return(FALSE);

/* Start at 1 to skip the length cell */
        for (i = 1; i <= Length; i++) {
                if (!unify(Struct1+i, Env1, Struct2+i, Env2)) {
                        undoBindings(CurTrailIndex);
                        return(FALSE);
                }
        }
        return(TRUE);
case STRUCTURE:
default:
        /* Walking down structures recursively is handled in the LENGTH
         * case.  Therefore, the STRUCTURE case is an error.
         */
        error(240,-80);
        undoBindings(CurTrailIndex);
```

```
                return(FALSE);
        }
}
/****************************************************************
INFERENCE ENGINE LEVEL
                                INSTANTIATE PURPOSE
        Search BindStack[], the list of current variable bindings, for
        a variable.

NOTES
        WARNING: instantiate() generates copies of structures to be returned
        to the caller. If you use instantiate(), it is your responsibility
        to freeStruct() (return to the memory pool) those structures when
        finished.

*****************************************************************/ instantiate(Var,Env,RetStruct,RetCode)
char    *Var;           /* Variable whose struct. will be instantiated. */
int     Env;            /* Var's variable binding environment.          */
STRUCT  **RetStruct;    /* The returned instantiated structure.         */
int     *RetCode;       /* Success/failure return code.                 */

{
        extern instStruct();
        extern int strcmp();
        extern BINDSTK BindStack[];
        extern int BindStkIndex;
        extern char *NameTable[];

int     i;

/* Search the current environment to find the variable to be
         * instantiated. Once found, call instStruct() to do the
         * actual copying.
         *
         * Note that the first entry in an environment will have the
         * EnvFlg (begin environment flag) set. Special care must be
         * taken to handle that entry properly when checking for loop
         * termination.
         */
        for(i=Env+1; i<BindStkIndex && !(BindStack[i].EnvFlg && i>Env); i++) {
                if (strcmp(Var,NameTable[BindStack[i].Var]) == 0) {
                        instStruct(BindStack[i].Struct, BindStack[i].Env,
                                        UNIQUEVAR, RetStruct, RetCode);
                        return;
                }
        }
}
/****************************************************************
INFERENCE ENGINE LEVEL
                                PARTIALINSTANTIATE PURPOSE
        Copy the structure bound to a variable without instantiating
        (copying) the structure's variable bindings.

NOTES
        WARNING: instantiate() generates copies of structures to be returned
        to the caller. If you use instantiate(), it is your responsibility
        to freeStruct() (return to the memory pool) those structures when
        finished.

*****************************************************************/

STRUCT *
partialInstantiate(Var,Env)
char    *Var;           /* Variable whose struct. will be instantiated. */
int     Env;            /* Var's variable binding environment.          */
```

```
extern STRUCT *copyStruct();
extern int strcmp();
extern char *NameTable[];
extern BINDSTk BindStack[];
extern int BindStkIndex;

int     i;

/* Search the current environment to find the variable to be
 * instantiated.  Once found, call copyStruct() to do the
 * actual copying.
 *
 * Note that the first entry in an environment will have the
 * EnvFlg (begin environment flag) set.  Special care must be
 * taken to handle that entry properly when checking for loop
 * termination.
 */
for(i=Env+1; i<BindStkIndex && !(BindStack[i].EnvFlg && i>Env); i++) {
        if (strcmp(Var,NameTable[BindStack[i].Var]) == 0) {
                return(copyStruct(BindStack[i].Struct));
        }
}
return((STRUCT *)NULL);
}
```

/*****************************************************************************
INFERENCE ENGINE LEVEL
                                INSTSTRUCT

PURPOSE
        Copy a structure, instantiating the new structure with the current
        variable bindings on BindStack[] as the copy is made.

NOTES
        WARNING:  instStruct() generates copies of structures to be returned
        to the caller.  If you use instStruct(), it is your responsibility
        to freeStruct() (return to the memory pool) those structures when
        finished.

If uninstantiated variables are found, new variables are "created",
        to avoid potential confusion.  For example, consider unifying
                foo(X,Y)
        with the binding (established elsewhere):
                Y = bar(X)
        This results in an instantiated structure:
                foo(X,bar(X))

Clearly the X in foo(X,Y) is NOT the same X as in bar(X).  The user
        just chose the same symbol.  Variables are local or unique to
        an instantiation of the rule/expression/KB Entry and have little to
        do with the symbols chosen.

Yet, if we generate an instantiated copy, which is "foo(X,bar(X))"
        the two Xs would appear to be the same variable!  So, we have to
        differentiate between them.  This is done by replacing the variable,
        which is actually an integer index into the NameTable[], by the
        negative of its index in the binding stack, BindStack[].

Thus, if X is 21 (index 21 into NameTable[]) we might have:
                foo(21,bar(21))
        But since the two Xs are in different positions in the variable
        binding stack, BindStack[], we make a substitution that might look
        like:
                foo(-10,bar(-5))
        since the X in foo(X,Y) is in location 10 in BindStack[] and the X
        in bar(X) is in location 5 in BindStack[].

The negative number is used to distinguish between uninstantiated
        variables which have been "substituted in" and actual indexes into
        NameTable[].  Client routines should check the sign of variables
        and act accordingly.

```
instStruct(p,Env,NewVarFlg,RetStruct,RetCode)
STRUCT   *p;                  /* Structure to be instantiated.       */
int      Env;                 /* Binding environment for variables.  */
int      NewVarFlg;           /* Create unique var names if unbound? */
STRUCT   **RetStruct;         /* The created structure.              */
int      *RetCode;            /* Success/failure return code.        */
{
        extern char *copmalloc();
        extern int movmem();
        extern int fullBindingIndex();
        extern BINDSTK BindStack[];
        extern int BindStkIndex;

int Index;              /* Index into Binding Stack.            */
        unsigned int Length;    /* Length (arity) of the new structure. */
        STRUCT *q;              /* Temp. pointer to the new structure.  */
        STRUCT *r;              /* Ptr. to the newly generated struct.  */
        STRUCT *s;              /* Ptr. to generated substructure.      */
        int i;

/* Sanity check. */
        if (p == NULL) {
                *RetStruct = (STRUCT *)NULL;
                return;
        }

/* Is the instance a complete STRUCT with a "Length" header cell?
         * If not, the length is one (a single atom cell).
         */
        if (VAL_TYPE(p) != LENGTH)
                Length = 1;
        else {
                Length = p->value.Length;
                p++;
        }

/* Create a new structure. */
        q = (STRUCT *)copmalloc(sizeof(STRUCT) * (Length+1));
        if (q==NULL) {
                *RetCode = -100;
                *RetStruct = (STRUCT *)NULL;
                return;
        }
        r = q;
        q->ValType = LENGTH;
        q->value.Length = Length;
        q++;

/* Copy each element from the old structure to the new structure. */
        movmem(p,q,sizeof(STRUCT)*Length);

/* Verify if any element needs to be updated. This is true for
         * structures and variables.
         */
        for (i=0; i < Length; i++) {

/* If the cell is a STRUCTURE pointer, copy the
                 * sub-structure.
                 */
                if (VAL_TYPE(q+i) == STRUCTURE)
                        instStruct((q+i)->value.ArgPtr, Env, NewVarFlg,
                                        &((q+i)->value.ArgPtr), RetCode);

/* If the cell is a VARIABLE, copy the varibable's value
                 * into the new structure in place of the variable.
                 * The variable may have 3 states:
                 *     1) Bound - we instantiate the structure that it is
                 *        bound to, with a special check to see if the
```

```
         *          created structure is length one.  Then simply
         *          put value in the cell.
         *     2) Unbound - create a new variable "name" by
         *          using the negative of the BindStack[] index
         *          of the variable.  See NOTES above.
         *          This is to prevent conflicts.
         *     3) Really Unbound - the variable binding environment
         *          index passed in, Env, is set to -1.  This indicates
         *          the structure does not have a variable binding
         *          environment.
         */
        else if (VAL_TYPE(q+i) == VARIABLE) {

/* instStruct() supports the use of -1 for Env.
                 * If Env is -1, this indicates there is NO binding
                 * environment for the variables in the structure.
                 * Just copy the variables and don't attempt to
                 * fetch their bindings from the Binding Stack.
                 */
                if (Env == -1) continue;

/* Look up the variable's binding. */
                Index = fullBindingIndex(NAME(q+i),Env);
                if (Index == -1) {
                        /* Error condition - variable not found in
                         * environment.  PUNT!
                         */
                        *RetStruct = (STRUCT *)NULL;
                        return;
                }
                if (BindStack[Index].Struct == NULL) {
                        /* Unbound.  The de-referenced structure
                         * is an unbound variable.  If NewVarFlg
                         * was set TRUE, create a unique variable
                         * identifier.  Otherwise, just copy over
                         * the name (index into the NameTable[]) of
                         * the variable found by fullBindingIndex().
                         */
                        if (NewVarFlg)
                                (q+i)->value.Name = -Index;
                        else
                                (q+i)->value.Name = BindStack[Index].Var;
                }
                else {
                        /* Bound to a structure.  Create a copy of the
                         * structure by recursively calling
                         * instStruct().
                         */
                        instStruct(BindStack[Index].Struct,
                                BindStack[Index].Env,NewVarFlg,&s,
                                RetCode);

/* Variable can be bound to another structure
                         * or atom.
                         */
                        if (VAL_TYPE(s)==LENGTH && s->value.Length==1) {
                                movmem(s+1,q+i,sizeof(STRUCT));
                                /* can't free! */
                        }
                        else {
                                (q+i)->ValType = STRUCTURE;
                                (q+i)->value.ArgPtr = s;
                        }
                }
        }
    }

*RetStruct = r; /* Return the binding. */
}
```

```
/****************************************************************************

DEREFSTRUCT

PURPOSE
        De-reference a structure with variables.

****************************************************************************/ deRefStruct(Struct,Env,RetStruct,RetEnv,RetCode)
STRUCT *Struct;         /* The structure to de-reference.              */
int Env;                /* Struct's variable binding environment.      */
STRUCT **RetStruct;     /* The returned (de-referenced) structure.     */
int *RetEnv;            /* RetStruct's variable binding environment.   */
int *RetCode;           /* Success/Failure return code.                */
{
        extern int bindingIndex();
        extern BINDSTK BindStack[];
        extern int BindStkIndex;

int i;

/* Initialize. */
        *RetCode = 0;

/* Simplify the entry.  If it's a structure of length 1, skip
         * the length count.  If it's a bound variable, use its binding.
         * If it's a pointer to a structure, use that structure.
         */
        while (TRUE) {

/* If a 2 cell structure where the 1st cell is a "Length
                 * Header Cell", skip to the 2nd cell containing the
                 * actual information.
                 */
                if (VAL_TYPE(Struct)==LENGTH && Struct->value.Length == 1) {
                        Struct++;
                        continue;
                }

/* If a variable, find the variable's binding (if bound). */
                if (VAL_TYPE(Struct) == VARIABLE) {
                        /* If there is no variable binding environment,
                         * then we can't look up the variable!  This is not
                         * an error - it is a convenience to the caller.
                         */
                        if (Env == -1) break;

/* Look up the variable's binding.  If an error
                         * occurs in bindingIndex(), then clean up.
                         */
                        i = bindingIndex(NAME(Struct),Env);
                        if (i == -1) {
                                Struct = (STRUCT *)NULL;
                                Env = -1;
                                break;
                        }

/* If a variable binding was found (the variable
                         * was bound), get the new binding and the binding's
                         * environment and go thru the loop again.
                         */
                        if (BindStack[i].Struct != NULL) {
                                Struct = BindStack[i].Struct;
                                Env = BindStack[i].Env;
                                continue;
                        }
                }
```

```
            /* If a structure is referenced, descend the structure. */
            if (VAL_TYPE(Struct) == STRUCTURE) {
                    Struct = Struct->value.ArgPtr;
                    continue;
            }
            break;
    }

/* Return the de-refererenced structure and it's environment. */
    *RetStruct = Struct;
    *RetEnv = Env;
}
/***********************************************************************
INFERENCE ENGINE LEVEL
                        BINDINGINDEX PURPOSE
        Search the environment on BindStack[] for the binding of the variable.

RETURNS
        Index in BindStack[], -1 if the binding is not found.  This is an
        error.

NOTES

***********************************************************************/
int
bindingIndex(Var, Env)
int Var;                /* The variable to be found/chased.    */
int Env;                /* The variable's binding environment. */

{
        extern BINDSTK BindStack[];
        extern int BindStkIndex;

int     i;

/* Search the current environment to find the variable.
         *
         * Note that the first entry in an environment will have the
         * EnvFlg (begin environment flag) set.  Special care must be
         * taken to handle that entry properly when checking for loop
         * termination.
         */
        for(i=Env+1; i<BindStkIndex && !(BindStack[i].EnvFlg && i>Env); i++) {
                if (BindStack[i].Var == Var)
                        return(i);
        }
        error(240,-82); /* Variable binding not found. */
        return(-1);
}
/***********************************************************************
                        GETBINDINGPTR
PURPOSE
        Return the structure bound to the Template variable and the
        environment where the variable is bound.

NOTES
        The structure immediately bound to the variable is returned and NOT
        a fully de-referenced structure.  Returning a fully de-referenced
        variable would cause havoc with certain meta-facts which depend
        on getBindingPtr() returning only the structure immediately bound
        to the variable.

RETURNS (by reference)
        The structure containing Template.
        The environment where the variable in that structure is bound.
***********************************************************************/ getBindingPtr(Template,Env,RetStruct,RetEnv)
```

```
char *Template;         /* String template to match in bind frame.  */
int Env;                /* Binding environment for Template.        */
STRUCT **RetStruct;     /* Structure found on the stack.            */
int *RetEnv;            /* Binding environment for RetVar.          */

{
        extern int bindingIndex();
        extern int strcmp();
        extern char *NameTable[];
        extern BINDSTK BindStack[];
        extern int BindStkIndex;

int i;              /* Index into Binding Stack.  */
        int NameIndex;      /* Index into NameTable[].    */

/* Find the index into the nametable where the Template
         * variable is.  If the Template variable cannot be found
         * in Env, this is an error.
         */
        NameIndex = -1;
        for (i=Env+1; i<BindStkIndex && !BindStack[i].EnvFlg; i++) {

/* Search the current environment to find the variable. */
                NameIndex = BindStack[i].Var;
                if (NameIndex >= 0) {
                        if (strcmp(NameTable[NameIndex],Template) == 0)
                                break;
                }
        }

/* Check to see if the variable was found on the Binding Stack.
         * If not, an error should be reported.
         */
        if (NameIndex==-1) {
                *RetStruct = (STRUCT *)NULL;
                *RetEnv = -1;
                return;
        }

/* Look up the variable's binding.
         * NOTE: bindingIndex() should be used here and NOT
         * fullBindingIndex().  This is because getBindingPtr() is defined
         * to return the structure bound immediately to the specified
         * variable.
         */
        if ((i = bindingIndex(NameIndex, Env)) == -1) {
                /* This is an error, but will already have been
                 * reported by bindingIndex().
                 */
                *RetStruct = (STRUCT *)NULL;
                *RetEnv = -1;
        }
        else {
                /* The variable was found, so return it's bound structure
                 * and the bound structure's variable binding environment.
                 */
                *RetStruct = BindStack[i].Struct;
                *RetEnv = BindStack[i].Env;
        }
}
/****************************************************************************
INFERENCE ENGINE LEVEL
                                FULLBINDINGINDEX PURPOSE
        Search the environment on BindStack[] for the binding of the variable.
        If that binding is itself a variable, return the full binding of that
        variable.

RETURNS
        Index in BindStack[]. -1 if no binding found (error).
```

NOTES

```
/******************************************************************/ int
fullBindingIndex(Var, Env)
int     Var;            /* The variable to find/chase.          */
int     Env;            /* The variable's binding environment.  */

{
        extern int bindingIndex();
        extern BINDSTK BindStack[];
        extern int BindStkIndex;

int     i;

/* Dereference variables until bound variable is found. */
        while (TRUE) {

/* Get the variable's index (position) on the Binding
                 * Stack.  If it isn't found, return -1 to signal an
                 * error.  The actual error is reported in bindingIndex().
                 */
                if ((i = bindingIndex(Var, Env)) == -1)
                        return(-1);

/* If the variable has a binding, chase the binding in
                 * its binding environment to see if it is bound to another
                 * variable (e.g., X->Y->Z->foobar) or an atom.
                 */
                if (BindStack[i].Struct != NULL) {
                        if (VAL_TYPE(BindStack[i].Struct) == VARIABLE) {
                                Var = BindStack[i].Struct->value.Name;
                                Env = BindStack[i].Env;
                                continue;
                        }
                        if (VAL_TYPE(BindStack[i].Struct) == LENGTH &&
                                BindStack[i].Struct->value.Length == 1 &&
                                VAL_TYPE(BindStack[i].Struct+1) == VARIABLE) {
                                Var = (BindStack[i].Struct+1)->value.Name;
                                Env = BindStack[i].Env;
                                continue;
                        }
                }
                return(i);
        }
}
/******************************************************************

BINDVAR

PURPOSE
        Bind to a Variable in Environment1 a Structure from Environment2.
        Keep a copy on the variable that was changed on the Trail.

******************************************************************/ bindVar(Var, Env1, Struct2, Env2)
int Var;                /* The variable to be bound.            */
int Env1;               /* Var's variable binding environement. */
STRUCT *Struct2;        /* The structure to bind to Var.        */
int Env2;               /* Struct2's variable binding environ.  */

{
        extern int addName();
        extern int bindingIndex();
        extern BINDSTK BindStack[];
        extern int BindStkIndex;

static int FirstTimeFlg = TRUE; /* For initialization.          */
```

```
        static int AnonVar;           /* Name of anonymous variable. */
        int RetCode;                  /* Success/failure return code. */
        int i;

/* Perform initialization. */
        if (FirstTimeFlg) {
                FirstTimeFlg = FALSE;

/* Look up Name (Symbol Table index) of the anonymous
                 * variable.
                 */
                AnonVar = addName("_",&RetCode);
                if (RetCode!=0) return;
        }

/* Check for the "anonymous variable", the underscore, "_".
         * The anonymous variable is a Prolog-ism which matches
         * anything but doesn't bind.
         */
        if (Var==AnonVar) return;

/* If the variable's binding environment (index into the Binding
         * Stack) is -1, return without performing any binding. This
         * is a user convenience.
         */
        if (Env1 == -1) return;

/* Fetch Binding Stack index (position) of Var. If it isn't on
         * the Binding Stack, this is an internal error. Return without
         * doing anything; the error is reported in bindingIndex().
         */
        if ((i = bindingIndex(Var, Env1)) == -1)
                return;

/* Perform the binding. */
        BindStack[i].Struct = Struct2;    /* Assign the variable (bind)     */
        BindStack[i].Env = Env2;          /* with its binding environment, */
        TrailStack[TrailStkIndex++] = i;  /* and push trail index.         */
}
/****************************************************************************
                          PUSHBINDFRAME PURPOSE
        Manipulate variable binding stack, BindStack[].
        Create "global" variable binding frame.

NOTES
        A "EnvFlg" on the binding stack indicates the start of an
        environment. For example, an environment is created for each rule.

A variable is not "defined" in the EnvFlg binding stack entry; only
        subsequent entries add variables to the binding stack.
****************************************************************************/
int
pushBindFrame(Struct)
STRUCT  *Struct;       /* Struct. whose variables are put on BindStack[]. */

{
        extern pushLocalFrame();
        extern BINDSTK BindStack[];
        extern int BindStkIndex;
        extern int TrailStkIndex;

int BegEnv;

/* Check for BindStack[] overflow. This is an out-of-space error
         * and is very critical.
         */
```

```
        if (BindStkIndex >= BINDSTACK_LEN) {
                error(240,-100);                /* BindStack[] overflow. */
                return(-1);
        }

/* Push a new "environment frame separator" - this means setting
         * the EnvFlg.  pushLocalFrame() does the actual work of pushing
         * the variables onto the Binding Stack following (on top of) the
         * frame separator.
         */
        BegEnv = BindStkIndex++;
        BindStack[BegEnv].EnvFlg = 1;
        BindStack[BegEnv].Trail  = TrailStkIndex;
        pushLocalFrame(Struct,BegEnv);
        return(BegEnv);
}
/****************************************************************************
INFERENCE ENGINE

POPBINDFRAME

PURPOSE
        Manipulate variable binding stack, BindStack[].
        Pop environment Env and all above.

NOTES
        A "EnvFlg" on the binding stack indicates the start of an
        environment.  For example, an environment is created for each rule.

****************************************************************************/ popBindFrame(Env)
int Env;                /* The variable binding frame to be popped.     */

{
        extern undoBindings();
        extern BINDSTK BindStack[];
        extern int BindStkIndex;

/* Validate Env to be a binding frame separator. */
        if (!BindStack[Env].EnvFlg) {
                error(240,-99);
                return;
        }

/* Pop the environment by undoing all bindings in that
         * environment.
         */
        undoBindings(BindStack[Env].Trail);
        BindStkIndex = Env;
}
/****************************************************************************
                                PUSHLOCALFRAME
PURPOSE
        Push variables found in a structure onto the binding stack,
        BindStack[].

NOTES
        This is the most time consuming of the unifier routines, given
        standard usage and execution profiles and tasks.  Any and all
        optimizations are appreciated!

****************************************************************************/ pushLocalFrame(p,Env)
STRUCT *p;              /* Struct. whose variables are to be pushed.    */
int Env;                /* The binding environment in which to push.    */

{
```

```
extern BINDSTK BindStack[];
extern int BindStkIndex;

register int i;         /* Looping counters. */
register int j;
int TempVar;
unsigned int Length;

/* Sanity check. */
if (p == NULL) return;

/* Is the instance a complete STRUCT with a "Length" header cell?
 * If not, the length is one (a single atom cell).
 */
if (VAL_TYPE(p) != LENGTH)
        Length = 1;
else. {
        Length = p->value.Length;
        p++;
}

/* Verify if any element is a variable.  If so, update the stack. */
for (i=0; i < Length; i++) {

/* If the cell is a STRUCTURE pointer, push the
         * sub-structure.
         */
        if (VAL_TYPE(p+i) == STRUCTURE)
                pushLocalFrame((p+i)->value.ArgPtr,Env);
        else if (VAL_TYPE(p+i) == VARIABLE) {

/* Search for the variable binding.  If it is
                 * not found (i.e. you reach the end of the binding
                 * stack, BindStk[]), then add the variable to the
                 * stack.
                 */
                TempVar = (p+i)->value.Name;
                for (j=Env+1; j < BindStkIndex; j++) {
                        if (BindStack[j].Var == TempVar)
                                break;
                }

/* The variable wasn't on the binding stack, so
                 * put it on.  Increment the EnvFlg counter which
                 * indicates the number of variables in the binding
                 * environment.
                 */
                if (j == BindStkIndex) {

/* Check for BindStack[] overflow.  The
                         * overflow error is an out-of-space error
                         * and is very critical.
                         */
                        if (BindStkIndex >= BINDSTACK_LEN) {
                                error(240,-100);
                                return;
                        }

/* Add the variable to the stack. */
                        BindStack[BindStkIndex].Var = (p+i)->value.Name;
                        BindStack[BindStkIndex].EnvFlg = 0;
                        BindStack[BindStkIndex++].Struct = (STRUCT *)NULL;
                }
        }
}
}
```

```
/************************************************************

UNDOBINDINGS

PURPOSE
        Manipulate the stack that keeps track of the bindings, TrailStack[].

NOTES

*************************************************************/ undoBindings(Index)
int     Index;

{
        extern char *NameTable[];
        extern int TrailStkIndex;

while (TrailStkIndex > Index) {
                TrailStkIndex--;
                BindStack[TrailStack[TrailStkIndex]].Struct = (STRUCT *)NULL;
        }
}
/************************************************************ unparser.c

Copyright (C) 1985 Teknowledge, Inc.
                   525 University Ave.
                   Palo Alto, CA  94301
                   (415) 327-6600

PROGRAM
        Copernicus
        Version 1.0 - IBM PC

SUBROUTINES
        unParse()
        putAtomUnParBuf()
        putUnParBuf()
        unParBlock()
        unParCell()
        unParList()
        unParRestList()

*************************************************************/ include <stdio.h>
include "typedef.h"
#include "parsedef.h"
/* EXTERNS
 * These externs must be placed here because they are used in macros defined
 * in parsedef.h.
 */
extern char *SymbolChar;

/* STATICS
 */
static char *UnParBuf;
static int BufSize;
static int BufCharCnt;
static unsigned char UnParFormat;      /* same as Format, the format parameter
                                        * passed in to unParse().
                                        */
```

```
/******************************************************************************

UNPARSE

PURPOSE
        Transform a structure into a text string.  Usually the argument
        "p" will point to a "length cell" of the structure, followed by
        a functor cell and some number of argument cells.

******************************************************************************/ unParse(p,Env,StrPtr,Format,RetCode)
STRUCT *p;                      /* The structure to be unparsed.     */
int Env;                        /* Variable binding environment for "p".*/
char **StrPtr;                  /* Where to put generated string.    */
unsigned char Format;           /* Quote strings?                    */
int *RetCode;                   /* Success/failure return code.      */

{
        extern char *copmalloc();
        extern char *strcpy();
        extern int unParCell();
        extern int free();

*RetCode = 0;           /* Success until proven otherwise.   */
        UnParFormat = Format;   /* Copy to global area for other routines.*/

/* Sanity check. */
        if (p==(char *)NULL) {
                *StrPtr = (char *)NULL;
                return;
        }

/* Initialize the buffer.  It will grow whenever the structure
         * takes more space than allocated.  These will be global
         * data for the procedures  putUnParBuf() and putAtomUnParBuf().
         */
        BufSize = 80;
        UnParBuf = (char *)copmalloc(BufSize * sizeof(char));
        if (UnParBuf == (char *)NULL) return;
        BufCharCnt = 0;
        *UnParBuf = '\0';       /* Defensive */

/* Do the appropriate sort of unparsing. */
        if (VAL_TYPE(p) != LENGTH) {
                *RetCode = unParCell(p,Env,MINPREC);
        }
        else if (p->value.Length == 1) {
                *RetCode = unParCell(p+1,Env,MINPREC);
        }
        else {
                *RetCode = unParBlock(p,Env,MINPREC);
        }

/* Copy over the results and return.   */
        *StrPtr = copmalloc((BufCharCnt+1) * sizeof(char));
        if (*StrPtr == (char *)NULL) return;
        strcpy(*StrPtr,UnParBuf);
        free(UnParBuf);
}
/******************************************************************************

PUTATOMUNPARBUF

PURPOSE
        Concatenate the atom onto the unparsing buffer, enlarging
        the buffer if necessary.  Differs from putUnParBuf in that
        it checks whether the atom needs to be enclosed in quotes,
        and does so if called for.
```

NOTES

May affect UnParBuf, BufCharCnt and BufSize as side effects.

```
*******************************************************************/ putAtomUnParBuf(i)
int     i;      /* Index of atom in NameTable[].              */

{
        char    *Str;
        char    *Cur;
        STRUCT  *p;
        extern unsigned char *strchr();
        extern char *copmalloc();
        extern char *NameTable[];
        extern unsigned char NamePropTable[];

Str = NameTable[i];
        if ((UnParFormat & QUOTEMASK) && (NEEDS_QUOTES(i))) {
                /* Print quote marks around atom.
                 * Must determine whether or not to include a space before
                 * the opening quote mark.
                 */
                if (BufCharCnt == 0)
                        putUnParBuf("'");       /* No space if buffer was empty.*/
                else if (strchr(" ,[(", UnParBuf[BufCharCnt-1]))
                        /* No additional space before open
                         * quote in these cases.
                         */
                        putUnParBuf("'");
                else
                        putUnParBuf(" '");

Cur = UnParBuf+BufCharCnt; /* Next available place in buffer.*/ while (*Str) {
                        if (BufCharCnt >= BufSize-3) {
                                /* Buffer can only hold BufSize-1 "real"
                                 * chars, plus '\0'. Must enlarge buffer.
                                 * For safety we allow room to double the
                                 * quote mark if the string contains a '\''.
                                 * We also allow room for the close quote, so
                                 * it can be inserted without a call to
                                 * putUnParBuf().
                                 */
                                BufSize += 80;
                                p = (char *)copmalloc(BufSize);
                                if (p==(char *)NULL) return;
                                movmem(UnParBuf,p,BufCharCnt);
                                free(UnParBuf);
                                UnParBuf = p;
                                Cur = UnParBuf + BufCharCnt;
                        }
                        if (*Str == '\'') {
                                *Cur++ = '\'';
                                BufCharCnt++;
                        }
                        *Cur++ = *Str++;
                        BufCharCnt++;
                }
                *Cur++ = '\'';  /* Close quote. No extra space. */
                *Cur++ = '\0';  /* Defensive. */
                BufCharCnt++;   /* Don't count the '\0'.        */
        }
        else {
                /* Atom does not need quote marks. Put it the usual way. */
                putUnParBuf(Str);
        }
}
```

```
/*********************************************************************

PUTUNPARBUF

PURPOSE
        Concatenate the string argument onto the unparsing buffer, enlarging
        the buffer if necessary.

NOTES
        May affect  UnParBuf, BufCharCnt and BufSize  as side effects.

Must be called with lexical units no smaller than tokens, as this
        routine will add a space between the last character of the unparse
        buffer and the first character being added to the unparse buffer if
        it determines that a space is necessary to separate the tokens.

To put atoms to the UnParBuf[], call  putAtomUnParBuf().  That routine
        will determine whether quote marks are needed.

**********************************************************************/ putUnParBuf(Str)
char *Str;

{
        int Len;
        char *Cur;
        char *Prev;
        char *p;
        extern char *copmalloc();
        extern unsigned char *strchr();
        extern int strlen();
        extern char *UnParBuf;
        extern int BufCharCnt;

/* Check for degenerate cases. */
        if ((Str == (char *)NULL) || ((Len=strlen(Str)) == 0)) return;

if (BufCharCnt + Len +1 >= BufSize) {
                /* Buffer can only hold BufSize-1 "real" chars, plus '\0'.
                 * Must enlarge buffer.  For safety we allow room to add an
                 * extra space (" ") between the last char in the buffer
                 * and the first char that we are now adding.
                 */
                BufSize += Len + 80;
                p = (char *)copmalloc(BufSize);
                if (p==(char *)NULL) return;
                movmem(UnParBuf,p,BufCharCnt);
                free(UnParBuf);
                UnParBuf = p;
        }

Cur = UnParBuf+BufCharCnt;
        if (BufCharCnt > 0)  Prev = Cur-1;
        else Prev = (char *)NULL;
        /* See if we need to insert an extra space between last char
         * in buffer and next char we are going to add.
         */ if (Prev==(char *)NULL || *Prev==' ' || *Str==' ') {
                /* do nothing. */
        }
        else if (*Prev=='=' || *Str=='=') {
                /* ALWAYS put a space before AND after an equal sign. */
                *Cur++ = ' ';
                BufCharCnt++;
        }
        else if (strchr("[(,",*Prev) || strchr("])(,",*Str)) {
                /* do nothing */
        }
```

```c
        else if (iscsym(*Str)) {
                if (iscsym(*Prev) || (*Prev==')') || (*Prev==']')) {
                        *Cur++ = ' ';
                        BufCharCnt++;
                }
        }
        else if (IS_SYMBOL_CHAR(*Prev) && IS_SYMBOL_CHAR(*Str)) {
                *Cur++ = ' ';
                BufCharCnt++;
        }
        else if (*Prev=='\'' && *Str=='\'') {
                *Cur++ = ' ';
                BufCharCnt++;
        }

/* Copy the string, ending with the closing '\0'. */
        while (*Cur++ = *Str++);
        BufCharCnt += Len;
}
/*******************************************************************

UNPARBLOCK

PURPOSE
        Unparse a block of STRUCT cells of length >= 2.

NOTES
        Encloses the unparsed structure in parentheses if the precedence
        of the operator (if there is one) is less than OkPrec.

RETURNS
        0 if successful.
        Negative error code if improper structure encountered.

*******************************************************************/
int
unParBlock(p,Env,OkPrec)
STRUCT *p;              /* A block of STRUCT cells to be unParse()ed.  */
int Env;                /* Variable binding environment for "p".        */
int OkPrec;             /* The lowest precedence operator that can be
                         * written without parentheses.
                         */
{
        int Err;                /* Error code from called routines.    */
        unsigned char Assoc;
        unsigned char OpType;
        unsigned char SpaceFlg;
        int Prec;
        int LOkPrec;
        int ROkPrec;
        unsigned int Len;
        int i;                  /* Loop index.                          */
        int j;                  /* Index into OpTable[].                */
        extern int lookUpOp();
        extern unsigned char opType();
        extern OPTABLE OpTable[];
        extern int DotIndex;
        extern int CommaPrec;

/* Defensive: */
        if (VAL_TYPE(p) != LENGTH) {
                /* Parser bug: routine should not have been called. */
                return(-28);
        }

Len = p->value.Length;
        if (Len == 1) {
                return(unParCell(p,Env,OkPrec));
        }
```

```
/* Get here if block has length >= 2.
 * Take care of lists first.  They are a very special case.
 */
if (((p+1)->value.Name == DotIndex) &&
    (VAL_TYPE(p+1) == SYMBOL) &&
    (Len == 3)) {
        return(unParList(p,Env));
}

/* Next take care of functors. */
Assoc = ASSOC(p+1);
if (Assoc == NOTOP) {
        /* Print the functor, "(", each argument (except the last)
         * followed by a comma, then the last argument followed by
         * ")", and finally (if called for) a space.
         *
         * For functor, the space bit indicates to print a space
         * after the closing parenthesis, not after the functor.
         * Hence we must temporarily un-set the space bit before
         * passing the functor off for printing.
         */
        SpaceFlg = HAS_SPACE(p+1);
        (p+1)->ValType &= ~SPACEMASK;
        Err = unParCell(p+1,Env,MAXPREC+1);
        if (Err < 0) return(Err);
        (p+1)->ValType |= SpaceFlg;
        putUnParBuf("(");
        for (i=2; i < Len; i++) {
                Err = unParCell(p+i,Env,CommaPrec+1);
                if (Err < 0) return(Err);
                putUnParBuf(",");
        }
        Err = unParCell(p+Len,Env,CommaPrec+1);
        if (Err < 0) return(Err);
        putUnParBuf(")");
        return(0);              /* Sweet success at last. */
}

/* Get here if the block is an operator structure.  Now we must
 * see what sort of operator it is so we can print out the
 * arguments in the right order and know what OkPrec to pass
 * in the recursive calls for the arguments.
 */
OpType = opType(Assoc);
j = lookUpOp((p+1)->value.Name,OpType);
Prec = OpTable[j].Prec;

if (Assoc==YF || Assoc==YFX) LOkPrec = Prec;
else LOkPrec = Prec+1;

if (Assoc==FY || Assoc==XFY) ROkPrec = Prec;
else ROkPrec = Prec+1;

if (Prec < OkPrec) putUnParBuf("(");

switch (OpType) {
case INF:
        Err = unParCell(p+2,Env,LOkPrec);
        if (Err < 0) return(Err);
        Err = unParCell(p+1,Env,MAXPREC+1);
        if (Err < 0) return(Err);
        Err = unParCell(p+3,Env,ROkPrec);
        if (Err < 0) return(Err);
        break;
case PREF:
        Err = unParCell(p+1,Env,MAXPREC+1);
        if (Err < 0) return(Err);
        Err = unParCell(p+2,Env,ROkPrec);
        if (Err < 0) return(Err);
        break;
```

```
            case POST:
                    Err = unParCell(p+2,Env,LOkPrec);
                    if (Err < 0) return(Err);
                    Err = unParCell(p+1,Env,MAXPREC-1);
                    if (Err < 0) return(Err);
                    break;
            default:
                    /* Parser Bug:  This case should be impossible. */
                    return(-99);
            } /* switch */ if (Prec < OkPrec) {
                    /* Delete trailing space before adding ")". */
                    if (*(UnParBuf+BufCharCnt-1) == ' ') BufCharCnt--;
                    putUnParBuf(") ");
            } return(0);          /* Success. */
}
/************************************************************************

UNPARCELL

PURPOSE
        Unparse a single STRUCT cell. If the cell has ValType STRUCTURE, then
        unparse the entire structure to which the ArgPtr points.

RETURNS
        0 if successful.
        Negative error code if improper cell encountered.

************************************************************************/
int
unParCell(p,Env,OkPrec)
STRUCT *p;              /* The structure cell to unParse().        */
int Env;                /* Variable binding environment for "p".   */
int OkPrec;             /* Minimum prec operator that does not require
                         * surrounding parentheses.
                         */
{
        /* Imports. */
        extern unsigned char *strchr();
        extern char *strcat();
        extern char *NameTable[];
        extern BINDSTK BindStack[];

char tmpbuf[30];
        int Err;                /* Error code from called routines.    */
        int i;

switch(VAL_TYPE(p)) {
        case LENGTH:
                return(unParBlock(p,Env,OkPrec));
        case SYMBOL:
                /* Must check whether to print in quotes or not.
                 * putAtomUnParBuf() does that checking.
                 */
                putAtomUnParBuf(p->value.Name);
                break;
        case VARIABLE:

/* Get variable's binding, if the binding environment is NOT
                 * -1. A -1 value for Env indicates there is no
                 * binding environment.
                 */
                if (Env>=0 && p->value.Name>=0) {
                        /* Get the variable's binding. If "p" does have
                         * a binding, then recursively call unParBlock().
                         * If "p" does NOT have a binding, fall through and
                         * print the variable's name.
```

```
                */
                i = fullBindingIndex(p->value.Name,Env);
                if ((i)>=0 && BindStack[i].Struct != (char *)NULL) {
                        Err = unParCell(BindStack[i].Struct,
                                BindStack[i].Env,OkPrec);
                        return(Err);
                }
        }

/* Occasionally the unifier sets a variable name index to
         * a negative number.
         * Don't output the name in that case.  Instead, generate
         * a new variable name using the index.
         */
        if (p->value.Name >= 0)
                putUnParBuf(NameTable[p->value.Name]);
        else {
                sprintf(tmpbuf,"X%d",-(p->value.Name));
                putUnParBuf(tmpbuf);
        }
        break;
case COMMA:
case ENDTOKEN:
        /* No check for quote marks necessary.  Put directly. */
        putUnParBuf(NameTable[p->value.Name]);
        break;
case FLOATNUM:
        sprintf(tmpbuf,"%1.6g",(double)(p->value.floatVal));
        if (strchr(tmpbuf,'.') == (char *)NULL)
                strcat(tmpbuf,".0");
        putUnParBuf(tmpbuf);
        break;
case INTNUM:
        ltoa((long)(p->value.intval),tmpbuf);
        putUnParBuf(tmpbuf);
        break;
case STRUCTURE:
        if ((Err=unParBlock(p->value.ArgPtr,Env,OkPrec)) < 0)
                return(Err);
        break;
default:
        /* Parser Bug: No other cases should occur. */
        return(-29);    /* Internal error. */
}

/* Gave up on the scheme of echoing spaces input by the user:
 *      if (HAS_SPACE(p)) putUnParBuf(" ");
 */ return(0); /* Success */
}
/****************************************************************************

UNPARLIST

PURPOSE
        Unparse a list (dotted pair) using the bracket-comma-bar notation.

NOTES
        It is the responsibility of the calling routine to validate that
        the argument  p  does indeed point to a dotted pair.  Nonsense will
        result otherwise.

****************************************************************************/
unParList(p,Env)
STRUCT  *p;             /* Dotted pair list.                            */
int Env;                /* Variable binding environment for "p".        */
{
        int     Err;    /* Error code from called routines. */
```

```
        extern int CommaPrec;

putUnParBuf("C");
        Err = unParCell(p+2,Env,CommaPrec+1);
        if (Err < 0) return(Err);
        Err = unParRestList(p+3,Env);
        if (Err < 0) return(Err);

/* Delete trailing space before adding "]". */
        if (*(UnParBuf + BufCharCnt - 1) == ' ') BufCharCnt--;
        putUnParBuf("]");
        return(0);
}
/****************************************************************

UNPARRESTLIST

PURPOSE
        To unparse the second element of a dotted pair, be it the null
        list, some other list, or not a list at all.

****************************************************************/ unParRestList(q,Env)
STRUCT  *q;             /* Second argument (3rd cell) of dotted pair.  */
int     Env;            /* Variable binding environment for "q".       */

{
        STRUCT  *r;
        int     Err;
        extern int DotIndex;
        extern int NullListIndex;
        extern int CommaPrec;

/* First see if it's the null list, and output nothing if so. */
        if ((q->value.Name == NullListIndex) &&
            (VAL_TYPE(q) == SYMBOL)) {
                return(0); /* success */
        }

/* Next see if it's some other list (i.e. dotted pair).      */
        if (VAL_TYPE(q) == STRUCTURE) {
                /* It might be. */
                r=q->value.ArgPtr;
                if (((r+1)->value.Name == DotIndex) &&
                    (VAL_TYPE(r+1) == SYMBOL) &&
                    (r->value.Length == 3)) {
                        /* It IS a dotted pair. */
                        putUnParBuf(",");
                        Err = unParCell(r+2,Env,CommaPrec+1);
                        if (Err < 0) return(Err);
                        return(unParRestList(r+3,Env));
                }
        }

/* Get here if  q  is NOT a structure pointing to a dotted pair. */
        putUnParBuf("|");
        return(unParCell(q,Env,CommaPrec));
}
/****************************************************************

USER.C

Copyright (C) 1985 Teknowledge, Inc.
                        525 University Ave.
                        Suite 200
                        Palo Alto, CA  94301
                        (415) 327-6600
```

```
PROGRAM
        Copernicus
        Version 1.0

PURPOSE
        Defines stubs for functions that are normally provided by the user.

COMPILER
        Version 1.0:
                Computer Innovations Optimizing C86
                IBM-PC SUBROUTINES
        demon()
        determine()
        error()
        evalAction()
        evalMetaFact()
        evalMetaProp()
        event()
        metaFactLoaded()
        readch()
        writebuf()
*************************************************************************/ include <stdio.h>
include "typedef.h"
/************************************************************************

DEMON

************************************************************************/ demon(Function,Code)
int Function;
int Code;

{
}
/************************************************************************

DETERMINE

PURPOSE
        Provides values for objects that have no relevant entries
        in the knowledge base.

NOTES
        The user must use addCache() to specify the values found for
        the Object.  Allowing the user to return a string like
        "the best color = red. the best body = full of 50. the best body
        = light of 40." might be allowed later.

*************************************************************************/
determine(Obj,Env)
STRUCT  *Obj;           /* Object for which values must be found. */
int Env;                /* Variable binding environment. */
{
}
/************************************************************************

ERROR

************************************************************************/
```

```
error(Function,ErrorId)
int Function;          /* Function id. */
int ErrorId;           /* Error identifier number. */
{
}
```

/**************************************************************

EVALACTION

**************************************************************/

```
evalAction(Action,PremiseCf,HaltFlg,PropCf,RetCode)
ACTION *Action;
int PremiseCf;
int *HaltFlg;
int *PropCf;
int *RetCode;

{
}
```

/**************************************************************

EVALMETAFACT

PURPOSE
        In the process of evaluating an object, the kernel has found
        a user-defined meta-fact. This function performs the appropriate
        actions for that meta-fact.

**************************************************************/

```
evalMetaFact(Entry,key,Env,Id,HaltFlg)
STRUCT *Entry;         /* Meta-fact entry.                     */
STRUCT *key;           /* Meta-fact key (expression).          */
int Env;               /* Variable binding environment.        */
char Id;               /* User code for the meta-fact.         */
int *HaltFlg;          /* Stop seeking expression? SV cutoff?  */
{
}
```

/**************************************************************

EVALMETAPROP

PURPOSE
        In the process of evaluating an object, the kernel has found
        a user-defined meta-prop. This function performs the appropriate
        actions for that meta-prop.

**************************************************************/

```
evalMetaProp(Prop,Env,id,Cf,Action,HaltFlg,PropCf,RetCode)
STRUCT *Prop;          /* Ptr to proposition to be evaluated.  */
int Env;               /* Variable binding environment.        */
int Cf;                /* Certainty factor of proposition.     */
int id;                /* Meta-proposition identifier.         */
ACTION *Action;        /* Continuation block.                  */
int *HaltFlg;          /* True if halted for single-value.     */
int *PropCf;           /* Returned CF of the proposition.      */
int *RetCode;          /* Success/failure code.                */
{
}
```

/**************************************************************

EVENT

**************************************************************/

```
event(EventId,Expr,Value,Cf,Env)
int EventId;           /* Event identifier.                    */
STRUCT *Expr;          /* The expression or kbase entry.       */
```

```
    STRUCT *Value;      /* The value or kbase label.      */
    int Cf;             /* The certainty factor, if any.  */
    int Env;            /* The binding environment for Expr. */

{
    }
/**************************************************************************

METAFACTLOADED

**************************************************************************/ metaFactLoaded(MetaFact,Id,ProceedFlg)
    STRUCT *MetaFact;   /* Meta-fact encountered.  */
    int Id;             /* Meta-fact identifier.   */
    int *ProceedFlg;    /* Add meta-fact to KB?    */
    {
    }
/**************************************************************************

READCH

**************************************************************************/ readch(c)
    int *c;         /* Character to return. */

{
        *c = '\0';
    }
/**************************************************************************

WRITECH

**************************************************************************/ writebuf(buf)
    char *buf;          /* String buffer to write. */
    {
    }
/************************************************************************** utility.c

Copyright (C) 1985 Teknowledge, Inc.
                525 University Ave.
                Suite 200
                Palo Alto, CA  94301
                (415) 327-6600

PROGRAM
        COPERNICUS
        Version 1.0 - IBM PC

PURPOSE
        Copernicus is an inference engine implemented as a set of subroutines.

COMPILER
        Version 1.0:
                Computer Innovations Optimizing C86
                IBM-PC SUBROUTINES
        copmalloc()
        copyStruct()
```

```
          freeStruct()
          insertList()
          newList()
          removeList()
          freeList()
          reFree()
***************************************************************/ include <stdio.h>
include "typedef.h"
/***************************************************************

COPMALLOC

PURPOSE
        Special Copernicus malloc() that checks for "no space available"
        condition.
NOTES
        copmalloc() function id is 150.
***************************************************************/
char *
copmalloc(Size)
int Size;               /* Number of bytes to allocate. */

{
        extern char *malloc();

char *p;

if ((p=malloc(Size)) == (char *)NULL) {
                error(150,-100);        /* Out of memory space. */
        }
        return(p);
}
/***************************************************************

COPYSTRUCT

PURPOSE
        Make a copy of the structure.  This does not instantiate.
RETURNS
        A clone of the original structure.

***************************************************************/

STRUCT *
copyStruct(p)
STRUCT  *p;

{
        extern char *copmalloc();

int i;
        unsigned int Length;
        STRUCT *q;
        STRUCT *RetStruct;

/* Defensive check. */
        if (p==(char *)NULL) return((STRUCT *)NULL);

/* Is the instance a complete STRUCT with a "Length" header cell?
         * If not, the length is one (a single atom cell).
         */
        if (VAL_TYPE(p) != LENGTH)
                Length = 1;
        else {
                Length = p->value.Length;
                p++;
        }
        /* Create a new structure. */
```

```
        RetStruct = q = (STRUCT *)copmalloc(sizeof(STRUCT) * (Length+1));
        if (q==(STRUCT *)NULL) return((STRUCT *)NULL);   /* Out-of-Space error. */
        q->ValType = LENGTH;
        q->value.Length = Length;
        q++;

/* Copy each element from the old structure to the new structure. */
        movmem(p, q, sizeof(STRUCT)*Length);

/* Verify if any element needs to be updated.  This is true for
         * structures.
         */
        for (i=0; i < Length; i++) {

/* If the cell is a STRUCTURE pointer, copy the
                 * sub-structure.
                 */
                if (VAL_TYPE(q+i) == STRUCTURE)
                        (q+i)->value.ArgPtr = copyStruct((q+i)->value.ArgPtr);
        }
        return(RetStruct);
}
/***************************************************************************

FREESTRUCT

PURPOSE
        Return the memory consumed by a structure to the malloc() memory
        pool.

***************************************************************************/ freeStruct(p)
STRUCT *p;

{
        int     i;

/* Sanity check. */
        if (p==(STRUCT *)NULL) return;
        if (VAL_TYPE(p) != LENGTH) return;

/* Free out any sub-structures contained in "p" before freeing "p"
         * itself.
         */
        for (i=1; i <= p->value.Length; i++) {
                if (VAL_TYPE(p+i) == STRUCTURE) {
                        freeStruct((p+i)->value.ArgPtr);
                        (p+i)->value.ArgPtr = (STRUCT *)NULL;   /* Be safe. */
                }
        }
        free(p); /* Free the head structure. */
}
/***************************************************************************
                        INSERTLIST
PURPOSE
        Add an item to a list.  This allocates enough memory for a next
        pointer and a struct pointer.

position = 0  : insert at top of list.
        position = -1 : insert at bottom of list.
        position = n  : insert before nth item.
RETURNS
        position where item was added (0 if unsuccessful).
***************************************************************************/
int
insertList (List,Entry,Position)
LISTHEAD *List;
STRUCT *Entry;
int     Position;
```

```
        extern char *copmalloc();

int i;
        ITEMINLIST *Item;           /* Item to be inserted.      */
        ITEMINLIST *Temp;           /* Lead pointer.             */
        ITEMINLIST *Connect = NULL; /* Chase pointer.            */

/* Sanity check. */
        if (List == NULL)
                return(0);

/* Allocate a new item. */
        if ((Item = (ITEMINLIST *) copmalloc(sizeof(ITEMINLIST))) == NULL)
                return(0);
        if (Position == -1)
                Position = List->Size + 1;

/* Find point of insertion. */
        Temp = List->First;         /* Set lead pointer.         */
        for (i=1; i<Position && Temp!=NULL; i++) {
                Connect = Temp;     /* Advance chase pointer.    */
                Temp = Temp->Next;  /* Advance lead pointer.     */
        }

/* Fill in the blanks. */
        List->Size++;               /* Inc. list cardinality.    */
        Item->Contents = Entry;     /* Insert the entry.         */
        Item->Next = Temp;          /* Link in the Item.         */

/* Link in the new entry. */
        if (i == 1)
                List->First = Item;
        else
                Connect->Next = Item;

return(i);                  /* Return position of insertion. */
}
/****************************************************************
                            NEWLIST PURPOSE
        Create a new top of a list. Initializes the first item to NULL and
        size to zero.
RETURNS
        A pointer to the top of the list (NULL if unsuccessful).
****************************************************************/

LISTHEAD *
newList()
{
        extern char *copmalloc();

LISTHEAD *Temp;

/* Allocate new entry. */
        if ((Temp = (LISTHEAD *) copmalloc(sizeof(LISTHEAD))) == NULL)
                return(NULL);

/* Fill in blanks. */
        Temp->First = NULL;
        Temp->Size = 0;
        return(Temp);
}
/****************************************************************
                           REMOVELIST
PURPOSE
        Remove an item in a list. This frees the memory for the next pointer
        and the STRUCT pointer in the item. Before freeing, it finds the
        STRUCT pointer to return.
```

```
            position = 0  : remove the top item in list
            position = -1 : remove the bottom item in list
            position = n  : remove the nth item in the list.
RETURNS
            Pointer to the structure contained in the item that was removed.
*****************************************************************************/
STRUCT *
removeList(List, Position)
LISTHEAD *List;
int Position;           /* Remove nth item.    */
{
            ITEMINLIST *FreeMe;
            STRUCT  *Temp;

/* Currently returns only the TOP of the list. */
            if (List->Size == 0)
                    return((char *)NULL);
            List->Size--;
            FreeMe = List->First;
            Temp = FreeMe->Contents;
            List->First = FreeMe->Next;
            free((char *)FreeMe);
            return(Temp);
}
/*****************************************************************************
                            FREELIST
PURPOSE
            Free up the memory of an entire list.  Walk through the list and
            free up each item.  Free the listhead.
RETURNS
            Nothing.
*****************************************************************************/
freeList(List)
LISTHEAD *List;
{
            if (List) {
                    refree(List->First);
                    free((char *)List);
            }
}
/*****************************************************************************
                            REFREE PURPOSE
            Frees an entire list, recursively.

*****************************************************************************/
refree(ptr)
ITEMINLIST *ptr;
{
            if (ptr) {
                    refree(ptr->Next);
                    free((char *)(ptr->Contents));
                    free((char *)ptr);
            }
}
```

What is claimed is:

1. A knowledge base processor comprising a computer; said computer having a memory containing data; said computer also having means for processing said data; said data including a knowledge base and a control procedure; said knowledge base representing knowledge about a certain subject domain, said knowledge base including a set of rules which in combination is capable of being applied to conclude values for certain expressions; said data also including at least one domain-dependent application subroutine; said control procedure including subroutine entry points capable of being called for accessing the knowledge base and finding the value of a specified expression by invoking combinations of said rules; said means for processing said data including means for executing said control procedure in response to calls to said subroutine entry points for accessing the knowledge base and finding the value of a specified expression by invoking combinations of said rules, and means for calling said application subroutine in response to the execution of certain designated steps in said control procedure during said invoking of said rules.

2. The knowledge base processor as claimed in claim 1, wherein said designated steps include the completion of said invoking of said rules in the event that said rules fail to conclude a value for a specified expression, whereupon an application supplied subroutine is called to determine a value for said specified expression.

3. The knowledge base processor as claimed in claim 1, wherein said designated steps include a step wherein said means for executing said control procedure encounters and interprets a predetermined meta-proposition in said rules in said knowledge base.

4. The knowledge base processor as claimed in claim 1, wherein said control procedure includes a callable subroutine executable by said means for executing for receiving a specified meta-proposition and storing said meta-proposition in a table of specified meta-propositions in memory, and wherein said designated steps include a step wherein said means for executing said control procedure compares symbols found in rules being invoked to the specified meta-propositions in said table, and calls an application subroutine in response to a match between a symbol found in a rule being invoked and a meta-proposition found in said table.

5. The knowledge base processor as claimed in claim 4, wherein during said call to said application subroutine in response to said match, said means for calling passes the matching symbol to said application subroutine.

6. The knowledge base processor as claimed in claim 1, wherein said designated steps include the step wherein the value of an expression has been determined by said means for executing.

7. The knowledge base processor as claimed in claim 1, wherein said designated steps include a step wherein the value of an expression is first being sought by said means for executing.

8. The knowledge base processor as claimed in claim 1, wherein said designated steps includes a step wherein a rule is invoked by said means for executing.

9. The knowledge base processor as claimed in claim 1, wherein said designated steps include a step wherein a rule is applied by said means for executing.

10. The knowledge base processor as claimed in claim 1, wherein said means for calling includes means for calling a single application subroutine in response to a number of different events, and means for passing data to said single application subroutine to indicate the particular event in response to which said single application subroutine is called.

11. The knowledge base processor as claimed in claim 1, wherein said control procedure includes a callable subroutine which is executable by said means for executing for aborting invocation of said rules.

12. The knowledge base processor as claimed in claim 11, wherein said means for executing said control procedure includes means for receiving a parameter associated with a subroutine call to said entry point for aborting the invocation of said rules, said parameter specifying a certain expression, and wherein only the invocation of rules which are being invoked to find a value for said expression specified by said parameter is aborted.

13. The knowledge base processor as claimed in claim 1, wherein sid control procedure is specified by a set of software subroutines in a high-level programming language, all of which are callable by an application program.

14. The knowledge base processor as claimed in claim 1, wherein said rules include certainty factors, and wherein said control procedure includes steps executable by said means for executing for combining certainty factors during rule invocation, for determining an associated certainty factor for each concluded value, and for indicating a respective set of rules successfully applied to conclude said value and certainty factor so as to record a reason for the value and certainty factor.

15. A knowledge system comprising a computer having a memory containing data, said computer also having means for processing said data; said data including a knowledge base representing knowledge about a particular subject domain, said knowledge base including rules specifying symbolic values for expressions representing objects in the subject domain, said means for processing said data including a knowledge base processor means for accessing the knowledge base and finding the value of a specified expression by invoking said rules, said data further including an application program for said subject domain, said application program being written in a conventional computer programming language that does not include lists and list operations as built-in features and that specifies control by the ordering of program steps that are executed by said computer, said application program including subroutine calls to said knowledge base processor means, wherein said knowledge base processor means comprises means for executing a control procedure, said control procedure being specified by a set of subroutines having been written in said conventional computer program language and compiled, and linked and loaded together with said application program into the memory of said computer.

16. The knowledge system as claimed in claim 15, wherein said conventional computer programming language is the "C" programming language.

17. The knowledge system as claimed in claim 15, wherein said set of subroutines includes a set of application interface subroutines callable by said application program, a set of inference engine subroutines callable by said application interface subroutines to control the invocation of said rules, and a set of data structure access subroutines callable by said application interface subroutines and said inference engine subroutines for accessing said knowledge base.

18. A knowledge system comprising a computer having a memory containing data, said computer also having means for processing said data; said data including a knowledge base representing knowledge about a particular subject domain, said knowledge base including rules specifying symbolic values for expressions representing objects in the subject domain, said means for processing said data including a knowledge base processor means for accessing the knowledge base and finding the value of a specified expression by invoking said rules, said data further including an application program for said subject domain, said application program being written in a conventional computer programming language that does not include lists and list operations as built-in features and that specifies control by the ordering of program steps that are executed by said computer, said application program including subroutine calls to said knowledge base processor means, wherein said knowledge base processor means includes means for receiving a call from said application program for receiving a specified meta-proposition and storing said meta-proposition in a table of predefined meta-propositions in memory, and for inspecting the table during invocation of each rule to determine whether the rule has any of said predefined meta-propositions therein, and upon finding any of said predefined meta-propositions therein for calling an application subroutine in said application program to interpret the predefined meta-proposition found in said rule.

19. A knowledge system comprising a computer having a memory containing data, said computer also having means for processing said data; said data including a knowledge base representing knowledge about a particular subject domain, said knowledge base including rules specifying symbolic values for expressions representing objects in the subject domain, said means for processing said data including a knowledge base processor means for accessing the knowledge base and finding the value of a specified expression by invoking said rules, said data further including an application program for said subject domain, said application program being written in a conventional computer programming language that does not include lists and list operations as built-in features and that specifies control by the ordering of program steps that are executed by said computer, said application program including subroutine calls to said knowledge base processor means, wherein said knowledge base processor means includes means for receiving a call from said application program for aborting said invoking of said rules.

20. A knowledge system comprising a computer having a memory containing data, said computer also having means for processing said data; said data including a knowledge base representing knowledge about a particular subject domain, said knowledge base including rules specifying symbolic values for expressions representing objects in the subject domain, said means for processing said data including a knowledge base processor means for accessing the knowledge base and finding the value of a specified expression by invoking said rules, said data further including an application program for said subject domain, said application program being written in a conventional computer programming language that does not include lists and list operations as built-in features and that specifies control by the ordering of program steps that are executed by said computer, said application program including subroutine calls to said knowledge base processor means, wherein said knowledge base processor means includes means for receiving a call from said application program together with a specified expression parameter from said application program and thereupon aborting invocation of said rules for concluding a value for said specified expression parameter.

21. A knowledge system comprising a computer having a memory containing data, said computer also having means for processing said data; said data including a knowledge base representing knowledge about a particular subject domain, said knowledge base including rules specifying symbolic values for expressions representing objects in the subject domain, said means for processing said data including a knowledge base processor means for accessing the knowledge base and finding the value of a specified expression by invoking said rules, said data further including an application program for said subject domain, said application program being written in a conventional computer programming language that does not include lists and list operations as built-in features and that specifies control by the ordering of program steps that are executed by said computer, said application program including subroutine calls to said knowledge base processor means, wherein said knowledge base includes certain statements designated as application defined meta-facts and said application program includes a subroutine call to said knowledge base processor for loading said knowledge base from a file into said memory, and said knowledge base processor means includes means for recognizing said application defined meta-facts during the loading of said knowledge base from said file into said memory, and upon recognizing each application-defined meta-fact, calling a certain application subroutine to interpret said application defined meta-fact before said rules are invoked.

22. A knowledge system comprising a computer having a memory containing data, said computer also having means for processing said data; said data including a knowledge base representing knowledge about a particular subject domain, said knowledge base including rules specifying symbolic values for expressions representing objects in the subject domain, said means for processing said data including a knowledge base processor means for accessing the knowledge base and finding the value of a specified expression by invoking said rules, said data further including an application program for said subject domain, said application program being written in a conventional computer programming language that does not include lists and list operations as built-in features and that specifies control by the ordering of program steps that are executed by said computer, said application program including subroutine calls to said knowledge base processor means, wherein said rules include certainty factors, and wherein said knowledge base processor means includes means for combining certainty factors during rule invocation, determining an associated certainty factor for each concluded value, and indicting a respective set of rules successfully applied to conclude said value and certainty factor so as to record a reason for the value and certainty factor.

23. A method of operating a computer to solve problems within a certain subject domain, said computer having a data processor and a memory, said memory containing a knowledge base representing knowledge about said subject domain, said knowledge base including rules for determining symbolic values for expressions representing objects in the subject domain, said method including the steps of storing in said computer memory an application program for said subject domain; and operating said data processor to execute said application program on said computer to solve a certain problem in said domain, said domain-dependent application program having been written in a conventional computer programming language that does not include lists and list operations as built-in features and that specifies control by the ordering of program steps that are executable by said data processor, said application program having steps for receiving information about said problem, said application program conducting symbolic inference during execution by calling subroutines in a domain-independent subroutine library including said subroutines which are called to back-chain rules to find a value of specified goal expressions and to change the language of the knowledge base by adding specified application defined meta-propositions to the syntax recognized by the domain-independent subroutine library, said domain-independent subroutine library calling back certain application subroutines in the application program, including at least one application supplied subroutine for evaluating said application defined meta-propositions when they sre found in said rules.

24. The method as claimed in claim 23, wherein said knowledge base also includes application defined metafacts which are recognized by said subroutine library and are passed by calls from the subroutine library to an application defined subroutine in the application program for execution prior to the back-chaining of said rules.

25. The method as claimed in claim 23, wherein said application supplied subroutines are called to determine the value of an expression when said back-chaining of said rules fails to find a value for an expression, and to signal that an error has been found during the execution of a particular one of the subroutines in said subroutine in library.

26. The method as claimed in claim 23, wherein at least one of said application supplied subroutines is called to indicate when a value for an expression is first being sought, and when a value for an expression has been concluded.

27. The computer-based interaction method as claimed in claim 23, wherein said domain-independent subroutine library includes subroutines for loading the knowledge base from a file, editing the knowledge base, and saving the knowledge base to a file.

28. A method of operating a computer to solve problems within a certain subject domain, said computer having a data processor and a memory, said memory containing a knowledge base representing knowledge about said subject domain, said knowledge base including a set of rules which in combination are capable of being applied to conclude values for certain expressions, said method including the steps of:
  storing a control procedure and at least one domain-dependent application subroutine in said computer memory, said control procedure including subroutine entry points capable of being called for accessing the knowledge base and finding a value of a specified expression by invoking combinations of said rules;
  operating said data processor to execute said control procedure in response to calls to said callable entry points for accessing the knowledge base and finding the value of a specified expression by invoking combinations of said rules; and
  operating said data processor to call said application subroutine in response to the execution of certain designated steps in said control procedure during invocation of said rules.

29. The method as claimed in claim 28, wherein said designated steps in said control procedure include completing the invocation of said rules when said rules fail to conclude a value for a specified expression, and wherein said method includes subsequently calling an application subroutine to determine a value for said specified expression.

30. The method as claimed in claim 28, wherein said designated steps include a step of interpreting a predetermined meta-proposition in said rules during the execution of said control procedure.

31. The method as claimed in claim 28, wherein said control procedure includes a callable subroutine which is executed by said data processor for receiving a specified meta-proposition and storing said meta-proposition in a table of specified meta-propositions in said memory, and wherein said designated steps include a step wherein said data processor compares symbols found in a rule being invoked to the specified meta-proposition in said table, and calls an application subroutine in response to a match between a symbol found in a rule being invoked and a meta-proposition found in said table.

32. The method as claimed in claim 31, wherein a matching symbol is passed to said application subroutine during said call to said application subroutine in response to said match.

33. The method as claimed in claim 28, wherein said designated steps include separate steps wherein the value of an expression has been determined, the value of an expression is first being sought, a rule is invoked, and a rule is successfully applied.

34. The method as claimed in claim 28, wherein a single application subroutine is called in response to a number of different events, and data are passed to said single application subroutine to indicate a particular event in response to which said single application subroutine is called.

35. The method as claimed in claim 28, wherein said control procedure includes a subroutine entry point which is called for aborting invocation of said rules.

36. The method as claimed in claim 35, wherein said control procedure is provided with a parameter associated with a subroutine call to said entry point which is called for aborting the invocation of said rules, said parameter specifying a certain expression, and wherein only the invocation of rules which are being invoked to find a value of said expression specified by said parameter is aborted.

37. The method as claimed in claim 28, wherein said control procedure is specified by a set of software subroutines in a high-level programming language.

38. The method as claimed in claim 28, wherein said rules include certainty factors, and said control procedure includes steps which are executed for combining certainty factors during rule invocation, for determining an associated certainty factor for each concluded value, and for indicating a respective set of rules successfully applied to conclude said value and certainty factor so as to record a reason for the value and certainty factor.

39. A method of operating a computer having a memory storing data, said computer also having means for processing data stored in said memory, said data including a knowledge base representing knowledge about a particular subject domain, said knowledge base including rules specifying symbolic values for expressions representing objects in the subject domain, said means for processing said data including means for accessing the knowledge base and finding the value of a specified expression by invoking said rules included within said knowledge base, said method including storing in said memory an application program for said subject domain, said application program having been written in a conventional computer programming language that does not include lists and list operations as built-in features and that specifies control by the ordering of program steps that are executed by said computer, said application program including subroutine calls to said knowledge base processor means; and operating said means for processing said data to execute said application program so as to access said knowledge base and find the value of said specified expression by invoking said rules.

40. The method as claimed in claim 39, wherein said knowledge base processor means comprises means for executing a control procedure, said control procedure being specified by a set of subroutines having been written in said conventional computer program language and compiled, and linked and loaded together with said application program into the memory of said computer, and wherein the execution of said application program causes said control procedure subroutines to be called for accessing said knowledge base.

41. The method as claimed in claim 40, wherein said set of control procedure subroutines includes a set of application interface subroutine, a set of inference engine subroutines and a set of data structure access subroutines, and wherein said application interface subroutines are called by said application program, said set of inference engine routines are called by said application interface subroutines to control the invocation of said rules, and said set of data structure access subroutines are called by said application interface subroutines and said inference engine subroutines for accessing said knowledge base.

* * * * *